US012112024B2

(12) United States Patent
Manzari et al.

(10) Patent No.: US 12,112,024 B2
(45) Date of Patent: Oct. 8, 2024

(54) USER INTERFACES FOR MANAGING MEDIA STYLES

(71) Applicant: Apple Inc., Cupertino, CA (US)

(72) Inventors: Johnnie B. Manzari, San Francisco, CA (US); Graham R. Clarke, Scotts Valley, CA (US); William A. Sorrentino, III, Mill Valley, CA (US); Andre Souza Dos Santos, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/721,039

(22) Filed: Apr. 14, 2022

(65) Prior Publication Data

US 2022/0382440 A1 Dec. 1, 2022

Related U.S. Application Data

(60) Provisional application No. 63/243,633, filed on Sep. 13, 2021, provisional application No. 63/195,679, filed on Jun. 1, 2021.

(51) Int. Cl.
*G06F 3/04845* (2022.01)
*G06F 3/0482* (2013.01)

(52) U.S. Cl.
CPC ........ *G06F 3/04845* (2013.01); *G06F 3/0482* (2013.01)

(58) Field of Classification Search
CPC ... G06F 3/04845; G06F 3/0481; G06F 3/0482
USPC .......................................................... 715/764
See application file for complete search history.

(56) References Cited

U.S. PATENT DOCUMENTS

| | | | |
|---|---|---|---|
| 4,518,237 | A | 5/1985 | Mizokami |
| 4,933,702 | A | 6/1990 | Komatsuzaki et al. |
| 5,463,443 | A | 10/1995 | Tanaka et al. |
| 5,557,358 | A | 9/1996 | Mukai et al. |
| 5,615,384 | A | 3/1997 | Allard et al. |
| 6,262,769 | B1 | 7/2001 | Anderson et al. |
| 6,268,864 | B1 | 7/2001 | Chen et al. |
| 6,278,466 | B1 | 8/2001 | Chen |
| 6,621,524 | B1 | 9/2003 | Iijima et al. |
| 6,677,981 | B1 | 1/2004 | Mancuso et al. |
| 6,900,840 | B1 | 5/2005 | Schinner et al. |
| 7,515,178 | B1 | 4/2009 | Fleischman et al. |
| 7,583,892 | B2 | 9/2009 | Okumura |
| 8,073,207 | B2 | 12/2011 | Ayaki et al. |
| 8,185,839 | B2 | 5/2012 | Jalon et al. |

(Continued)

FOREIGN PATENT DOCUMENTS

| | | | |
|---|---|---|---|
| AU | 2013368443 | B2 | 3/2016 |
| AU | 2017100683 | B4 | 1/2018 |

(Continued)

OTHER PUBLICATIONS

Certificate of Examination received for Australian Patent Application No. 2021107587, mailed on Apr. 29, 2022, 2 pages.

(Continued)

*Primary Examiner* — Hwei-Min Lu
(74) *Attorney, Agent, or Firm* — DLA Piper LLP (US)

(57) ABSTRACT

The present disclosure generally relates to user interfaces for media-processing styles. In some embodiments, the present disclosure relates to user interfaces for editing media-processing styles.

60 Claims, 39 Drawing Sheets

(56) References Cited

U.S. PATENT DOCUMENTS 8,295,546 B2 10/2012 Craig et al.
8,390,628 B2 3/2013 Harding et al.
8,405,680 B1 3/2013 Gomes et al.
8,423,089 B2 4/2013 Song et al.
8,493,408 B2 7/2013 Williamson et al.
8,576,304 B2 11/2013 Ishibashi
8,638,371 B2 1/2014 Laberge et al.
8,723,988 B2 5/2014 Thorn
8,736,704 B2 5/2014 Jasinski et al.
8,736,716 B2 5/2014 Prentice
8,848,097 B2 9/2014 Makii
8,885,978 B2 11/2014 Cote et al.
8,896,652 B2 11/2014 Ralston
8,922,588 B2 12/2014 Makino et al.
9,001,226 B1 4/2015 Ng et al.
9,024,938 B2 5/2015 Joshi
9,094,576 B1 7/2015 Karakotsios
9,153,031 B2 10/2015 El-Saban et al.
9,158,974 B1 10/2015 Laska et al.
9,207,837 B2 12/2015 Paretti et al.
9,223,486 B2 12/2015 Shin et al.
9,230,241 B1 1/2016 Singh et al.
9,230,306 B2 1/2016 Sun et al.
9,230,355 B1 1/2016 Ahuja et al.
9,245,177 B2 1/2016 Perez
9,246,961 B2 1/2016 Walkin et al.
9,250,797 B2 2/2016 Roberts et al.
9,264,660 B1 2/2016 Petterson et al.
9,288,476 B2 3/2016 Sandrew et al.
9,298,263 B2 3/2016 Geisner et al.
9,313,397 B2 4/2016 Harris et al.
9,313,401 B2 4/2016 Frey et al.
9,342,230 B2 5/2016 Bastien et al.
9,349,414 B1 5/2016 Furment et al.
9,360,671 B1 6/2016 Zhou
9,448,708 B1 9/2016 Bennett et al.
9,467,812 B2 10/2016 Jung et al.
9,507,420 B2 11/2016 Tartz et al.
9,544,563 B1 1/2017 Cheng et al.
9,592,428 B2 3/2017 Binder
9,600,178 B2 3/2017 Yun et al.
9,602,559 B1 3/2017 Barros et al.
9,609,221 B2 3/2017 Kim et al.
9,626,589 B1 4/2017 Graham et al.
9,628,416 B2 4/2017 Henderson
9,667,881 B2 5/2017 Harris et al.
9,686,497 B1 6/2017 Terry
9,704,250 B1 7/2017 Gilmour et al.
9,716,825 B1 7/2017 Manzari et al.
9,747,504 B2 8/2017 Ma et al.
9,760,976 B2 9/2017 Kameyama
9,767,613 B1 9/2017 Bedikian et al.
9,819,912 B2 11/2017 Maruta
9,913,246 B1 3/2018 Carey et al.
9,948,589 B2 4/2018 Gonnen et al.
10,015,298 B2 7/2018 Yang et al.
10,021,294 B2 7/2018 Kwon et al.
10,055,887 B1 8/2018 Gil et al.
10,091,411 B2 10/2018 Ha et al.
10,095,385 B2 10/2018 Walkin et al.
10,127,639 B2 11/2018 Miura et al.
10,139,218 B2 11/2018 Matsushita
10,152,222 B2 12/2018 Ozawa et al.
10,176,622 B1 1/2019 Waggoner et al.
10,187,587 B2 1/2019 Hasinoff et al.
10,225,463 B2 3/2019 Yun et al.
10,230,901 B2 3/2019 Harris et al.
10,270,983 B1 4/2019 Van Os et al.
10,289,265 B2 5/2019 Kulkarni
10,297,034 B2 5/2019 Nash et al.
10,304,231 B2 5/2019 Saito
10,313,652 B1 6/2019 Falstrup et al.
10,325,417 B1 6/2019 Scapel et al.
10,326,942 B2 6/2019 Shabtay et al.
10,345,592 B2 7/2019 Samec et al.
10,375,313 B1 8/2019 Van Os et al.
10,379,719 B2 8/2019 Scapel et al.
10,397,469 B1 8/2019 Yan et al.
10,397,500 B1 8/2019 Xu et al.
10,447,908 B2 10/2019 Lee et al.
10,467,729 B1 11/2019 Perera et al.
10,467,775 B1 11/2019 Waggoner et al.
10,521,091 B2 12/2019 Anzures et al.
10,521,948 B2 12/2019 Rickwald et al.
10,523,879 B2 12/2019 Dye et al.
10,574,895 B2 2/2020 Lee et al.
10,585,551 B2 3/2020 Lee et al.
10,614,139 B2 4/2020 Fujioka et al.
10,638,058 B2 4/2020 Matsunaga
10,645,294 B1 * 5/2020 Manzari ................ H04N 23/74
10,652,470 B1 5/2020 Manzari et al.
10,657,695 B2 5/2020 Chand et al.
10,659,405 B1 5/2020 Chang et al.
10,674,072 B1 6/2020 Manzari et al.
10,681,282 B1 6/2020 Manzari et al.
10,698,575 B2 6/2020 Walkin et al.
10,735,642 B1 8/2020 Manzari et al.
10,735,643 B1 8/2020 Manzari et al.
10,791,273 B1 9/2020 Manzari et al.
10,798,035 B2 10/2020 Lewis et al.
10,845,968 B2 11/2020 Scapel et al.
10,855,910 B2 12/2020 Tano et al.
10,902,661 B1 1/2021 Mourkogiannis et al.
10,958,850 B2 3/2021 Kwak et al.
11,039,074 B1 6/2021 Manzari et al.
11,054,973 B1 7/2021 Manzari et al.
11,120,528 B1 9/2021 Seely et al.
11,140,313 B1 10/2021 Knott
11,212,449 B1 12/2021 Manzari et al.
11,321,857 B2 5/2022 Stauber et al.
11,350,026 B1 5/2022 Manzari et al.
11,418,699 B1 8/2022 Manzari et al.
11,468,625 B2 10/2022 Manzari et al.
11,539,876 B2 12/2022 Manzari et al.
11,550,420 B2 1/2023 Bovet et al.
11,570,359 B2 1/2023 Lee et al.
11,606,496 B2 3/2023 Watanabe et al.
11,747,969 B1 9/2023 Karunamuni
11,778,339 B2 10/2023 Manzari et al.
11,811,961 B2 11/2023 Zhang et al.
2002/0070945 A1 6/2002 Kage
2002/0167604 A1 11/2002 Ban et al.
2003/0107664 A1 6/2003 Suzuki
2003/0122930 A1 7/2003 Schofield et al.
2003/0160756 A1 8/2003 Numano
2003/0174216 A1 9/2003 Iguchi et al.
2004/0027369 A1 * 2/2004 Kellock ............... G11B 27/034
2004/0041924 A1 3/2004 White et al.
2004/0061796 A1 4/2004 Honda et al.
2004/0090469 A1 5/2004 Moon et al.
2004/0201699 A1 10/2004 Parulski et al.
2005/0024517 A1 2/2005 Luciano
2005/0027515 A1 2/2005 Huang et al.
2005/0189419 A1 9/2005 Igarashi et al.
2005/0206981 A1 9/2005 Hung
2005/0210380 A1 * 9/2005 Kramer ................... G06T 11/00
715/255
2005/0210403 A1 9/2005 Satanek
2005/0248660 A1 11/2005 Stavely et al.
2005/0270397 A1 12/2005 Battles
2006/0033831 A1 2/2006 Ejima et al.
2006/0132482 A1 6/2006 Oh et al.
2006/0158730 A1 7/2006 Kira
2006/0170781 A1 8/2006 Sobol
2006/0187322 A1 8/2006 Janson et al.
2006/0209067 A1 9/2006 Pellacini et al.
2006/0228040 A1 10/2006 Simon et al.
2007/0024614 A1 2/2007 Tam et al.
2007/0025723 A1 2/2007 Baudisch et al.
2007/0031062 A1 2/2007 Pal et al.
2007/0097088 A1 5/2007 Battles
2007/0101355 A1 5/2007 Chung et al.
2007/0113099 A1 5/2007 Takikawa et al.
2007/0140675 A1 6/2007 Yanagi et al.

(56) References Cited

U.S. PATENT DOCUMENTS

2007/0153112 A1 7/2007 Ueda et al.
2007/0195350 A1* 8/2007 Hattori ............... H04N 1/00413 358/1.13
2007/0222789 A1* 9/2007 Yoshio ................ G06F 3/04845 345/589
2007/0228259 A1 10/2007 Hohenberger
2007/0257992 A1 11/2007 Kato
2007/0273769 A1 11/2007 Takahashi
2007/0291152 A1 12/2007 Suekane et al.
2008/0030592 A1 2/2008 Border et al.
2008/0084484 A1 4/2008 Ochi et al.
2008/0106601 A1 5/2008 Matsuda
2008/0129759 A1 6/2008 Jeon et al.
2008/0129825 A1 6/2008 Deangelis et al.
2008/0131019 A1 6/2008 Ng
2008/0143840 A1 6/2008 Corkum et al.
2008/0192020 A1 8/2008 Kang et al.
2008/0218611 A1 9/2008 Parulski et al.
2008/0222558 A1 9/2008 Cho et al.
2008/0259154 A1 10/2008 Garrison et al.
2008/0298571 A1 12/2008 Kurtz et al.
2008/0309811 A1 12/2008 Fujinawa et al.
2009/0009612 A1 1/2009 Tico et al.
2009/0021576 A1 1/2009 Linder et al.
2009/0021600 A1 1/2009 Watanabe
2009/0022422 A1 1/2009 Sorek et al.
2009/0027515 A1 1/2009 Maruyama et al.
2009/0027539 A1 1/2009 Kunou
2009/0040332 A1 2/2009 Yoshino et al.
2009/0046097 A1 2/2009 Franklin
2009/0051783 A1 2/2009 Kim et al.
2009/0066817 A1 3/2009 Sakamaki
2009/0073285 A1 3/2009 Terashima
2009/0077460 A1 3/2009 Li et al.
2009/0102918 A1 4/2009 Sakamoto et al.
2009/0109316 A1 4/2009 Matsui
2009/0144639 A1 6/2009 Nims et al.
2009/0167671 A1 7/2009 Kerofsky
2009/0167672 A1 7/2009 Kerofsky
2009/0175511 A1 7/2009 Lee et al.
2009/0244318 A1 10/2009 Makii
2009/0251484 A1 10/2009 Zhao et al.
2009/0263044 A1 10/2009 Imagawa et al.
2009/0271705 A1 10/2009 Sheng et al.
2009/0276700 A1 11/2009 Anderson et al.
2009/0319897 A1* 12/2009 Kotler ................. H04N 1/6013 715/838
2009/0322901 A1 12/2009 Subbotin et al.
2010/0020221 A1 1/2010 Tupman et al.
2010/0020222 A1 1/2010 Jones et al.
2010/0033615 A1 2/2010 Mori
2010/0039522 A1 2/2010 Huang
2010/0042926 A1 2/2010 Bull et al.
2010/0066853 A1 3/2010 Aoki et al.
2010/0066889 A1 3/2010 Ueda et al.
2010/0066890 A1 3/2010 Ueda et al.
2010/0066895 A1 3/2010 Ueda et al.
2010/0093400 A1 4/2010 Ju et al.
2010/0123737 A1 5/2010 Williamson et al.
2010/0124941 A1 5/2010 Cho
2010/0153847 A1 6/2010 Fama
2010/0164893 A1 7/2010 Shin et al.
2010/0188426 A1 7/2010 Ohmori et al.
2010/0194931 A1 8/2010 Kawaguchi et al.
2010/0208122 A1 8/2010 Yumiki
2010/0231777 A1 9/2010 Shintani et al.
2010/0232703 A1 9/2010 Aiso
2010/0238327 A1 9/2010 Griffith et al.
2010/0259645 A1 10/2010 Kaplan et al.
2010/0277470 A1 11/2010 Margolis
2010/0283743 A1 11/2010 Coddington
2010/0289825 A1 11/2010 Shin et al.
2010/0302280 A1 12/2010 Szeliski et al.
2010/0317410 A1 12/2010 Song et al.
2011/0008033 A1 1/2011 Ichimiya et al.
2011/0013049 A1 1/2011 Thörn
2011/0018970 A1 1/2011 Wakabayashi
2011/0019058 A1 1/2011 Sakai et al.
2011/0050864 A1 3/2011 Bond
2011/0072394 A1 3/2011 Victor et al.
2011/0074710 A1 3/2011 Weeldreyer et al.
2011/0074830 A1 3/2011 Rapp et al.
2011/0109581 A1 5/2011 Ozawa et al.
2011/0138332 A1 6/2011 Miyagawa
2011/0157379 A1 6/2011 Kimura
2011/0176039 A1 7/2011 Lo
2011/0187879 A1 8/2011 Ochiai
2011/0199495 A1 8/2011 Laberge et al.
2011/0221755 A1 9/2011 Geisner et al.
2011/0242369 A1 10/2011 Misawa et al.
2011/0249073 A1 10/2011 Cranfill et al.
2011/0249078 A1 10/2011 Abuan et al.
2011/0296163 A1 12/2011 Abernethy et al.
2011/0304632 A1 12/2011 Evertt et al.
2012/0002898 A1 1/2012 Côtéet al.
2012/0019551 A1* 1/2012 Pettigrew ................ H04N 9/75 345/594
2012/0026378 A1 2/2012 Pang et al.
2012/0036480 A1* 2/2012 Warner ............... G06F 3/04847 715/833
2012/0056830 A1 3/2012 Suzuki et al.
2012/0056997 A1 3/2012 Jang
2012/0069028 A1 3/2012 Bouguerra
2012/0079378 A1 3/2012 Goossens
2012/0127189 A1 5/2012 Park et al.
2012/0127346 A1 5/2012 Sato et al.
2012/0133797 A1 5/2012 Sato et al.
2012/0162242 A1 6/2012 Amano et al.
2012/0162455 A1 6/2012 Kim et al.
2012/0169776 A1 7/2012 Rissa et al.
2012/0188394 A1 7/2012 Park et al.
2012/0194559 A1 8/2012 Lim
2012/0206452 A1 8/2012 Geisner et al.
2012/0206495 A1 8/2012 Endo et al.
2012/0206619 A1 8/2012 Nitta et al.
2012/0206621 A1 8/2012 Chen et al.
2012/0235990 A1 9/2012 Yamaji
2012/0243802 A1 9/2012 Fintel et al.
2012/0274830 A1 11/2012 Kameyama et al.
2012/0293611 A1 11/2012 Lee
2012/0308209 A1 12/2012 Zaletel
2012/0309520 A1 12/2012 Evertt et al.
2012/0313973 A1 12/2012 Li et al.
2013/0010170 A1 1/2013 Matsuzawa et al.
2013/0038546 A1 2/2013 Mineo
2013/0055119 A1 2/2013 Luong
2013/0076908 A1 3/2013 Bratton et al.
2013/0083222 A1 4/2013 Matsuzawa et al.
2013/0088413 A1 4/2013 Raffle et al.
2013/0088614 A1 4/2013 Lee
2013/0101164 A1 4/2013 Leclerc et al.
2013/0135315 A1 5/2013 Bares et al.
2013/0141362 A1 6/2013 Asanuma et al.
2013/0141513 A1 6/2013 Setton et al.
2013/0141524 A1 6/2013 Karunamuni et al.
2013/0147933 A1 6/2013 Kulas et al.
2013/0155308 A1 6/2013 Wu et al.
2013/0155474 A1 6/2013 Roach et al.
2013/0159900 A1 6/2013 Pendharkar
2013/0165186 A1 6/2013 Choi
2013/0179831 A1 7/2013 Izaki
2013/0194378 A1 8/2013 Brown
2013/0201104 A1 8/2013 Ptucha et al.
2013/0201203 A1* 8/2013 Warner ................ G06T 11/001 345/591
2013/0201307 A1 8/2013 Schloter et al.
2013/0210563 A1 8/2013 Hollinger
2013/0222663 A1 8/2013 Rydenhag et al.
2013/0222671 A1 8/2013 Tseng et al.
2013/0235222 A1 9/2013 Karn et al.
2013/0235226 A1 9/2013 Karn et al.
2013/0235234 A1 9/2013 Cucci et al.
2013/0239057 A1 9/2013 Ubillos et al.
2013/0246948 A1 9/2013 Chen et al.

(56) References Cited

U.S. PATENT DOCUMENTS

2013/0265467 A1 10/2013 Matsuzawa et al.
2013/0290905 A1 10/2013 Luvogt et al.
2013/0336545 A1 12/2013 Pritikin et al.
2013/0346916 A1 12/2013 Williamson et al.
2014/0009639 A1 1/2014 Lee
2014/0022399 A1 1/2014 Rashid et al.
2014/0028872 A1 1/2014 Lee et al.
2014/0028885 A1 1/2014 Ma et al.
2014/0033043 A1 1/2014 Kashima
2014/0033100 A1 1/2014 Noda et al.
2014/0037178 A1 2/2014 Park
2014/0043329 A1 2/2014 Wang et al.
2014/0043368 A1 2/2014 Yu
2014/0043517 A1 2/2014 Yim et al.
2014/0047389 A1 2/2014 Aarabi
2014/0049536 A1 2/2014 Neuman et al.
2014/0055554 A1 2/2014 Du et al.
2014/0063175 A1 3/2014 Jafry et al.
2014/0063313 A1 3/2014 Choi et al.
2014/0071061 A1 3/2014 Lin et al.
2014/0071325 A1 3/2014 Kawahara et al.
2014/0092272 A1 4/2014 Choi
2014/0095122 A1 4/2014 Appleman et al.
2014/0118560 A1 5/2014 Bala et al.
2014/0118563 A1 5/2014 Mehta et al.
2014/0123005 A1 5/2014 Forstall et al.
2014/0132735 A1 5/2014 Lee et al.
2014/0152886 A1 6/2014 Morgan-Mar et al.
2014/0176469 A1 6/2014 Lim
2014/0176565 A1 6/2014 Adeyoola et al.
2014/0192233 A1 7/2014 Kakkori et al.
2014/0205207 A1* 7/2014 Bhatt ...................... G06T 11/60
382/311
2014/0218371 A1 8/2014 Du et al.
2014/0229831 A1 8/2014 Chordia et al.
2014/0232838 A1 8/2014 Jorgensen et al.
2014/0240471 A1 8/2014 Srinivasa et al.
2014/0240531 A1 8/2014 Nakai et al.
2014/0240551 A1 8/2014 Kim et al.
2014/0267126 A1 9/2014 Åberg et al.
2014/0267867 A1 9/2014 Lee et al.
2014/0281966 A1* 9/2014 Kajiyama ........... G06F 3/04847
715/708
2014/0281983 A1 9/2014 Xian et al.
2014/0282223 A1 9/2014 Bastien et al.
2014/0285698 A1 9/2014 Geiss
2014/0300635 A1 10/2014 Suzuki
2014/0300722 A1 10/2014 Garcia
2014/0300779 A1 10/2014 Yeo et al.
2014/0327639 A1 11/2014 Papakipos et al.
2014/0333671 A1 11/2014 Phang et al.
2014/0333790 A1 11/2014 Wakazono
2014/0333824 A1 11/2014 Xiu
2014/0351753 A1 11/2014 Shin et al.
2014/0354845 A1 12/2014 Mølgaard et al.
2014/0359438 A1 12/2014 Matsuki
2014/0362091 A1 12/2014 Bouaziz et al.
2014/0362105 A1 12/2014 Kocienda et al.
2014/0362274 A1 12/2014 Christie et al.
2014/0364228 A1 12/2014 Rimon
2014/0368601 A1 12/2014 Decharms
2014/0368719 A1 12/2014 Kaneko et al.
2014/0372856 A1 12/2014 Radakovitz et al.
2014/0375862 A1 12/2014 Kim et al.
2015/0022649 A1 1/2015 Koppal
2015/0033129 A1 1/2015 Cho et al.
2015/0033192 A1 1/2015 Bohannon et al.
2015/0035825 A1 2/2015 Zhou et al.
2015/0042852 A1 2/2015 Lee et al.
2015/0043806 A1 2/2015 Sunkavalli et al.
2015/0058754 A1 2/2015 Rauh
2015/0067513 A1 3/2015 Zambetti et al.
2015/0070362 A1 3/2015 Hirai
2015/0078621 A1 3/2015 Choi et al.
2015/0078726 A1 3/2015 Shakib et al.
2015/0085174 A1 3/2015 Shabtay et al.
2015/0092077 A1 4/2015 Feder et al.
2015/0109417 A1 4/2015 Zirnheld
2015/0116353 A1 4/2015 Miura et al.
2015/0116448 A1 4/2015 Gottlieb
2015/0116542 A1 4/2015 Lee
2015/0135109 A1 5/2015 Zambetti et al.
2015/0135234 A1 5/2015 Hall
2015/0138079 A1 5/2015 Lannsjö
2015/0145950 A1 5/2015 Murphy et al.
2015/0146079 A1 5/2015 Kim
2015/0149927 A1 5/2015 Walkin et al.
2015/0150141 A1 5/2015 Szymanski et al.
2015/0154448 A1 6/2015 Murayama et al.
2015/0172534 A1 6/2015 Miyakawa et al.
2015/0181135 A1 6/2015 Shimosato
2015/0189138 A1 7/2015 Xie et al.
2015/0194186 A1 7/2015 Lee et al.
2015/0208001 A1 7/2015 Nonaka et al.
2015/0212723 A1 7/2015 Lim et al.
2015/0213001 A1 7/2015 Levy et al.
2015/0213604 A1 7/2015 Li et al.
2015/0220249 A1 8/2015 Snibbe et al.
2015/0248198 A1 9/2015 Somlai-Fisher et al.
2015/0248583 A1 9/2015 Sekine et al.
2015/0249775 A1 9/2015 Jacumet
2015/0249785 A1 9/2015 Mehta et al.
2015/0254855 A1 9/2015 Patankar et al.
2015/0254868 A1 9/2015 Srikanth et al.
2015/0256749 A1 9/2015 Frey et al.
2015/0277686 A1 10/2015 Laforge et al.
2015/0286724 A1 10/2015 Knaapen et al.
2015/0289104 A1 10/2015 Jung et al.
2015/0297185 A1 10/2015 Mccormack et al.
2015/0301731 A1 10/2015 Okamoto et al.
2015/0310583 A1 10/2015 Hume et al.
2015/0312182 A1 10/2015 Langholz
2015/0312184 A1 10/2015 Langholz et al.
2015/0312185 A1 10/2015 Langholz et al.
2015/0334075 A1 11/2015 Wang et al.
2015/0334291 A1 11/2015 Cho et al.
2015/0334292 A1 11/2015 Tartz et al.
2015/0341536 A1 11/2015 Huang et al.
2015/0347824 A1 12/2015 Saari et al.
2015/0350141 A1 12/2015 Yang et al.
2015/0350533 A1 12/2015 Harris et al.
2015/0362998 A1 12/2015 Park et al.
2015/0365587 A1 12/2015 Ha et al.
2015/0370458 A1 12/2015 Chen
2016/0012567 A1 1/2016 Siddiqui et al.
2016/0026371 A1 1/2016 Lu et al.
2016/0029004 A1 1/2016 Campbell et al.
2016/0044236 A1 2/2016 Matsuzawa et al.
2016/0048598 A1 2/2016 Fujioka et al.
2016/0048599 A1 2/2016 Fujioka et al.
2016/0048725 A1 2/2016 Holz et al.
2016/0048903 A1 2/2016 Fujioka et al.
2016/0050169 A1 2/2016 Ben et al.
2016/0050351 A1 2/2016 Lee et al.
2016/0050446 A1 2/2016 Fujioka et al.
2016/0065832 A1 3/2016 Kim et al.
2016/0065861 A1 3/2016 Steinberg et al.
2016/0065930 A1 3/2016 Chandra et al.
2016/0070427 A1* 3/2016 Furtwangler ......... G06F 40/154
715/762
2016/0077725 A1 3/2016 Maeda
2016/0080639 A1 3/2016 Choi et al.
2016/0088280 A1 3/2016 Sadi et al.
2016/0092035 A1 3/2016 Crocker et al.
2016/0098094 A1 4/2016 Minkkinen
2016/0117829 A1 4/2016 Yoon et al.
2016/0127636 A1 5/2016 Ito et al.
2016/0127638 A1 5/2016 Guo et al.
2016/0132200 A1 5/2016 Walkin et al.
2016/0132201 A1 5/2016 Shaw et al.
2016/0134840 A1 5/2016 Mcculloch
2016/0142649 A1 5/2016 Yim
2016/0148384 A1 5/2016 Bud et al.
2016/0162039 A1 6/2016 Eilat et al.

(56) References Cited

U.S. PATENT DOCUMENTS

2016/0163084 A1 6/2016 Corazza et al.
2016/0173869 A1 6/2016 Srikanth et al.
2016/0188181 A1 6/2016 Smith
2016/0212319 A1 7/2016 Harris et al.
2016/0217601 A1 7/2016 Tsuda et al.
2016/0219212 A1 7/2016 Shoji
2016/0219217 A1 7/2016 Williams et al.
2016/0225175 A1 8/2016 Kim et al.
2016/0226926 A1 8/2016 Singh et al.
2016/0227016 A1 8/2016 Kim et al.
2016/0227121 A1 8/2016 Matsushita
2016/0247288 A1 8/2016 Omori et al.
2016/0247309 A1 8/2016 Li et al.
2016/0255268 A1 9/2016 Kang et al.
2016/0259413 A1 9/2016 Anzures et al.
2016/0259497 A1 9/2016 Bauer et al.
2016/0259498 A1 9/2016 Foss et al.
2016/0259499 A1 9/2016 Kocienda et al.
2016/0259518 A1 9/2016 King et al.
2016/0259519 A1 9/2016 Foss et al.
2016/0259527 A1 9/2016 Kocienda et al.
2016/0259528 A1 9/2016 Foss et al.
2016/0267067 A1 9/2016 Mays et al.
2016/0283097 A1 9/2016 Voss et al.
2016/0284123 A1 9/2016 Hare et al.
2016/0307324 A1 10/2016 Higuchi et al.
2016/0323507 A1 11/2016 Chong et al.
2016/0337570 A1 11/2016 Tan et al.
2016/0337582 A1 11/2016 Shimauchi et al.
2016/0353030 A1 12/2016 Tang et al.
2016/0357353 A1 12/2016 Miura et al.
2016/0357387 A1 12/2016 Bovet et al.
2016/0360097 A1 12/2016 Penha et al.
2016/0360116 A1* 12/2016 Penha .................. H04N 23/634
2016/0366323 A1 12/2016 Chen et al.
2016/0366344 A1 12/2016 Pan et al.
2016/0370974 A1 12/2016 Stenneth
2016/0373650 A1 12/2016 Kim et al.
2017/0011773 A1 1/2017 Lee
2017/0013179 A1 1/2017 Kang et al.
2017/0018289 A1 1/2017 Morgenstern
2017/0019604 A1 1/2017 Kim et al.
2017/0024872 A1 1/2017 Olsson et al.
2017/0026565 A1 1/2017 Hong et al.
2017/0032269 A1* 2/2017 Portilla ................ G06F 40/103
2017/0034449 A1 2/2017 Eum et al.
2017/0038852 A1 2/2017 Hildreth et al.
2017/0039686 A1 2/2017 Miura et al.
2017/0041677 A1 2/2017 Anderson et al.
2017/0046065 A1 2/2017 Zeng et al.
2017/0048450 A1 2/2017 Lee et al.
2017/0048461 A1 2/2017 Lee et al.
2017/0048494 A1 2/2017 Boyle et al.
2017/0054960 A1 2/2017 Chien et al.
2017/0061635 A1 3/2017 Petrovich et al.
2017/0064184 A1 3/2017 Tsai
2017/0064200 A1 3/2017 Castillo et al.
2017/0064205 A1* 3/2017 Choi ...................... H04N 23/00
2017/0064213 A1* 3/2017 Windmark ................ G06T 5/90
2017/0092329 A1 3/2017 Kim et al.
2017/0094019 A1 3/2017 Ahmed et al.
2017/0094132 A1 3/2017 Miyata
2017/0094161 A1 3/2017 Graham et al.
2017/0109604 A1 4/2017 Graham et al.
2017/0109912 A1 4/2017 Lee et al.
2017/0111567 A1 4/2017 Pila
2017/0111616 A1 4/2017 Li et al.
2017/0134807 A1 5/2017 Shaw et al.
2017/0139572 A1* 5/2017 Sunkavalli .......... G06F 3/04845
2017/0178287 A1 6/2017 Anderson
2017/0180811 A1 6/2017 Quirino et al.
2017/0186162 A1 6/2017 Mihic et al.
2017/0220212 A1 8/2017 Yang et al.
2017/0230576 A1 8/2017 Sparks et al.
2017/0230585 A1 8/2017 Nash et al.
2017/0237888 A1 8/2017 Harris et al.
2017/0243389 A1 8/2017 Wild et al.
2017/0244482 A1 8/2017 Dimare et al.
2017/0244896 A1 8/2017 Chien et al.
2017/0244897 A1 8/2017 Jung et al.
2017/0257559 A1 9/2017 Stricker
2017/0257596 A1 9/2017 Murata et al.
2017/0264817 A1 9/2017 Yan et al.
2017/0272654 A1 9/2017 Poindexter, Jr.
2017/0285764 A1 10/2017 Kim et al.
2017/0285916 A1 10/2017 Xu et al.
2017/0287220 A1 10/2017 Khalid et al.
2017/0302840 A1 10/2017 Hasinoff et al.
2017/0315772 A1 11/2017 Lee et al.
2017/0324784 A1 11/2017 Taine et al.
2017/0336926 A1 11/2017 Chaudhri et al.
2017/0336928 A1 11/2017 Chaudhri et al.
2017/0336961 A1 11/2017 Heo et al.
2017/0352379 A1 12/2017 Oh et al.
2017/0354888 A1 12/2017 Benedetto et al.
2017/0358071 A1 12/2017 Yamaoka et al.
2017/0359504 A1 12/2017 Manzari et al.
2017/0359505 A1* 12/2017 Manzari ............... H04N 23/631
2017/0359506 A1 12/2017 Manzari et al.
2017/0366729 A1 12/2017 Itoh
2017/0371844 A1 12/2017 Yao
2018/0007315 A1 1/2018 Kim et al.
2018/0013949 A1 1/2018 Han
2018/0021684 A1 1/2018 Benedetto
2018/0034867 A1 2/2018 Zahn et al.
2018/0035031 A1 2/2018 Kwak et al.
2018/0047200 A1 2/2018 O'hara et al.
2018/0048820 A1 2/2018 Hinkel et al.
2018/0052571 A1 2/2018 Seol et al.
2018/0077332 A1 3/2018 Shimura et al.
2018/0088787 A1 3/2018 Bereza et al.
2018/0091728 A1 3/2018 Brown et al.
2018/0091732 A1 3/2018 Wilson et al.
2018/0095649 A1 4/2018 Valdivia et al.
2018/0096202 A1 4/2018 Stathacopoulos et al.
2018/0096487 A1 4/2018 Nash et al.
2018/0107367 A1 4/2018 Rinneberg et al.
2018/0109722 A1 4/2018 Laroia et al.
2018/0113577 A1 4/2018 Burns et al.
2018/0114543 A1 4/2018 Novikoff
2018/0120661 A1 5/2018 Kilgore et al.
2018/0124299 A1 5/2018 Brook
2018/0129224 A1 5/2018 Hur
2018/0131878 A1 5/2018 Charlton et al.
2018/0146132 A1 5/2018 Manzari et al.
2018/0152611 A1 5/2018 Li et al.
2018/0184008 A1 6/2018 Kondo
2018/0184061 A1 6/2018 Kitsunai et al.
2018/0191944 A1 7/2018 Carbonell et al.
2018/0198985 A1 7/2018 Ishitsuka
2018/0199025 A1 7/2018 Holzer et al.
2018/0213144 A1 7/2018 Kim et al.
2018/0213161 A1 7/2018 Kanda et al.
2018/0227479 A1 8/2018 Parameswaran et al.
2018/0227482 A1 8/2018 Holzer et al.
2018/0227505 A1 8/2018 Baltz et al.
2018/0234608 A1 8/2018 Sudo et al.
2018/0239930 A1 8/2018 Lai et al.
2018/0253194 A1 9/2018 Javadi
2018/0267703 A1 9/2018 Kamimaru et al.
2018/0270420 A1 9/2018 Lee et al.
2018/0278823 A1 9/2018 Horesh
2018/0284979 A1 10/2018 Choi et al.
2018/0288310 A1 10/2018 Goldenberg
2018/0302551 A1 10/2018 Yamajo et al.
2018/0302568 A1 10/2018 Kim et al.
2018/0308282 A1 10/2018 Yokoi
2018/0335901 A1* 11/2018 Manzari ................ G06F 3/0488
2018/0335927 A1 11/2018 Anzures et al.
2018/0335929 A1 11/2018 Scapel et al.
2018/0335930 A1 11/2018 Scapel et al.
2018/0336715 A1 11/2018 Rickwald et al.
2018/0343383 A1 11/2018 Ito et al.
2018/0349008 A1* 12/2018 Manzari ................. H04N 23/62

(56) References Cited

U.S. PATENT DOCUMENTS

2018/0349659 A1 12/2018 Manzari et al.
2018/0352165 A1 12/2018 Zhen et al.
2018/0376122 A1 12/2018 Park et al.
2019/0007589 A1 1/2019 Kadambala et al.
2019/0028650 A1 1/2019 Bernstein et al.
2019/0029513 A1 1/2019 Gunnerson et al.
2019/0051032 A1 2/2019 Chu et al.
2019/0058827 A1 2/2019 Park et al.
2019/0082097 A1 3/2019 Manzari et al.
2019/0089873 A1 3/2019 Misawa et al.
2019/0108684 A1 4/2019 Callaghan
2019/0114740 A1 4/2019 Ogino et al.
2019/0121216 A1 4/2019 Shabtay et al.
2019/0138259 A1 5/2019 Bagaria et al.
2019/0141030 A1 5/2019 Cockerill et al.
2019/0149706 A1 5/2019 Rivard et al.
2019/0174054 A1 6/2019 Srivastava et al.
2019/0199926 A1 6/2019 An et al.
2019/0205861 A1 7/2019 Bace
2019/0206031 A1 7/2019 Kim et al.
2019/0220089 A1 7/2019 Kakizawa et al.
2019/0222769 A1 7/2019 Srivastava et al.
2019/0235743 A1 8/2019 Ono
2019/0289201 A1 9/2019 Nishimura et al.
2019/0289271 A1 9/2019 Paulus et al.
2019/0318538 A1 10/2019 Li et al.
2019/0342507 A1 11/2019 Dye et al.
2019/0342616 A1 11/2019 Domm et al.
2019/0379821 A1 12/2019 Kobayashi et al.
2019/0379837 A1 12/2019 Kim et al.
2020/0045245 A1 2/2020 Van Os et al.
2020/0053288 A1 2/2020 Kim et al.
2020/0059605 A1 2/2020 Liu et al.
2020/0068121 A1 2/2020 Wang
2020/0082599 A1 3/2020 Manzari
2020/0104038 A1 4/2020 Kamath et al.
2020/0105003 A1 4/2020 Stauber et al.
2020/0106952 A1 4/2020 Missig et al.
2020/0106965 A1 4/2020 Malia et al.
2020/0128191 A1 4/2020 Sun et al.
2020/0142577 A1 5/2020 Manzari et al.
2020/0204725 A1 6/2020 Li
2020/0221020 A1 7/2020 Manzari et al.
2020/0234508 A1 7/2020 Shaburov et al.
2020/0236278 A1 7/2020 Yeung et al.
2020/0242788 A1 7/2020 Jacobs et al.
2020/0244879 A1 7/2020 Hohjoh
2020/0285806 A1 9/2020 Radakovitz et al.
2020/0285851 A1 9/2020 Lin et al.
2020/0335133 A1 10/2020 Vaucher
2020/0336660 A1 10/2020 Dong et al.
2020/0342613 A1 10/2020 Altuev et al.
2020/0358963 A1 11/2020 Manzari et al.
2020/0380768 A1 12/2020 Harris et al.
2020/0380781 A1 12/2020 Barlier et al.
2020/0410730 A1* 12/2020 Wilensky ................ G06F 17/18
2020/0410763 A1 12/2020 Hare et al.
2020/0412975 A1 12/2020 Al Majid et al.
2021/0005003 A1 1/2021 Chong et al.
2021/0051275 A1 2/2021 Brown et al.
2021/0058351 A1 2/2021 Viklund et al.
2021/0065448 A1 3/2021 Goodrich et al.
2021/0065454 A1 3/2021 Goodrich et al.
2021/0096703 A1 4/2021 Anzures et al.
2021/0097695 A1 4/2021 Lundberg et al.
2021/0099568 A1 4/2021 Depue et al.
2021/0099761 A1 4/2021 Zhang
2021/0146838 A1 5/2021 Goseberg et al.
2021/0152505 A1 5/2021 Baldwin et al.
2021/0160431 A1 5/2021 Chen et al.
2021/0168108 A1 6/2021 Antmen et al.
2021/0168300 A1 6/2021 Wang et al.
2021/0195093 A1 6/2021 Manzari et al.
2021/0201953 A1 7/2021 Takahashi et al.
2021/0264656 A1 8/2021 Barlier et al.
2021/0287343 A1 9/2021 Kaida
2021/0318798 A1 10/2021 Manzari et al.
2021/0344845 A1 11/2021 Li et al.
2021/0373750 A1 12/2021 Manzari et al.
2021/0375042 A1 12/2021 Chen et al.
2021/0389850 A1 12/2021 Charlton et al.
2021/0397338 A1 12/2021 Davydov et al.
2022/0006946 A1 1/2022 Missig et al.
2022/0044459 A1 2/2022 Zacharia et al.
2022/0053126 A1 2/2022 Zhao et al.
2022/0053142 A1 2/2022 Manzari et al.
2022/0057984 A1 2/2022 Yang et al.
2022/0070385 A1 3/2022 Van Os et al.
2022/0103758 A1 3/2022 Manzari et al.
2022/0124241 A1 4/2022 Manzari et al.
2022/0134226 A1 5/2022 Takura et al.
2022/0207838 A1 6/2022 Anvaripour et al.
2022/0210328 A1 6/2022 Anvaripour et al.
2022/0210337 A1 6/2022 Anvaripour et al.
2022/0217275 A1 7/2022 Fan
2022/0224828 A1 7/2022 Lim et al.
2022/0262022 A1 8/2022 Stauber et al.
2022/0264028 A1 8/2022 Manzari et al.
2022/0276041 A1 9/2022 Dryer et al.
2022/0279116 A1 9/2022 Zhou
2022/0294992 A1 9/2022 Manzari et al.
2022/0319100 A1 10/2022 Manzari et al.
2022/0345785 A1 10/2022 Yang et al.
2022/0353425 A1 11/2022 Manzari et al.
2022/0382417 A1* 12/2022 Zhang .................. G06F 3/0482
2022/0382443 A1 12/2022 Clarke et al.
2022/0394190 A1 12/2022 Cui et al.
2022/0408020 A1 12/2022 Zhang
2022/0417416 A1 12/2022 Li et al.
2023/0007186 A1 1/2023 Li et al.
2023/0018557 A1 1/2023 Jiang
2023/0020616 A1 1/2023 Manzari et al.
2023/0081664 A1 3/2023 Li
2023/0115929 A1 4/2023 Bian et al.
2023/0116044 A1 4/2023 Han
2023/0156144 A1 5/2023 Cui
2023/0156316 A1 5/2023 Kang et al.
2023/0179856 A1 6/2023 Shin
2023/0188831 A1 6/2023 Hyun et al.
2023/0188861 A1 6/2023 Bian
2023/0209179 A1 6/2023 Manzari et al.
2023/0217097 A1 7/2023 Wu et al.
2023/0217098 A1 7/2023 Wang et al.
2023/0229297 A1 7/2023 Manzari et al.
2023/0252659 A1 8/2023 Stauber et al.
2023/0254573 A1 8/2023 Manzari et al.
2023/0283884 A1 9/2023 Van Os et al.
2023/0308742 A1 9/2023 Lin et al.
2023/0308743 A1 9/2023 Ku et al.
2023/0308778 A1 9/2023 Yang
2023/0319394 A1 10/2023 Manzari et al.
2023/0328429 A1 10/2023 Bian
2023/0353862 A1 11/2023 Yi et al.
2023/0359314 A1 11/2023 Karunamuni
2023/0359315 A1 11/2023 Karunamuni et al.
2023/0359316 A1 11/2023 Karunamuni
2023/0388665 A1 11/2023 Manzari et al.
2023/0393705 A1 12/2023 Krenn
2023/0418426 A1 12/2023 Karunamuni

FOREIGN PATENT DOCUMENTS

AU 2015297035 B2 6/2018
CA 101821707 A 9/2010
CA 2729392 A1 8/2011
CA 2965700 A1 5/2016
CA 2729392 C 5/2017
CN 1437365 A 8/2003
CN 1499878 A 5/2004
CN 1901717 A 1/2007
CN 101068311 A 11/2007
CN 101282422 A 10/2008
CN 101300830 A 11/2008
CN 101310519 A 11/2008

(56) References Cited

FOREIGN PATENT DOCUMENTS

| | | | |
|---|---|---|---|
| CN | 101355655 | A | 1/2009 |
| CN | 101364031 | A | 2/2009 |
| CN | 101388965 | A | 3/2009 |
| CN | 101576996 | A | 11/2009 |
| CN | 101681462 | A | 3/2010 |
| CN | 101778220 | A | 7/2010 |
| CN | 101883213 | A | 11/2010 |
| CN | 101931691 | A | 12/2010 |
| CN | 201788344 | U | 4/2011 |
| CN | 102075727 | A | 5/2011 |
| CN | 102084327 | A | 6/2011 |
| CN | 102088554 | A | 6/2011 |
| CN | 102202208 | A | 9/2011 |
| CN | 102272700 | A | 12/2011 |
| CN | 102428655 | A | 4/2012 |
| CN | 102457661 | A | 5/2012 |
| CN | 102474560 | A | 5/2012 |
| CN | 102567953 | A | 7/2012 |
| CN | 202330968 | U | 7/2012 |
| CN | 102625036 | A | 8/2012 |
| CN | 102855079 | A | 1/2013 |
| CN | 103037075 | A | 4/2013 |
| CN | 103051837 | A | 4/2013 |
| CN | 103051841 | A | 4/2013 |
| CN | 103052961 | A | 4/2013 |
| CN | 103297719 | A | 9/2013 |
| CN | 103309602 | A | 9/2013 |
| CN | 103324329 | A | 9/2013 |
| CN | 103685925 | A | 3/2014 |
| CN | 103702029 | A | 4/2014 |
| CN | 103702039 | A | 4/2014 |
| CN | 103777742 | A | 5/2014 |
| CN | 103947190 | A | 7/2014 |
| CN | 103970472 | A | 8/2014 |
| CN | 104270597 | A | 1/2015 |
| CN | 104346080 | A | 2/2015 |
| CN | 104346099 | A | 2/2015 |
| CN | 104423946 | A | 3/2015 |
| CN | 104461288 | A | 3/2015 |
| CN | 104487928 | A | 4/2015 |
| CN | 104754203 | A | 7/2015 |
| CN | 104781773 | A | 7/2015 |
| CN | 104813322 | A | 7/2015 |
| CN | 104836947 | A | 8/2015 |
| CN | 104903834 | A | 9/2015 |
| CN | 104952063 | A | 9/2015 |
| CN | 105049726 | A | 11/2015 |
| CN | 105138259 | A | 12/2015 |
| CN | 105144057 | A | 12/2015 |
| CN | 105183442 | A | 12/2015 |
| CN | 105190511 | A | 12/2015 |
| CN | 105210018 | A | 12/2015 |
| CN | 105229571 | A | 1/2016 |
| CN | 105245774 | A | 1/2016 |
| CN | 105264480 | A | 1/2016 |
| CN | 105338256 | A | 2/2016 |
| CN | 105474163 | A | 4/2016 |
| CN | 105493138 | A | 4/2016 |
| CN | 105589637 | A | 5/2016 |
| CN | 105611215 | A | 5/2016 |
| CN | 105620393 | A | 6/2016 |
| CN | 105630290 | A | 6/2016 |
| CN | 105637855 | A | 6/2016 |
| CN | 105653031 | A | 6/2016 |
| CN | 105765967 | A | 7/2016 |
| CN | 105794196 | A | 7/2016 |
| CN | 105981372 | A | 9/2016 |
| CN | 105991915 | A | 10/2016 |
| CN | 106067947 | A | 11/2016 |
| CN | 106161956 | A | 11/2016 |
| CN | 106210184 | A | 12/2016 |
| CN | 106210550 | A | 12/2016 |
| CN | 106257540 | A | 12/2016 |
| CN | 106257909 | A | 12/2016 |
| CN | 106303280 | A | 1/2017 |
| CN | 106303690 | A | 1/2017 |
| CN | 106341611 | A | 1/2017 |
| CN | 106375662 | A | 2/2017 |
| CN | 106412214 | A | 2/2017 |
| CN | 106412412 | A | 2/2017 |
| CN | 106412445 | A | 2/2017 |
| CN | 106445219 | A | 2/2017 |
| CN | 106534619 | A | 3/2017 |
| CN | 106575149 | A | 4/2017 |
| CN | 106791357 | A | 5/2017 |
| CN | 106791377 | A | 5/2017 |
| CN | 106791420 | A | 5/2017 |
| CN | 106921829 | A | 7/2017 |
| CN | 107077274 | A | 8/2017 |
| CN | 107079141 | A | 8/2017 |
| CN | 107533356 | A | 1/2018 |
| CN | 107566721 | A | 1/2018 |
| CN | 107580693 | A | 1/2018 |
| CN | 107613283 | A | 1/2018 |
| CN | 107770448 | A | 3/2018 |
| CN | 107800945 | A | 3/2018 |
| CN | 107820011 | A | 3/2018 |
| CN | 107924113 | A | 4/2018 |
| CN | 108353126 | A | 7/2018 |
| CN | 108391053 | A | 8/2018 |
| CN | 108513070 | A | 9/2018 |
| CN | 108549522 | A | 9/2018 |
| CN | 108668083 | A | 10/2018 |
| CN | 108712609 | A | 10/2018 |
| CN | 108769562 | A | 11/2018 |
| CN | 108848308 | A | 11/2018 |
| CN | 108886569 | A | 11/2018 |
| CN | 109005366 | A | 12/2018 |
| CN | 109061985 | A | 12/2018 |
| CN | 109313530 | A | 2/2019 |
| CN | 109496425 | A | 3/2019 |
| CN | 109639970 | A | 4/2019 |
| CN | 109644217 | A | 4/2019 |
| CN | 109644229 | A | 4/2019 |
| CN | 109769396 | A | 5/2019 |
| CN | 110678832 | A | 1/2020 |
| CN | 110784615 | A | 2/2020 |
| CN | 111784615 | A | 10/2020 |
| CN | 111901475 | A | 11/2020 |
| CN | 111901476 | A | 11/2020 |
| CN | 111917980 | A | 11/2020 |
| CN | 112004136 | A | 11/2020 |
| CN | 112154658 | A | 12/2020 |
| CN | 112291627 | A | 1/2021 |
| CN | 112598677 | A | 4/2021 |
| CN | 112637477 | A | 4/2021 |
| DK | 201670652 | A1 | 12/2017 |
| DK | 201670753 | A1 | 1/2018 |
| DK | 201670755 | A1 | 1/2018 |
| DK | 201670627 | A1 | 2/2018 |
| EP | 0651543 | A2 | 5/1995 |
| EP | 0651543 | A3 | 12/1997 |
| EP | 1278099 | A1 | 1/2003 |
| EP | 1592212 | A1 | 11/2005 |
| EP | 0651543 | B1 | 9/2008 |
| EP | 2194508 | A1 | 6/2010 |
| EP | 2430766 | A2 | 3/2012 |
| EP | 2454872 | A1 | 5/2012 |
| EP | 2482179 | A2 | 8/2012 |
| EP | 2487613 | A1 | 8/2012 |
| EP | 2487913 | A2 | 8/2012 |
| EP | 2430766 | A4 | 12/2012 |
| EP | 2579572 | A1 | 4/2013 |
| EP | 2634751 | A1 | 9/2013 |
| EP | 2640060 | A1 | 9/2013 |
| EP | 2682855 | A2 | 1/2014 |
| EP | 2830297 | A1 | 1/2015 |
| EP | 2843530 | A1 | 3/2015 |
| EP | 2950198 | A1 | 12/2015 |
| EP | 2966855 | A2 | 1/2016 |
| EP | 2972677 | A1 | 1/2016 |
| EP | 2430766 | B1 | 3/2016 |
| EP | 3008575 | A1 | 4/2016 |
| EP | 3012732 | A1 | 4/2016 |

(56) References Cited

FOREIGN PATENT DOCUMENTS

| | | | |
|---|---|---|---|
| EP | 3026636 | A1 | 6/2016 |
| EP | 3033837 | A1 | 6/2016 |
| EP | 3046070 | A1 | 7/2016 |
| EP | 3051525 | A1 | 8/2016 |
| EP | 3104590 | A1 | 12/2016 |
| EP | 3107065 | A1 | 12/2016 |
| EP | 3120217 | A1 | 1/2017 |
| EP | 3033837 | A4 | 3/2017 |
| EP | 3209012 | A1 | 8/2017 |
| EP | 3211587 | A1 | 8/2017 |
| EP | 2194508 | B1 | 12/2017 |
| EP | 3333544 | A1 | 6/2018 |
| EP | 2556665 | B1 | 8/2018 |
| EP | 3033837 | B1 | 10/2018 |
| EP | 3393119 | A1 | 10/2018 |
| EP | 3135028 | B1 | 1/2019 |
| EP | 2482179 | B1 | 3/2019 |
| EP | 3457680 | A1 | 3/2019 |
| EP | 3012732 | B1 | 5/2019 |
| EP | 3008575 | B1 | 7/2019 |
| EP | 3120217 | B1 | 4/2020 |
| EP | 3633975 | A1 | 4/2020 |
| EP | 3046070 | B1 | 10/2020 |
| EP | 2682855 | B1 | 2/2021 |
| EP | 3787285 | A1 | 3/2021 |
| EP | 3633975 | B1 | 5/2023 |
| GB | 2307383 | A | 5/1997 |
| GB | 2515797 | A | 1/2015 |
| GB | 2519363 | A | 4/2015 |
| GB | 2523670 | A | 9/2015 |
| JP | 2-179078 | A | 7/1990 |
| JP | 9-116792 | A | 5/1997 |
| JP | 11-355617 | A | 12/1999 |
| JP | 2000-207549 | A | 7/2000 |
| JP | 2000-244905 | A | 9/2000 |
| JP | 2001-245204 | A | 9/2001 |
| JP | 2001-298649 | A | 10/2001 |
| JP | 2003-8964 | A | 1/2003 |
| JP | 2003-18438 | A | 1/2003 |
| JP | 2003-32597 | A | 1/2003 |
| JP | 2003-241293 | A | 8/2003 |
| JP | 2003-248549 | A | 9/2003 |
| JP | 2003-338975 | A | 11/2003 |
| JP | 2004-15595 | A | 1/2004 |
| JP | 2004-135074 | A | 4/2004 |
| JP | 2005-31466 | A | 2/2005 |
| JP | 2005-191641 | A | 7/2005 |
| JP | 2005-191985 | A | 7/2005 |
| JP | 2005-311699 | A | 11/2005 |
| JP | 2006-332809 | A | 12/2006 |
| JP | 3872041 | B2 | 1/2007 |
| JP | 2007-28211 | A | 2/2007 |
| JP | 2007-124398 | A | 5/2007 |
| JP | 2008-66978 | A | 3/2008 |
| JP | 2008-236534 | A | 10/2008 |
| JP | 2009-105919 | A | 5/2009 |
| JP | 2009-212899 | A | 9/2009 |
| JP | 2009-246468 | A | 10/2009 |
| JP | 2009-273023 | A | 11/2009 |
| JP | 2009-545256 | A | 12/2009 |
| JP | 2010-117444 | A | 5/2010 |
| JP | 2010-119147 | A | 5/2010 |
| JP | 2010-160581 | A | 7/2010 |
| JP | 2010-182023 | A | 8/2010 |
| JP | 2010-211166 | A | 9/2010 |
| JP | 2010-268052 | A | 11/2010 |
| JP | 2011-87167 | A | 4/2011 |
| JP | 2011-91570 | A | 5/2011 |
| JP | 2011-124864 | A | 6/2011 |
| JP | 2011-211552 | A | 10/2011 |
| JP | 2012-79302 | A | 4/2012 |
| JP | 2012-89973 | A | 5/2012 |
| JP | 2012-124608 | A | 6/2012 |
| JP | 2012-147379 | A | 8/2012 |
| JP | 2013-70303 | A | 4/2013 |
| JP | 2013-101528 | A | 5/2013 |
| JP | 2013-106289 | A | 5/2013 |
| JP | 2013-546238 | A | 12/2013 |
| JP | 2014-23083 | A | 2/2014 |
| JP | 2014-212415 | A | 11/2014 |
| JP | 2014-222439 | A | 11/2014 |
| JP | 2015-1716 | A | 1/2015 |
| JP | 2015-5255 | A | 1/2015 |
| JP | 2015-22716 | A | 2/2015 |
| JP | 2015-25897 | A | 2/2015 |
| JP | 2015-50713 | A | 3/2015 |
| JP | 2015-76717 | A | 4/2015 |
| JP | 2015-91098 | A | 5/2015 |
| JP | 2015-146619 | A | 8/2015 |
| JP | 2015-149095 | A | 8/2015 |
| JP | 2015-180987 | A | 10/2015 |
| JP | 2015-201839 | A | 11/2015 |
| JP | 2016-66978 | A | 4/2016 |
| JP | 2016-72965 | A | 5/2016 |
| JP | 2016-129315 | A | 7/2016 |
| JP | 2016-175175 | A | 10/2016 |
| JP | 2017-34474 | A | 2/2017 |
| JP | 2017-69776 | A | 4/2017 |
| JP | 2017-521804 | A | 8/2017 |
| JP | 2018-10488 | A | 1/2018 |
| JP | 2018-107711 | A | 7/2018 |
| JP | 2018-121235 | A | 8/2018 |
| JP | 2019-507928 | A | 3/2019 |
| JP | 2019-62556 | A | 4/2019 |
| JP | 2019-145108 | A | 8/2019 |
| JP | 2020-42602 | A | 3/2020 |
| JP | 6982047 | B2 | 11/2021 |
| KR | 10-2005-0086630 | A | 8/2005 |
| KR | 10-2009-0066319 | A | 6/2009 |
| KR | 10-2012-0025872 | A | 3/2012 |
| KR | 10-2012-0048397 | A | 5/2012 |
| KR | 10-2012-0054406 | A | 5/2012 |
| KR | 10-2012-0057696 | A | 6/2012 |
| KR | 10-2012-0093322 | A | 8/2012 |
| KR | 10-2012-0113252 | A | 10/2012 |
| KR | 10-2013-0033445 | A | 4/2013 |
| KR | 10-1341095 | B1 | 12/2013 |
| KR | 10-2014-0019631 | A | 2/2014 |
| KR | 10-2014-0049850 | A | 4/2014 |
| KR | 10-2014-0062801 | A | 5/2014 |
| KR | 10-2015-0014290 | A | 2/2015 |
| KR | 10-2015-0024899 | A | 3/2015 |
| KR | 10-2016-0016910 | A | 2/2016 |
| KR | 10-2016-0019145 | A | 2/2016 |
| KR | 10-2016-0020396 | A | 2/2016 |
| KR | 10-2016-0020791 | A | 2/2016 |
| KR | 10-2016-0047891 | A | 5/2016 |
| KR | 10-2016-0075583 | A | 6/2016 |
| KR | 10-1655078 | B1 | 9/2016 |
| KR | 10-1674959 | B1 | 11/2016 |
| KR | 10-2016-0146942 | A | 12/2016 |
| KR | 10-2017-0112267 | A | 10/2017 |
| KR | 10-2017-0117306 | A | 10/2017 |
| KR | 10-2017-0123125 | A | 11/2017 |
| KR | 10-1799223 | B1 | 11/2017 |
| KR | 10-2017-0135975 | A | 12/2017 |
| KR | 10-2018-0017227 | A | 2/2018 |
| KR | 10-2018-0037076 | A | 4/2018 |
| KR | 10-2018-0095331 | A | 8/2018 |
| KR | 10-2018-0108847 | A | 10/2018 |
| KR | 10-2018-0137610 | A | 12/2018 |
| KR | 10-2019-0034248 | A | 4/2019 |
| KR | 10-2338576 | B1 | 12/2021 |
| SU | 1610470 | A1 | 11/1990 |
| WO | 99/39307 | A1 | 8/1999 |
| WO | 2005/043892 | A1 | 5/2005 |
| WO | 2007/126707 | A1 | 11/2007 |
| WO | 2008/014301 | A2 | 1/2008 |
| WO | 2008/020655 | A1 | 2/2008 |
| WO | 2008/030779 | A2 | 3/2008 |
| WO | 2008/109644 | A2 | 9/2008 |
| WO | 2009/032638 | A2 | 3/2009 |
| WO | 2009/078091 | A1 | 6/2009 |
| WO | 2010/059426 | A2 | 5/2010 |

(56) References Cited

FOREIGN PATENT DOCUMENTS

| | | | |
|---|---|---|---|
| WO | 2010/077048 | A2 | 7/2010 |
| WO | 2010/102678 | A1 | 9/2010 |
| WO | 2010/077048 | A3 | 10/2010 |
| WO | 2010/131869 | A2 | 11/2010 |
| WO | 2010/134275 | A1 | 11/2010 |
| WO | 2011/007264 | A1 | 1/2011 |
| WO | 2010/131869 | A3 | 2/2011 |
| WO | 2010/059426 | A3 | 5/2011 |
| WO | 2011/084860 | A2 | 7/2011 |
| WO | 2012/001947 | A1 | 1/2012 |
| WO | 2012/006251 | A1 | 1/2012 |
| WO | 2012/019163 | A2 | 2/2012 |
| WO | 2012/051720 | A2 | 4/2012 |
| WO | 2013/082325 | A1 | 6/2013 |
| WO | 2013/152453 | A1 | 10/2013 |
| WO | 2013/152454 | A1 | 10/2013 |
| WO | 2013/169870 | A1 | 11/2013 |
| WO | 2013/189058 | A1 | 12/2013 |
| WO | 2014/066115 | A1 | 5/2014 |
| WO | 2014/105276 | A1 | 7/2014 |
| WO | 2014/105277 | A2 | 7/2014 |
| WO | 2014/159779 | A1 | 10/2014 |
| WO | 2014/160819 | A1 | 10/2014 |
| WO | 2014/165141 | A1 | 10/2014 |
| WO | 2014/185028 | A1 | 11/2014 |
| WO | 2014/200734 | A1 | 12/2014 |
| WO | 2014/200798 | A1 | 12/2014 |
| WO | 2015/023044 | A1 | 2/2015 |
| WO | 2015/026864 | A1 | 2/2015 |
| WO | 2015/037211 | A1 | 3/2015 |
| WO | 2015/059349 | A1 | 4/2015 |
| WO | 2015/080744 | A1 | 6/2015 |
| WO | 2015/085042 | A1 | 6/2015 |
| WO | 2015/112868 | A1 | 7/2015 |
| WO | 2014/200798 | A8 | 8/2015 |
| WO | 2015/144209 | A1 | 10/2015 |
| WO | 2015/152953 | A1 | 10/2015 |
| WO | 2015/166684 | A1 | 11/2015 |
| WO | 2015/183438 | A1 | 12/2015 |
| WO | 2015/183756 | A1 | 12/2015 |
| WO | 2015/187458 | A1 | 12/2015 |
| WO | 2015/187494 | A1 | 12/2015 |
| WO | 2015/190666 | A1 | 12/2015 |
| WO | 2016/028806 | A1 | 2/2016 |
| WO | 2016/028807 | A1 | 2/2016 |
| WO | 2016/028808 | A1 | 2/2016 |
| WO | 2016/028809 | A1 | 2/2016 |
| WO | 2016/064435 | A1 | 4/2016 |
| WO | 2016/073804 | A2 | 5/2016 |
| WO | 2016/073804 | A3 | 7/2016 |
| WO | 2016/144975 | A2 | 9/2016 |
| WO | 2016/145129 | A1 | 9/2016 |
| WO | 2016/172619 | A1 | 10/2016 |
| WO | 2016/203282 | A1 | 12/2016 |
| WO | 2016/204936 | A1 | 12/2016 |
| WO | 2017/051605 | A1 | 3/2017 |
| WO | 2017/058834 | A1 | 4/2017 |
| WO | 2017/071559 | A1 | 5/2017 |
| WO | 2017/077751 | A1 | 5/2017 |
| WO | 2017/153771 | A1 | 9/2017 |
| WO | 2017/164716 | A1 | 9/2017 |
| WO | 2017/201326 | A1 | 11/2017 |
| WO | 2017/213439 | A1 | 12/2017 |
| WO | 2017/218193 | A1 | 12/2017 |
| WO | 2018/006053 | A1 | 1/2018 |
| WO | 2018/012395 | A1 | 1/2018 |
| WO | 2018/012831 | A1 | 1/2018 |
| WO | WO-2018017625 | A1 * | 1/2018 |
| WO | 2018/048838 | A1 | 3/2018 |
| WO | 2018/049430 | A2 | 3/2018 |
| WO | 2018/057268 | A1 | 3/2018 |
| WO | 2018/099037 | A1 | 6/2018 |
| WO | 2018/144339 | A2 | 8/2018 |
| WO | 2018/159864 | A1 | 9/2018 |
| WO | 2018/212802 | A1 | 11/2018 |
| WO | 2018/222244 | A1 | 12/2018 |
| WO | 2019/050562 | A1 | 3/2019 |
| WO | 2019/216997 | A1 | 11/2019 |
| WO | 2020/227386 | A2 | 11/2020 |
| WO | 2022/231869 | A1 | 11/2022 |

OTHER PUBLICATIONS

Corrected Notice of Allowance received for U.S. Appl. No. 16/144,629, mailed on Aug. 24, 2022, 6 pages.

Corrected Notice of Allowance received for U.S. Appl. No. 16/144,629, mailed on Jun. 23, 2022, 5 pages.

Corrected Notice of Allowance received for U.S. Appl. No. 17/483,684, mailed on Aug. 24, 2022, 6 pages.

Corrected Notice of Allowance received for U.S. Appl. No. 17/484,279, mailed on Feb. 15, 2022, 2 pages.

Corrected Notice of Allowance received for U.S. Appl. No. 17/484,279, mailed on Feb. 28, 2022, 2 pages.

Corrected Notice of Allowance received for U.S. Appl. No. 17/484,307, mailed on Apr. 20, 2022, 2 pages.

Corrected Notice of Allowance received for U.S. Appl. No. 17/484,307, mailed on Feb. 10, 2022, 7 pages.

Corrected Notice of Allowance received for U.S. Appl. No. 17/484,321, mailed on Mar. 24, 2022, 2 pages.

Examiner-Initiated Interview Summary received for U.S. Appl. No. 17/356,322, mailed on Sep. 29, 2022, 4 pages.

Hourunranta et al., "Video and Audio Editing for Mobile Applications", Proceedings/2006 IEEE international Conference on multimedia and expo, ICME 2006, Jul. 9, 2006, pp. 1305-1308.

Hurwitz Jon, "Interface For Small-Screen Media Playback Control", Technical Disclosure Commons, Online available at: https://www.tdcommons.org/cgi/viewcontent.cgi?article=4231&context=dpubs_series, Apr. 17, 2020, pp. 1-9.

Intention to Grant received for European Patent Application No. 20168009.7, mailed on May 17, 2022, 9 pages.

Intention to Grant received for European Patent Application No. 21733324.4, mailed on Sep. 13, 2022, 7 pages.

International Search Report and Written Opinion received for PCT Patent Application No. PCT/US2022/024964, mailed on Aug. 4, 2022, 17 pages.

Non-Final Office Action received for U.S. Appl. No. 17/356,322, mailed on Aug. 11, 2022, 17 pages.

Non-Final Office Action received for U.S. Appl. No. 17/479,897, mailed on Aug. 30, 2022, 10 pages.

Notice of Acceptance received for Australian Patent Application No. 2019338180, mailed on Jun. 27, 2022, 3 pages.

Notice of Acceptance received for Australian Patent Application No. 2020239717, mailed on Jun. 1, 2022, 3 pages.

Notice of Acceptance received for Australian Patent Application No. 2021201295, mailed on May 10, 2022, 3 pages.

Notice of Acceptance received for Australian Patent Application No. 2021203177, mailed on Jul. 14, 2022, 3 pages.

Notice of Acceptance received for Australian Patent Application No. 2022202377, mailed on May 11, 2022, 3 pages.

Notice of Acceptance received for Australian Patent Application No. 2022215297, mailed on Sep. 26, 2022, 3 pages.

Notice of Allowance received for Chinese Patent Application No. 202180002106.3, mailed on May 5, 2022, 6 pages (3 pages of English Translation and 3 pages of Official Copy).

Notice of Allowance received for Japanese Patent Application No. 2020-159338, mailed on Jul. 19, 2022, 3 pages (1 page of English Translation and 2 pages of Official Copy).

Notice of Allowance received for Japanese Patent Application No. 2021-510849, mailed on May 16, 2022, 4 pages (1 page of English Translation and 3 pages of Official Copy).

Notice of Allowance received for Japanese Patent Application No. 2021-565919, mailed on Oct. 3, 2022, 3 pages (1 page of English Translation and 2 of pages Official Copy).

Notice of Allowance received for Korean Patent Application No. 10-2022-7006310, mailed on Sep. 20, 2022, 8 pages (2 pages of English Translation and 6 pages of Official Copy).

(56) References Cited

OTHER PUBLICATIONS

Notice of Allowance received for Korean Patent Application No. 10-2022-7016421, mailed on May 25, 2022, 6 pages (2 pages of English Translation and 4 pages of Official Copy).
Notice of Allowance received for U.S. Appl. No. 16/144,629, mailed on Jul. 25, 2022, 10 pages.
Notice of Allowance received for U.S. Appl. No. 17/483,684, mailed on Apr. 27, 2022, 10 pages.
Notice of Allowance received for U.S. Appl. No. 17/483,684, mailed on Aug. 16, 2022, 9 pages.
Notice of Allowance received for U.S. Appl. No. 17/484,279, mailed on Jan. 26, 2022, 12 pages.
Notice of Allowance received for U.S. Appl. No. 17/484,279, mailed on May 13, 2022, 9 pages.
Notice of Allowance received for U.S. Appl. No. 17/484,307, mailed on Mar. 8, 2022, 11 pages.
Notice of Allowance received for U.S. Appl. No. 17/484,307, mailed on Nov. 30, 2021, 11 pages.
Notice of Allowance received for U.S. Appl. No. 17/484,321, mailed on Nov. 30, 2021, 10 pages.
Notice of Allowance received for U.S. Appl. No. 17/740,032, mailed on Oct. 13, 2022, 11 pages.
Office Action received for Australian Patent Application No. 2021203177, mailed on May 4, 2022, 7 pages.
Office Action received for Brazilian Patent Application No. BR122018076550-0, mailed on Sep. 28, 2022, 7 pages (1 page of English Translation and 6 pages of Official Copy).
Office Action received for Chinese Patent Application No. 202111323807.5, mailed on Jul. 15, 2022, 12 pages (6 pages of English Translation and 6 pages of Official Copy).
Office Action received for European Patent Application No. 20206196.6, mailed on Aug. 10, 2022, 13 pages.
Office Action received for European Patent Application No. 20210373.5, mailed on May 31, 2022, 5 pages.
Office Action received for European Patent Application No. 21163791.3, mailed on Sep. 20, 2022, 6 pages.
Office Action received for Indian Patent Application No. 202118028159, mailed on Jun. 27, 2022, 6 pages.
Office Action received for Indian Patent Application No. 202215010325, mailed on Oct. 10, 2022, 7 pages.
Office Action received for Japanese Patent Application No. 2021-166686, mailed on Oct. 3, 2022, 3 pages (2 pages of English Translation and 1 page of Official Copy).
Office Action received for Japanese Patent Application No. 2021-565919, mailed on Jun. 13, 2022, 4 pages (2 pages of English Translation and 2 pages of Official Copy).
Office Action received for Korean Patent Application No. 10-2022-7010505, mailed on Jun. 14, 2022, 5 pages (2 pages of English Translation and 3 pages of Official Copy).
Office Action received for Korean Patent Application No. 10-2022-7023077, mailed on Jul. 25, 2022, 6 pages (2 pages of English Translation and 4 pages of Official Copy).
Supplemental Notice of Allowance received for U.S. Appl. No. 17/484,321, mailed on Mar. 1, 2022, 6 pages.
Advisory Action received for U.S. Appl. No. 16/144,629, mailed on Dec. 13, 2019, 9 pages.
Advisory Action received for U.S. Appl. No. 16/144,629, mailed on Jan. 6, 2021, 10 pages.
Android Police, "Galaxy S9+ In-Depth Camera Review", See Especially 0:43-0:53; 1:13-1:25; 1:25-1:27; 5:11-5:38; 6:12-6:26, Available Online at: <https://www.youtube.com/watch?v=GZHYCdMCv-w>, Apr. 19, 2018, 3 pages.
Applicant Initiated Interview Summary received for U.S. Appl. No. 17/190,879, mailed on Oct. 26, 2021, 3 pages.
Applicant-Initiated Interview Summary received for U.S. Appl. No. 16/144,629, mailed on Jul. 2, 2020, 5 pages.
Applicant-Initiated Interview Summary received for U.S. Appl. No. 16/144,629, mailed on Nov. 23, 2020, 3 pages.
Applicant-Initiated Interview Summary received for U.S. Appl. No. 16/528,257, mailed on Nov. 18, 2021, 2 pages.
Applicant-Initiated Interview Summary received for U.S. Appl. No. 16/528,941, mailed on Jun. 19, 2020, 3 pages.
Applicant-Initiated Interview Summary received for U.S. Appl. No. 16/528,941, mailed on Nov. 10, 2020, 2 pages.
Applicant-Initiated Interview Summary received for U.S. Appl. No. 16/584,100, mailed on Feb. 19, 2020, 3 pages.
Applicant-Initiated Interview Summary received for U.S. Appl. No. 16/586,344, mailed on Feb. 27, 2020, 3 pages.
Applicant-Initiated Interview Summary received for U.S. Appl. No. 16/599,433, mailed on Apr. 20, 2021, 7 pages.
Applicant-Initiated Interview Summary received for U.S. Appl. No. 16/733,718, mailed on Nov. 2, 2020, 4 pages.
Applicant-Initiated Interview Summary received for U.S. Appl. No. 17/027,317, mailed on Dec. 21, 2020, 4 pages.
Applicant-Initiated Interview Summary received for U.S. Appl. No. 17/220,596, mailed on Aug. 18, 2021, 3 pages.
AstroVideo, "AstroVideo enables you to use a low-cost, low-light video camera to capture astronomical images.", Available online at: https://www.coaa.co.uk/astrovideo.htm, Retrieved on: Nov. 18, 2019, 5 pages.
"[B612] Addition of facial recognition bear/cat stamps and AR background function having moving sparkles or hearts", Available Online at: <URL, htpps://apptopi.jp/2017/01/22/b612>, Jan. 22, 2017, 11 pages (Official Copy only). {See Communication under 37 CFR § 1.98(a) (3)}.
Certificate of Examination received for Australian Patent Application No. 2017100683, mailed on Jan. 16, 2018, 2 pages.
Certificate of Examination received for Australian Patent Application No. 2019100420, mailed on Jul. 3, 2019, 2 pages.
Certificate of Examination received for Australian Patent Application No. 2019100794, mailed on Dec. 19, 2019, 2 pages.
Certificate of Examination received for Australian Patent Application No. 2020100189, mailed on May 12, 2020, 2 pages.
Certificate of Examination received for Australian Patent Application No. 2020100720, mailed on Nov. 11, 2020, 2 pages.
Certificate of Examination received for Australian Patent Application No. 2020101043, mailed on Dec. 22, 2020, 2 pages.
Certificate of Examination received for Australian Patent Application No. 2020104220, mailed on Apr. 1, 2021, 2 pages.
Certificate of Examination received for Australian Patent Application No. 2021103004, mailed on Sep. 13, 2021, 2 pages.
Channel Highway, "Virtual Makeover in Real-time and in full 3D", Available online at: https://www.youtube.com/watch?=NgUbBzb5qZg, Feb. 16, 2016, 1 page.
Clover, Juli, "Moment Pro Camera App for iOS Gains Zebra Striping for Displaying Over and Underexposed Areas", Online Available at: https://web.archive.org/web/20190502081353/https://www.macrumors.com/2019/05/01 /momentcamera-app-zebra-striping-and-more/, May 1, 2019, 8 pages.
Corrected Notice of Allowance received for U.S. Appl. No. 15/273,453, mailed on Dec. 21, 2017, 3 pages.
Corrected Notice of Allowance received for U.S. Appl. No. 15/273,453, mailed on Feb. 8, 2018, 2 pages.
Corrected Notice of Allowance received for U.S. Appl. No. 15/273,453, mailed on Nov. 27, 2017, 2 pages.
Corrected Notice of Allowance received for U.S. Appl. No. 15/273,503, mailed on Nov. 2, 2017, 2 pages.
Corrected Notice of Allowance received for U.S. Appl. No. 15/273,503, mailed on Nov. 24, 2017, 2 pages.
Corrected Notice of Allowance received for U.S. Appl. No. 15/858,175, mailed on Sep. 21, 2018, 2 pages
Corrected Notice of Allowance received for U.S. Appl. No. 16/143,097, mailed on Nov. 8, 2019, 3 pages.
Corrected Notice of Allowance received for U.S. Appl. No. 16/144,629, mailed on Apr. 21, 2022, 5 pages.
Corrected Notice of Allowance received for U.S. Appl. No. 16/191,117, mailed on Dec. 9, 2019, 2 pages.
Corrected Notice of Allowance received for U.S. Appl. No. 16/191,117, mailed on Feb. 28, 2020, 2 pages.
Corrected Notice of Allowance received for U.S. Appl. No. 16/191,117, mailed on Nov. 20, 2019, 2 pages.
Corrected Notice of Allowance received for U.S. Appl. No. 16/528,257, mailed on Feb. 3, 2022, 2 pages.

(56) References Cited

OTHER PUBLICATIONS

Corrected Notice of Allowance received for U.S. Appl. No. 16/582,595, mailed on Apr. 7, 2020, 5 pages.
Corrected Notice of Allowance received for U.S. Appl. No. 16/582,595, mailed on Apr. 22, 2020, 5 pages.
Corrected Notice of Allowance received for U.S. Appl. No. 16/583,020, mailed on Mar. 24, 2020, 2 pages.
Corrected Notice of Allowance received for U.S. Appl. No. 16/584,044, mailed on Apr. 16, 2020, 3 pages.
Corrected Notice of Allowance received for U.S. Appl. No. 16/584,044, mailed on Jan. 29, 2020, 3 pages.
Corrected Notice of Allowance received for U.S. Appl. No. 16/584,044, mailed on Mar. 4, 2020, 2 pages.
Corrected Notice of Allowance received for U.S. Appl. No. 16/584,100, mailed on Feb. 21, 2020, 9 pages.
Corrected Notice of Allowance received for U.S. Appl. No. 16/584,693, mailed on Feb. 21, 2020, 15 pages.
Corrected Notice of Allowance received for U.S. Appl. No. 16/584,693, mailed on Mar. 4, 2020, 2 pages.
Corrected Notice of Allowance received for U.S. Appl. No. 16/584,693, mailed on Mar. 20, 2020, 2 pages.
Corrected Notice of Allowance received for U.S. Appl. No. 16/586,314, mailed on Apr. 8, 2020, 5 pages.
Corrected Notice of Allowance received for U.S. Appl. No. 16/586,314, mailed on Mar. 4, 2020, 3 pages.
Corrected Notice of Allowance received for U.S. Appl. No. 16/586,344, mailed on Apr. 7, 2020, 4 pages.
Corrected Notice of Allowance received for U.S. Appl. No. 16/586,344, mailed on Jan. 23, 2020, 4 pages.
Corrected Notice of Allowance received for U.S. Appl. No. 16/586,344, mailed on Mar. 17, 2020, 4 pages.
Corrected Notice of Allowance received for U.S. Appl. No. 16/599,433, mailed on Aug. 13, 2021, 5 pages.
Corrected Notice of Allowance received for U.S. Appl. No. 16/599,433, mailed on Oct. 14, 2021, 3 pages.
Corrected Notice of Allowance received for U.S. Appl. No. 16/733,718, mailed on Aug. 18, 2021, 2 pages.
Corrected Notice of Allowance received for U.S. Appl. No. 16/733,718, mailed on Nov. 17, 2021, 2 pages.
Corrected Notice of Allowance received for U.S. Appl. No. 16/825,879, mailed on Aug. 13, 2021, 2 pages.
Corrected Notice of Allowance received for U.S. Appl. No. 16/825,879, mailed on Jul. 23, 2021, 2 pages.
Corrected Notice of Allowance received for U.S. Appl. No. 16/825,879, mailed on Sep. 15, 2021, 2 pages.
Corrected Notice of Allowance received for U.S. Appl. No. 16/835,651, mailed on Aug. 10, 2021, 4 pages.
Corrected Notice of Allowance received for U.S. Appl. No. 16/835,651, mailed on Aug. 13, 2021, 2 pages.
Corrected Notice of Allowance received for U.S. Appl. No. 16/835,651, mailed on Jul. 28, 2021, 4 pages.
Corrected Notice of Allowance received for U.S. Appl. No. 16/835,651, mailed on Jun. 14, 2021, 2 pages.
Corrected Notice of Allowance received for U.S. Appl. No. 17/027,484, mailed on May 14, 2021, 5 pages.
Corrected Notice of Allowance received for U.S. Appl. No. 17/027,484, mailed on May 28, 2021, 5 pages.
Corrected Notice of Allowance received for U.S. Appl. No. 17/190,879, mailed on Nov. 19, 2021, 2 pages.
Corrected Notice of Allowance received for U.S. Appl. No. 17/220,596, mailed on Nov. 4, 2021, 3 pages.
Corrected Notice of Allowance received for U.S. Appl. No. 17/220,596, mailed on Nov. 18, 2021, 27 pages.
Corrected Notice of Allowance received for U.S. Appl. No. 17/354,376, mailed on Apr. 11, 2022, 5 pages.
Corrected Notice of Allowance received for U.S. Appl. No. 17/354,376, mailed on Feb. 16, 2022, 5 pages.
Corrected Notice of Allowance received for U.S. Appl. No. 17/354,376, mailed on Mar. 23, 2022, 6 pages.
Decision of Refusal received for Japanese Patent Application No. 2018-243463, mailed on Feb. 25, 2019, 8 pages (5 pages of English Translation and 3 pages of Official Copy).
Decision of Refusal received for Japanese Patent Application No. 2018-545502, mailed on Feb. 25, 2019, 11 pages (7 pages of English Translation and 4 pages of Official Copy).
Decision on Appeal received for Japanese Patent Application No. 2018-225131, mailed on Mar. 11, 2021, 5 pages (4 pages of English Translation and 1 page of Official Copy).
Decision on Appeal received for Japanese Patent Application No. 2018-545502, mailed on Mar. 25, 2021, 3 pages (1 page of English Translation and 2 pages of Official Copy).
Decision on Appeal received for U.S. Appl. No. 16/144,629, mailed on Jan. 18, 2022, 8 pages.
Decision to Grant received for Danish Patent Application No. PA201670627, mailed on Nov. 29, 2018, 2 pages.
Decision to Grant received for Danish Patent Application No. PA201670753, mailed on Mar. 6, 2019, 2 pages.
Decision to Grant received for Danish Patent Application No. PA201670755, mailed on Mar. 6, 2019, 2 pages.
Decision to Grant received for Danish Patent Application No. PA201770719, mailed on Feb. 3, 2022, 2 pages.
Decision to Grant received for Danish Patent Application No. PA201970593, mailed on Sep. 7, 2021, 2 pages.
Decision to Grant received for Danish Patent Application No. PA201970601, mailed on Feb. 3, 2021, 2 pages.
Decision to Grant received for Danish Patent Application No. PA201970603, mailed on May 21, 2021, 2 pages.
Decision to Grant received for European Patent Application No. 17809168.2, mailed on Oct. 21, 2021, 3 pages.
Decision to Grant received for European Patent Application No. 18176890.4, mailed on Jul. 9, 2020, 3 pages.
Decision to Grant received for European Patent Application No. 18183054.8, mailed on Jan. 21, 2021, 3 pages.
Decision to Grant received for European Patent Application No. 18209460.7, mailed on Apr. 9, 2021, 2 pages.
Decision to Grant received for European Patent Application No. 18214698.5, mailed on Sep. 10, 2020, 3 pages.
Decision to Grant received for Japanese Patent Application No. 2018-182607, mailed on Apr. 13, 2022, 3 pages (1 page of English Translation and 2 pages of Official Copy).
Decision to Grant received for Japanese Patent Application No. 2018-243463, mailed on Aug. 17, 2020, 2 pages (1 page of English Translation and 1 page of Official Copy).
Decision to Grant received for Japanese Patent Application No. 2019-203399, mailed on Oct. 20, 2021, 3 pages (1 page of English Translation and 2 pages of Official Copy).
Decision to Grant received for Japanese Patent Application No. 2019-566087, mailed on Jan. 26, 2022, 2 pages (1 page of English Translation and 1 page of Official Copy).
Decision to Grant received for Japanese Patent Application No. 2020-070418, mailed on Feb. 8, 2021, 3 pages (1 page of English Translation and 2 pages of Official Copy).
Decision to Grant received for Japanese Patent Application No. 2020-184470, mailed on Jul. 1, 2021, 3 pages (1 page of English Translation and 2 pages of Official Copy).
Decision to Grant received for Japanese Patent Application No. 2020-184471, mailed on Jul. 1, 2021, 3 pages (1 page of English Translation and 2 pages of Official Copy).
Decision to Grant received for Japanese Patent Application No. 2020-193703, mailed on Aug. 10, 2021, 3 pages (1 page of English Translation and 2 pages of Official Copy).
Decision to Grant received for Japanese Patent Application No. 2021-051385, mailed on Jul. 8, 2021, 3 pages (1 page of English Translation and 2 pages of Official Copy).
Decision to Refuse received for European Patent Application No. 19204230.7, mailed on Feb. 4, 2022, 15 pages.
Decision to Refuse received for European Patent Application No. 19724959.2, mailed on Jun. 22, 2021, 13 pages.
Decision to Refuse received for Japanese Patent Application No. 2018-225131, mailed on Jul. 8, 2019, 6 pages (4 pages of English Translation and 2 pages of Official Copy).

(56) References Cited

OTHER PUBLICATIONS

Decision to Refuse received for Japanese Patent Application No. 2018-243463, mailed on Jul. 8, 2019, 5 pages (3 pages of English Translation and 2 pages of Official Copy).
Decision to Refuse received for Japanese Patent Application No. 2018-545502, mailed on Jul. 8, 2019, 5 pages (3 pages of English Translation and 2 pages of Official Copy).
Demetriou, Soteris, "Analyzing & Designing the Security of Shared Resources On Smartphone Operating Systems", Dissertation, University of Illinois at Urbana-Champaign Online available at: https://www.ideals.illinois.edu/bitstream/handle/2142/100907/DEMETRIOU-DISSERTATION-2018.pdf?sequence=1&isAllowed=n, 2018, 211 pages.
Digital Trends, "ModiFace Partners With Samsung To Bring AR Makeup To The Galaxy S9", Available online at: https://www.digitaltrends.com/mobile/modiface-samsung-partnership-ar-makeup-galaxy-s9/, 2018, 16 pages.
Dutta, Tushar S., "Warning! iOS Apps With Camera Access Permission Can Spy On You", Online available at: https://web.archive.org/web/20180219092123/https://techviral.net/ios-apps-camera-can-spy/, Feb. 19, 2018, 3 pages.
European Search Report received for European Patent Application No. 18209460.7, mailed on Mar. 15, 2019, 4 pages.
European Search Report received for European Patent Application No. 18214698.5, mailed on Mar. 21, 2019, 5 pages.
European Search Report received for European Patent Application No. 20206196.6, mailed on Dec. 8, 2020, 4 pages.
European Search Report received for European Patent Application No. 20206197.4, mailed on Nov. 30, 2020, 4 pages.
European Search Report received for European Patent Application No. 20210373.5, mailed on Apr. 13, 2021, 4 pages.
European Search Report received for European Patent Application No. 21157252.4, mailed on Apr. 16, 2021, 4 pages.
European Search Report received for European Patent Application No. 21163791.3, mailed on May 6, 2021, 5 pages.
Examiner Initiated-Interview Summary received for U.S. Appl. No. 16/528,941, mailed on Dec. 1, 2020, 2 pages.
Examiner-Initiated Interview Summary received for U.S. Appl. No. 17/220,596, mailed on Oct. 7, 2021, 2 pages.
Examiner's Answer to Appeal Brief received for U.S. Appl. No. 16/144,629, mailed on Jul. 21, 2021, 21 pages.
Extended European Search Report received for European Patent Application No. 19204230.7, mailed on Feb. 21, 2020, 7 pages.
Extended European Search Report received for European Patent Application No. 20168009.7, mailed on Sep. 11, 2020, 12 pages.
Extended European Search Report received for European Patent Application No. 22151131.4, mailed on Mar. 24, 2022, 6 pages.
Extended Search Report received for European Patent Application 17809168.2, mailed on Jun. 28, 2018, 9 pages.
Fedko, Daria, "AR Hair Styles", Online Available at: <https://www.youtube.com/watch?v=FrS6tHRbFE0>, Jan. 24, 2017, 2 pages.
Feng et al., "3D Direct Human-Computer Interface Paradigm Based on Free Hand Tracking", Chinese Journal of Computers, vol. 37, No. 6, Jun. 30, 2014, 15 pages (Official Copy only). {See Communication under 37 CFR § 1.98(a) (3)}.
Final Office Action received for U.S. Appl. No. 15/728,147, mailed on Aug. 29, 2018, 39 pages.
Final Office Action received for U.S. Appl. No. 15/728,147, mailed on May 28, 2019, 45 pages.
Final Office Action received for U.S. Appl. No. 16/144,629, mailed on Sep. 11, 2020, 22 pages.
Final Office Action received for U.S. Appl. No. 16/144,629, mailed on Sep. 18, 2019, 22 pages.
Final Office Action received for U.S. Appl. No. 16/528,941, mailed on Jul. 13, 2020, 15 pages.
Gadgets Portal, "Galaxy J5 Prime Camera Review! (vs J7 Prime) 4K", Available Online at: https://www.youtube.com/watch?v=Rf2Gy8QmDqc, Oct. 24, 2016, 3 pages.
Gavin's Gadgets, "Honor 10 Camera App Tutorial—How to use All Modes + 90 Photos Camera Showcase", See Especially 2:58-4:32, Available Online at: <https://www.youtube.com/watch?v=M5XZwXJcK74>, May 26, 2018, 3 pages.
Gibson, Andrews, "Aspect Ratio: What it is and Why it Matters", Retrieved from: <https://web.archive.org/web/20190331225429/https:/digital-photography-school.com/aspect-ratio-what-it-is-and-why-it-matters/>, Paragraphs: "Adjusting aspect ratio in-camera", "Cropping in post-processing", Mar. 31, 2019, 10 pages.
GSM Arena, "Honor 10 Review: Camera", Available Online at: <https://web.archive.org/web/20180823142417/https://www.gsmarena.com/honor_10-review-1771p5.php>, Aug. 23, 2018, 11 pages.
Hall, Brent, "Samsung Galaxy Phones Pro Mode (S7/S8/S9/Note 8/Note 9): When, why, & How To Use It", See Especially 3:18-5:57, Available Online at: <https://www.youtube.com/watch?v=KwPxGUDRKTg>, Jun. 19, 2018, 3 pages.
HelpvideosTV, "How to Use Snap Filters on Snapchat", Retrieved from: <https://www.youtube.com/watch?v=oR-7clWPszU&feature=youtu.be>, Mar. 22, 2017, pp. 1-2.
Hernández, Carlos, "Lens Blur in the New Google Camera App", Available online at: https://research.googleblog.com/2014/04/lens-blur-in-new-google-camera-app.html, https://ai.googleblog.com/2014/04/1ens-blur-in-new-google-camera-app.html, Apr. 16, 2014, 6 pages.
Huawei Mobile PH, "Huawei P10 Tips & Tricks: Compose Portraits With Wide Aperture (Bokeh)", Available Online at: <https://www.youtube.com/watch?v=WM4yo5-hrrE>, Mar. 30, 2017, 2 pages.
Iluvtrading, "Galaxy S10 / S10+: How to Use Bright Night Mode for Photos (Super Night Mode)", Online Available at: https://www.youtube.com/watch?v=SfZ7Us1S1Mk, Mar. 11, 2019, 4 pages.
Iluvtrading, "Super Bright Night Mode: Samsung Galaxy S1O vs Huawei P30 Pro (Review/How to/Explained)", Online Available at: https://www.youtube.com/watch?v=d4r3PWioY4Y, Apr. 26, 2019, 4 pages.
ImagespaceTV, "Olympus OM-D E-M1 Mark II—Highlights & Shadows with Gavin Hoey", Online available at: https://www.youtube.com/watch?v=goEhh1n--hQ, Aug. 3, 2018, 3 pages.
Intention to Grant received for Danish Patent Application No. PA201670627, mailed on Jun. 11, 2018, 2 pages.
Intention to Grant received for Danish Patent Application No. PA201670753, mailed on Oct. 29, 2018, 2 pages.
Intention to Grant received for Danish Patent Application No. PA201670755, mailed on Nov. 13, 2018, 2 pages.
Intention to Grant received for Danish Patent Application No. PA201970593, mailed on Apr. 13, 2021, 2 pages.
Intention to Grant received for Danish Patent Application No. PA201970601, mailed on Sep. 21, 2020, 2 pages.
Intention to Grant received for Danish Patent Application No. PA201970603, mailed on Jan. 13, 2021, 2 pages.
Intention to Grant received for Danish Patent Application No. PA202070611, mailed on May 5, 2021, 2 pages.
Intention to Grant received for European Patent Application No. 17809168.2, mailed on Jun. 25, 2021, 8 pages.
Intention to Grant received for European Patent Application No. 18176890.4, mailed on Feb. 28, 2020, 8 pages.
Intention to Grant received for European Patent Application No. 18183054.8, mailed on Nov. 5, 2020, 6 pages.
Intention to Grant received for European Patent Application No. 18209460.7, mailed on Jan. 15, 2021, 8 pages.
Intention to Grant received for European Patent Application No. 18214698.5, mailed on Apr. 21, 2020, 8 pages.
International Preliminary Report on Patentability received for PCT Patent Application No. PCT/US2017/035321, mailed on Dec. 27, 2018, 11 pages.
International Preliminary Report on Patentability received for PCT Patent Application No. PCT/US2018/015591, mailed on Dec. 19, 2019, 10 pages.
International Preliminary Report on Patentability received for PCT Patent Application No. PCT/US2019/024067, mailed on Nov. 19, 2020, 12 pages.
International Preliminary Report on Patentability received for PCT Patent Application No. PCT/US2019/049101, mailed on Mar. 25, 2021, 17 pages.

(56) References Cited

OTHER PUBLICATIONS

International Preliminary Report on Patentability received for PCT Patent Application No. PCT/US2020/031643, mailed on Nov. 18, 2021, 27 pages.
International Search Report and Written Opinion received for PCT Patent Application No. PCT/US2017/035321, mailed on Oct. 6, 2017, 15 pages.
International Search Report and Written Opinion received for PCT Patent Application No. PCT/US2018/015591, mailed on Jun. 14, 2018, 14 pages.
International Search Report and Written Opinion received for PCT Patent Application No. PCT/US2019/024067, mailed on Oct. 9, 2019, 18 pages.
International Search Report and Written Opinion received for PCT Patent Application No. PCT/US2019/049101, mailed on Dec. 16, 2019, 26 pages.
International Search Report and Written Opinion received for PCT Patent Application No. PCT/US2020/031643, mailed on Dec. 2, 2020, 33 pages.
International Search Report and Written Opinion received for PCT Patent Application No. PCT/US2020/031643, mailed on Nov. 2, 2020, 34 pages.
International Search Report and Written Opinion received for PCT Patent Application No. PCT/US2021/034304, mailed on Oct. 11, 2021, 24 pages.
International Search Report and Written Opinion received for PCT Patent Application No. PCT/US2021/046877, mailed on Mar. 1, 2022, 17 pages.
Invitation to Pay Addition Fees received for PCT Patent Application No. PCT/US2017/035321, mailed on Aug. 17, 2017, 3 pages.
Invitation to Pay Additional Fees and Partial International Search Report received for PCT Patent Application No. PCT/US2019/049101, mailed on Oct. 24, 2019, 17 pages.
Invitation to Pay Additional Fees received for PCT Patent Application No. PCT/US2019/024067, mailed on Jul. 16, 2019, 13 pages.
Invitation to Pay Additional Fees received for PCT Patent Application No. PCT/US2020/031643, mailed on Sep. 9, 2020, 30 pages.
Invitation to Pay Additional Fees received for PCT Patent Application No. PCT/US2021/034304, mailed on Aug. 20, 2021, 16 pages.
Invitation to Pay Additional Fees received for PCT Patent Application No. PCT/US2021/046877, mailed on Jan. 5, 2022, 10 pages.
Invitation to Pay Search Fees received for European Patent Application No. 18704732.9, mailed on Jun. 2, 2021, 3 pages.
Invitation to Pay Search Fees received for European Patent Application No. 19724959.2, mailed on Feb. 25, 2020, 3 pages.
King, Juliea, "How to Check the Exposure Meter on Your Nikon D5500", Online available at: https://www.dummies.com/article/home-auto-hobbies/photography/how-to-check-the-exposuremeter-on-your-nikon-d5500-142677, Mar. 26, 2016, 6 pages.
KK World, "Redmi Note 7 Pro Night Camera Test I Night Photography with Night Sight & Mode", Online Available at: https://www.youtube.com/watch?v=3EKjGBjX3PY, Mar. 26, 2019, 4 pages.
Kozak Tadeusz, "When You're Video Chatting on Snapchat, How Do You Use Face Filters?", Quora, Online Available at: https://www.quora.com/When-youre-video-chatting-on-Snapchat-how-do-you-use-face-filters, Apr. 29, 2018, 1 page.
Lang, Brian, "How to Audio & Video Chat with Multiple Users at the Same Time in Groups", Snapchat 101, Online Available at: <https://smartphones.gadgethacks.com/how-to/snapchat-101-audio-video-chat-with-multiple-users-same-time-groups-0184113/>, Apr. 17, 2018, 4 pages.
Messelodi et al., "A Kalman filter based background updating algorithm robust to sharp illumination changes.", International Conference on Image Analysis and Processing. Springer, Berlin, Heidelberg, 2005, pp. 163-170.
Minutes of the Oral Proceedings received for European Patent Application No. 19204230.7, mailed on Feb. 2, 2022, 9 pages.
Minutes of the Oral Proceedings received for European Patent Application No. 19724959.2, mailed on Jun. 14, 2021, 6 pages.
Mobiscrub, "Galaxy S4 mini camera review", Available Online at: https://www.youtube.com/watch?v=KYKOydw8QT8, Aug. 10, 2013, 3 pages.
Mobiscrub, "Samsung Galaxy S5 Camera Review—HD Video", Available Online on: https://www.youtube.com/watch?v=BFgwDtNKMjg, Mar. 27, 2014, 3 pages.
Modifacechannel, "Sephora 3D Augmented Reality Mirror", Available Online at: https://www.youtube.com/watch?v=wwBO4PU9EXI, May 15, 2014, 1 page.
Neurotechnology, "Sentimask SDK", Available at: https://www.neurotechnology.com/sentimask.html, Apr. 22, 2018, 5 pages.
"Nikon Digital Camera D7200 User's Manual", Online available at: https://download.nikonimglib.com/archive3/dbHI400jWws903mGr6q98a4k8F90/D7200UM SG(En)05.pdf, 2005, 416 pages.
Non-Final Office Action received for U.S. Appl. No. 16/528,257, mailed on Jul. 30, 2021, 12 pages.
Non-Final Office Action received for U.S. Appl. No. 15/273,522, mailed on Nov. 30, 2016, 15 pages.
Non-Final Office Action received for U.S. Appl. No. 15/273,544, mailed on May 25, 2017, 18 pages.
Non-Final Office Action received for U.S. Appl. No. 15/728,147, mailed on Feb. 22, 2018, 20 pages.
Non-Final Office Action received for U.S. Appl. No. 15/728,147, mailed on Jan. 31, 2019, 41 pages.
Non-Final Office Action received for U.S. Appl. No. 16/143,097, mailed on Feb. 28, 2019, 17 pages.
Non-Final Office Action received for U.S. Appl. No. 16/144,629, mailed on Mar. 13, 2020, 24 pages.
Non-Final Office Action received for U.S. Appl. No. 16/144,629, mailed on Mar. 29, 2019, 18 pages.
Non-Final Office Action received for U.S. Appl. No. 16/528,941, mailed on Dec. 7, 2020, 15 pages.
Non-Final Office Action received for U.S. Appl. No. 16/528,941, mailed on Jan. 30, 2020, 14 pages.
Non-Final Office Action received for U.S. Appl. No. 16/582,595, mailed on Nov. 26, 2019, 17 pages.
Non-Final Office Action received for U.S. Appl. No. 16/583,020, mailed on Nov. 14, 2019, 9 pages.
Non-Final Office Action received for U.S. Appl. No. 16/599,433, mailed on Jan. 28, 2021, 16 pages.
Non-Final Office Action received for U.S. Appl. No. 16/733,718, mailed on Sep. 16, 2020, 25 pages.
Non-Final Office Action received for U.S. Appl. No. 16/825,879, mailed on May 5, 2021, 12 pages.
Non-Final Office Action received for U.S. Appl. No. 17/027,317, mailed on Nov. 17, 2020, 17 pages.
Non-Final Office Action received for U.S. Appl. No. 17/190,879, mailed on Oct. 13, 2021, 10 pages.
Non-Final Office Action received for U.S. Appl. No. 17/220,596, mailed on Jun. 10, 2021, 31 pages.
Notice of Acceptance received for Australian Patent Application No. 2017286130, mailed on Apr. 26, 2019, 3 pages.
Notice of Acceptance received for Australian Patent Application No. 2018279787, mailed on Dec. 10, 2019, 3 pages.
Notice of Acceptance received for Australian Patent Application No. 2019213341, mailed on Aug. 25, 2020, 3 pages.
Notice of Acceptance received for Australian Patent Application No. 2019266049, mailed on Nov. 24, 2020, 3 pages.
Notice of Acceptance received for Australian Patent Application No. 2020201969, mailed on Mar. 26, 2021, 3 pages.
Notice of Acceptance received for Australian Patent Application No. 2020260413, mailed on Oct. 14, 2021, 3 pages.
Notice of Acceptance received for Australian Patent Application No. 2020267151, mailed on Dec. 9, 2020, 3 pages.
Notice of Acceptance received for Australian Patent Application No. 2020277216, mailed on Mar. 15, 2021, 3 pages.
Notice of Acceptance received for Australian Patent Application No. 2021201167, mailed on Mar. 15, 2021, 3 pages.
Notice of Acceptance received for Australian Patent Application No. 2021203210, mailed on Jul. 9, 2021, 3 pages.
Notice of Acceptance received for Australian Patent Application No. 2021254567, mailed on Nov. 17, 2021, 3 pages.

(56) References Cited

OTHER PUBLICATIONS

Notice of Acceptance received for Australian Patent Application No. 2022200966, mailed on Feb. 25, 2022, 3 pages.
Notice of Allowance received for Brazilian Patent Application No. 112018074765-3, mailed on Oct. 8, 2019, 2 pages (1 page of English Translation and 1 page of Official Copy).
Notice of Allowance received for Chinese Patent Application No. 201780002533.5, mailed on Apr. 14, 2020, 2 pages (1 page of English Translation and 1 page of Official Copy).
Notice of Allowance received for Chinese Patent Application No. 201810566134.8, mailed on Apr. 7, 2020, 3 pages (1 page of English Translation and 2 pages of Official Copy).
Notice of Allowance received for Chinese Patent Application No. 201810664927.3, mailed on Jul. 19, 2019, 2 pages (1 page of English Translation and 1 page of Official Copy).
Notice of Allowance received for Chinese Patent Application No. 201811512767.7, mailed on Jul. 27, 2020, 4 pages (1 page of English Translation and 3 pages of Official Copy).
Notice of Allowance received for Chinese Patent Application No. 201910692978.1, mailed on Feb. 4, 2021, 6 pages (3 pages of English Translation and 3 pages of Official Copy).
Notice of Allowance received for Chinese Patent Application No. 201911202668.3, mailed on Feb. 4, 2021, 5 pages (2 pages of English Translation and 3 pages of Official Copy).
Notice of Allowance received for Chinese Patent Application No. 201911219525.3, mailed on Sep. 29, 2020, 2 pages (1 page of English Translation and 1 page of Official Copy).
Notice of Allowance received for Chinese Patent Application No. 202010218168.5, mailed on Aug. 25, 2021, 6 pages (3 pages of English Translation and 3 pages of Official Copy).
Notice of Allowance received for Chinese Patent Application No. 202010287950.2, mailed on Mar. 22, 2022, 7 pages (3 pages of English Translation and 4 pages of Official Copy).
Notice of Allowance received for Chinese Patent Application No. 202010287953.6, mailed on Mar. 18, 2021, 7 pages (3 pages of English Translation and 4 pages of Official Copy).
Notice of Allowance received for Chinese Patent Application No. 202010287958.9, mailed on Aug. 27, 2021, 6 pages (3 pages of English Translation and 3 pages of Official Copy).
Notice of Allowance received for Chinese Patent Application No. 202010287961.0, mailed on Mar. 9, 2021, 8 pages (4 pages of English Translation and 4 pages of Official Copy).
Notice of Allowance received for Chinese Patent Application No. 202010287975.2, mailed on Mar. 1, 2021, 7 pages (3 pages of English Translation and 4 pages of Official Copy).
Notice of Allowance received for Chinese Patent Application No. 202010600151.6, mailed on Aug. 13, 2021, 2 pages (1 page of English Translation and 1 page of Official Copy).
Notice of Allowance received for Chinese Patent Application No. 202010600197.8, mailed on Feb. 9, 2022, 5 pages (1 page of English Translation and 4 pages of Official Copy).
Notice of Allowance received for Chinese Patent Application No. 202010601484.0, mailed on Nov. 23, 2021, 2 pages (1 page of English Translation and 1 page of Official Copy).
Notice of Allowance received for Chinese Patent Application No. 202011480411.7, mailed on Feb. 18, 2022, 6 pages (3 pages of English Translation and 3 pages of Official Copy).
Notice of Allowance received for Japanese Patent Application No. 2018-171188, mailed on Jul. 16, 2019, 3 pages (1 page of English Translation and 2 pages of Official Copy).
Notice of Allowance received for Korean Patent Application No. 10-2018-7026743, mailed on Mar. 20, 2019, 7 pages (1 page of English Translation and 6 pages of Official Copy).
Notice of Allowance received for Korean Patent Application No. 10-2018-7028849, mailed on Feb. 1, 2019, 4 pages (1 page of English Translation and 3 pages of Official Copy).
Notice of Allowance received for Korean Patent Application No. 10-2018-7034780, mailed on Jun. 19, 2019, 4 pages (1 page of English Translation and 3 pages of Official Copy).
Notice of Allowance received for Korean Patent Application No. 10-2018-7036893, mailed on Jun. 12, 2019, 4 pages (1 page of English Translation and 3 pages of Official Copy).
Notice of Allowance received for Korean Patent Application No. 10-2019-7027042, mailed on Nov. 26, 2020, 4 pages (1 page of English Translation and 3 pages of Official Copy).
Notice of Allowance received for Korean Patent Application No. 10-2019-7035478, mailed on Apr. 24, 2020, 4 pages (1 page of English Translation and 3 pages of Official Copy).
Notice of Allowance received for Korean Patent Application No. 10-2020-0052618, mailed on Mar. 23, 2021, 5 pages (2 page of English Translation and 3 pages of Official Copy).
Notice of Allowance received for Korean Patent Application No. 10-2020-0143726, mailed on Nov. 10, 2020, 5 pages (2 pages of English Translation and 3 pages of Official Copy).
Notice of Allowance received for Korean Patent Application No. 10-2020-0155924, mailed on Nov. 23, 2020, 7 pages (2 pages of English Translation and 5 pages of Official Copy).
Notice of Allowance received for Korean Patent Application No. 10-2020-7021870, mailed on Apr. 26, 2021, 4 pages (1 page of English Translation and 3 pages of Official Copy).
Notice of Allowance received for Korean Patent Application No. 10-2020-7031855, mailed on Mar. 22, 2021, 5 pages (1 page of English Translation and 4 pages of Official Copy).
Notice of Allowance received for Korean Patent Application No. 10-2021-0022053, mailed on Nov. 23, 2021, 5 pages (2 pages of English Translation and 3 pages of Official Copy).
Notice of Allowance received for Korean Patent Application No. 10-2021-7000954, mailed on Aug. 18, 2021, 5 pages (2 pages of English Translation and 3 pages of Official Copy).
Notice of Allowance received for Korean Patent Application No. 10-2021-7019525, mailed on Jul. 13, 2021, 5 pages (1 page of English Translation and 4 pages of Official Copy).
Notice of Allowance received for Korean Patent Application No. 10-2021-7020693, mailed on Dec. 27, 2021, 5 pages (1 page of English Translation and 4 pages of Official Copy).
Notice of Allowance received for Korean Patent Application No. 10-2021-7035687, mailed on Dec. 30, 2021, 5 pages (1 page of English Translation and 4 pages of Official Copy).
Notice of Allowance received for Korean Patent Application No. 10-2021-7036337, mailed on Apr. 5, 2022, 4 pages (1 page of English Translation and 3 pages of Official Copy).
Notice of Allowance received for Korean Patent Application No. 10-2022-7002829, mailed on Feb. 12, 2022, 6 pages (1 page of English Translation and 5 pages of Official Copy).
Notice of Allowance received for U.S. Appl. No. 16/528,941, mailed on Aug. 10, 2021, 5 pages.
Notice of Allowance received for U.S. Appl. No. 16/528,941, mailed on May 19, 2021, 5 pages.
Notice of Allowance received for U.S. Appl. No. 15/273,453, mailed on Oct. 12, 2017, 11 pages.
Notice of Allowance received for U.S. Appl. No. 15/273,503, mailed on Aug. 14, 2017, 9 pages.
Notice of Allowance received for U.S. Appl. No. 15/273,522, mailed on Mar. 28, 2017, 9 pages.
Notice of Allowance received for U.S. Appl. No. 15/273,522, mailed on May 19, 2017, 2 pages.
Notice of Allowance received for U.S. Appl. No. 15/273,522, mailed on May 23, 2017, 2 pages.
Notice of Allowance received for U.S. Appl. No. 15/273,544, mailed on Mar. 13, 2018, 8 pages.
Notice of Allowance received for U.S. Appl. No. 15/273,544, mailed on Oct. 27, 2017, 8 pages.
Notice of Allowance received for U.S. Appl. No. 15/728,147, mailed on Aug. 19, 2019, 13 pages.
Notice of Allowance received for U.S. Appl. No. 15/858,175, mailed on Jun. 1, 2018, 8 pages.
Notice of Allowance received for U.S. Appl. No. 15/858,175, mailed on Sep. 12, 2018, 8 pages.
Notice of Allowance received for U.S. Appl. No. 16/110,514, mailed on Apr. 29, 2019, 9 pages.
Notice of Allowance received for U.S. Appl. No. 16/110,514, mailed on Mar. 13, 2019, 11 pages.

(56) References Cited

OTHER PUBLICATIONS

Notice of Allowance received for U.S. Appl. No. 16/143,097, mailed on Aug. 29, 2019, 23 pages.
Notice of Allowance received for U.S. Appl. No. 16/143,201, mailed on Feb. 8, 2019, 9 pages.
Notice of Allowance received for U.S. Appl. No. 16/143,201, mailed on Nov. 28, 2018, 14 pages.
Notice of Allowance received for U.S. Appl. No. 16/144,629, mailed on Apr. 7, 2022, 8 pages.
Notice of Allowance received for U.S. Appl. No. 16/191,117, mailed on Oct. 29, 2019, 9 pages.
Notice of Allowance received for U.S. Appl. No. 16/528,257, mailed on Jan. 14, 2022, 10 pages.
Notice of Allowance received for U.S. Appl. No. 16/582,595, mailed on Mar. 20, 2020, 9 pages.
Notice of Allowance received for U.S. Appl. No. 16/583,020, mailed on Apr. 1, 2020, 5 pages.
Notice of Allowance received for U.S. Appl. No. 16/583,020, mailed on Feb. 28, 2020, 5 pages.
Notice of Allowance received for U.S. Appl. No. 16/584,044, mailed on Dec. 11, 2019, 15 pages.
Notice of Allowance received for U.S. Appl. No. 16/584,044, mailed on Mar. 30, 2020, 16 pages.
Notice of Allowance received for U.S. Appl. No. 16/584,044, mailed on Nov. 14, 2019, 13 pages.
Notice of Allowance received for U.S. Appl. No. 16/584,100, mailed on Apr. 8, 2020, 12 pages.
Notice of Allowance received for U.S. Appl. No. 16/584,100, mailed on Jan. 14, 2020, 13 pages.
Notice of Allowance received for U.S. Appl. No. 16/584,693, mailed on Jan. 15, 2020, 15 pages.
Notice of Allowance received for U.S. Appl. No. 16/584,693, mailed on May 4, 2020, 12 pages.
Notice of Allowance received for U.S. Appl. No. 16/586,314, mailed on Apr. 1, 2020, 8 pages.
Notice of Allowance received for U.S. Appl. No. 16/586,314, mailed on Jan. 9, 2020, 10 pages.
Notice of Allowance received for U.S. Appl. No. 16/586,344, mailed on Dec. 16, 2019, 12 pages.
Notice of Allowance received for U.S. Appl. No. 16/586,344, mailed on Mar. 27, 2020, 12 pages.
Notice of Allowance received for U.S. Appl. No. 16/599,433, mailed on May 14, 2021, 11 pages.
Notice of Allowance received for U.S. Appl. No. 16/599,433, mailed on Oct. 4, 2021, 13 pages.
Notice of Allowance received for U.S. Appl. No. 16/733,718, mailed on Feb. 5, 2021, 14 pages.
Notice of Allowance received for U.S. Appl. No. 16/733,718, mailed on Jul. 29, 2021, 26 pages.
Notice of Allowance received for U.S. Appl. No. 16/733,718, mailed on Oct. 20, 2021, 24 pages.
Notice of Allowance received for U.S. Appl. No. 16/825,879, mailed on Jul. 13, 2021, 9 pages.
Notice of Allowance received for U.S. Appl. No. 16/825,879, mailed on Sep. 28, 2021, 8 pages.
Notice of Allowance received for U.S. Appl. No. 16/835,651, mailed on Jul. 23, 2021, 8 pages.
Notice of Allowance received for U.S. Appl. No. 16/835,651, mailed on Jun. 1, 2021, 10 pages.
Notice of Allowance received for U.S. Appl. No. 16/835,651, mailed on Nov. 10, 2021, 9 pages.
Notice of Allowance received for U.S. Appl. No. 17/027,317, mailed on Apr. 12, 2021, 7 pages.
Notice of Allowance received for U.S. Appl. No. 17/027,317, mailed on Jan. 13, 2021, 10 pages.
Notice of Allowance received for U.S. Appl. No. 17/027,484, mailed on May 3, 2021, 11 pages.
Notice of Allowance received for U.S. Appl. No. 17/190,879, mailed on Nov. 10, 2021, 8 pages.
Notice of Allowance received for U.S. Appl. No. 17/220,596, mailed on Oct. 21, 2021, 43 pages.
Notice of Allowance received for U.S. Appl. No. 17/354,376, mailed on Jan. 27, 2022, 10 pages.
Notice of Allowance received for U.S. App. No. 17/354,376, mailed on Mar. 4, 2022, 5 pages.
Notice of Allowance received for U.S. Appl. No. 17/354,376, mailed on Mar. 30, 2022, 5 pages.
Office Action received for Australian Patent Application No. 2017100683, mailed on Sep. 20, 2017, 3 pages.
Office Action received for Australian Patent Application No. 2017100684, mailed on Jan. 24, 2018, 4 pages.
Office Action received for Australian Patent Application No. 2017100684, mailed on Oct. 5, 2017, 4 pages.
Office Action Received for Australian Patent Application No. 2017286130, mailed on Jan. 21, 2019, 4 pages.
Office Action received for Australian Patent Application No. 2019100794, mailed on Oct. 3, 2019, 4 pages.
Office Action received for Australian Patent Application No. 2019213341, mailed on Jun. 30, 2020, 6 pages.
Office Action received for Australian Patent Application No. 2019338180, mailed on Feb. 18, 2022, 3 pages.
Office Action received for Australian Patent Application No. 2020100189, mailed on Apr. 1, 2020, 3 pages.
Office Action received for Australian Patent Application No. 2020100720, mailed on Jul. 9, 2020, 7 pages.
Office Action received for Australian Patent Application No. 2020100720, mailed on Sep. 1, 2020, 5 pages.
Office Action received for Australian Patent Application No. 2020101043, mailed on Aug. 14, 2020, 5 pages.
Office Action received for Australian Patent Application No. 2020101043, mailed on Oct. 30, 2020, 4 pages.
Office Action received for Australian Patent Application No. 2020201969, mailed on Sep. 25, 2020, 5 pages.
Office Action received for Australian Patent Application No. 2020239717, mailed on Dec. 15, 2021, 6 pages.
Office Action received for Australian Patent Application No. 2020239717, mailed on Jun. 23, 2021, 7 pages.
Office Action received for Australian Patent Application No. 2020239717, mailed on Mar. 16, 2022, 4 pages.
Office Action received for Australian Patent Application No. 2020239717, mailed on Sep. 28, 2021, 6 pages.
Office Action received for Australian Patent Application No. 2020260413, mailed on Jun. 24, 2021, 2 pages.
Office Action received for Australian Patent Application No. 2020277216, mailed on Dec. 17, 2020, 5 pages.
Office Action received for Australian Patent Application No. 2021103004, mailed on Aug. 12, 2021, 5 pages.
Office Action received for Australian Patent Application No. 2021107587, mailed on Feb. 1, 2022, 6 pages.
Office Action received for Australian Patent Application No. 2021201295, mailed on Jan. 14, 2022, 3 pages.
Office Action received for Chinese Patent Application No. 201780002533.5, mailed on Apr. 25, 2019, 17 pages (7 pages of English Translation and 10 pages of Official Copy).
Office Action received for Chinese Patent Application No. 201780002533.5, mailed on Feb. 3, 2020, 6 pages (3 pages of English Translation and 3 pages of Official Copy).
Office Action received for Chinese Patent Application No. 201780002533.5, mailed on Sep. 26, 2019, 21 pages (9 pages of English Translation and 12 pages of Official Copy).
Office Action received for Chinese Patent Application No. 201810566134.8, mailed on Aug. 13, 2019, 14 pages (8 pages of English Translation and 6 pages of Official Copy).
Office Action received for Chinese Patent Application No. 201810664927.3, mailed on Mar. 28, 2019, 11 pages (5 pages of English Translation and 6 pages of Official Copy).
Office Action received for Chinese Patent Application No. 201811446867.4, mailed on Dec. 31, 2019, 12 pages (5 pages of English Translation and 7 pages of Official Copy).
Office Action received for Chinese Patent Application No. 201811446867.4, mailed on May 6, 2020, 10 pages (5 pages of English Translation and 5 pages of Official Copy).

(56) References Cited

OTHER PUBLICATIONS

Office Action received for Chinese Patent Application No. 201811446867.4, mailed on Sep. 8, 2020, 9 pages (4 pages of English Translation and 5 pages of Official Copy).
Office Action received for Chinese Patent Application No. 201811512767.7, mailed on Dec. 20, 2019, 14 pages (7 pages of English Translation and 7 pages of Official Copy).
Office Action received for Chinese Patent Application No. 201811512767.7, mailed on Jun. 4, 2020, 6 pages (3 pages of English Translation and 3 pages of Official Copy).
Office Action received for Chinese Patent Application No. 201910692978.1, mailed on Apr. 3, 2020, 19 pages (8 pages of English Translation and 11 pages of Official Copy).
Office Action received for Chinese Patent Application No. 201910692978.1, mailed on Nov. 4, 2020, 4 pages (1 page of English Translation and 3 pages of Official Copy).
Office Action received for Chinese Patent Application No. 201911202668.3, mailed on Aug. 4, 2020, 13 pages (7 pages of English Translation and 6 pages of Official Copy).
Office Action received for Chinese Patent Application No. 201911219525.3, mailed on Jul. 10, 2020, 7 pages (1 page of English Translation and 6 pages of Official Copy).
Office Action received for Chinese Patent Application No. 202010218168.5, mailed on Feb. 9, 2021, 21 pages (9 pages of English Translation and 12 pages of Official Copy).
Office Action received for Chinese Patent Application No. 202010287950.2, mailed on Aug. 10, 2021, 12 pages (6 pages of English Translation and 6 pages of Official Copy).
Office Action received for Chinese Patent Application No. 202010287950.2, mailed on Feb. 20, 2021, 22 pages (10 pages of English Translation and 12 pages of Official Copy).
Office Action received for Chinese Patent Application No. 202010287950.2, mailed on Nov. 19, 2021, 8 pages (5 pages of English Translation and 3 pages of Official Copy).
Office Action received for Chinese Patent Application No. 202010287953.6, mailed on Jan. 14, 2021, 14 pages (7 pages of English Translation and 7 pages of Official Copy).
Office Action received for Chinese Patent Application No. 202010287958.9, mailed on Jan. 5, 2021, 16 pages (8 pages of English Translation and 8 pages of Official Copy).
Office Action received for Chinese Patent Application No. 202010287961.0, mailed on Dec. 30, 2020, 16 pages (8 pages of English Translation and 8 pages of Official Copy).
Office Action received for Chinese Patent Application No. 202010287975.2, mailed on Dec. 30, 2020, 17 pages (9 pages of English Translation and 8 pages of Official Copy).
Office Action received for Chinese Patent Application No. 202010600151.6, mailed on Apr. 29, 2021, 11 pages (5 pages of English Translation and 6 pages of Official Copy).
Office Action received for Chinese Patent Application No. 202010600197.8, mailed on Jul. 2, 2021, 14 pages (6 pages of English Translation and 8 pages of Official Copy).
Office Action received for Chinese Patent Application No. 202010601484.0, mailed on Jun. 3, 2021, 13 pages (6 pages of English Translation and 7 pages of Official Copy).
Office Action received for Chinese Patent Application No. 202011480411.7, mailed on Aug. 2, 2021, 12 pages (6 pages of English Translation and 6 pages of Official Copy).
Office Action received for Chinese Patent Application No. 202011480411.7, mailed on Jan. 12, 2022, 7 pages (4 pages of English Translation and 3 pages of Official Copy).
Office Action received for Chinese Patent Application No. 202110766668.7, mailed on Feb. 16, 2022, 12 pages (6 pages of English Translation and 6 pages of Official Copy).
Office Action received for Chinese Patent Application No. 202180002106.3, mailed on Feb. 16, 2022, 12 pages (6 pages of English Translation and 6 pages of Official Copy).
Office Action received for Danish Patent Application No. PA201670627, mailed on Apr. 5, 2017, 3 pages.
Office Action received for Danish Patent Application No. PA201670627, mailed on Nov. 6, 2017, 2 pages.
Office Action received for Danish Patent Application No. PA201670627, mailed on Oct. 11, 2016, 8 pages.
Office Action received for Danish Patent Application No. PA201670753, mailed on Dec. 20, 2016, 7 pages.
Office Action received for Danish Patent Application No. PA201670753, mailed on Jul. 5, 2017, 4 pages.
Office Action received for Danish Patent Application No. PA201670753, mailed on Mar. 23, 2018, 5 pages.
Office Action received for Danish Patent Application No. PA201670755, mailed on Apr. 6, 2017, 5 pages.
Office Action received for Danish Patent Application No. PA201670755, mailed on Apr. 20, 2018, 2 pages.
Office Action received for Danish Patent Application No. PA201670755, mailed on Dec. 22, 2016, 6 pages.
Office Action received for Danish Patent Application No. PA201670755, mailed on Oct. 20, 2017, 4 pages.
Office Action received for Danish Patent Application No. PA201770563, mailed on Aug. 13, 2018, 5 pages.
Office Action received for Danish Patent Application No. PA201770563, mailed on Jan. 28, 2020, 3 pages.
Office Action received for Danish Patent Application No. PA201770563, mailed on Jun. 28, 2019, 5 pages.
Office Action received for Danish Patent Application No. PA201770719, mailed on Aug. 14, 2018, 6 pages.
Office Action received for Danish Patent Application No. PA201770719, mailed on Feb. 19, 2019, 4 pages.
Office Action received for Danish Patent Application No. PA201770719, mailed on Jan. 17, 2020, 4 pages.
Office Action received for Danish Patent Application No. PA201770719, mailed on Jun. 30, 2021, 3 pages.
Office Action received for Danish Patent Application No. PA201770719, mailed on Nov. 16, 2020, 5 pages.
Office Action received for Danish Patent Application No. PA201770719, mailed on Nov. 16, 2021, 2 pages.
Office Action received for Danish Patent Application No. PA201870366, mailed on Aug. 22, 2019, 3 pages.
Office Action received for Danish Patent Application No. PA201870366, mailed on Dec. 12, 2018, 3 pages.
Office Action received for Danish Patent Application No. PA201870367, mailed on Dec. 20, 2018, 5 pages.
Office Action received for Danish Patent Application No. PA201870368, mailed on Dec. 20, 2018, 5 pages.
Office Action received for Danish Patent Application No. PA201870368, mailed on Oct. 1, 2019, 6 pages.
Office Action received for Danish Patent Application No. PA201870623, mailed on Jan. 30, 2020, 2 pages.
Office Action received for Danish Patent Application No. PA201870623, mailed on Jul. 12, 2019, 4 pages.
Office Action received for Danish Patent Application No. PA201970592, mailed on Mar. 2, 2020, 5 pages.
Office Action received for Danish Patent Application No. PA201970592, mailed on Oct. 26, 2020, 5 pages.
Office Action received for Danish Patent Application No. PA201970593, mailed on Apr. 16, 2020, 2 pages.
Office Action received for Danish Patent Application No. PA201970593, mailed on Feb. 2, 2021, 2 pages.
Office Action received for Danish Patent Application No. PA201970593, mailed on Mar. 10, 2020, 4 pages.
Office Action received for Danish Patent Application No. PA201970595, mailed on Mar. 10, 2020, 4 pages.
Office Action received for Danish Patent Application No. PA201970600, mailed on Mar. 9, 2020, 5 pages.
Office Action received for Danish Patent Application No. PA201970601, mailed on Aug. 13, 2020, 3 pages.
Office Action received for Danish Patent Application No. PA201970601, mailed on Jan. 31, 2020, 3 pages.
Office Action received for Danish Patent Application No. PA201970601, mailed on Nov. 11, 2019, 8 pages.
Office Action received for Danish Patent Application No. PA201970603, mailed on Nov. 4, 2020, 3 pages.

(56) References Cited

OTHER PUBLICATIONS

Office Action received for Danish Patent Application No. PA201970605, mailed on Mar. 10, 2020, 5 pages.
Office Action received for Danish Patent Application No. PA202070611, mailed on Dec. 22, 2020, 7 pages.
Office Action received for European Patent Application 17809168.2, mailed on Jan. 7, 2020, 5 pages.
Office Action received for European Patent Application 17809168.2, mailed on Oct. 8, 2020, 4 pages.
Office Action received for European Patent Application No. 18176890.4, mailed on Oct. 16, 2018, 8 pages.
Office Action received for European Patent Application No. 18183054.8, mailed on Feb. 24, 2020, 6 pages.
Office Action received for European Patent Application No. 18183054.8, mailed on Nov. 16, 2018, 8 pages.
Office Action received for European Patent Application No. 18209460.7, mailed on Apr. 10, 2019, 7 pages.
Office Action received for European Patent Application No. 18209460.7, mailed on Apr. 21, 2020, 5 pages.
Office Action received for European Patent Application No. 18214698.5, mailed on Apr. 2, 2019, 8 pages.
Office Action received for European Patent Application No. 18704732.9, mailed on Sep. 7, 2021, 10 pages.
Office Action received for European Patent Application No. 19204230.7, mailed on Sep. 28, 2020, 6 pages.
Office Action received for European Patent Application No. 19724959.2, mailed on Apr. 23, 2020, 10 pages.
Office Action received for European Patent Application No. 20168009.7, mailed on Apr. 20, 2021, 6 pages.
Office Action received for European Patent Application No. 20168009.7, mailed on Sep. 13, 2021, 8 pages.
Office Action received for European Patent Application No. 20206196.6, mailed on Jan. 13, 2021, 10 pages.
Office Action received for European Patent Application No. 20206197.4, mailed on Aug. 27, 2021, 6 pages.
Office Action received for European Patent Application No. 20206197.4, mailed on Jan. 12, 2021, 9 pages.
Office Action received for European Patent Application No. 20206197.4, mailed on Mar. 18, 2022, 7 pages.
Office Action received for European Patent Application No. 20210373.5, mailed on Dec. 9, 2021, 7 pages.
Office Action received for European Patent Application No. 20210373.5, mailed on May 10, 2021, 9 pages.
Office Action received for European Patent Application No. 21157252.4, mailed on Apr. 23, 2021, 8 pages.
Office Action received for European Patent Application No. 21163791.3, mailed on Jun. 2, 2021, 8 pages.
Office Action received for Indian Patent Application No. 201814036470, mailed on Feb. 26, 2021, 7 pages.
Office Action received for Indian Patent Application No. 201817024430, mailed on Sep. 27, 2021, 8 pages.
Office Action received for Indian Patent Application No. 201818025015, mailed on Feb. 4, 2022, 7 pages.
Office Action received for Indian Patent Application No. 201818045872, mailed on Oct. 13, 2021, 7 pages.
Office Action received for Indian Patent Application No. 201818046896, mailed on Feb. 2, 2022, 7 pages.
Office Action received for Indian Patent Application No. 201917053025, mailed on Mar. 19, 2021, 7 pages.
Office Action received for Indian Patent Application No. 202014041530, mailed on Dec. 8, 2021, 7 pages.
Office Action received for Indian Patent Application No. 202018006172, mailed on May 5, 2021, 6 pages.
Office Action received for Indian Patent Application No. 202118021941, mailed on Mar. 23, 2022, 5 pages.
Office Action received for Indian Patent Application No. 202118046032, mailed on Apr. 25, 2022, 6 pages.
Office Action received for Indian Patent Application No. 202118046033, mailed on Apr. 25, 2022, 7 pages.
Office Action received for Indian Patent Application No. 202118046044, mailed on Apr. 25, 2022, 6 pages.
Office Action received for Japanese Patent Application No. 2018-182607, mailed on Apr. 6, 2020, 6 pages (3 pages of English Translation and 3 pages of Official Copy).
Office Action received for Japanese Patent Application No. 2018-182607, mailed on Jul. 20, 2020, 5 pages (2 pages of English Translation and 3 pages of Official Copy).
Office Action received for Japanese Patent Application No. 2018-182607, mailed on Sep. 8, 2021, 7 pages (4 pages of English Translation and 3 pages of Official Copy).
Office Action received for Japanese Patent Application No. 2018-225131, mailed on Aug. 17, 2020, 21 pages (6 pages of English Translation and 15 pages of Official Copy).
Office Action received for Japanese Patent Application No. 2018-225131, mailed on Mar. 4, 2019, 10 pages (6 pages of English Translation and 4 pages of Official Copy).
Office Action received for Japanese Patent Application No. 2018-545502, mailed on Aug. 17, 2020, 14 pages (6 pages of English Translation and 8 pages of Official Copy).
Office Action received for Japanese Patent Application No. 2019-203399, mailed on Aug. 10, 2021, 4 pages (2 pages of English Translation and 2 pages of Official Copy).
Office Action received for Japanese Patent Application No. 2019-566087, mailed on Oct. 18, 2021, 10 pages (6 pages of English Translation and 4 pages of Official Copy).
Office Action received for Japanese Patent Application No. 2020-070418, mailed on Aug. 3, 2020, 22 pages (14 pages of English Translation and 8 pages of Official Copy).
Office Action received for Japanese Patent Application No. 2020-159338, mailed on Dec. 8, 2021, 9 pages (5 pages of English Translation and 4 pages of Official Copy).
Office Action received for Japanese Patent Application No. 2020-184470, mailed on May 10, 2021, 3 pages (1 page of English Translation and 2 pages of Official Copy).
Office Action received for Japanese Patent Application No. 2020-184471, mailed on May 10, 2021, 3 pages (1 page of English Translation and 2 pages of Official Copy).
Office Action received for Japanese Patent Application No. 2020-193703, mailed on Apr. 19, 2021, 4 pages (2 pages of English Translation and 2 pages of Official Copy).
Office Action received for Korean Patent Application No. 10-2018-7026743, mailed on Jan. 17, 2019, 5 pages (2 pages of English Translation and 3 pages of Official Copy).
Office Action received for Korean Patent Application No. 10-2018-7034780, mailed on Apr. 4, 2019, 11 pages (5 pages of English Translation and 6 pages of Official Copy).
Office Action received for Korean Patent Application No. 10-2018-7036893, mailed on Apr. 9, 2019, 6 pages (2 pages of English Translation and 4 pages of Official Copy).
Office Action received for Korean Patent Application No. 10-2019-7027042, mailed on May 13, 2020, 6 pages (2 pages of English Translation and 4 pages of Official Copy).
Office Action received for Korean Patent Application No. 10-2019-7035478, mailed on Jan. 17, 2020, 17 pages (9 pages of English Translation and 8 pages of Official Copy).
Office Action received for Korean Patent Application No. 10-2020-0052618, mailed on Aug. 18, 2020, 11 pages (5 pages of English Translation and 6 pages of Official Copy).
Office Action received for Korean Patent Application No. 10-2020-7021870, mailed on Nov. 11, 2020, 11 pages (5 pages of English Translation and 6 pages of Official Copy).
Office Action received for Korean Patent Application No. 10-2020-7031855, mailed on Nov. 24, 2020, 6 pages (2 pages of English Translation and 4 pages of Official Copy).
Office Action received for Korean Patent Application No. 10-2021-0022053, mailed on Mar. 1, 2021, 11 pages (5 pages of English Translation and 6 pages of Official Copy).
Office Action received for Korean Patent Application No. 10-2021-7000954, mailed on Jan. 28, 2021, 5 pages (2 pages of English Translation and 3 pages of Official Copy).

(56) References Cited

OTHER PUBLICATIONS

Office Action received for Korean Patent Application No. 10-2021-7020693, mailed on Jul. 14, 2021, 7 pages (3 pages of English Translation and 4 pages of Official Copy).
Office Action received for Korean Patent Application No. 10-2021-7036337, mailed on Dec. 8, 2021, 6 pages (2 pages of English Translation and 4 pages of Official Copy).
Office Action received for Korean Patent Application No. 10-2022-7006310, mailed on Mar. 8, 2022, 6 pages (2 pages of English Translation and 4 pages of Official Copy).
Osxdaily, "How to Zoom the Camera on iPhone", Available Online at: https://osxdaily.com/2012/04/18/zoom-camera-iphone/, Apr. 18, 2012, 6 pages.
Paine, Steve, "Samsung Galaxy Camera Detailed Overview—User Interface", Retrieved from: <https://www.youtube.com/watch?v=td8UYSySulo&feature=youtu.be>, Sep. 18, 2012, pp. 1-2.
PC World, "How to make AR Emojis on the Samsung Galaxy S9", You Tube, Available Online: https://www.youtube.com/watch?v=8wQICfulkz0, Feb. 25, 2018, 2 pages.
Phonearena, "Sony Xperia Z5 camera app and UI overview", Retrieved from <https://www.youtube.com/watch?v=UtDzdTsmkfU&feature=youtu.be>, Sep. 8, 2015, pp. 1-3.
Pre-Appeal Review Report received for Japanese Patent Application No. 2018-182607, mailed on Jan. 21, 2021, 4 pages (2 pages of English Translation and 2 pages of Official Copy).
Pre-Appeal Review Report received for Japanese Patent Application No. 2018-225131, mailed on Jan. 24, 2020, 8 pages (4 pages of English Translation and 4 pages of Official Copy).
Pre-Appeal Review Report received for Japanese Patent Application No. 2018-545502, mailed on Jan. 24, 2020, 8 pages (3 pages of English Translation and 5 pages of Official Copy).
"Procamera Capture the Moment", Online Available at: http://www.procamera-app.com/procamera_manual/ProCamera_Manual_EN.pdf, Apr. 21, 2016, 63 pages.
Record of Oral Hearing received for U.S. Appl. No. 16/144,629, mailed on Jan. 28, 2022, 13 pages.
Result of Consultation received for European Patent Application No. 19204230.7, mailed on Nov. 16, 2020, 3 pages.
Result of Consultation received for European Patent Application No. 19204230.7, mailed on Sep. 24, 2020, 5 pages.
Result of Consultation received for European Patent Application No. 19724959.2, mailed on Sep. 4, 2020, 3 pages.
Schiffhauer, Alexander, "See the Light with Night Sight", Available online at: https://www.blog.google/products/pixel/see-light-night-sight, Nov. 14, 2018, 6 pages.
Search Report and Opinion received for Danish Patent Application No. PA201770563, mailed on Oct. 10, 2017, 9 pages.
Search Report and Opinion received for Danish Patent Application No. PA201870366, mailed on Aug. 27, 2018, 9 pages.
Search Report and Opinion received for Danish Patent Application No. PA201870367, mailed on Aug. 27, 2018, 9 pages.
Search Report and Opinion received for Danish Patent Application No. PA201870368, mailed on Sep. 6, 2018, 7 pages.
Search Report and Opinion received for Danish Patent Application No. PA201870623, mailed on Dec. 20, 2018, 8 pages.
Search Report and Opinion received for Danish Patent Application No. PA201970592, mailed on Nov. 7, 2019, 8 pages.
Search Report and Opinion received for Danish Patent Application No. PA201970593, mailed on Oct. 29, 2019, 10 pages.
Search Report and Opinion received for Danish Patent Application No. PA201970595, mailed on Nov. 8, 2019, 16 pages.
Search Report and Opinion received for Danish Patent Application No. PA201970600, mailed on Nov. 5, 2019, 11 pages.
Search Report and Opinion received for Danish Patent Application No. PA201970603, mailed on Nov. 15, 2019, 9 pages.
Search Report and Opinion received for Danish Patent Application No. PA201970605, mailed on Nov. 12, 2019, 10 pages.
Search Report received for Danish Patent Application No. PA201770719, mailed on Oct. 17, 2017, 9 pages.
Shaw et al., "Skills for Closeups Photography", Watson-Guptill Publications, Nov. 1999, 5 pages (Official Copy Only). {See Communication under 37 CFR § 1.98(a) (3)}.
shiftdelete.net, "Oppo Reno 10× Zoom Ön Inceleme—Huawei P30 Pro'ya rakip mi geliyor?", Available online at: <https://www.youtube.com/watch?v=ev2wlUztdrg>, See especially 5:34-6:05, Apr. 24, 2019, 2 pages.
Smart Reviews, "Honor10 AI Camera's In Depth Review", See Especially 2:37-2:48; 6:39-6:49, Available Online at <https://www.youtube.com/watch?v=oKFqRvxeDBQ>, May 31, 2018, 2 pages.
Snapchat Lenses, "How To Get All Snapchat Lenses Face Effect Filter on Android", Retrieved from: <https://www.youtube.com/watch?v=0PfnF1RInfw&feature=youtu.be>, Sep. 21, 2015, pp. 1-2.
"Sony Xperia XZ3 Camera Review—The Colors, Duke, The Colors!", Android Headlines—Android News & Tech News, Available online at: <https://www.youtube.com/watch?v=mwpYXzWVOgw>, See especially 1:02-1:27, 2:28-2:30, Nov. 3, 2018, 3 pages.
Sony, "User Guide, Xperia XZ3, H8416/H9436/H9493", Sony Mobile Communications Inc., Retrieved from: <https://www-support-downloads.sonymobile.com/h8416/userguide_EN_H8416-H9436-H9493_2_Android9.0.pdf>, See pp. 86-102, 2018, 121 pages.
Summons to Attend Oral Proceedings received for European Patent Application No. 19204230.7, mailed on May 25, 2021, 10 pages.
Summons to Attend Oral Proceedings received for European Patent Application No. 19724959.2, mailed on Feb. 1, 2021, 9 pages.
Summons to Attend Oral Proceedings received for European Patent Application No. 19724959.2, mailed on Mar. 31, 2021, 3 pages.
Supplemental Notice of Allowance received for U.S. Appl. No. 16/143,201, mailed on Dec. 13, 2018, 2 pages.
Supplemental Notice of Allowance received for U.S. Appl. No. 16/143,201, mailed on Dec. 19, 2018, 2 pages.
Supplemental Notice of Allowance received for U.S. Appl. No. 16/143,201, mailed on Jan. 10, 2019, 2 pages.
Supplemental Notice of Allowance received for U.S. Appl. No. 16/733,718, mailed on Mar. 9, 2021, 21 pages.
Supplemental Notice of Allowance received for U.S. Appl. No. 16/733,718, mailed on Mar. 29, 2021, 2 pages.
Supplementary European Search Report received for European Patent Application No. 18176890.4, mailed on Sep. 20, 2018, 4 pages.
Supplementary European Search Report received for European Patent Application No. 18183054.8, mailed on Oct. 11, 2018, 4 pages.
Tech With Brett, "How to Create Your AR Emoji on the Galaxy S9 and S9+", Available online at: <https://www.youtube.com/watch?v=HHMdcBpC8MQ>, Mar. 16, 2018, 5 pages.
Techtag, "Samsung J5 Prime Camera Review | True Review", Available online at: https://www.youtube.com/watch?v=a_p906ai6PQ, Oct. 26, 2016, 3 pages.
Techtag, "Samsung J7 Prime Camera Review (Technical Camera)", Available Online at: https://www.youtube.com/watch?v=AJPcLP8GpFQ, Oct. 4, 2016, 3 pages.
Telleen et al., "Synthetic Shutter Speed Imaging", University of California, Santa Cruz, vol. 26, No. 3, 2007, 8 pages.
The Nitpicker, "Sony Xperia XZ3 | in-depth Preview", Available online at: <https://www.youtube.com/watch?v=TGCKxBuiO5c>, See especially 12:40-17:25, Oct. 7, 2018, 3 pages.
Tico et al., "Robust method of digital image stabilization", Nokia Research Center, ISCCSP, Malta,, Mar. 12-14, 2008, pp. 316-321.
Vickgeek, "Canon 80D Live View Tutorial | Enhance your image quality", Available online at: https://www.youtube.com/watch?v=JGNCiy6Wt9c, Sep. 27, 2016, 3 pages.
Vivo India, "Bokeh Mode | Vivo V9", Available Online at: <https://www.youtube.com/watch?v=B5AIHhH5Rxs>, Mar. 25, 2018, 3 pages.
Whitacre Michele, "Photography 101 | Exposure Meter", Online available at: https://web.archive.org/web/20160223055834/http://www.michelewhitacrephotographyblog.com, Feb. 23, 2016, 4 pages.
Wong, Richard, "Huawei Smartphone (P20/P10/P9, Mate 10/9) Wide Aperture Mode Demo", Available Online at: <https://www.youtube.com/watch?v=eLY3LsZGDPA>, May 7, 2017, 2 pages.
Wu et al., "Security Threats to Mobile Multimedia Applications: Camera-Based Attacks on Mobile Phones", IEEE Communications

(56) References Cited

OTHER PUBLICATIONS

Magazine, Available online at: http://www.ieeeprojectmadurai.in/BASE/ANDROID/Security%20Threats%20to%20Mobile.pdf, Mar. 2014, pp. 80-87.
Xeetechcare, "Samsung Galaxy S10—Super Night Mode & Ultra Fast Charging!", Online Available at: https://www.youtube.com/watch?v=3bguV4FX6aA, Mar. 28, 2019, 4 pages.
X-Tech, "Test Make up via Slick Augmented Reality Mirror Without Putting It on", Available Online at: http://x-tech.am/test-make-up-via-slick-augmented-reality-mirror-without-putting-it-on/, Nov. 29, 2014, 5 pages.
Board Opinion received for Chinese Patent Application No. 201811446867.4, mailed on Feb. 14, 2023, 11 pages (4 pages of English Translation and 7 pages of Official Copy).
Corrected Notice of Allowance received for U.S. Appl. No. 17/566,094, mailed on Mar. 7, 2023, 2 pages.
Intention to Grant received for European Patent Application No. 20168009.7, mailed on Feb. 28, 2023, 10 pages.
Non-Final Office Action received for U.S. Appl. No. 17/542,947, mailed on Mar. 2, 2023, 59 pages.
Notice of Allowance received for U.S. Appl. No. 17/732,191, mailed on Feb. 27, 2023, 12 pages.
Office Action received for Chinese Patent Application No. 202110766668.7, mailed on Jan. 20, 2023, 11 pages (6 pages of English Translation and 5 pages of Official Copy).
Corrected Notice of Allowance received for U.S. Appl. No. 17/356,322, mailed on Feb. 15, 2023, 2 pages.
Corrected Notice of Allowance received for U.S. Appl. No. 17/525,664, mailed on Feb. 23, 2023, 2 pages.
Corrected Notice of Allowance received for U.S. Appl. No. 17/740,032, mailed on Feb. 15, 2023, 6 pages.
Notice of Allowance received for Japanese Patent Application No. 2022-027861, mailed on Feb. 13, 2023, 3 pages (1 page of English Translation and 2 pages of Official Copy).
Notice of Allowance received for U.S. Appl. No. 17/510,168, mailed on Feb. 13, 2023, 10 pages.
Notice of Allowance received for U.S. Appl. No. 17/525,664, mailed on Feb. 14, 2023, 10 pages.
Notice of Allowance received for U.S. Appl. No. 17/566,094, mailed on Feb. 23, 2023, 8 pages.
Office Action received for Chinese Patent Application No. 202210849242.2, mailed on Jan. 20, 2023, 12 pages (6 pages of English Translation and 6 pages of Official Copy).
Office Action received for Indian Patent Application No. 202117009020, mailed on Feb. 6, 2023, 7 pages.
Office Action received for Japanese Patent Application No. 2021-187533, mailed on Feb. 6, 2023, 7 pages (4 pages of English Translation and 3 pages of Official Copy).
Applicant-Initiated Interview Summary received for U.S. Appl. No. 17/041,412, mailed on Jan. 31, 2023, 7 pages.
Applicant-Initiated Interview Summary received for U.S. Appl. No. 17/356,322, mailed on Dec. 27, 2022, 4 pages.
Applicant-Initiated Interview Summary received for U.S. Appl. No. 17/479,897, mailed on Oct. 31, 2022, 3 pages.
Corrected Notice of Allowance received for U.S. Appl. No. 17/525,664, mailed on Nov. 3, 2022, 2 pages.
Corrected Notice of Allowance received for U.S. Appl. No. 17/566,094, mailed on Feb. 8, 2023, 2 pages.
Corrected Notice of Allowance received for U.S. Appl. No. 17/566,094, mailed on Jan. 5, 2023, 2 pages.
Corrected Notice of Allowance received for U.S. Appl. No. 17/566,094, mailed on Jan. 23, 2023, 2 pages.
Corrected Notice of Allowance received for U.S. Appl. No. 17/740,032, mailed on Nov. 3, 2022, 6 pages.
Drunk Beauty Flower Digital Technology, "iPhone Xs Max Camera Tips, Tricks, Features and Complete Tutorial", Available online at: https://www.ixigua.com/6606874981844386308?wid_try=1, Oct. 2, 2018, 2 pages (Official Copy Only). {See Communication under 37 CFR § 1.98(a) (3)}.
European Search Report received for European Patent Application No. 22184844.3, mailed on Nov. 4, 2022, 4 pages.
European Search Report received for European Patent Application No. 22184853.4, mailed on Nov. 14, 2022, 5 pages.
Final Office Action received for U.S. Appl. No. 17/356,322, mailed on Nov. 29, 2022, 19 pages.
Final Office Action received for U.S. Appl. No. 17/479,897, mailed on Jan. 10, 2023, 15 pages.
Intention to Grant received for European Patent Application No. 18704732.9, mailed on Dec. 6, 2022, 10 pages.
Intention to Grant received for European Patent Application No. 20168009.7, mailed on Oct. 31, 2022, 9 pages.
Intention to Grant received for European Patent Application No. 20206197.4, mailed on Dec. 15, 2022, 10 pages.
Intention to Grant received for European Patent Application No. 20210373.5, mailed on Jan. 10, 2023, 12 pages.
Intention to Grant received for European Patent Application No. 21733324.4, mailed on Jan. 9, 2023, 9 pages.
International Preliminary Report on Patentability received for PCT Patent Application No. PCT/US2021/034304, mailed on Dec. 15, 2022, 19 pages.
International Search Report and Written Opinion received for PCT Patent Application No. PCT/US2022/030589, mailed on Sep. 5, 2022, 26 pages.
International Search Report and Written Opinion received for PCT Patent Application No. PCT/US2022/030704, mailed on Nov. 9, 2022, 19 pages.
Invitation to Pay Additional Fees and Partial International Search Report received for PCT Patent Application No. PCT/US2022/030704, mailed on Sep. 15, 2022, 12 pages.
Non-Final Office Action received for U.S. Appl. No. 17/041,412, mailed on Dec. 5, 2022, 13 pages.
Non-Final Office Action received for U.S. Appl. No. 17/510,168, mailed on Dec. 6, 2022, 11 pages.
Non-Final Office Action received for U.S. Appl. No. 17/944,765, mailed on Jan. 18, 2023, 9 pages.
Notice of Acceptance received for Australian Patent Application No. 2021290292, mailed on Jan. 23, 2023, 3 pages.
Notice of Allowance received for Brazilian Patent Application No. BR122018076550-0, mailed on Jan. 3, 2022, 3 pages (1 page of English Translation and 2 pages of Official Copy).
Notice of Allowance received for Chinese Patent Application No. 202111323807.5, mailed on Jan. 10, 2023, 4 pages (1 page of English Translation and 3 pages of Official Copy).
Notice of Allowance received for Korean Patent Application No. 10-2022-7010505, mailed on Dec. 26, 2022, 7 pages (2 pages of English Translation and 5 pages of Official Copy).
Notice of Allowance received for Korean Patent Application No. 10-2022-7023077, mailed on Nov. 1, 2022, 8 pages (2 pages of English Translation and 6 pages of Official Copy).
Notice of Allowance received for U.S. Appl. No. 17/356,322, mailed on Feb. 2, 2023, 11 pages.
Notice of Allowance received for U.S. Appl. No. 17/483,684, mailed on Oct. 24, 2022, 9 pages.
Notice of Allowance received for U.S. Appl. No. 17/525,664, mailed on Oct. 27, 2022, 11 pages.
Notice of Allowance received for U.S. Appl. No. 17/566,094, mailed on Nov. 22, 2022, 10 pages.
Notice of Allowance received for U.S. Appl. No. 17/732,191, mailed on Nov. 9, 2022, 12 pages.
Notice of Allowance received for U.S. Appl. No. 17/740,032, mailed on Feb. 1, 2023, 9 pages.
Office Action received for Australian Patent Application No. 2021290292, mailed on Nov. 24, 2022, 2 pages.
Office Action received for Chinese Patent Application No. 202110766668.7, mailed on Sep. 15, 2022, 18 pages (9 pages of English Translation and 9 pages of Official Copy).
Office Action received for Chinese Patent Application No. 202210063070.6, mailed on Jan. 5, 2023, 12 pages (6 pages of English Translation and 6 pages of Official Copy).
Office Action received for European Patent Application No. 19769316.1, mailed on Jan. 12, 2023, 10 pages.

(56) References Cited

OTHER PUBLICATIONS

Office Action received for European Patent Application No. 22184844.3, mailed on Nov. 16, 2022, 7 pages.
Office Action received for European Patent Application No. 22184853.4, mailed on Nov. 25, 2022, 7 pages.
Office Action received for Japanese Patent Application No. 2022-027861, mailed on Nov. 21, 2022, 4 pages (2 pages of English Translation and 2 pages of Official Copy).
Office Action received for Korean Patent Application No. 10-2020-0124139, mailed on Jan. 17, 2023, 10 pages (5 pages of English Translation and 5 pages of Official Copy).
Office Action received for Korean Patent Application No. 10-2021-7006145, mailed on Oct. 12, 2022, 14 pages (6 pages of English Translation and 8 pages of Official Copy).
Office Action received for Korean Patent Application No. 10-2022-7043663, mailed on Jan. 6, 2023, 12 pages (5 pages of English Translation and 7 pages of Official Copy).
Result of Consultation received for European Patent Application No. 22184844.3, mailed on Feb. 1, 2023, 3 pages.
Corrected Notice of Allowance received for U.S. Appl. No. 17/041,412, mailed on Mar. 31, 2023, 6 pages.
Corrected Notice of Allowance received for U.S. Appl. No. 17/510,168, mailed on Mar. 29, 2023, 2 pages.
Notice of Allowance received for U.S. Appl. No. 17/944,765, mailed on Apr. 5, 2023, 9 pages.
Office Action received for Australian Patent Application No. 2022218463, mailed on Mar. 17, 2023, 2 pages.
Corrected Notice of Allowance received for U.S. Appl. No. 17/041,412, mailed on May 17, 2023, 2 pages.
Corrected Notice of Allowance received for U.S. Appl. No. 17/525,664, mailed on May 17, 2023, 2 pages.
Decision to Grant received for European Patent Application No. 20210373.5, mailed on May 19, 2023, 4 pages.
Notice of Allowance received for Chinese Patent Application No. 202210063070.6, mailed on May 2, 2023, 2 pages (1 page of English Translation and 1 page of Official Copy).
Notice of Allowance received for U.S. Appl. No. 17/356,322, mailed on May 8, 2023, 10 pages.
Corrected Notice of Allowance received for U.S. Appl. No. 17/041,412, mailed on Apr. 12, 2023, 2 pages.
Corrected Notice of Allowance received for U.S. Appl. No. 17/525,664, mailed on Apr. 11, 2023, 2 pages.
Hearing Notice received for Indian Patent Application No. 201817024430, mailed on Apr. 6, 2023, 2 pages.
International Preliminary Report on Patentability received for PCT Patent Application No. PCT/US2021/046877, mailed on Apr. 6, 2023, 12 pages.
Office Action received for Chinese Patent Application No. 202211072958.2, mailed on Apr. 5, 2023, 11 pages (6 pages of English Translation and 5 pages of Official Copy).
Office Action received for Indian Patent Application No. 202215026045, mailed on Mar. 31, 2023, 8 pages.
Corrected Notice of Allowance received for U.S. Appl. No. 17/944,765, mailed on Jun. 1, 2023, 5 pages.
Final Office Action received for U.S. Appl. No. 17/542,947, mailed on May 25, 2023, 55 pages.
Intention to Grant received for European Patent Application No. 20206197.4, mailed on May 25, 2023, 9 pages.
Corrected Notice of Allowance received for U.S. Appl. No. 17/041,412, mailed on Mar. 23, 2023, 7 pages.
Corrected Notice of Allowance received for U.S. Appl. No. 17/356,322, mailed on Mar. 8, 2023, 2 pages.
Corrected Notice of Allowance received for U.S. Appl. No. 17/510,168, mailed on Mar. 16, 2023, 2 pages.
Notice of Allowance received for Korean Patent Application No. 10-2021-7006145, mailed on Mar. 6, 2023, 5 pages (2 pages of English Translation and 3 pages of Official Copy).
Notice of Allowance received for U.S. Appl. No. 17/041,412, mailed on Mar. 15, 2023, 13 pages.
Office Action received for Indian Patent Application No. 202015008746, mailed on Mar. 6, 2023, 7 pages.
Applicant-Initiated Interview Summary received for U.S. Appl. No. 17/542,947, mailed on Apr. 28, 2023, 4 pages.
Decision to Grant received for Japanese Patent Application No. 2021-166686, mailed on Apr. 20, 2023, 2 pages (1 page of English Translation and 1 page of Official Copy).
Non-Final Office Action received for U.S. Appl. No. 17/479,897, mailed on Apr. 25, 2023, 14 pages.
Notice of Acceptance received for Australian Patent Application No. 2022218463, mailed on Apr. 18, 2023, 3 pages.
Notice of Allowance received for U.S. Appl. No. 17/041,412, mailed on Apr. 26, 2023, 11 pages.
Notice of Allowance received for U.S. Appl. No. 17/510,168, mailed on May 3, 2023, 10 pages.
Notice of Allowance received for U.S. Appl. No. 17/525,664, mailed on Apr. 26, 2023, 10 pages.
Office Action received for European Patent Application No. 22184844.3, mailed on Apr. 26, 2023, 5 pages.
Office Action received for European Patent Application No. 22184853.4, mailed on Apr. 26, 2023, 4 pages.
Summons to Attend Oral Proceedings received for European Patent Application No. 21163791.3, mailed on May 3, 2023, 6 pages.
Applicant-Initiated Interview Summary received for U.S. Appl. No. 17/479,897, mailed on Jun. 12, 2023, 2 pages.
Board Decision received for Chinese Patent Application No. 201811446867.4, mailed on Apr. 26, 2023, 21 pages (05 pages of English Translation and 16 pages of Official copy).
Decision to Grant received for European Patent Application No. 21733324.4, mailed on Jun. 2, 2023, 3 pages.
Office Action received for Chinese Patent Application No. 202211072261.5, mailed on Apr. 29, 2023, 17 pages (9 pages of English Translation and 8 pages of Official Copy).
Office Action received for Japanese Patent Application No. 2022-130725, mailed on Sep. 4, 2023, 2 pages (1 page of English Translation and 1 page of Official Copy).
Applicant-Initiated Interview Summary received for U.S. Appl. No. 17/542,947, mailed on Jul. 10, 2023, 4 pages.
Corrected Notice of Allowance received for U.S. Appl. No. 17/944,765, mailed on Jul. 27, 2023, 5 pages.
Decision to Grant received for European Patent Application No. 20168009.7, mailed on Jun. 22, 2023, 4 pages.
Extended European Search Report received for European Patent Application No. 23173036.7, mailed on Jul. 24, 2023, 13 pages.
Notice of Allowance received for Korean Patent Application No. 10-2020-0124139, mailed on Jun. 19, 2023, 7 pages (2 pages of English Translation and 5 pages of Official Copy).
Notice of Allowance received for U.S. Appl. No. 17/479,897, mailed on Jul. 26, 2023, 7 pages.
Notice of Hearing received for Indian Patent Application No. 201818046896, mailed on Jul. 11, 2023, 2 pages.
Office Action received for Australian Patent Application No. 2022221466, mailed on Jun. 16, 2023, 2 pages.
Office Action received for Australian Patent Application No. 2022228121, mailed on Jul. 7, 2023, 3 pages.
Office Action received for Chinese Patent Application No. 202110766668.7, mailed on Jun. 7, 2023, 13 pages (9 pages of English Translation and 4 pages of Official Copy).
Office Action received for Chinese Patent Application No. 202211072958.2, mailed on Jun. 20, 2023, 48 pages (24 pages of English Translation and 24 pages of Official Copy).
Office Action received for Chinese Patent Application No. 202211073034.4, mailed on May 30, 2023, 21 pages (10 pages of English Translation and 11 pages of Official Copy).
Office Action received for European Patent Application No. 21157252.4, mailed on Jul. 24, 2023, 5 pages.
Office Action received for Japanese Patent Application No. 2021-187533, mailed on Jun. 26, 2023, 6 pages (3 pages of English Translation and 3 pages of Official Copy).
Summons to Oral Proceedings received for European Patent Application No. 19724959.2, mailed on Jul. 14, 2023, 6 pages.
Notice of Acceptance received for Australian Patent Application No. 2022221466, mailed on Aug. 31, 2023, 3 pages.

(56) References Cited

OTHER PUBLICATIONS

Notice of Allowance received for Korean Patent Application No. 10-2023-7009943, mailed on Aug. 31, 2023, 7 pages (2 pages of English Translation and 5 pages of Official Copy).
Result of Consultation received for European Patent Application No. 22184844.3, mailed on Aug. 28, 2023, 3 pages.
Decision to Grant received for Japanese Patent Application No. 2023-083816, mailed on Aug. 9, 2023, 2 pages (1 page of English Translation and 1 page of Official Copy).
Intention to Grant received for European Patent Application No. 22151131.4, mailed on Aug. 4, 2023, 10 pages.
Notice of Allowance received for Korean Patent Application No. 10-2022-7043663, mailed on Jul. 25, 2023, 8 pages (2 pages of English Translation and 6 pages of Official Copy).
Corrected Notice of Allowance received for U.S. Appl. No. 17/479,897, mailed on Aug. 17, 2023, 2 pages.
Decision to Grant received for European Patent Application No. 18704732.9, mailed on Aug. 18, 2023, 3 pages.
Non-Final Office Action received for U.S. Appl. No. 18/114,880, mailed on Aug. 29, 2023, 10 pages.
Office Action received for Australian Patent Application No. 2022228191, mailed on Aug. 16, 2023, 4 pages.
Communication for Board of Appeal received for European Patent Application No. 19724959.2, mailed on Sep. 27, 2023, 14 pages.
Decision to Grant received for Japanese Patent Application No. 2021-187533, mailed on Sep. 28, 2023, 3 pages (1 page of English Translation and 2 pages of Official Copy).
Notice of Allowance received for U.S. Appl. No. 17/479,897, mailed on Oct. 3, 2023, 5 pages.
Office Action received for Australian Patent Application No. 2022228121, mailed on Sep. 20, 2023, 3 pages.
Applicant-Initiated Interview Summary received for U.S. Appl. No. 17/542,947, mailed on Feb. 9, 2024, 4 pages.
Non-Final Office Action received for U.S. Appl. No. 18/123,878, mailed on Jan. 31, 2024, 19 pages.
Notice of Allowance received for Japanese Patent Application No. 2022-095182, mailed on Feb. 5, 2024, 4 pages (1 page of English Translation and 3 pages of Official Copy).
Notice of Hearing received for Indian Patent Application No. 201814036470, mailed on Feb. 7, 2024, 4 pages.
Office Action received for Chinese Patent Application No. 202211072261.5, mailed on Dec. 28, 2023, 22 pages (14 pages of English Translation and 8 pages of Official Copy).
Office Action received for Korean Patent Application No. 10-2023-7016569, mailed on Jan. 22, 2024, 10 pages (4 pages of English Translation and 6 pages of Official Copy).
Brief Communication Regarding Oral Proceedings received for European Patent Application No. 21163791.3, mailed on Nov. 7, 2023, 4 pages.
Notice of Acceptance received for Australian Patent Application No. 2023204616, mailed on Oct. 31, 2023, 3 pages.
Office Action received for Japanese Patent Application No. 2022-095182, mailed on Sep. 25, 2023, 10 pages (5 pages of English Translation and 5 pages of Official Copy).
Decision to Grant received for European Patent Application No. 20206197.4, mailed on Oct. 6, 2023, 4 pages.
Notice of Acceptance received for Australian Patent Application No. 2022228191, mailed on Oct. 10, 2023, 3 pages.
Office Action received for European Patent Application No. 22722604.0, mailed on Oct. 13, 2023, 11 pages.
Office Action received for Japanese Patent Application No. 2022-145387, mailed on Oct. 2, 2023, 7 pages (3 pages of English Translation and 4 pages of Official Copy).
Decision to Grant received for Japanese Patent Application No. 2022-130725, mailed on Dec. 11, 2023, 2 pages (1 page of English Translation and 1 page of Official Copy).
International Preliminary Report on Patentability received for PCT Patent Application No. PCT/US2022/030589, mailed on Dec. 14, 2023, 22 pages.
International Preliminary Report on Patentability received for PCT Patent Application No. PCT/US2022/030704, mailed on Dec. 14, 2023, 14 pages.
Leonie, "Can I interrupt slideshow music in Mac Photos?", Online available at: <https://discussions.apple.com/thread/8027658?sortBy=best>, Jul. 31, 2017, 1 page.
Non-Final Office Action received for U.S. Appl. No. 17/542,947, mailed on Dec. 15, 2023, 68 pages.
Notice of Acceptance received for Australian Patent Application No. 2022228121, mailed on Dec. 13, 2023, 3 pages.
Office Action received for Australian Patent Application No. 2023200607, mailed on Dec. 20, 2023, 3 pages.
Office Action received for European Patent Application No. 22184853.4, mailed on Dec. 11, 2023, 4 pages.
Summons to Attend Oral Proceedings received for European Patent Application No. 22184844.3, mailed on Dec. 11, 2023, 9 pages.
Office Action received for Chinese Patent Application No. 202211073034.4, mailed on Nov. 22, 2023, 14 pages (9 pages of English Translation and 5 pages of Official Copy).
Decision to Grant received for European Patent Application No. 22151131.4, mailed on Nov. 16, 2023, 3 pages.
Decision to Grant received for Japanese Patent Application No. 2023-146062, mailed on Nov. 13, 2023, 2 pages (1 page of English Translation and 1 page of Official Copy).
Intention to Grant received for European Patent Application No. 20206196.6, mailed on Nov. 10, 2023, 10 pages.
Non-Final Office Action received for U.S. Appl. No. 17/546,968, mailed on Nov. 24, 2023, 34 pages.
Non-Final Office Action received for U.S. Appl. No. 18/196,997, mailed on Nov. 20, 2023, 12 pages.
Notice of Allowance received for Korean Patent Application No. 10-2022-7029729, mailed on Nov. 9, 2023, 8 pages (2 pages of English Translation and 6 pages of Official Copy).
Notice of Allowance received for U.S. Appl. No. 18/114,880, mailed on Nov. 15, 2023, 11 pages.
Notice of Hearing received for Indian Patent Application No. 201818045872, mailed on Nov. 16, 2023, 2 pages.
Office Action received for Korean Patent Application No. 10-2023-7037005, mailed on Nov. 13, 2023, 13 pages (6 pages of English Translation and 7 pages of Official Copy).
Decision to Refuse received for European Patent Application No. 21163791.3, mailed on Dec. 4, 2023, 16 pages.
Minutes of the Oral Proceedings received for European Patent Application No. 21163791.3, mailed on Dec. 1, 2023, 6 pages.
Non-Final Office Action received for U.S. Appl. No. 18/197,242, mailed on Dec. 7, 2023, 24 pages.
Notice of Allowance received for U.S. Appl. No. 18/121,458, mailed on Dec. 6, 2023, 9 pages.
Notice of Hearing received for Indian Patent Application No. 202118028159, mailed on Nov. 22, 2023, 2 pages.
Office Action received for Japanese Patent Application No. 2023-041079, mailed on Nov. 21, 2023, 6 pages (3 pages of English Translation and 3 pages of Official Copy).
Applicant-Initiated Interview Summary received for U.S. Appl. No. 17/546,968, mailed on Jan. 16, 2024, 3 pages.
Corrected Notice of Allowance received for U.S. Appl. No. 18/121,458, mailed on Jan. 18, 2024, 2 pages.
International Preliminary Report on Patentability received for PCT Patent Application No. PCT/US2022/024964, mailed on Nov. 9, 2023, 11 pages.
Applicant-Initiated Interview Summary received for U.S. Appl. No. 18/197,242, mailed on Feb. 22, 2024, 2 pages.
Communication for Board of Appeal received for European Patent Application No. 19204230.7, mailed on Feb. 16, 2024, 1 page.
Invitation to Pay Search Fees received for European Patent Application No. 20728854.9, mailed on Feb. 23, 2024, 3 pages.
Notice of Allowance received for U.S. Appl. No. 18/114,880, mailed on Feb. 15, 2024, 17 pages.
Office Action received for Australian Patent Application No. 2023200607, mailed on Feb. 22, 2024, 2 pages.
Office Action received for Chinese Patent Application No. 201880036400.4, mailed on Jan. 20, 2024, 14 pages (6 pages of English Translation and 8 pages of Official Copy).

(56) References Cited

OTHER PUBLICATIONS

Office Action received for Chinese Patent Application No. 202210849316.2, mailed on Jan. 18, 2024, 12 pages (6 pages of English Translation and 6 pages of Official Copy).
Summons to Oral Proceedings received for European Patent Application No. 19204230.7, mailed on Feb. 19, 2024, 2 pages.
Applicant-Initiated Interview Summary received for U.S. Appl. No. 17/546,968, mailed on Apr. 26, 2024, 2 pages.
Applicant-Initiated Interview Summary received for U.S. Appl. No. 18/123,878, mailed on Apr. 15, 2024, 4 pages.
Corrected Notice of Allowance received for U.S. Appl. No. 18/196,997, mailed on Apr. 18, 2024, 2 pages.
Corrected Notice of Allowance received for U.S. Appl. No. 18/196,997, mailed on Apr. 25, 2024, 2 pages.
Corrected Notice of Allowance received for U.S. Appl. No. 18/197,242, mailed on Apr. 4, 2024, 2 pages.
Corrected Notice of Allowance received for U.S. Appl. No. 18/197,242, mailed on Mar. 18, 2024, 2 pages.
Corrected Notice of Allowance received for U.S. Appl. No. 18/197,242, mailed on Mar. 27, 2024, 2 pages.
Corrected Notice of Allowance received for U.S. Appl. No. 18/197,242, mailed on May 15, 2024, 2 pages.
Corrected Notice of Allowance received for U.S. Appl. No. 18/228,591, mailed on Apr. 16, 2024, 5 pages.
Decision to Grant received for Japanese Patent Application No. 2022-145387, mailed on Mar. 4, 2024, 3 pages (1 page of English Translation and 2 pages of Official Copy).
Decision to Grant received for Japanese Patent Application No. 2023-041079, mailed on Mar. 28, 2024, 3 pages (1 page of English Translation and 2 pages of Official Copy).
Extended European Search Report received for European Patent Application No. 23204776.1, mailed on May 6, 2024, 8 pages.
Extended European Search Report received for European Patent Application No. 24155758.6, mailed on Mar. 20, 2024, 11 pages.
Final Office Action received for U.S. Appl. No. 17/542,947, mailed on Apr. 18, 2024, 55 pages.
Final Office Action received for U.S. Appl. No. 17/546,968, mailed on Mar. 19, 2024, 43 pages.
Final Office Action received for U.S. Appl. No. 18/123,878, mailed on Apr. 26, 2024, 23 pages.
Intention to Grant received for European Patent Application No. 22722604.0, mailed on May 14, 2024, 9 pages.
Non-Final Office Action received for U.S. Appl. No. 17/846,962, mailed on May 9, 2024, 19 pages.
Notice of Acceptance received for Australian Patent Application No. 2023200607, mailed on May 9, 2024, 3 pages.
Notice of Allowance received for U.S. Appl. No. 18/121,458, mailed on Mar. 12, 2024, 9 pages.
Notice of Allowance received for U.S. Appl. No. 18/196,997, mailed on Mar. 28, 2024, 11 pages.
Notice of Allowance received for U.S. Appl. No. 18/197,242, mailed on Mar. 6, 2024, 11 pages.
Notice of Allowance received for U.S. Appl. No. 18/228,591, mailed on Apr. 5, 2024, 10 pages.
Notice of Allowance received for U.S. Appl. No. 18/228,591, mailed on May 16, 2024, 5 pages.
Office Action received for Chinese Patent Application No. 202010235395.9, mailed on Mar. 16, 2024, 18 pages (9 pages of English Translation and 9 pages of Official Copy).
Office Action received for Chinese Patent Application No. 202110530629.7, mailed on Mar. 14, 2024, 13 pages (6 pages of English Translation and 7 pages of Official Copy).
Office Action received for Chinese Patent Application No. 202211072958.2, mailed on Jan. 27, 2024, 19 pages (8 pages of English Translation and 11 pages of Official Copy).
Office Action received for Chinese Patent Application No. 202211073034.4, mailed on Mar. 26, 2024, 14 pages (9 pages of English Translation and 5 pages of Official Copy).
Office Action received for European Patent Application No. 20728854.9, mailed on Apr. 8, 2024, 7 pages.
Office Action received for European Patent Application No. 20728854.9, mailed on May 7, 2024, 10 pages.
Office Action received for European Patent Application No. 22184853.4, mailed on Apr. 29, 2024, 5 pages.
Office Action received for Indian Patent Application No. 202117017871, mailed on Apr. 4, 2024, 8 pages.
Office Action received for Indian Patent Application No. 202118028158, mailed on Apr. 22, 2024, 7 pages.
Office Action received for Korean Patent Application No. 10-2024-7004853, mailed on Mar. 4, 2024, 6 pages (2 pages of English Translation and 4 pages of Official Copy).
Result of Consultation received for European Patent Application No. 20206196.6, mailed on Mar. 27, 2024, 4 pages.
Technology for Teachers and Students, "Adding Music to PowerPoint Presentations - PowerPoint Tutorial", Online available at: https://www.youtube.com/watch?v=tBiwTRLVOd0, Aug. 6, 2018, 6 pages.
TRAVELVIDS—VIDEO O,"How to quickly make a Slideshow video on iPhone (No 3rd party Apps required)", Online available at: https://www.youtube.com/watch?v=KpAzFvBQLf0, May 8, 2020, 4 pages.
Applicant-Initiated Interview Summary received for U.S. Appl. No. 17/542,947, mailed on Jun. 6, 2024, 4 pages.
Applicant-Initiated Interview Summary received for U.S. Appl. No. 18/123,878, mailed on Jun. 3, 2024, 3 pages.
Corrected Notice of Allowance received for U.S. Appl. No. 18/196,997, mailed on Jun. 3, 2024, 2 pages.
Corrected Notice of Allowance received for U.S. Appl. No. 18/196,997, mailed on May 23, 2024, 2 pages.
Corrected Notice of Allowance received for U.S. Appl. No. 18/228,591, mailed on May 28, 2024, 5 pages.
Notice of Allowance received for U.S. Appl. No. 17/546,968, mailed on May 31, 2024, 24 pages.
Notice of Allowance received for U.S. Appl. No. 18/628,021, mailed on Jun. 5, 2024, 9 pages.
Office Action received for Chinese Patent Application No. 202211072261.5, mailed on Apr. 28, 2024, 19 pages (13 pages of English Translation and 6 pages of Official Copy).
Advisory Action received for U.S. Appl. No. 18/123,878, mailed on Jun. 24, 2024, 4 pages.
Communication for Board of Appeal received for European Patent Application No. 19204230.7, mailed on Jun. 18, 2024, 15 pages.
Corrected Notice of Allowance received for U.S. Appl. No. 18/196,997, mailed on Jun. 13, 2024, 2 pages.
Corrected Notice of Allowance received for U.S. Appl. No. 18/228,591, mailed on Jun. 13, 2024, 5 pages.
Corrected Notice of Allowance received for U.S. Appl. No. 18/628,021, mailed on Jun. 24, 2024, 2 pages.
Office Action received for Korean Patent Application No. 10-2023-7002360, mailed on Jun. 5, 2024, 6 pages (2 pages of English Translation and 4 pages of Official Copy).
Supplemental Notice of Allowance received for U.S. Appl. No. 17/546,968, mailed on Jun. 14, 2024, 2 pages.
Notice of Allowance received for Korean Patent Application No. 10-2023-7037005, mailed on Jul. 2, 2024, 10 pages (2 pages of English Translation and 8 pages of Official Copy).
Notice of Allowance received for U.S. Appl. No. 18/196,997, mailed on Jul. 15, 2024, 11 pages.
Notice of Allowance received for U.S. Appl. No. 18/197,242, mailed on Jul. 10, 2024, 12 pages.
Corrected Notice of Allowance received for U.S. Appl. No. 18/197,242, mailed on Jul. 22, 2024, 2 pages.

* cited by examiner

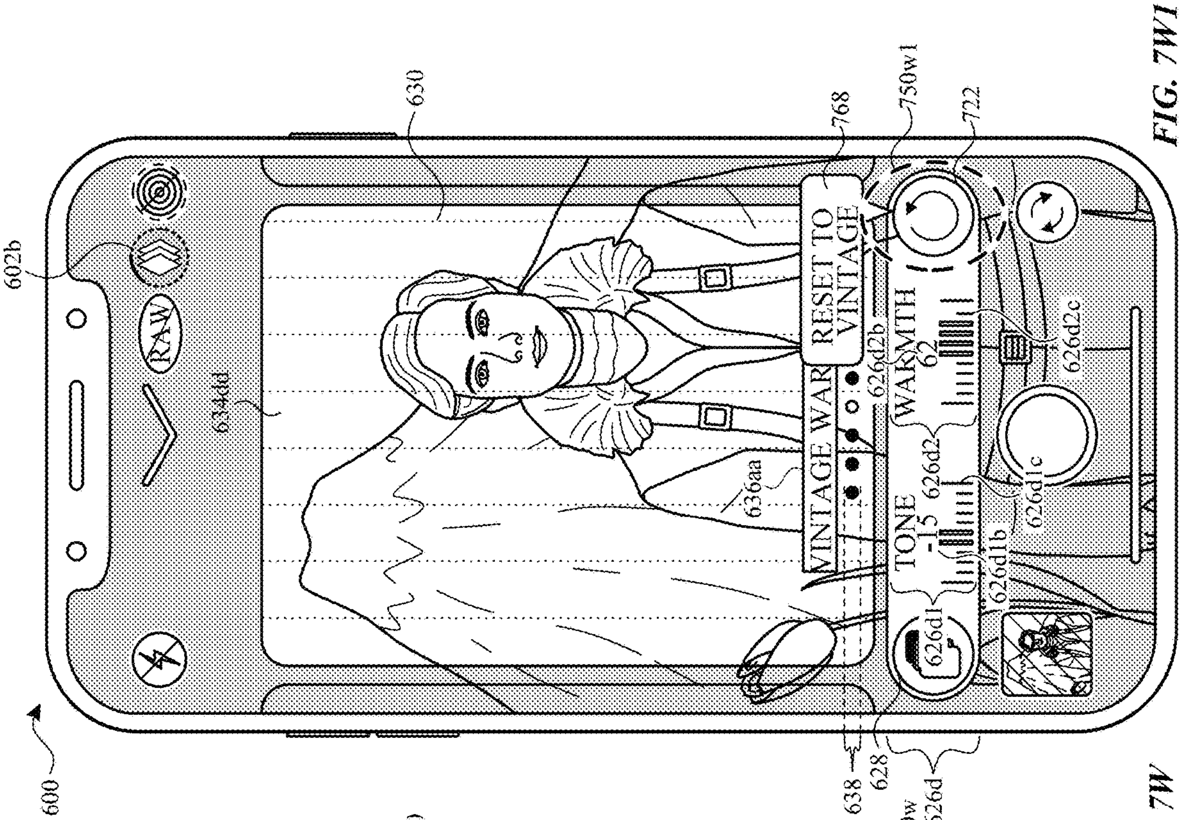
FIG. 7W1
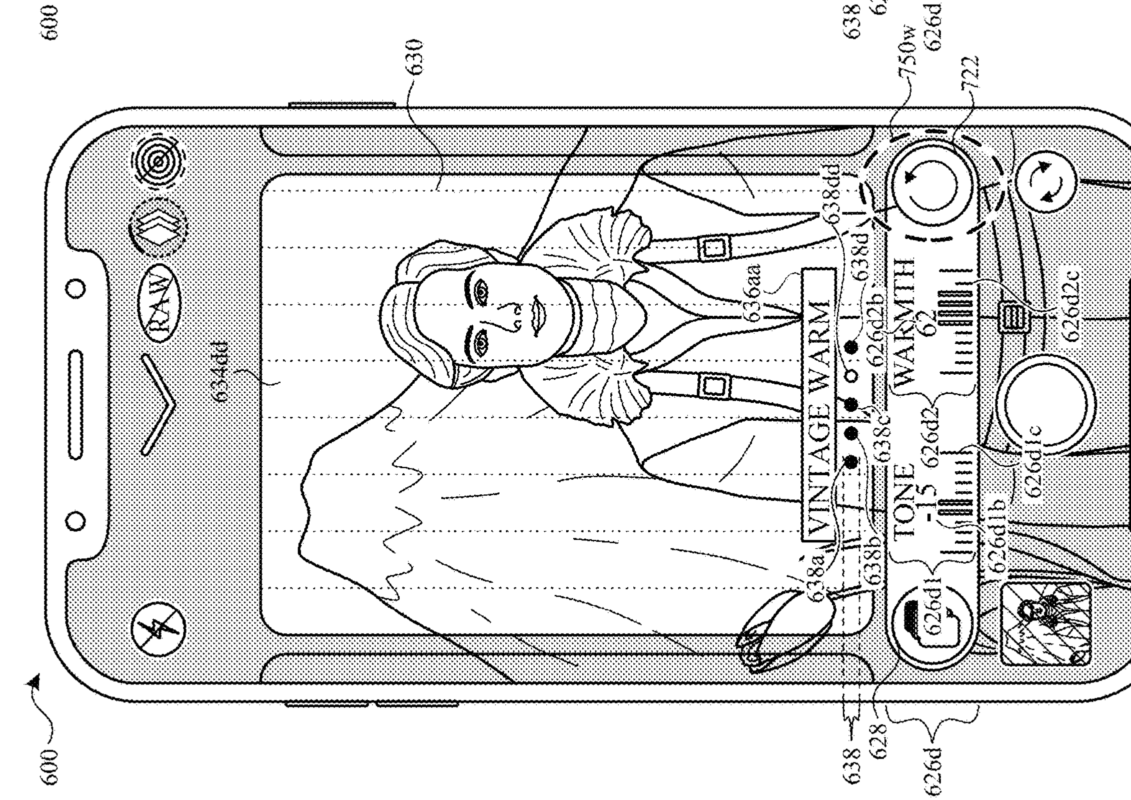
FIG. 7W

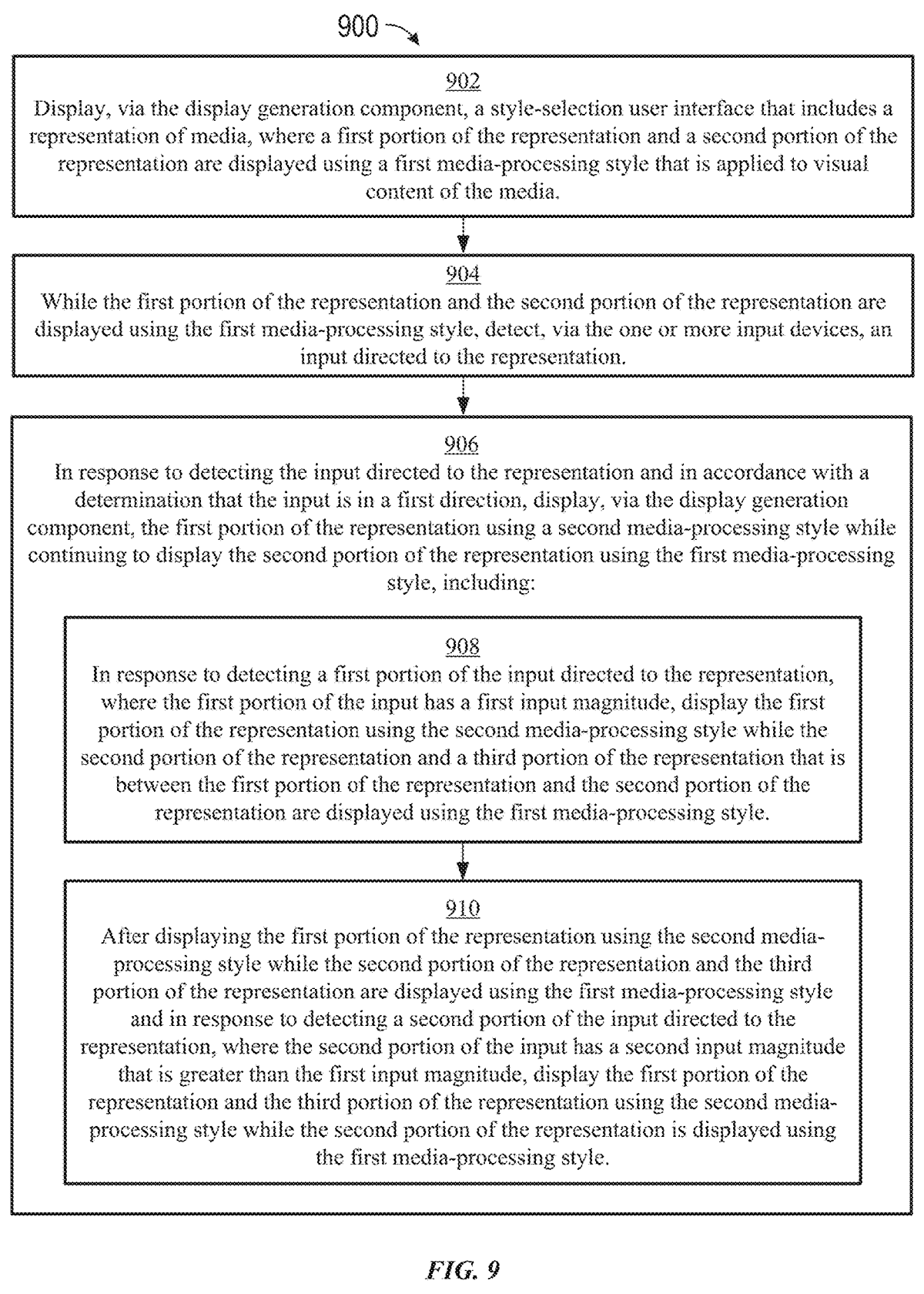

900

902
Display, via the display generation component, a style-selection user interface that includes a representation of media, where a first portion of the representation and a second portion of the representation are displayed using a first media-processing style that is applied to visual content of the media.

904
While the first portion of the representation and the second portion of the representation are displayed using the first media-processing style, detect, via the one or more input devices, an input directed to the representation.

906
In response to detecting the input directed to the representation and in accordance with a determination that the input is in a first direction, display, via the display generation component, the first portion of the representation using a second media-processing style while continuing to display the second portion of the representation using the first media-processing style, including:

908
In response to detecting a first portion of the input directed to the representation, where the first portion of the input has a first input magnitude, display the first portion of the representation using the second media-processing style while the second portion of the representation and a third portion of the representation that is between the first portion of the representation and the second portion of the representation are displayed using the first media-processing style.

910
After displaying the first portion of the representation using the second media-processing style while the second portion of the representation and the third portion of the representation are displayed using the first media-processing style and in response to detecting a second portion of the input directed to the representation, where the second portion of the input has a second input magnitude that is greater than the first input magnitude, display the first portion of the representation and the third portion of the representation using the second media-processing style while the second portion of the representation is displayed using the first media-processing style.

*FIG. 9*

USER INTERFACES FOR MANAGING MEDIA STYLES

CROSS-REFERENCE TO RELATED APPLICATIONS

This application claims priority to U.S. Provisional Patent Application Ser. No. 63/243,633, entitled "USER INTERFACES FOR MANAGING MEDIA STYLES," filed on Sep. 13, 2021, and U.S. Provisional Patent Application Ser. No. 63/195,679, entitled "USER INTERFACES FOR MANAGING MEDIA STYLES," filed on Jun. 1, 2021. The contents of which are hereby incorporated by reference in their entireties.

FIELD

The present disclosure relates generally to computer user interfaces and, more specifically, to techniques for managing media styles that are applied to the visual content of media.

BACKGROUND

Users of smartphones and other personal electronic devices are more frequently capturing, storing, and editing media for safekeeping memories and sharing with friends. Some existing techniques allowed users to capture images or videos. Users can manage such media by, for example, capturing, storing, and editing the media.

BRIEF SUMMARY

Some techniques for managing media styles that are applied to the visual content of media using electronic devices (e.g., including, computer systems), however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing media styles that are applied to the visual content of media. Such methods and interfaces optionally complement or replace other methods for managing media styles that are applied to the visual content of media. Such methods and interfaces reduce the cognitive burden on a user and produce a more efficient human-machine interface. For battery-operated computing devices, such methods and interfaces conserve power and increase the time between battery charges and reduced number of unnecessary, extraneous, and/or repetitive received inputs.

In accordance with some embodiments, a method performed at a computer system that is in communication with a display generation component and one or more input devices is described. The method comprises: displaying, via the display generation component, a style-selection user interface that includes a representation of media, wherein a first portion of the representation and a second portion of the representation are displayed using a first media-processing style that is applied to visual content of the media; while the first portion of the representation and the second portion of the representation are displayed using the first media-processing style, detecting, via the one or more input devices, an input directed to the representation; and in response to detecting the input directed to the representation and in accordance with a determination that the input is in a first direction, displaying, via the display generation component, the first portion of the representation using a second media-processing style while continuing to display the second portion of the representation using the first media-processing style, including: in response to detecting a first portion of the input directed to the representation, wherein the first portion of the input has a first input magnitude, displaying the first portion of the representation using the second media-processing style while the second portion of the representation and a third portion of the representation that is between the first portion of the representation and the second portion of the representation are displayed using the first media-processing style; and after displaying the first portion of the representation using the second media-processing style while the second portion of the representation and the third portion of the representation are displayed using the first media-processing style and in response to detecting a second portion of the input directed to the representation, wherein the second portion of the input has a second input magnitude that is greater than the first input magnitude, displaying the first portion of the representation and the third portion of the representation using the second media-processing style while the second portion of the representation is displayed using the first media-processing style.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: displaying, via the display generation component, a style-selection user interface that includes a representation of media, wherein a first portion of the representation and a second portion of the representation are displayed using a first media-processing style that is applied to visual content of the media; while the first portion of the representation and the second portion of the representation are displayed using the first media-processing style, detecting, via the one or more input devices, an input directed to the representation; and in response to detecting the input directed to the representation and in accordance with a determination that the input is in a first direction, displaying, via the display generation component, the first portion of the representation using a second media-processing style while continuing to display the second portion of the representation using the first media-processing style, including: in response to detecting a first portion of the input directed to the representation, wherein the first portion of the input has a first input magnitude, displaying the first portion of the representation using the second media-processing style while the second portion of the representation and a third portion of the representation that is between the first portion of the representation and the second portion of the representation are displayed using the first media-processing style; and after displaying the first portion of the representation using the second media-processing style while the second portion of the representation and the third portion of the representation are displayed using the first media-processing style and in response to detecting a second portion of the input directed to the representation, wherein the second portion of the input has a second input magnitude that is greater than the first input magnitude, displaying the first portion of the representation and the third portion of the representation using the second media-processing style while the second portion of the representation is displayed using the first media-processing style.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: displaying, via the display generation component, a style-selection user interface that includes a representation of media, wherein a first portion of the representation and a second portion of the representation are displayed using a first media-processing style that is applied to visual content of the media; while the first portion of the representation and the second portion of the representation are displayed using the first media-processing style, detecting, via the one or more input devices, an input directed to the representation; and in response to detecting the input directed to the representation and in accordance with a determination that the input is in a first direction, displaying, via the display generation component, the first portion of the representation using a second media-processing style while continuing to display the second portion of the representation using the first media-processing style, including: in response to detecting a first portion of the input directed to the representation, wherein the first portion of the input has a first input magnitude, displaying the first portion of the representation using the second media-processing style while the second portion of the representation and a third portion of the representation that is between the first portion of the representation and the second portion of the representation are displayed using the first media-processing style; and after displaying the first portion of the representation using the second media-processing style while the second portion of the representation and the third portion of the representation are displayed using the first media-processing style and in response to detecting a second portion of the input directed to the representation, wherein the second portion of the input has a second input magnitude that is greater than the first input magnitude, displaying the first portion of the representation and the third portion of the representation using the second media-processing style while the second portion of the representation is displayed using the first media-processing style.

In accordance with some embodiments, a computer system that is configured to communicate with a display generation component one or more input devices is described. The computer system comprises: one or more processors; and memory storing one or more programs configured to be executed by the one or more processors, the one or more programs including instructions for: displaying, via the display generation component, a style-selection user interface that includes a representation of media, wherein a first portion of the representation and a second portion of the representation are displayed using a first media-processing style that is applied to visual content of the media; while the first portion of the representation and the second portion of the representation are displayed using the first media-processing style, detecting, via the one or more input devices, an input directed to the representation; and in response to detecting the input directed to the representation and in accordance with a determination that the input is in a first direction, displaying, via the display generation component, the first portion of the representation using a second media-processing style while continuing to display the second portion of the representation using the first media-processing style, including: in response to detecting a first portion of the input directed to the representation, wherein the first portion of the input has a first input magnitude, displaying the first portion of the representation using the second media-processing style while the second portion of the representation and a third portion of the representation that is between the first portion of the representation and the second portion of the representation are displayed using the first media-processing style; and after displaying the first portion of the representation using the second media-processing style while the second portion of the representation and the third portion of the representation are displayed using the first media-processing style and in response to detecting a second portion of the input directed to the representation, wherein the second portion of the input has a second input magnitude that is greater than the first input magnitude, displaying the first portion of the representation and the third portion of the representation using the second media-processing style while the second portion of the representation is displayed using the first media-processing style.

In accordance with some embodiments, a computer system that is configured to communicate with a display generation component and one or more input devices is described. The computer system comprises: means for displaying, via the display generation component, a style-selection user interface that includes a representation of media, wherein a first portion of the representation and a second portion of the representation are displayed using a first media-processing style that is applied to visual content of the media; means, while the first portion of the representation and the second portion of the representation are displayed using the first media-processing style, for detecting, via the one or more input devices, an input directed to the representation; and means, responsive to detecting the input directed to the representation and in accordance with a determination that the input is in a first direction, for displaying, via the display generation component, the first portion of the representation using a second media-processing style while continuing to display the second portion of the representation using the first media-processing style, including: means, responsive to detecting a first portion of the input directed to the representation, wherein the first portion of the input has a first input magnitude, for displaying the first portion of the representation using the second media-processing style while the second portion of the representation and a third portion of the representation that is between the first portion of the representation and the second portion of the representation are displayed using the first media-processing style; and means, after displaying the first portion of the representation using the second media-processing style while the second portion of the representation and the third portion of the representation are displayed using the first media-processing style and in response to detecting a second portion of the input directed to the representation, wherein the second portion of the input has a second input magnitude that is greater than the first input magnitude, for displaying the first portion of the representation and the third portion of the representation using the second media-processing style while the second portion of the representation is displayed using the first media-processing style.

In accordance with some embodiments, a computer program product is described. The computer program product comprises one or more programs configured to be executed by one or more processors of a computer system that is in communication with a display generation component and one or more input devices. The one or more programs include instructions for: displaying, via the display generation component, a style-selection user interface that includes a representation of media, wherein a first portion of the representation and a second portion of the representation are displayed using a first media-processing style that is applied to visual content of the media; while the first portion of the representation and the second portion of the representation are displayed using the first media-processing style, detecting, via the one or more input devices, an input directed to the representation; and in response to detecting the input directed to the representation and in accordance with a determination that the input is in a first direction, displaying, via the display generation component, the first portion of the representation using a second media-processing style while continuing to display the second portion of the representation using the first media-processing style, including: in response to detecting a first portion of the input directed to the representation, wherein the first portion of the input has a first input magnitude, displaying the first portion of the representation using the second media-processing style while the second portion of the representation and a third portion of the representation that is between the first portion of the representation and the second portion of the representation are displayed using the first media-processing style; and after displaying the first portion of the representation using the second media-processing style while the second portion of the representation and the third portion of the representation are displayed using the first media-processing style and in response to detecting a second portion of the input directed to the representation, wherein the second portion of the input has a second input magnitude that is greater than the first input magnitude, displaying the first portion of the representation and the third portion of the representation using the second media-processing style while the second portion of the representation is displayed using the first media-processing style.

In accordance with some embodiments, a method performed at a computer system that is in communication with a display generation component and one or more input devices is described. The method comprises: displaying, via the display generation component, a user interface that includes a representation of media, wherein the representation of the media is displayed using a first media-processing style that is applied to visual content of the media; while displaying the representation of the media using the first media-processing style, concurrently displaying, via the display generation component, a plurality of selectable user interface objects for the first media-processing style, including: a first selectable user interface object for editing a first parameter of the first media-processing style that is displayed with a representation of a current value for the first parameter of the first media-processing style; and a second electable user interface object for editing a second parameter of the first media-processing style that is displayed with a representation of a current value for the second parameter of the first media-processing style, wherein the first parameter is different from the second parameter; while displaying the plurality of selectable user interface objects for the first media-processing style, detecting, via the one or more input devices, an input directed to the plurality of selectable user interface objects for the first media-processing style; and in response to detecting the input directed to the plurality of selectable user interface objects for the first media-processing style: in accordance with a determination that the input is directed to the first selectable user interface object for editing the first parameter of the first media-processing style, displaying, via the display generation component, a first control for adjusting the current value for the first parameter; and in accordance with a determination that the input is directed to the second user interface object for editing the second parameter of the first media-processing style, displaying, via the display generation component, a second control for adjusting the current value for the second parameter.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: displaying, via the display generation component, a user interface that includes a representation of media, wherein the representation of the media is displayed using a first media-processing style that is applied to visual content of the media; while displaying the representation of the media using the first media-processing style, concurrently displaying, via the display generation component, a plurality of selectable user interface objects for the first media-processing style, including: a first selectable user interface object for editing a first parameter of the first media-processing style that is displayed with a representation of a current value for the first parameter of the first media-processing style; and a second electable user interface object for editing a second parameter of the first media-processing style that is displayed with a representation of a current value for the second parameter of the first media-processing style, wherein the first parameter is different from the second parameter; while displaying the plurality of selectable user interface objects for the first media-processing style, detecting, via the one or more input devices, an input directed to the plurality of selectable user interface objects for the first media-processing style; and in response to detecting the input directed to the plurality of selectable user interface objects for the first media-processing style: in accordance with a determination that the input is directed to the first selectable user interface object for editing the first parameter of the first media-processing style, displaying, via the display generation component, a first control for adjusting the current value for the first parameter; and in accordance with a determination that the input is directed to the second user interface object for editing the second parameter of the first media-processing style, displaying, via the display generation component, a second control for adjusting the current value for the second parameter.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: displaying, via the display generation component, a user interface that includes a representation of media, wherein the representation of the media is displayed using a first media-processing style that is applied to visual content of the media; while displaying the representation of the media using the first media-processing style, concurrently displaying, via the display generation component, a plurality of selectable user interface objects for the first media-processing style, including: a first selectable user interface object for editing a first parameter of the first media-processing style that is displayed with a representation of a current value for the first parameter of the first media-processing style; and a second electable user interface object for editing a second parameter of the first media-processing style that is displayed with a representation of a current value for the second parameter of the first media-processing style, wherein the first parameter is different from the second parameter; while displaying the plurality of selectable user interface objects for the first media-processing style, detecting, via the one or more input devices, an input directed to the plurality of selectable user interface objects for the first media-processing style; and in response to detecting the input directed to the plurality of selectable user interface objects for the first media-processing style: in accordance with a determination that the input is directed to the first selectable user interface object for editing the first parameter of the first media-processing style, displaying, via the display generation component, a first control for adjusting the current value for the first parameter; and in accordance with a determination that the input is directed to the second user interface object for editing the second parameter of the first media-processing style, displaying, via the display generation component, a second control for adjusting the current value for the second parameter.

In accordance with some embodiments, a computer system that is configured to communicate with a display generation component and one or more input devices is described. The computer system comprises: one or more processors; and memory storing one or more programs configured to be executed by the one or more processors, the one or more programs including instructions for: displaying, via the display generation component, a user interface that includes a representation of media, wherein the representation of the media is displayed using a first media-processing style that is applied to visual content of the media; while displaying the representation of the media using the first media-processing style, concurrently displaying, via the display generation component, a plurality of selectable user interface objects for the first media-processing style, including: a first selectable user interface object for editing a first parameter of the first media-processing style that is displayed with a representation of a current value for the first parameter of the first media-processing style; and a second electable user interface object for editing a second parameter of the first media-processing style that is displayed with a representation of a current value for the second parameter of the first media-processing style, wherein the first parameter is different from the second parameter; while displaying the plurality of selectable user interface objects for the first media-processing style, detecting, via the one or more input devices, an input directed to the plurality of selectable user interface objects for the first media-processing style; and in response to detecting the input directed to the plurality of selectable user interface objects for the first media-processing style: in accordance with a determination that the input is directed to the first selectable user interface object for editing the first parameter of the first media-processing style, displaying, via the display generation component, a first control for adjusting the current value for the first parameter; and in accordance with a determination that the input is directed to the second user interface object for editing the second parameter of the first media-processing style, displaying, via the display generation component, a second control for adjusting the current value for the second parameter.

In accordance with some embodiments, a computer system that is configured to communicate with a display generation component and one or more input devices is described. The computer system comprises: means for displaying, via the display generation component, a user interface that includes a representation of media, wherein the representation of the media is displayed using a first media-processing style that is applied to visual content of the media; means, while displaying the representation of the media using the first media-processing style, for concurrently displaying, via the display generation component, a plurality of selectable user interface objects for the first media-processing style, including: a first selectable user interface object for editing a first parameter of the first media-processing style that is displayed with a representation of a current value for the first parameter of the first media-processing style; and a second electable user interface object for editing a second parameter of the first media-processing style that is displayed with a representation of a current value for the second parameter of the first media-processing style, wherein the first parameter is different from the second parameter; means, while displaying the plurality of selectable user interface objects for the first media-processing style, for detecting, via the one or more input devices, an input directed to the plurality of selectable user interface objects for the first media-processing style; and means, responsive to detecting the input directed to the plurality of selectable user interface objects for the first media-processing style, for: in accordance with a determination that the input is directed to the first selectable user interface object for editing the first parameter of the first media-processing style, displaying, via the display generation component, a first control for adjusting the current value for the first parameter; and in accordance with a determination that the input is directed to the second user interface object for editing the second parameter of the first media-processing style, displaying, via the display generation component, a second control for adjusting the current value for the second parameter.

In accordance with some embodiments, a computer program product is described. The computer program product comprises one or more programs configured to be executed by one or more processors of a computer system that is that is in communication with a display generation component and one or more input devices. The one or more programs include instructions for: displaying, via the display generation component, a user interface that includes a representation of media, wherein the representation of the media is displayed using a first media-processing style that is applied to visual content of the media; while displaying the representation of the media using the first media-processing style, concurrently displaying, via the display generation component, a plurality of selectable user interface objects for the first media-processing style, including: a first selectable user interface object for editing a first parameter of the first media-processing style that is displayed with a representation of a current value for the first parameter of the first media-processing style; and a second electable user interface object for editing a second parameter of the first media-processing style that is displayed with a representation of a current value for the second parameter of the first media-processing style, wherein the first parameter is different from the second parameter; while displaying the plurality of selectable user interface objects for the first media-processing style, detecting, via the one or more input devices, an input directed to the plurality of selectable user interface objects for the first media-processing style; and in response to detecting the input directed to the plurality of selectable user interface objects for the first media-processing style: in accordance with a determination that the input is directed to the first selectable user interface object for editing the first parameter of the first media-processing style, displaying, via the display generation component, a first control for adjusting the current value for the first parameter; and in accordance with a determination that the input is directed to the second user interface object for editing the second parameter of the first media-processing style, displaying, via the display generation component, a second control for adjusting the current value for the second parameter. Executable instructions for performing these functions are, optionally, included in a non-transitory computer-readable storage medium or other computer program product configured for execution by one or more processors.

Executable instructions for performing these functions are, optionally, included in a transitory computer-readable storage medium or other computer program product configured for execution by one or more processors.

Thus, devices are provided with faster, more efficient methods and interfaces for managing media styles that are applied to the visual content of media, thereby increasing the effectiveness, efficiency, and user satisfaction with such devices. Such methods and interfaces may complement or replace other methods for managing media styles that are applied to the visual content of media.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 9 is a flow diagram illustrating methods for selecting media-processing styles using a computer system in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing media styles that are applied to the visual content of media, such as the methods described herein to select media-processing styles and edit media-processing styles. Such techniques can reduce the cognitive burden on a user who desires to edit media, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing media-processing styles.

Figure 6B:
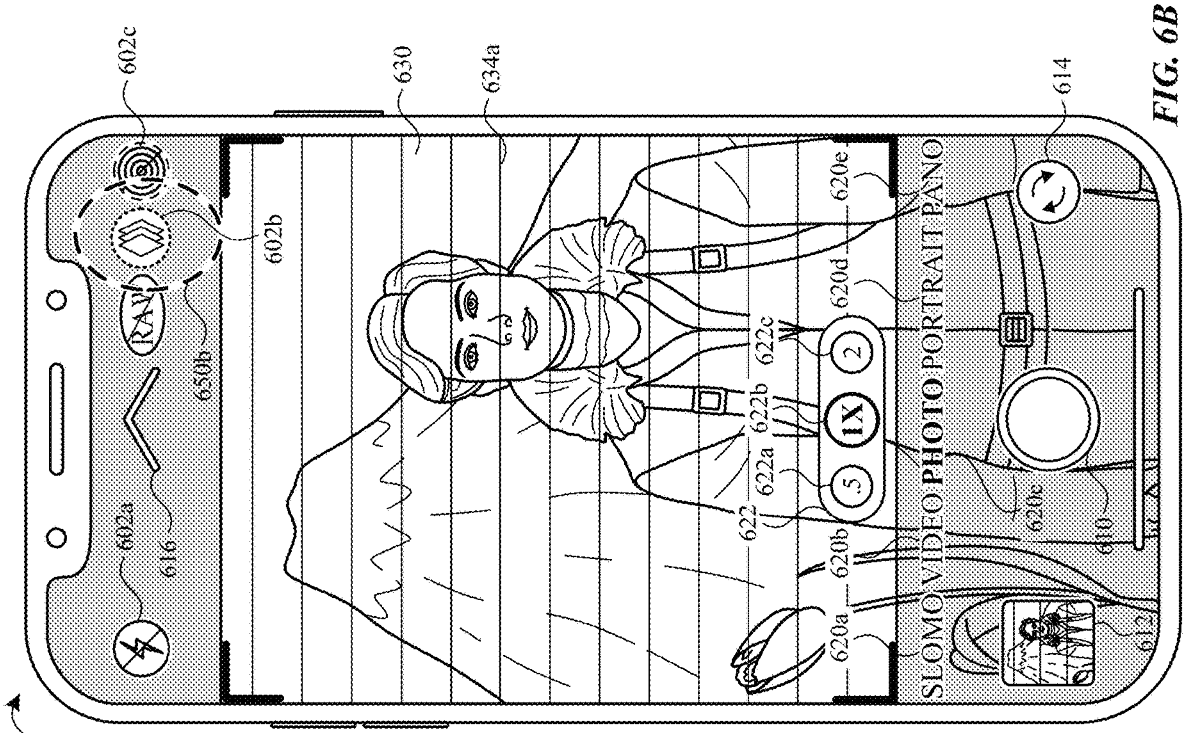
FIGS. 6A-6Y illustrate exemplary user interfaces for selecting media-processing styles using a computer system in accordance with some embodiments.
Figure 6A:
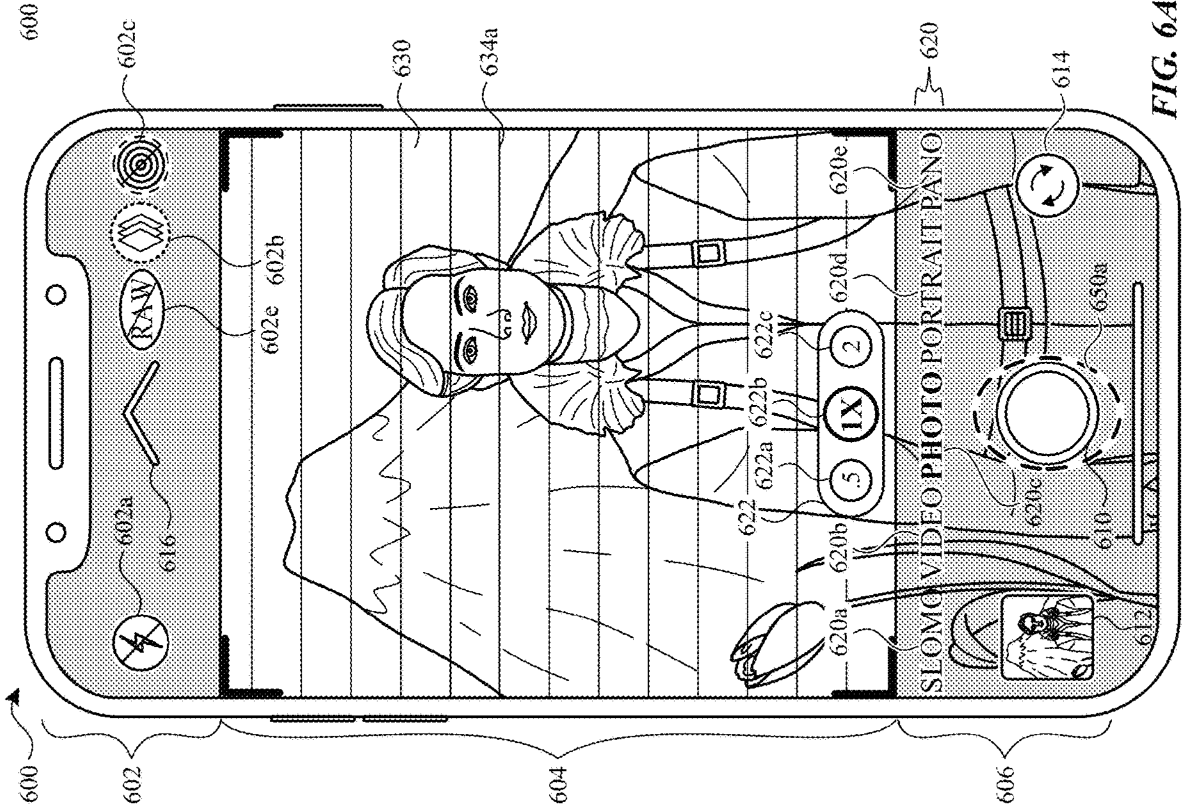
Figure 6D:
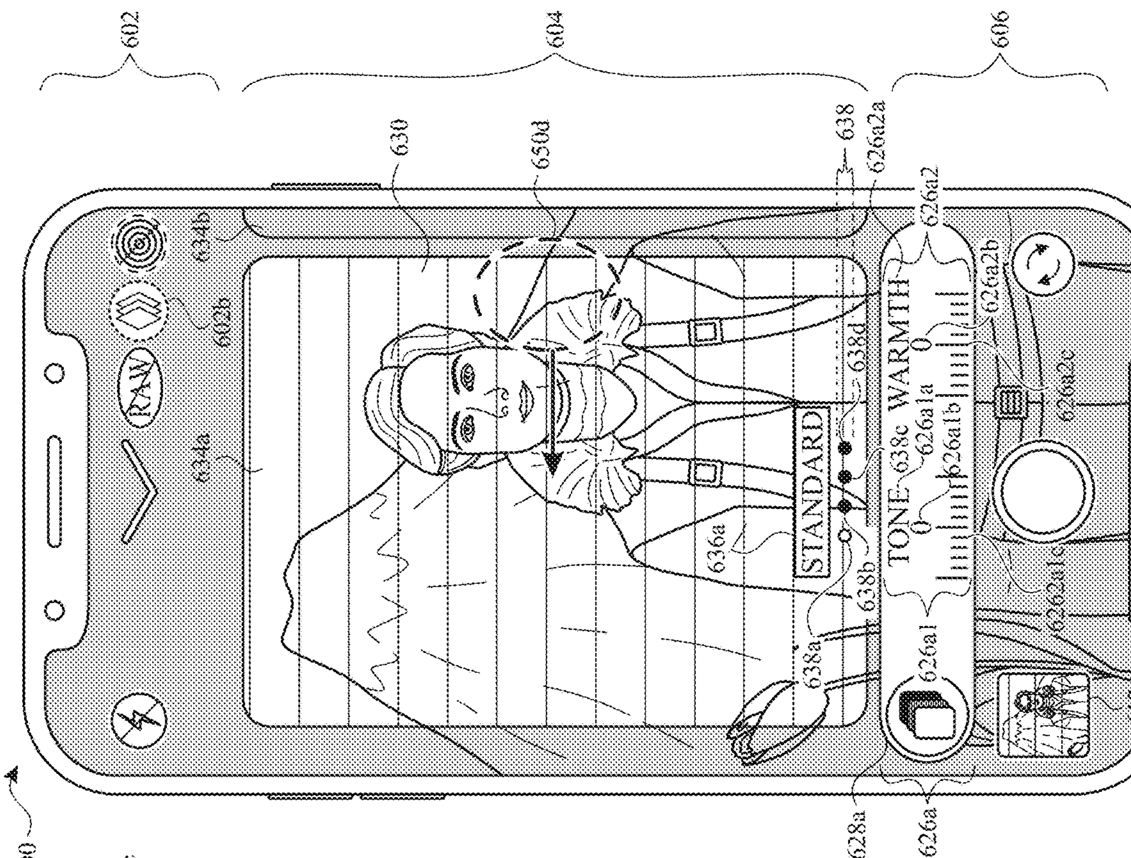
Figure 6C:
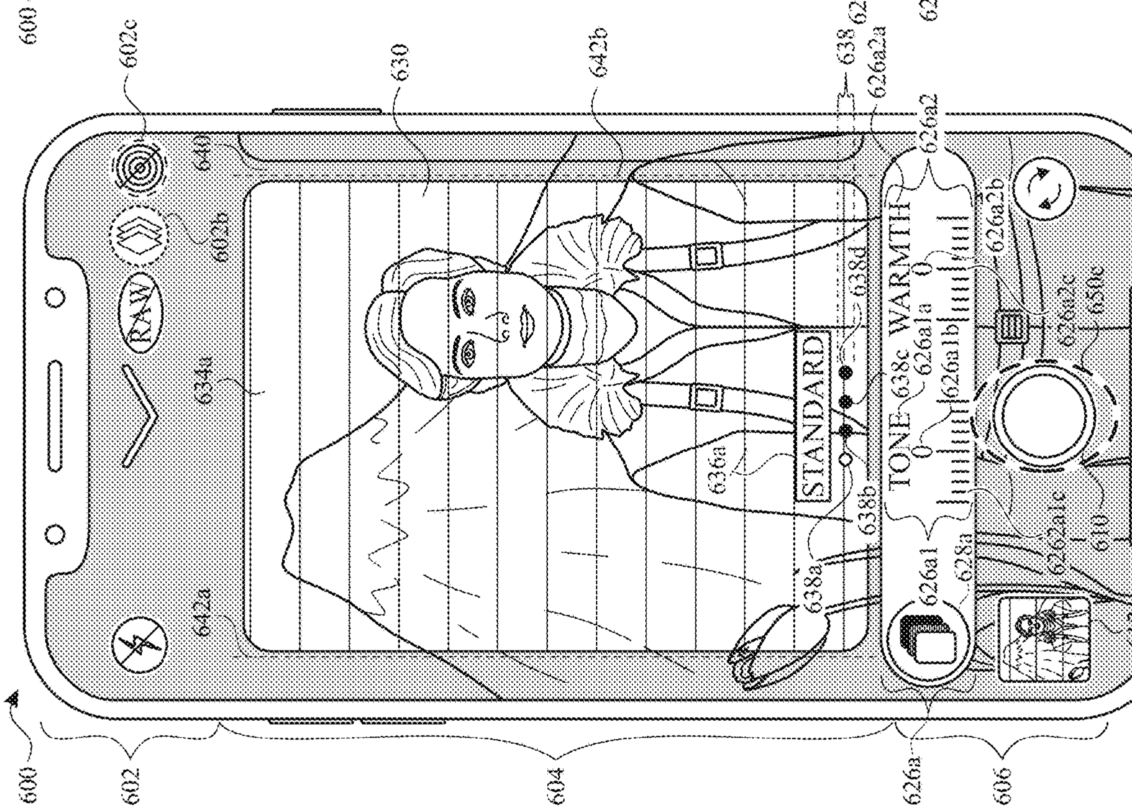
Figure 6F:
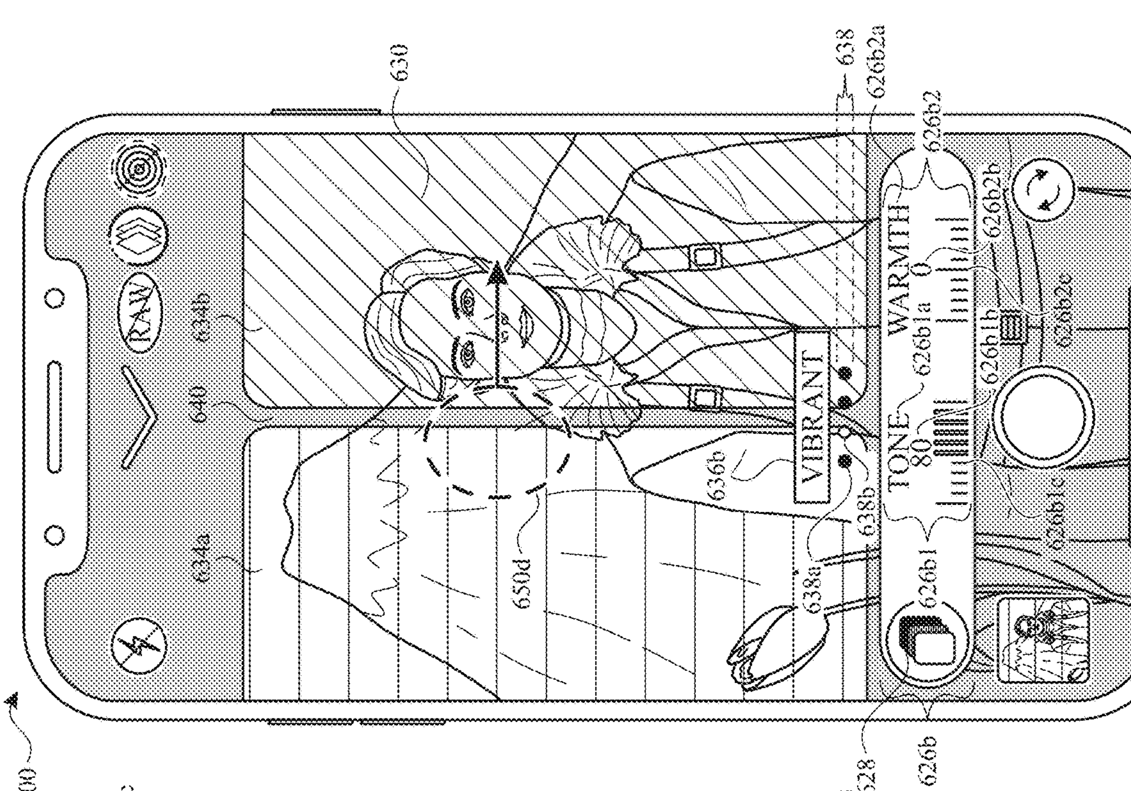
Figure 6E:
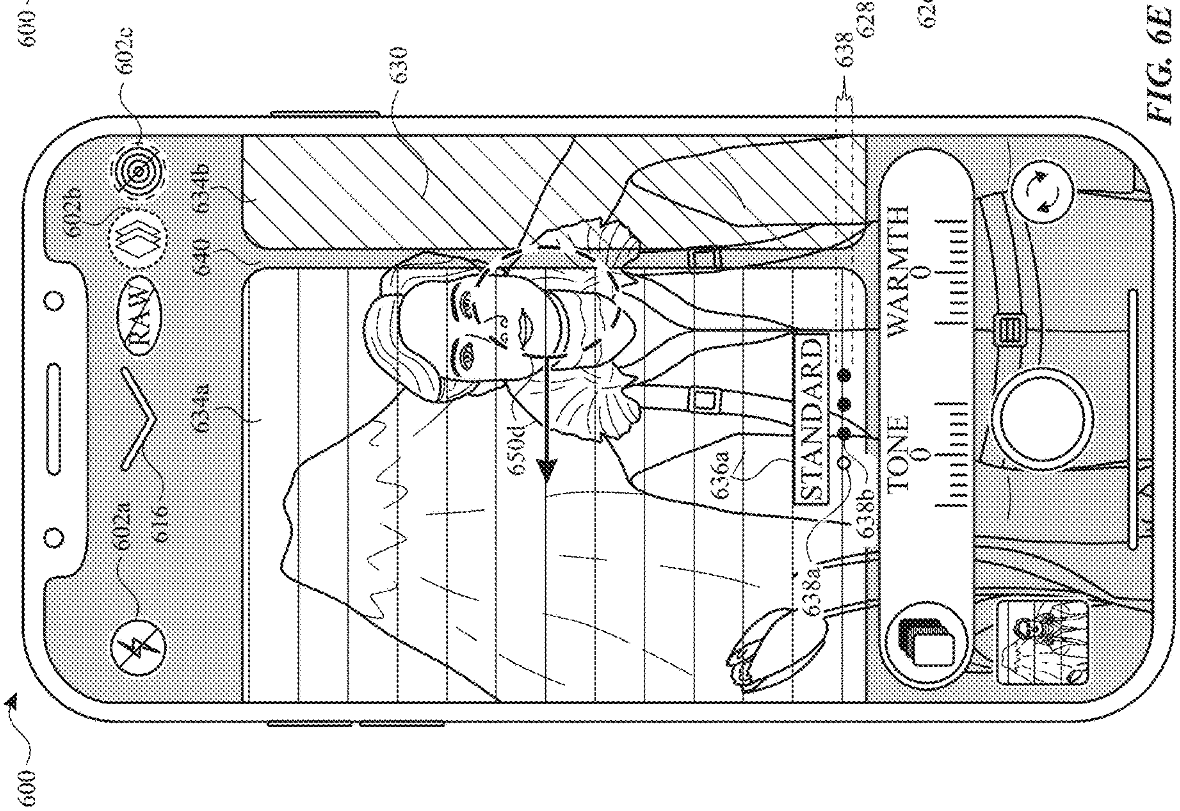
Figure 6H:
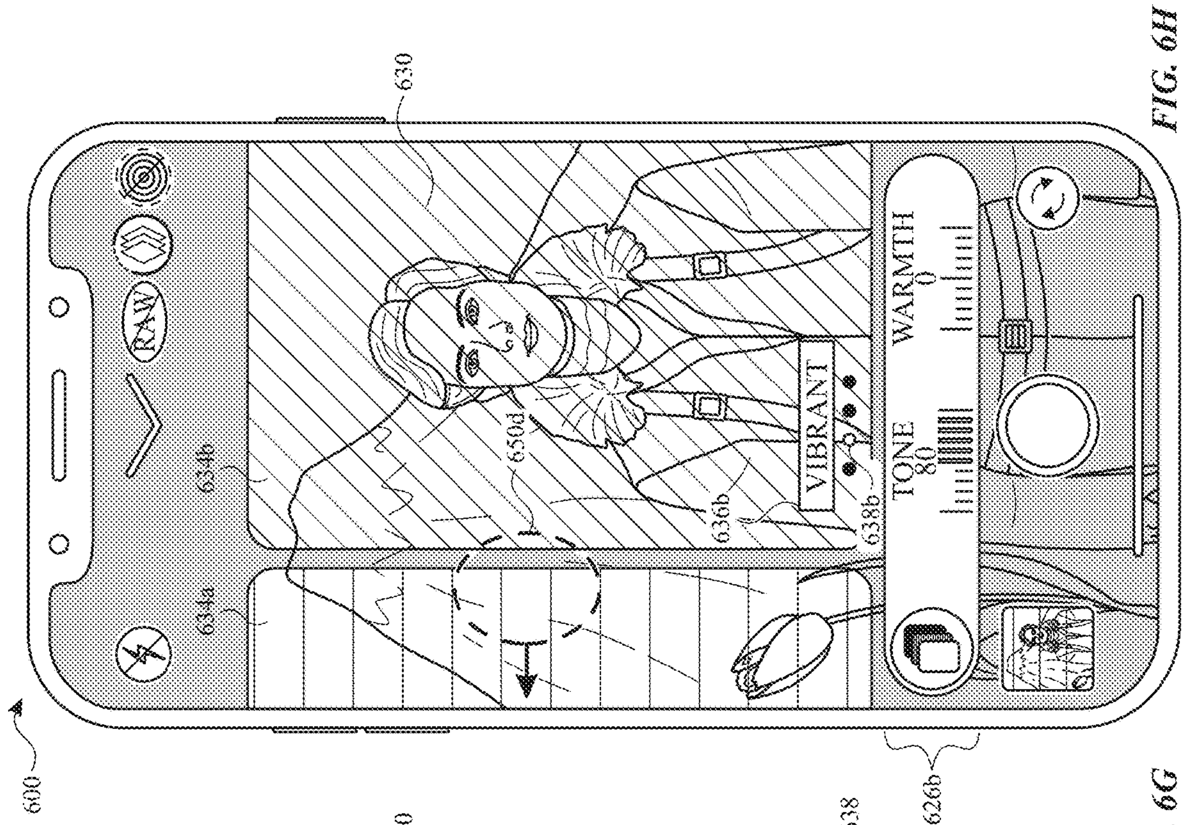
Figure 6G:
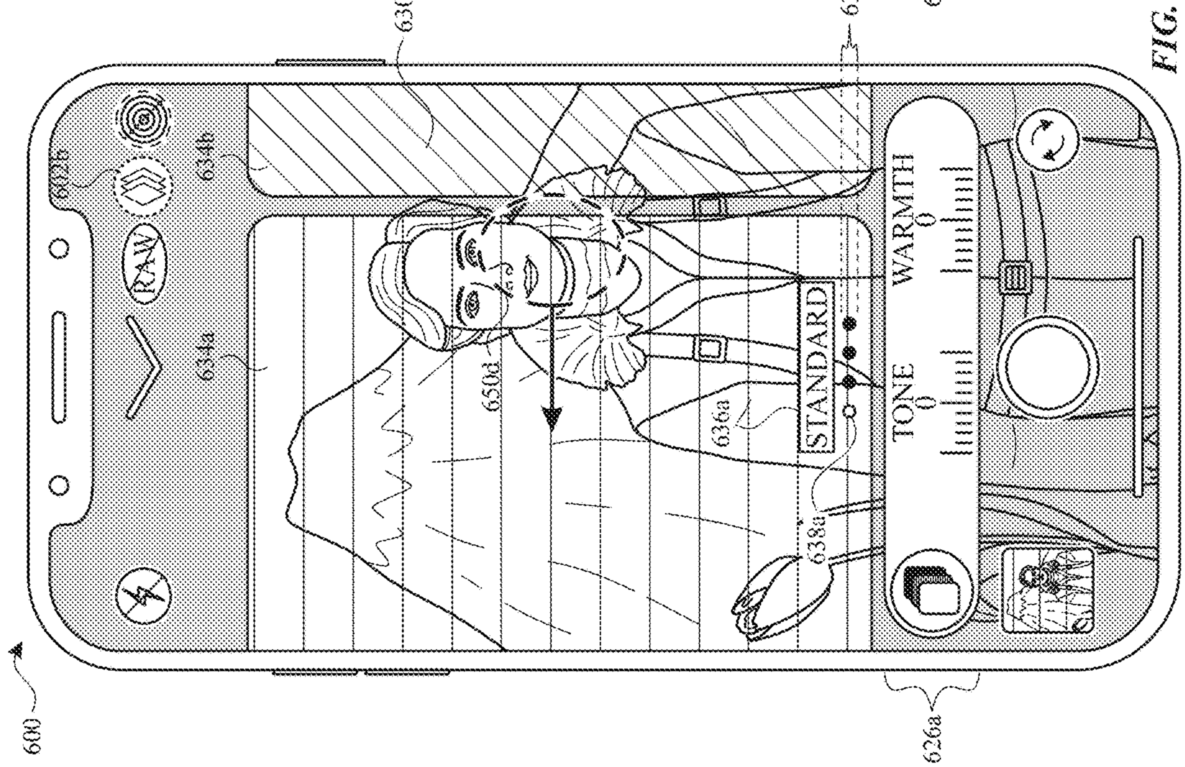
Figure 6J:
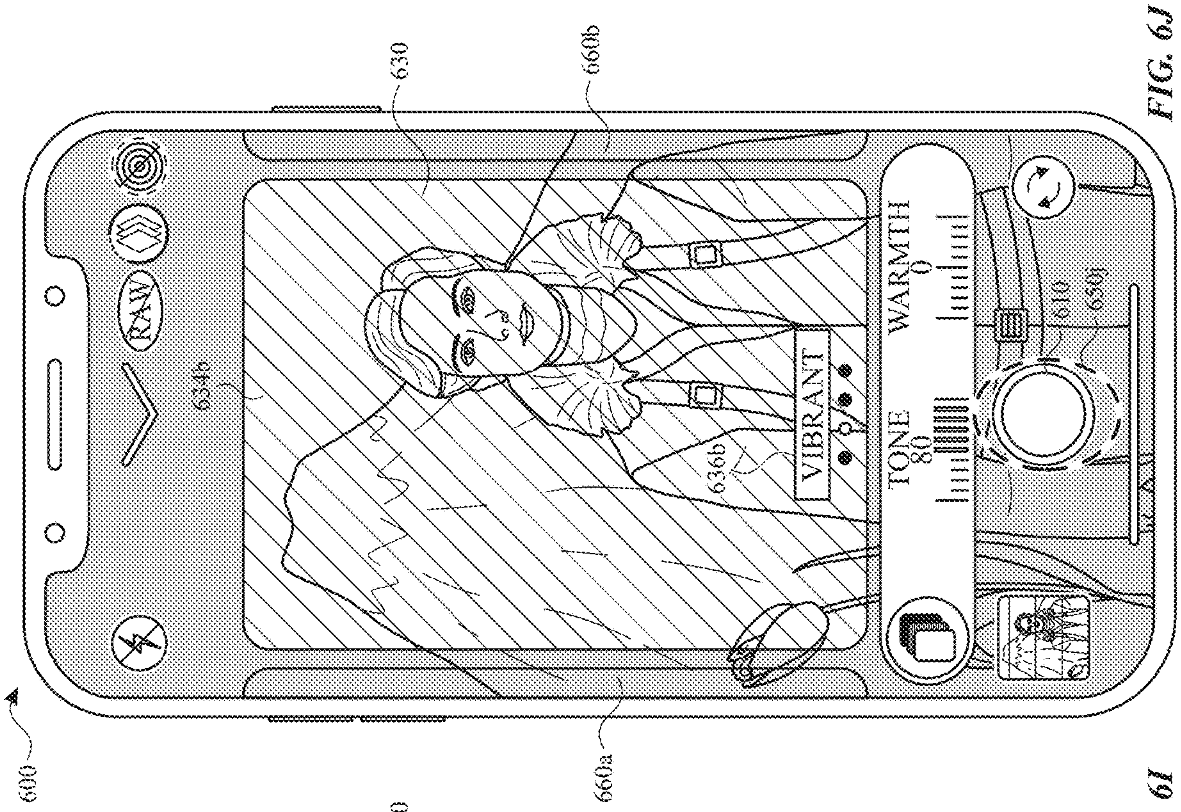
Figure 6I:
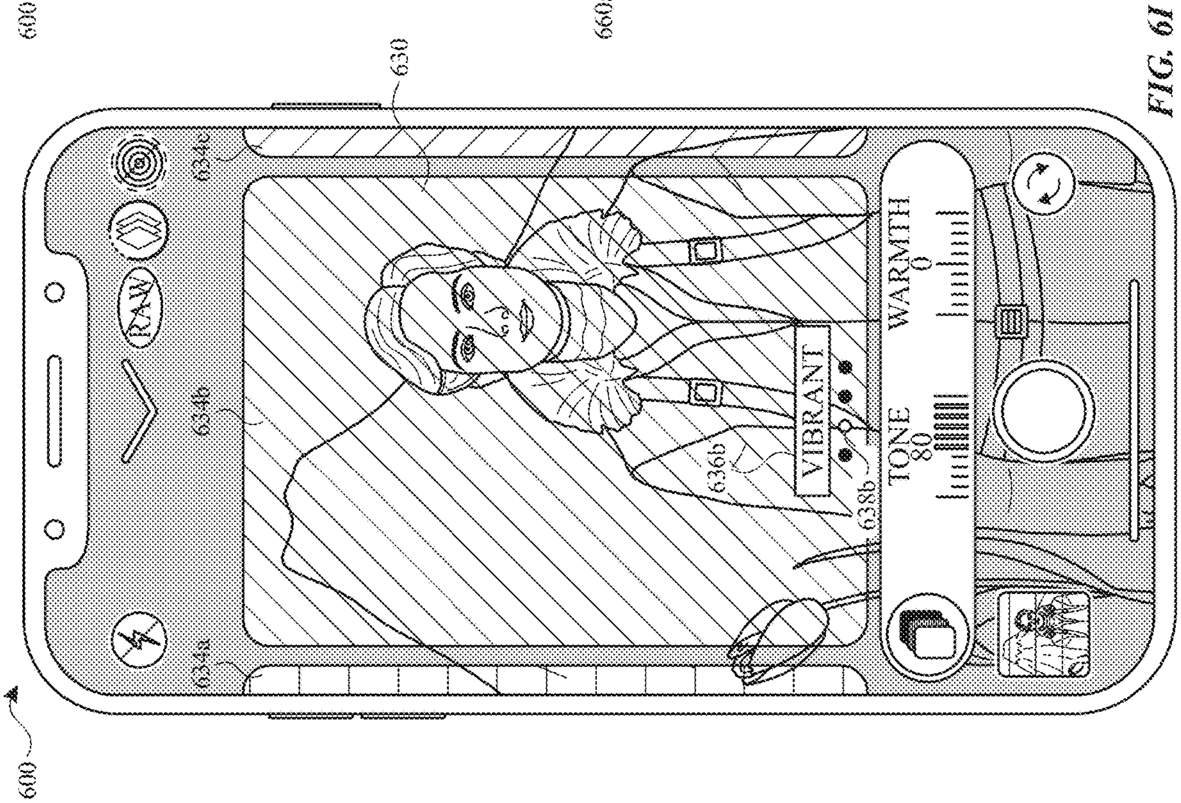
Figures 6K, 6L:
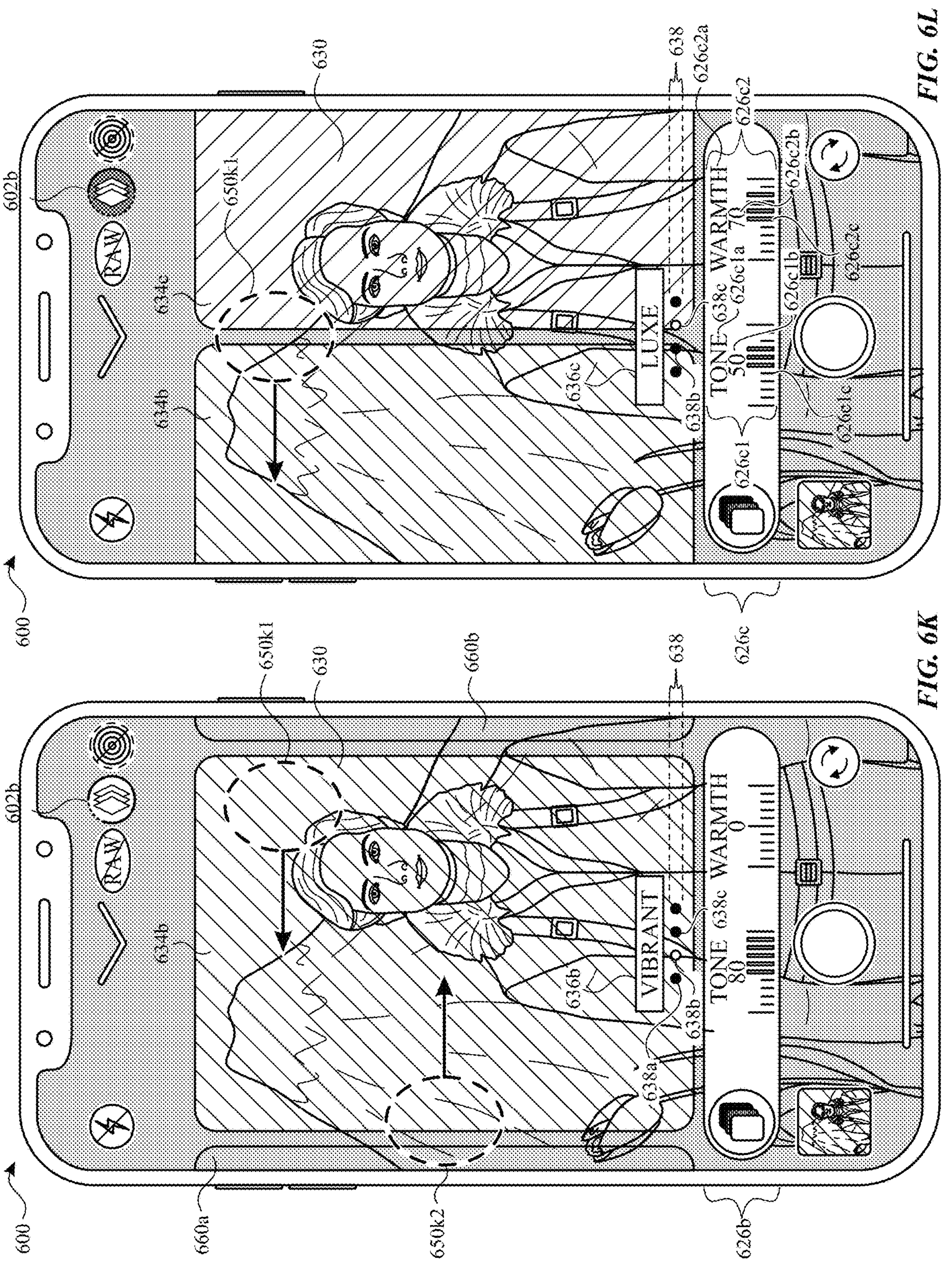
Figure 6N:
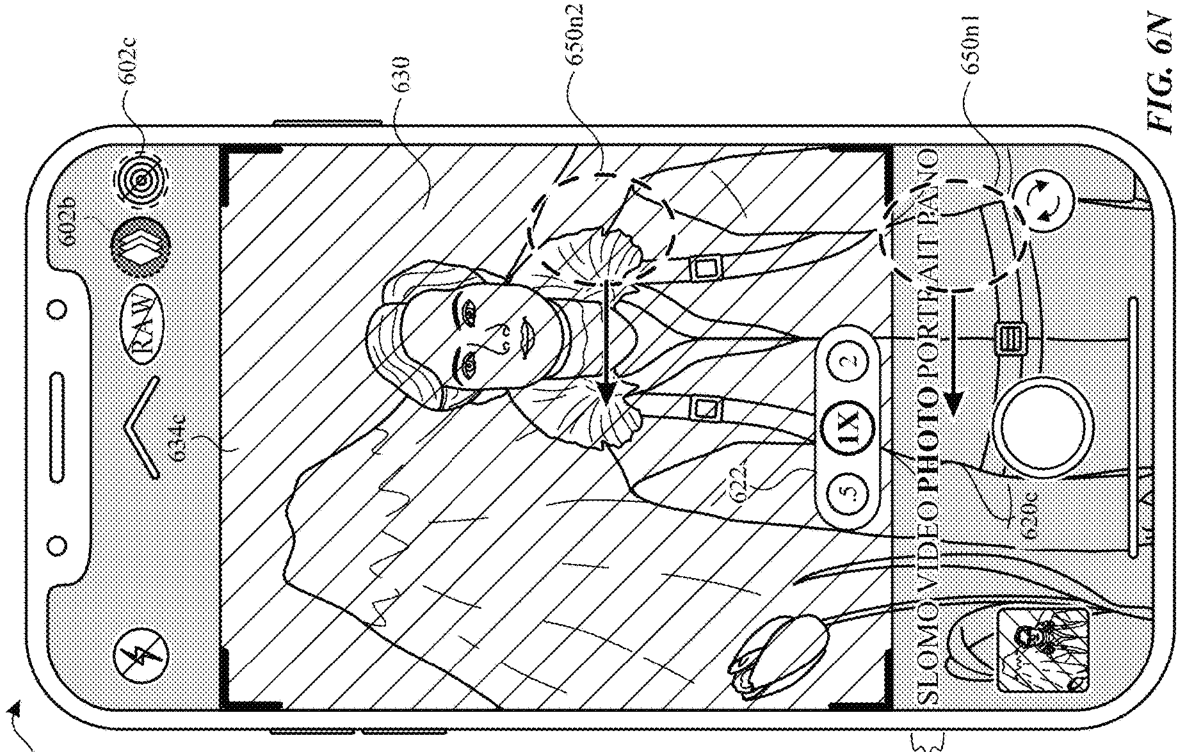
Figure 6M:
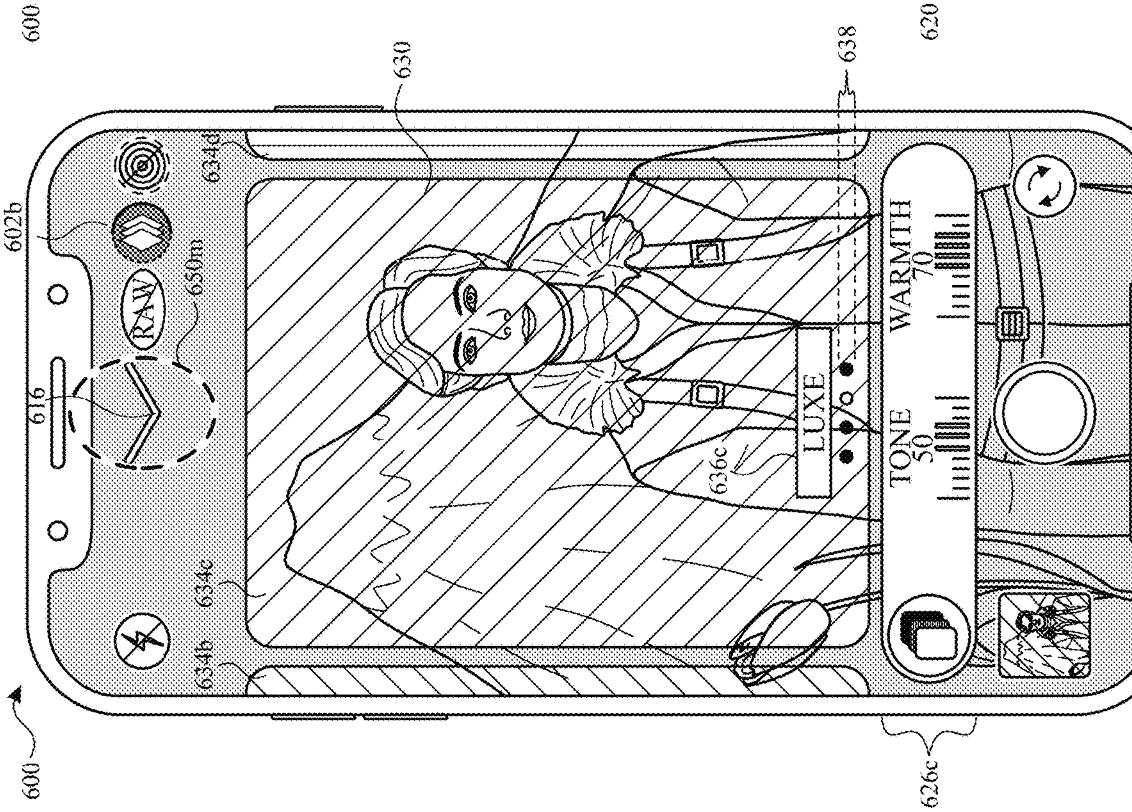
Figure 6P:
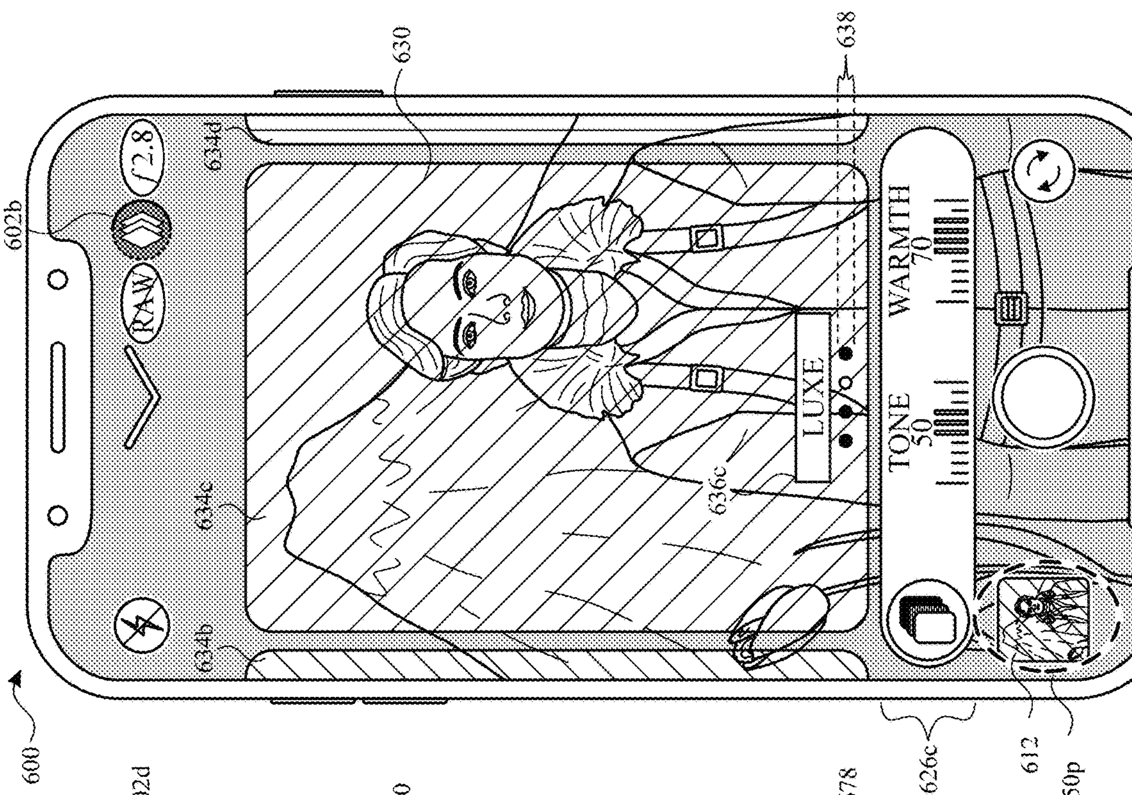
Figure 6O:
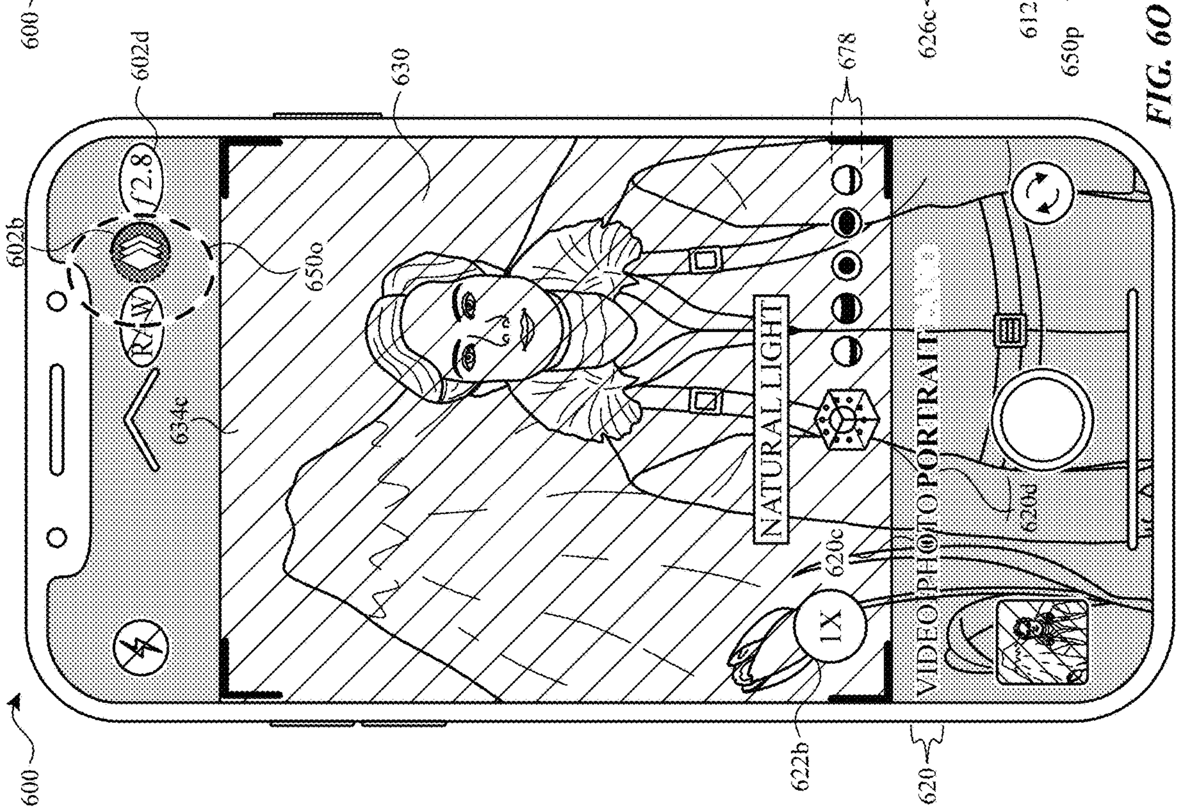
Figure 6R:
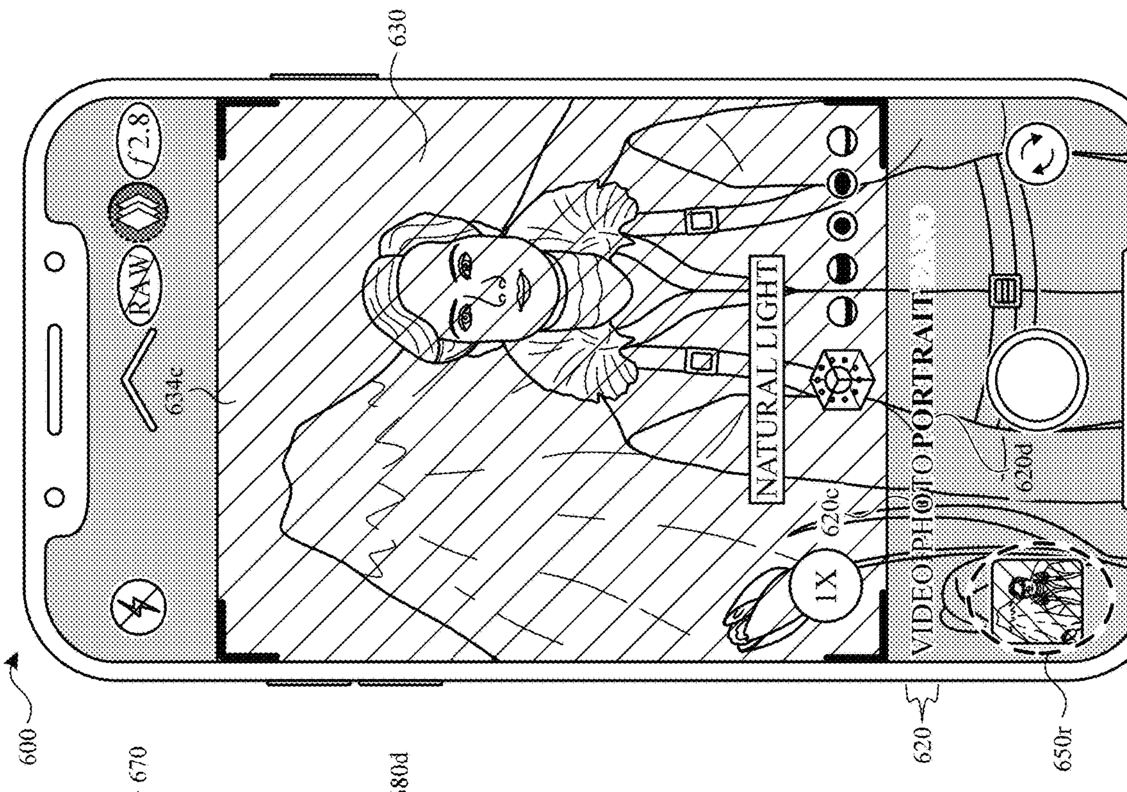
Figure 6Q:
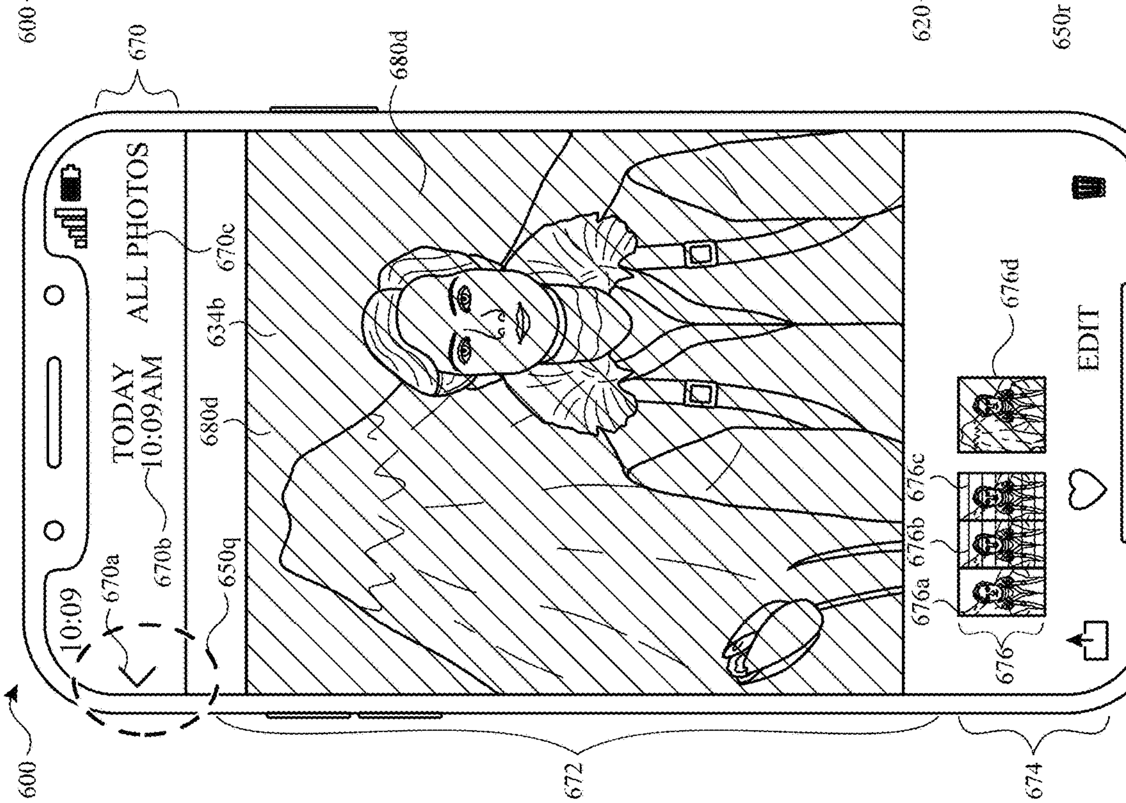
Figure 6S:
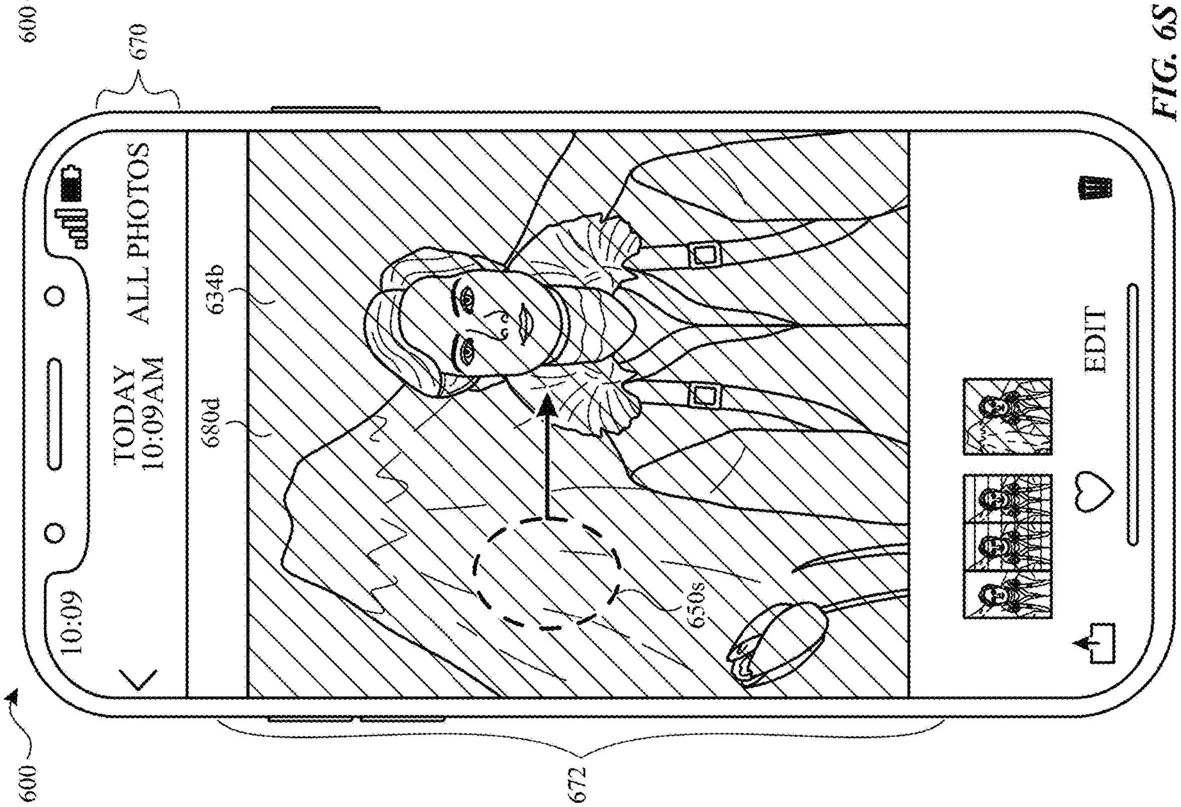
Figure 6T:
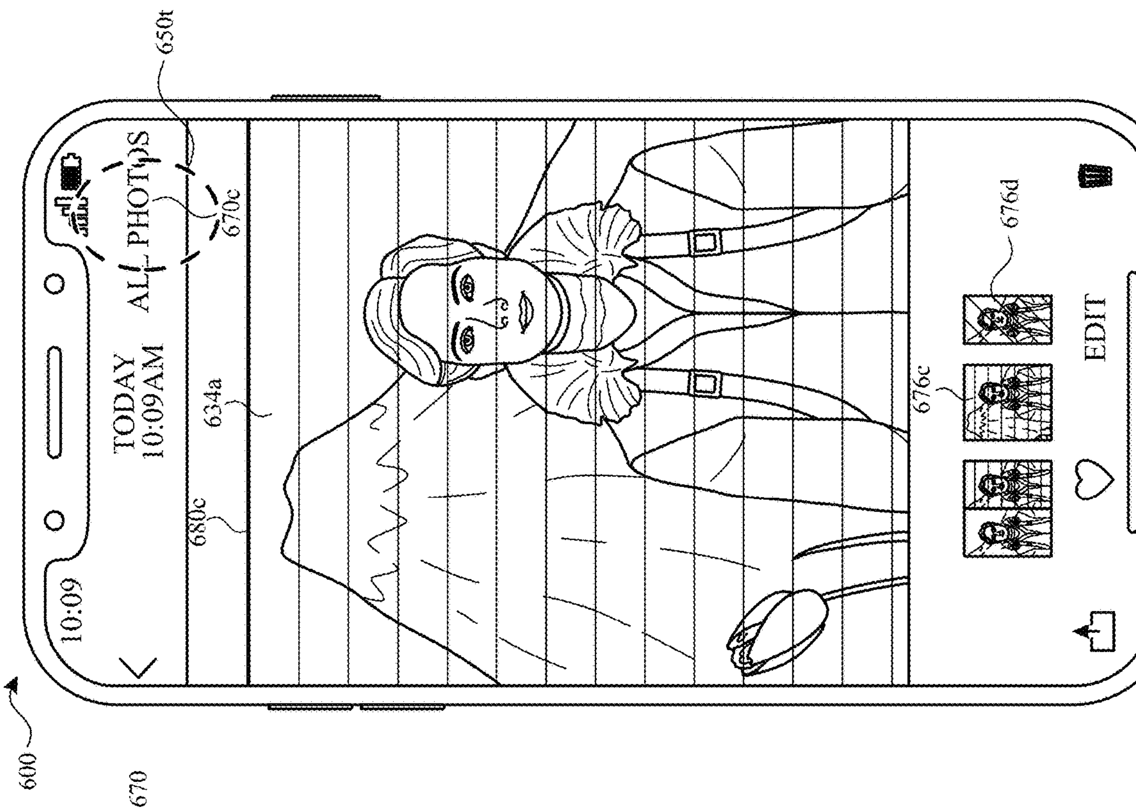
Figure 6V:
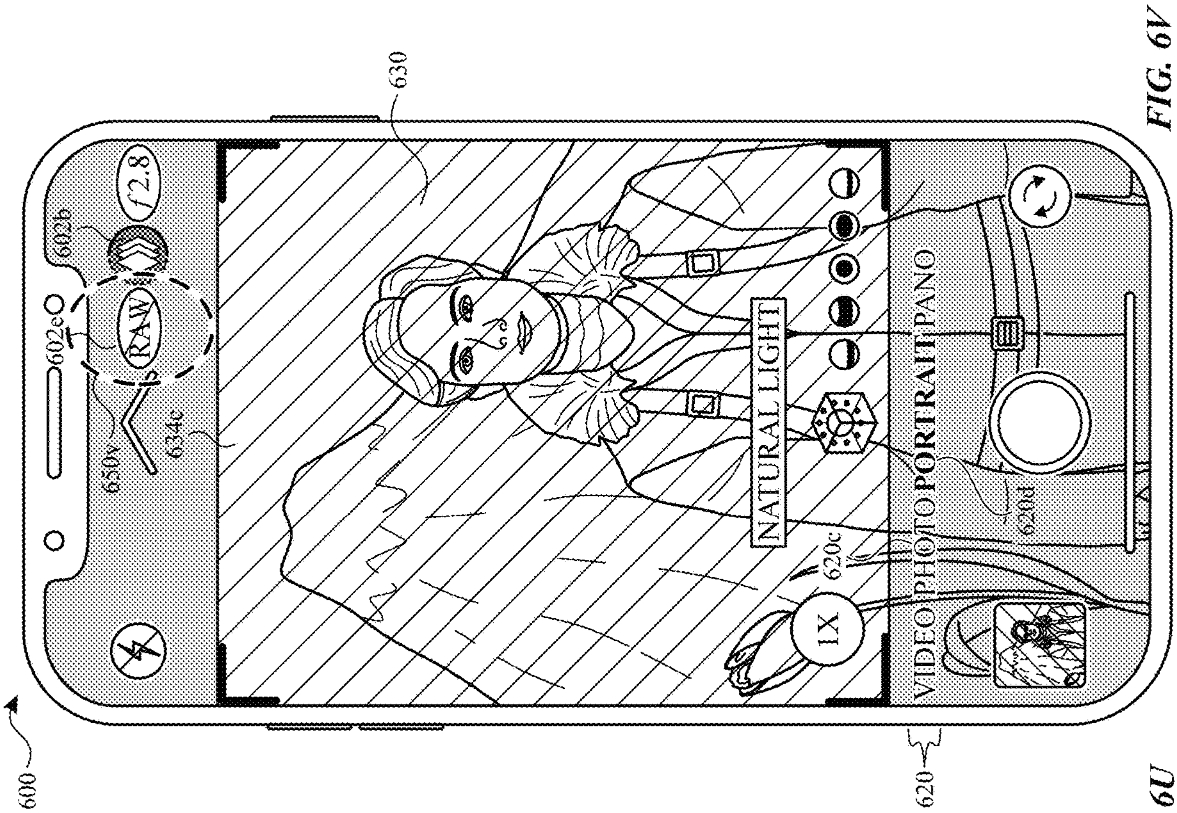
Figure 6U:
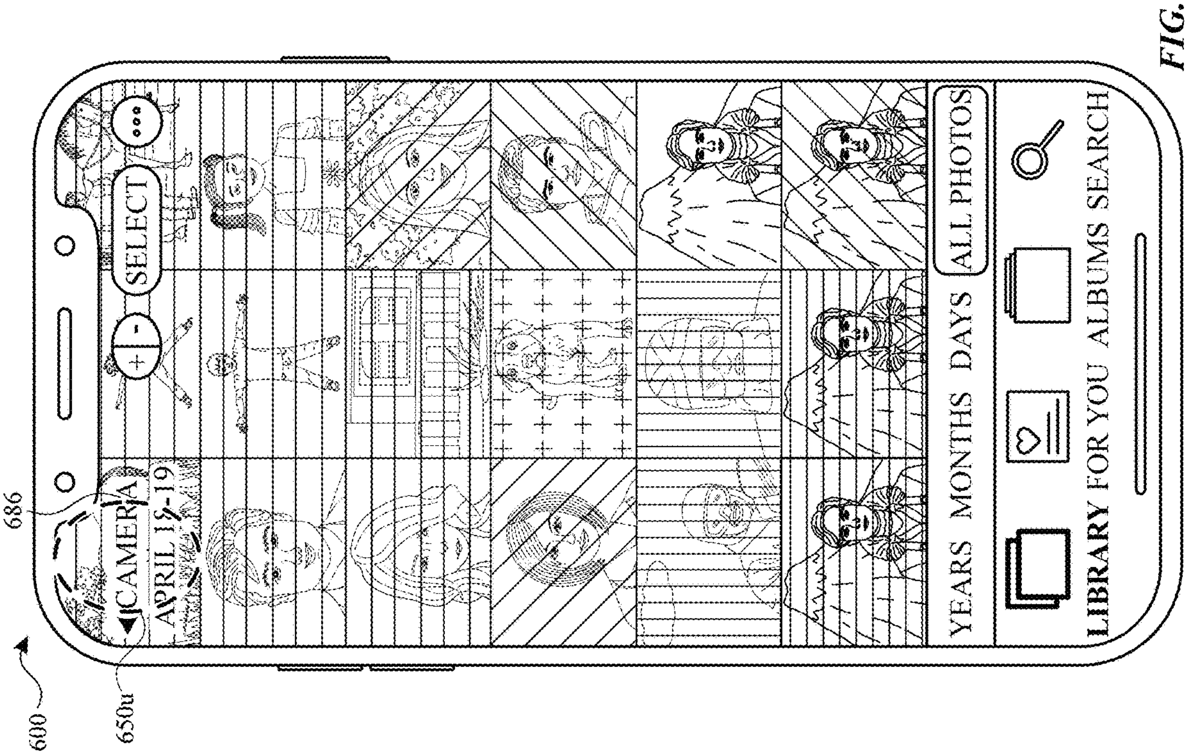
Figure 6X:
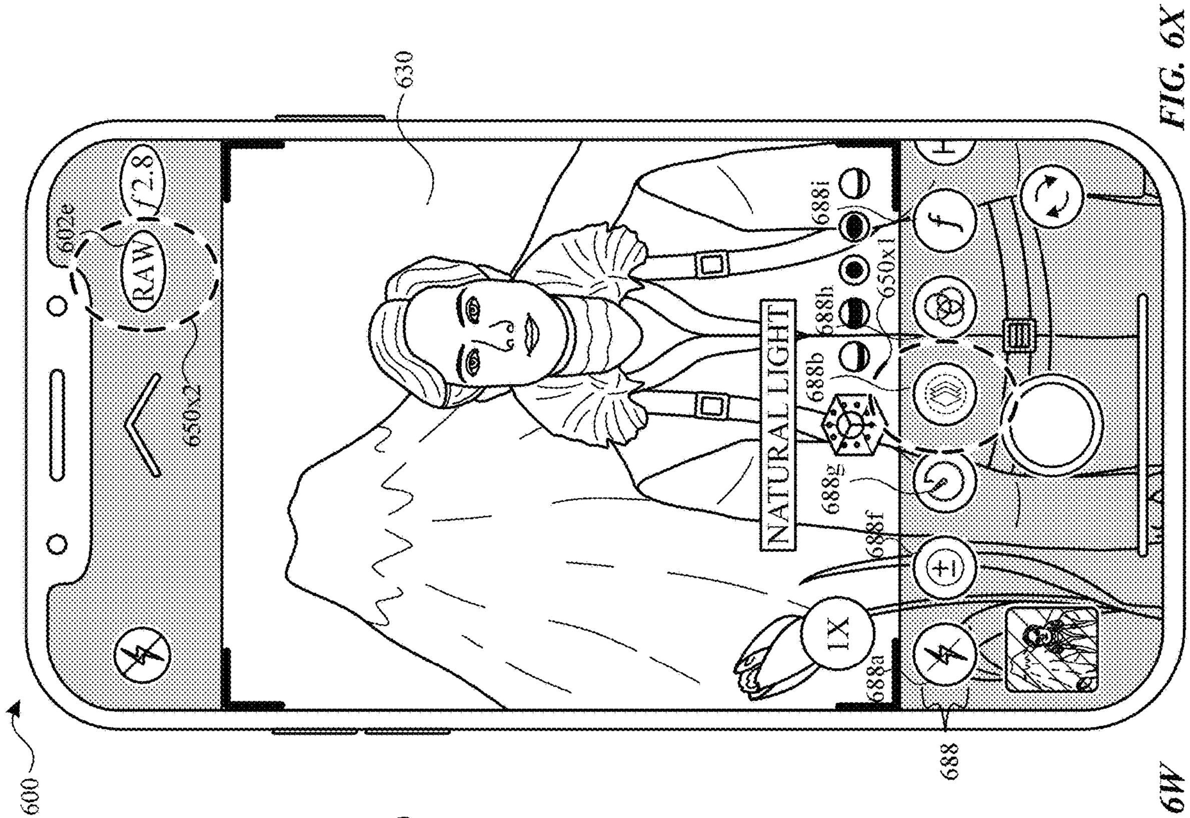
Figure 6W:
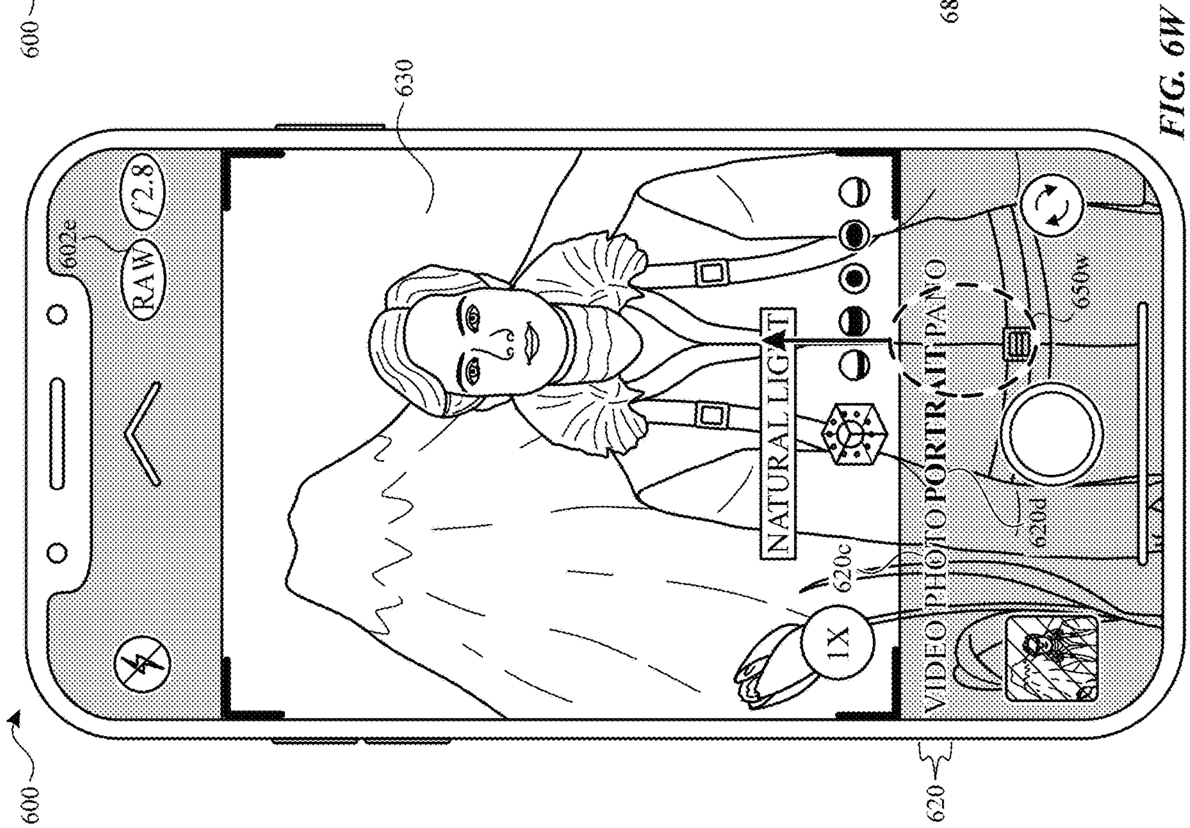
Figure 6Y:
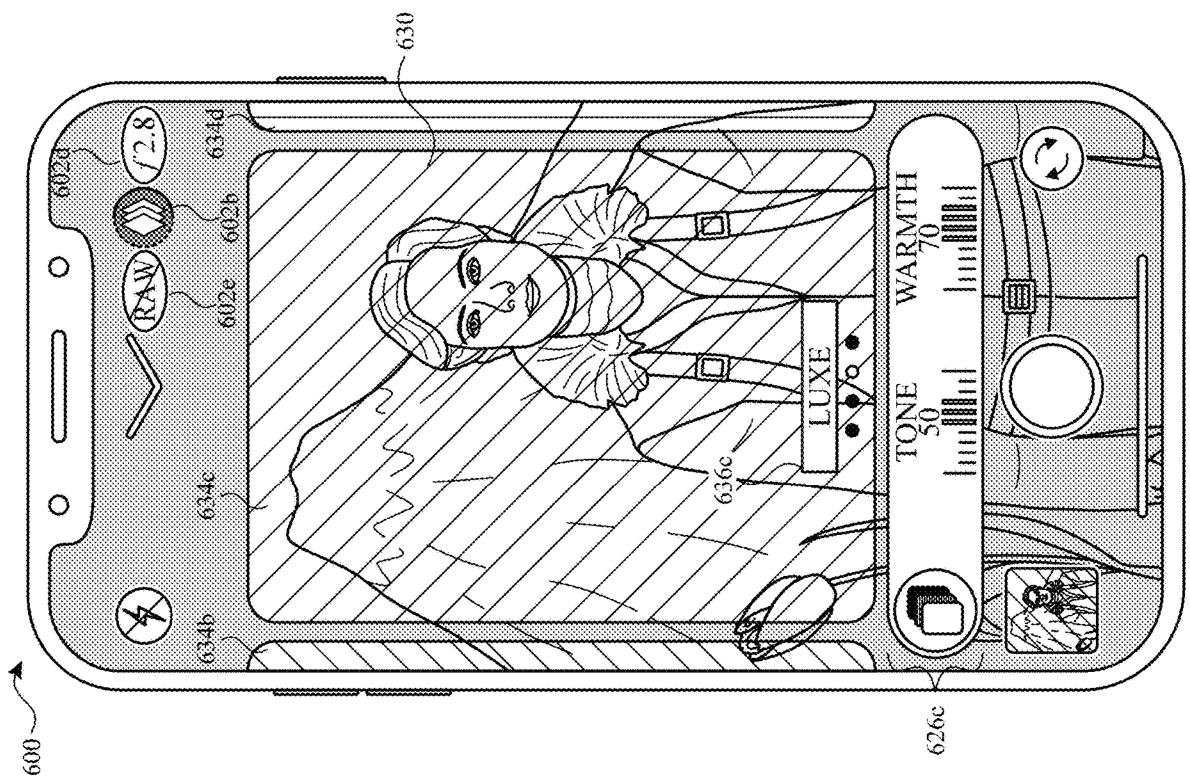
Figure 10A:
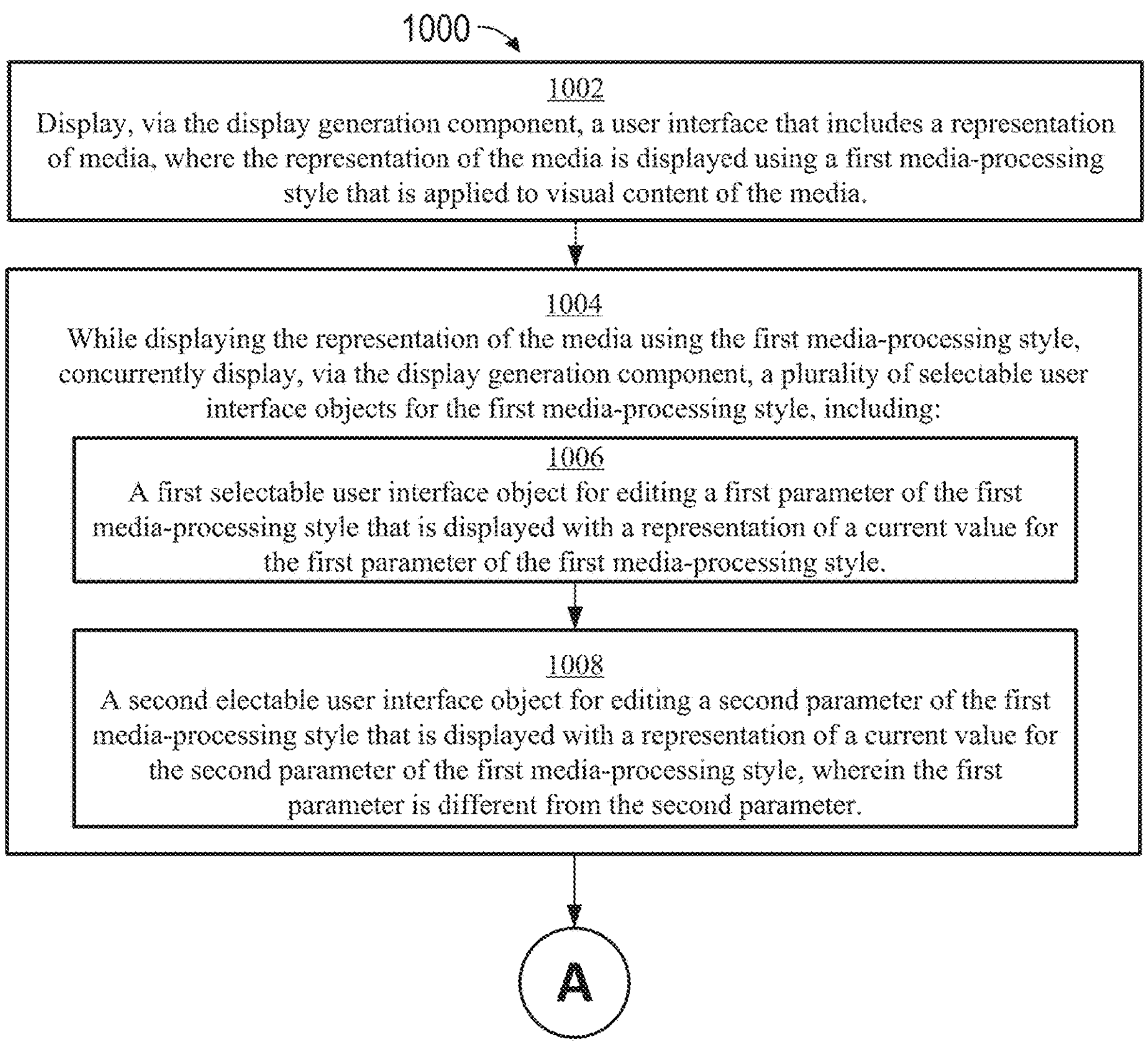
FIGS. 10A-10B are a flow diagram illustrating methods for editing media-processing styles using a computer system in accordance with some embodiments.
Figure 10B:
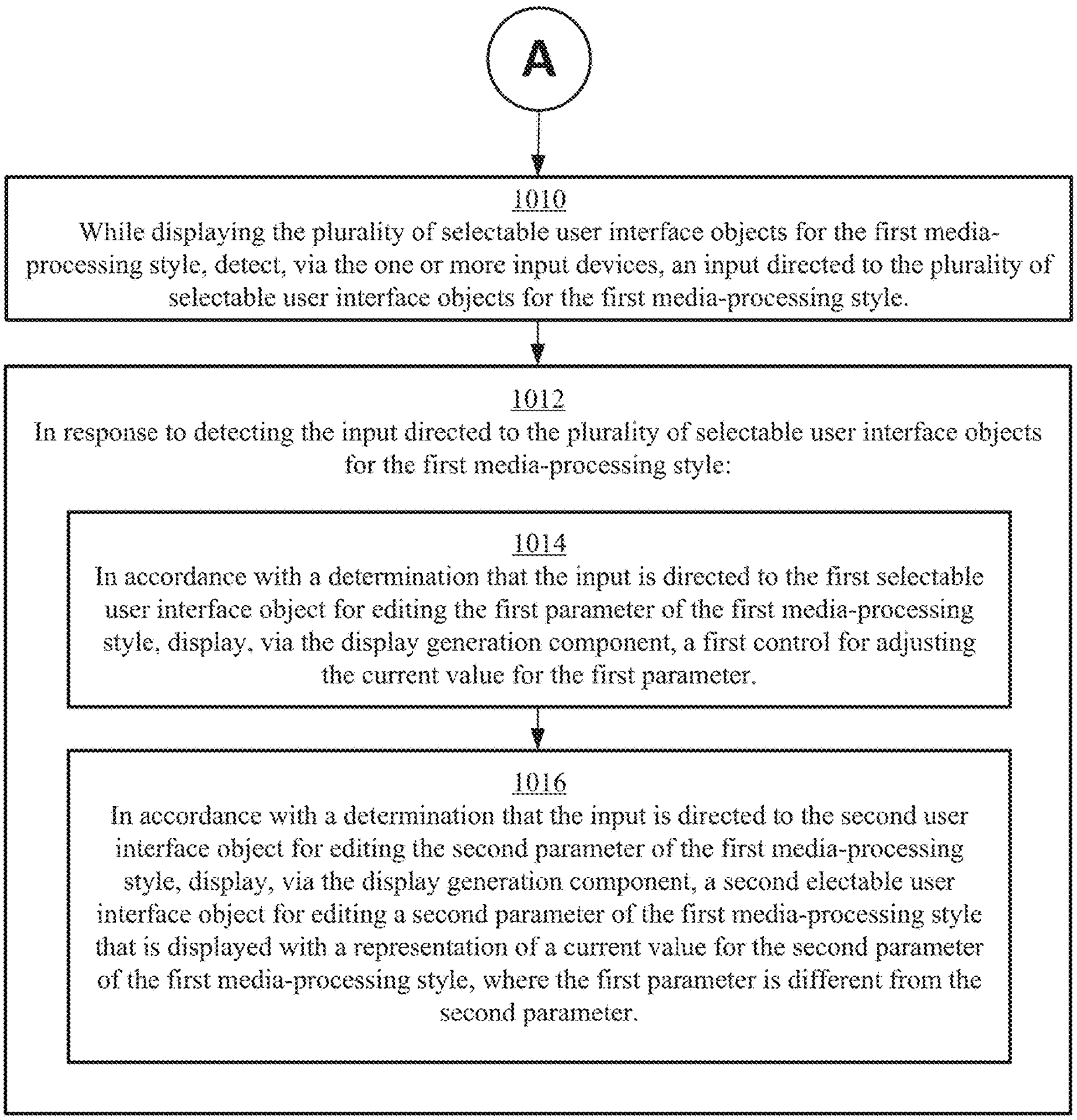

FIGS. 6A-6Y illustrate exemplary user interfaces for selecting media-processing styles using a computer system in accordance with some embodiments. FIGS. 7A-7X illustrate exemplary user interfaces for editing media-processing styles using a computer system in accordance with some embodiments. FIGS. 8A-8C illustrate exemplary user interfaces for selecting media-processing styles using a computer system in accordance with some embodiments. FIG. 9 is a flow diagram illustrating methods for selecting media-processing styles using a computer system in accordance with some embodiments. FIGS. 10A-10B are a flow diagram illustrating methods for editing media-processing styles using a computer system in accordance with some embodiments. The user interfaces in FIGS. 6A-6Y, 7A-7X, and 8A-8C are used to illustrate the processes described below, including the processes in FIGS. 9 and 10A-10B.

The processes described below enhance the operability of the devices and make the user-device interfaces more efficient (e.g., by helping the user to provide proper inputs and reducing user mistakes when operating/interacting with the devices) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional technical techniques. These techniques also reduce power usage and improve battery life of the devices by enabling the user to use the devices more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
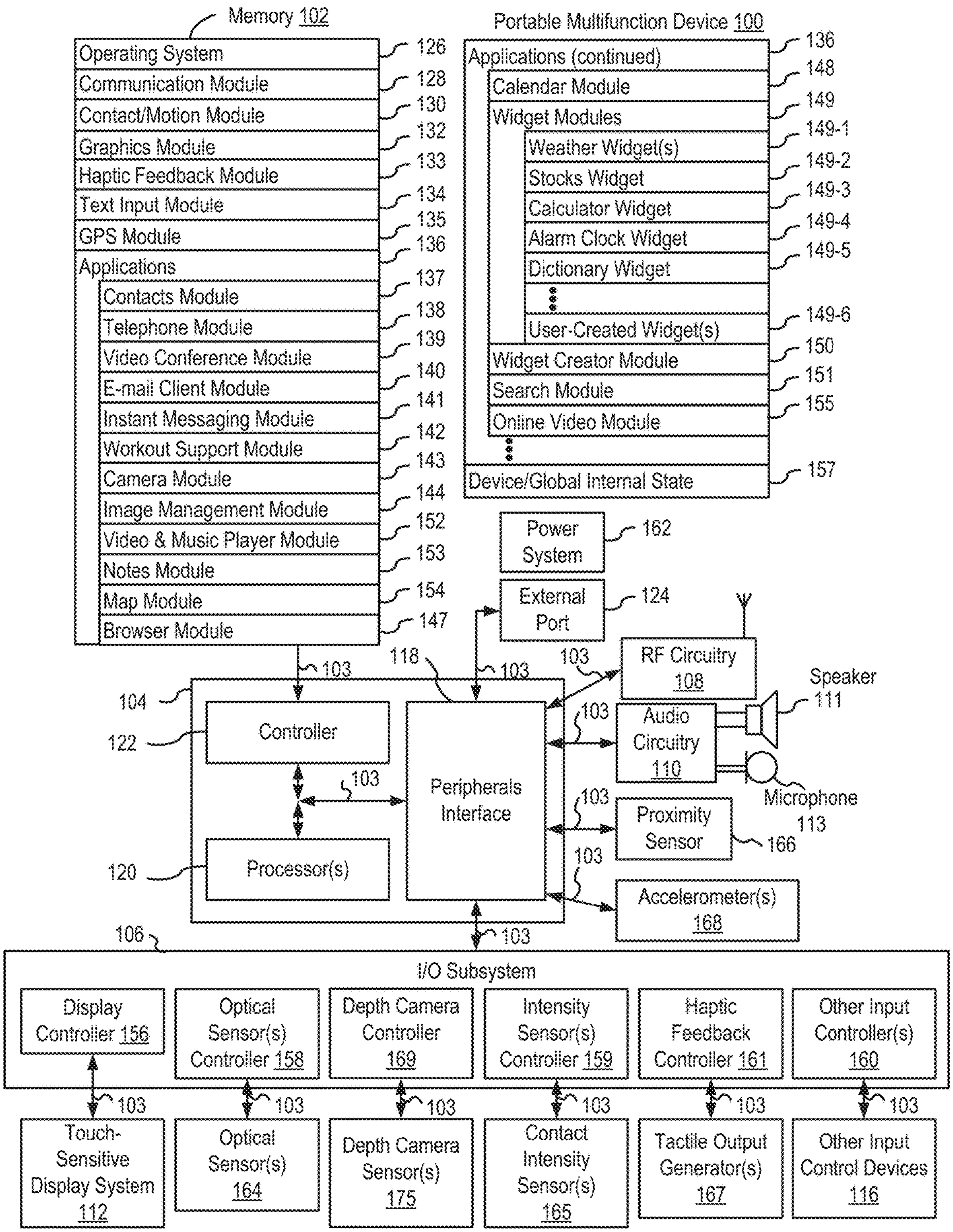
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
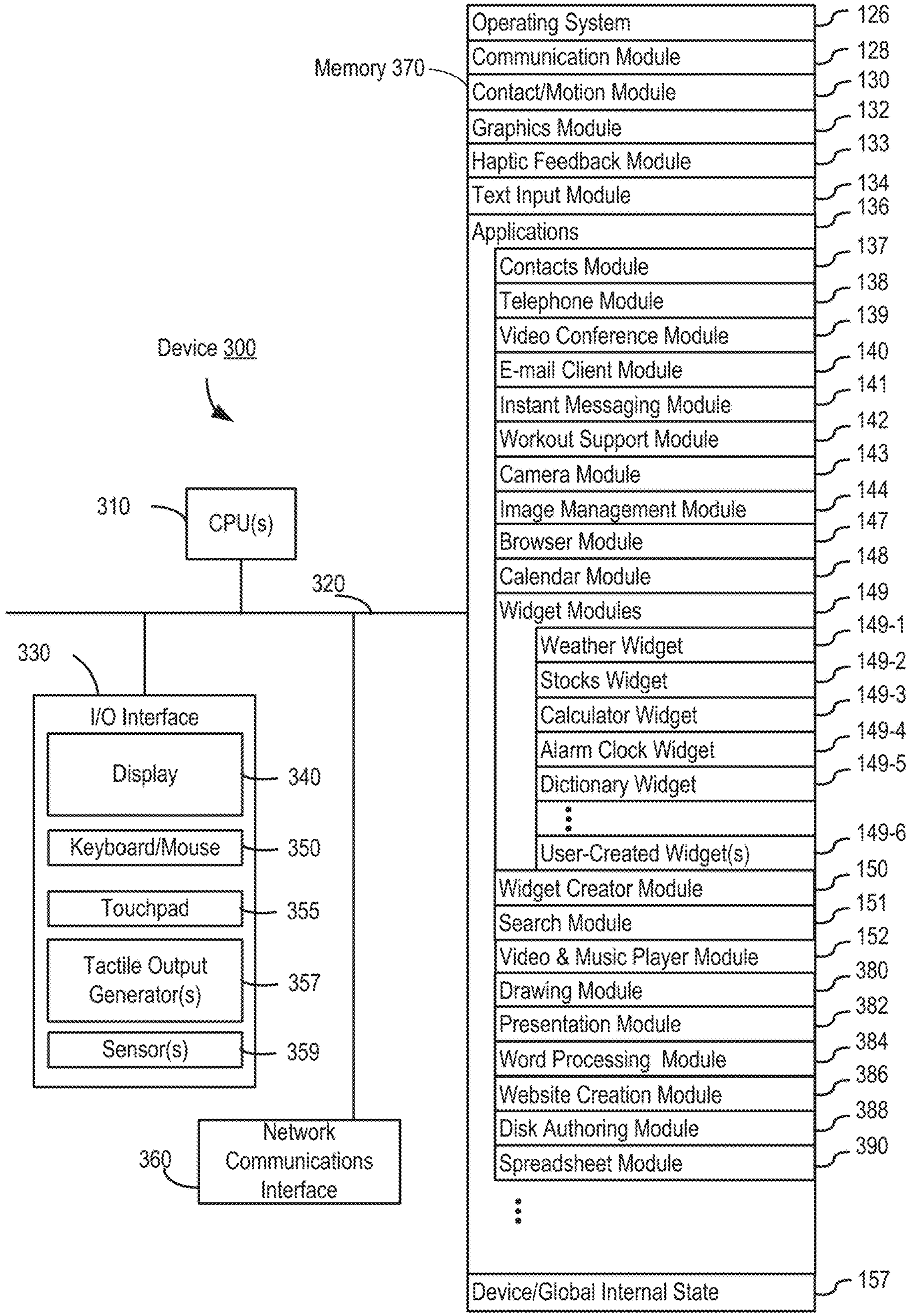
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
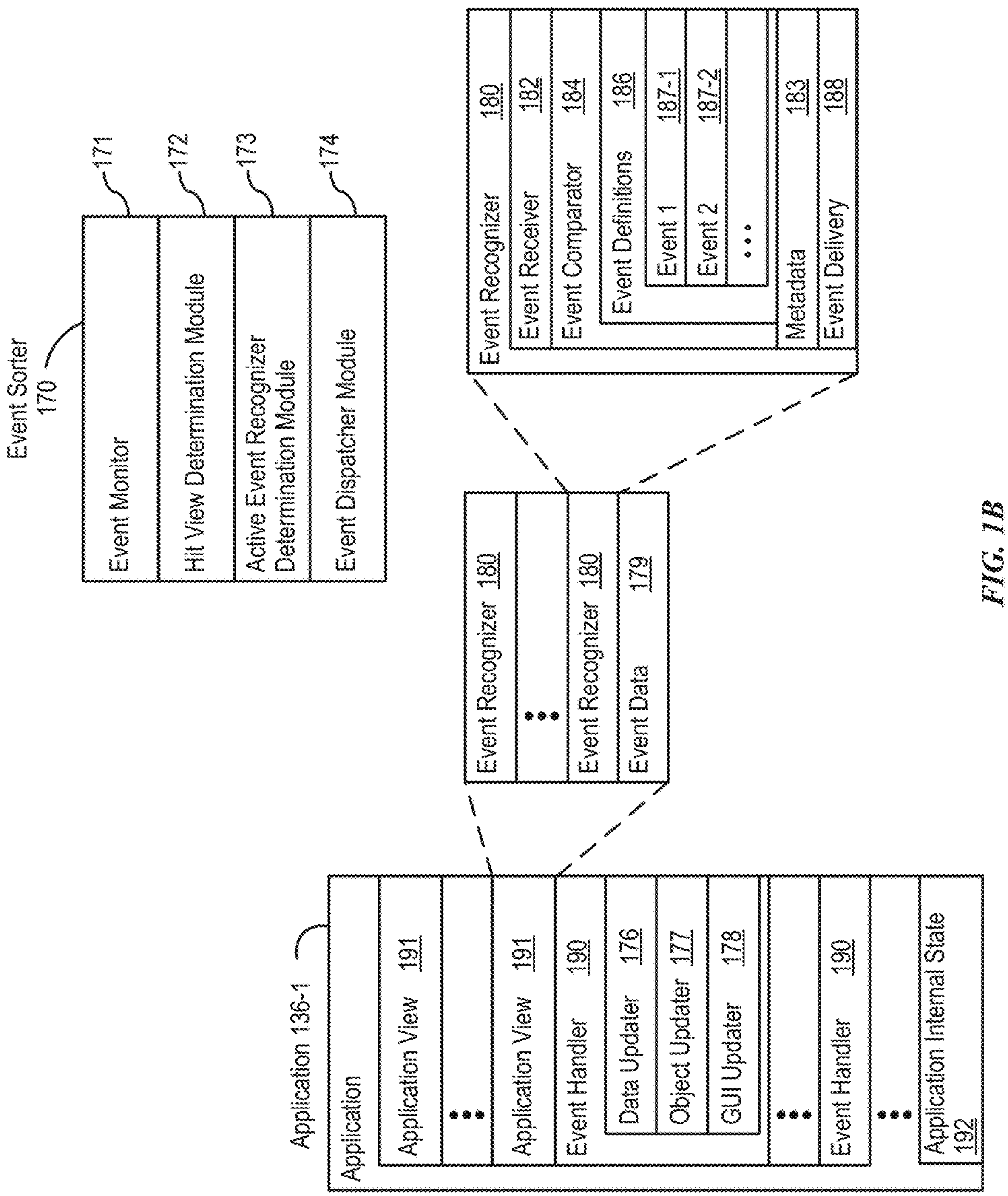
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
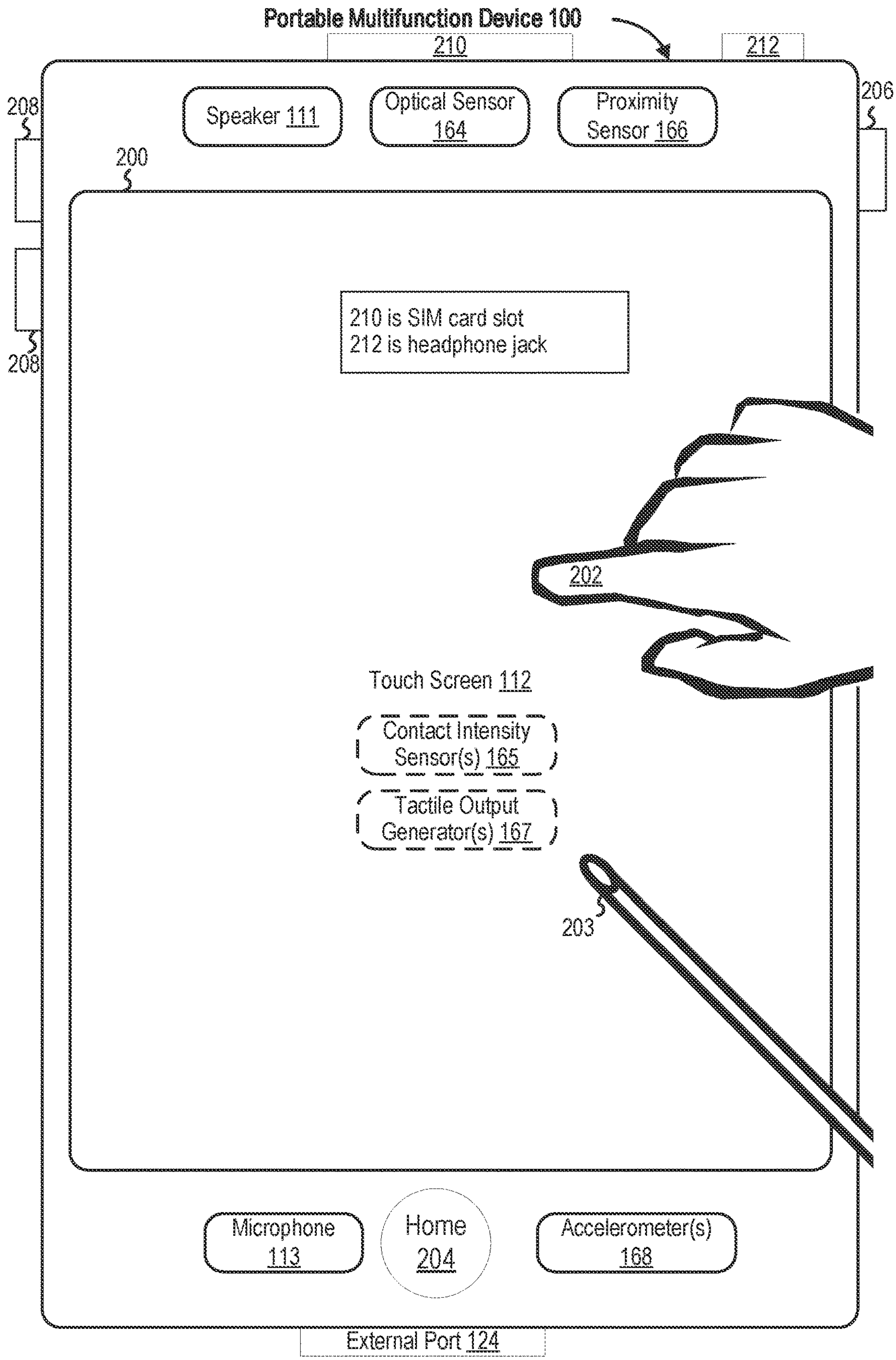
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as “home” or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child’s learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
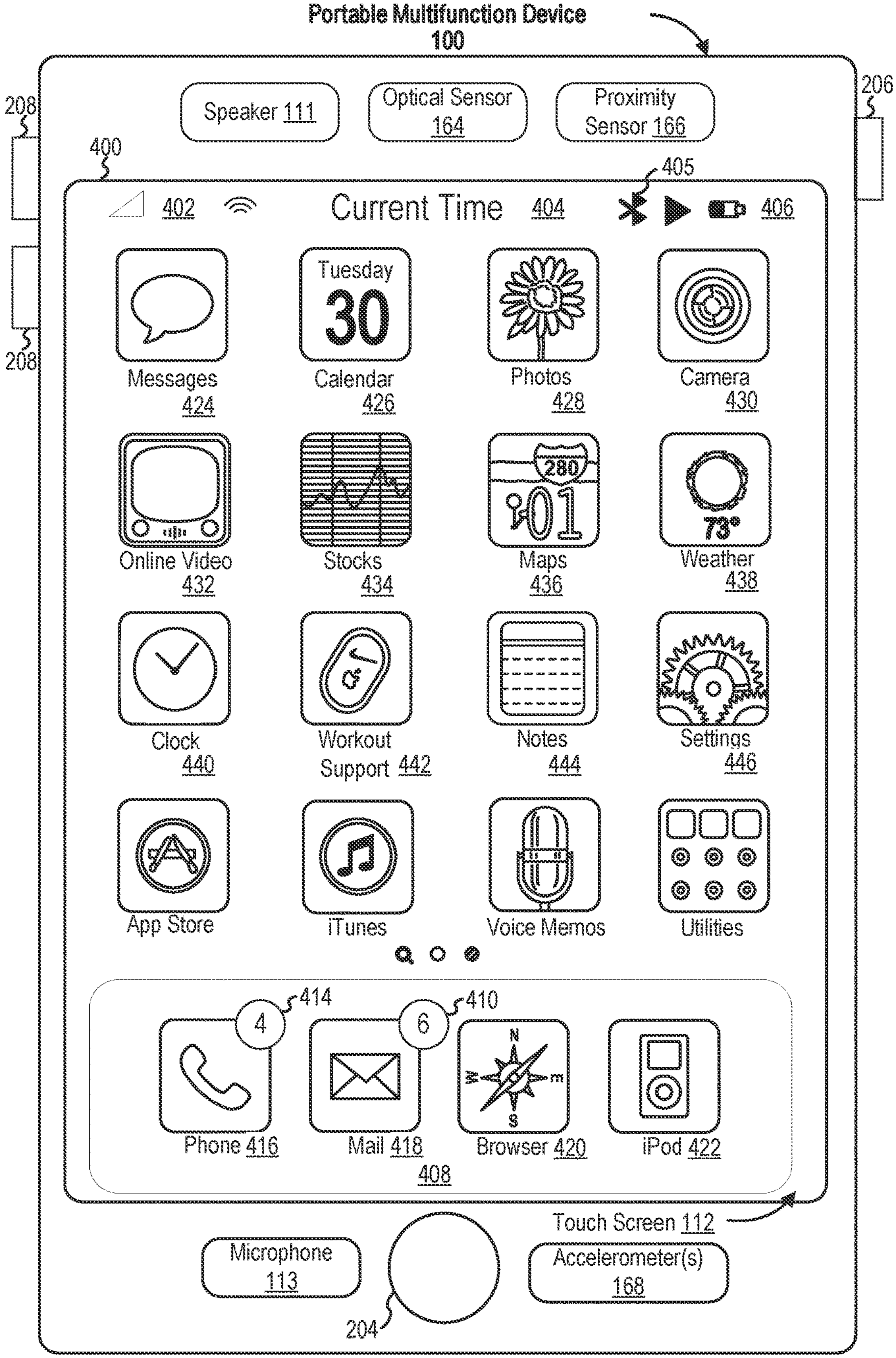
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled “Phone,” which optionally includes an indicator 414 of the number of missed calls or voicemail messages;
  - Icon 418 for e-mail client module 140, labeled “Mail,” which optionally includes an indicator 410 of the number of unread e-mails;
  - Icon 420 for browser module 147, labeled “Browser;” and
  - Icon 422 for video and music player module 152, also referred to as iPod (trademark of Apple Inc.) module 152, labeled “iPod;” and Icons for other applications, such as:

- Icon 424 for IM module 141, labeled "Messages;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video;"
- Icon 434 for stocks widget 149-2, labeled "Stocks;"
- Icon 436 for map module 154, labeled "Maps;"
- Icon 438 for weather widget 149-1, labeled "Weather;"
- Icon 440 for alarm clock widget 149-4, labeled "Clock;"
- Icon 442 for workout support module 142, labeled "Workout Support;"
- Icon 444 for notes module 153, labeled "Notes;" and
- Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
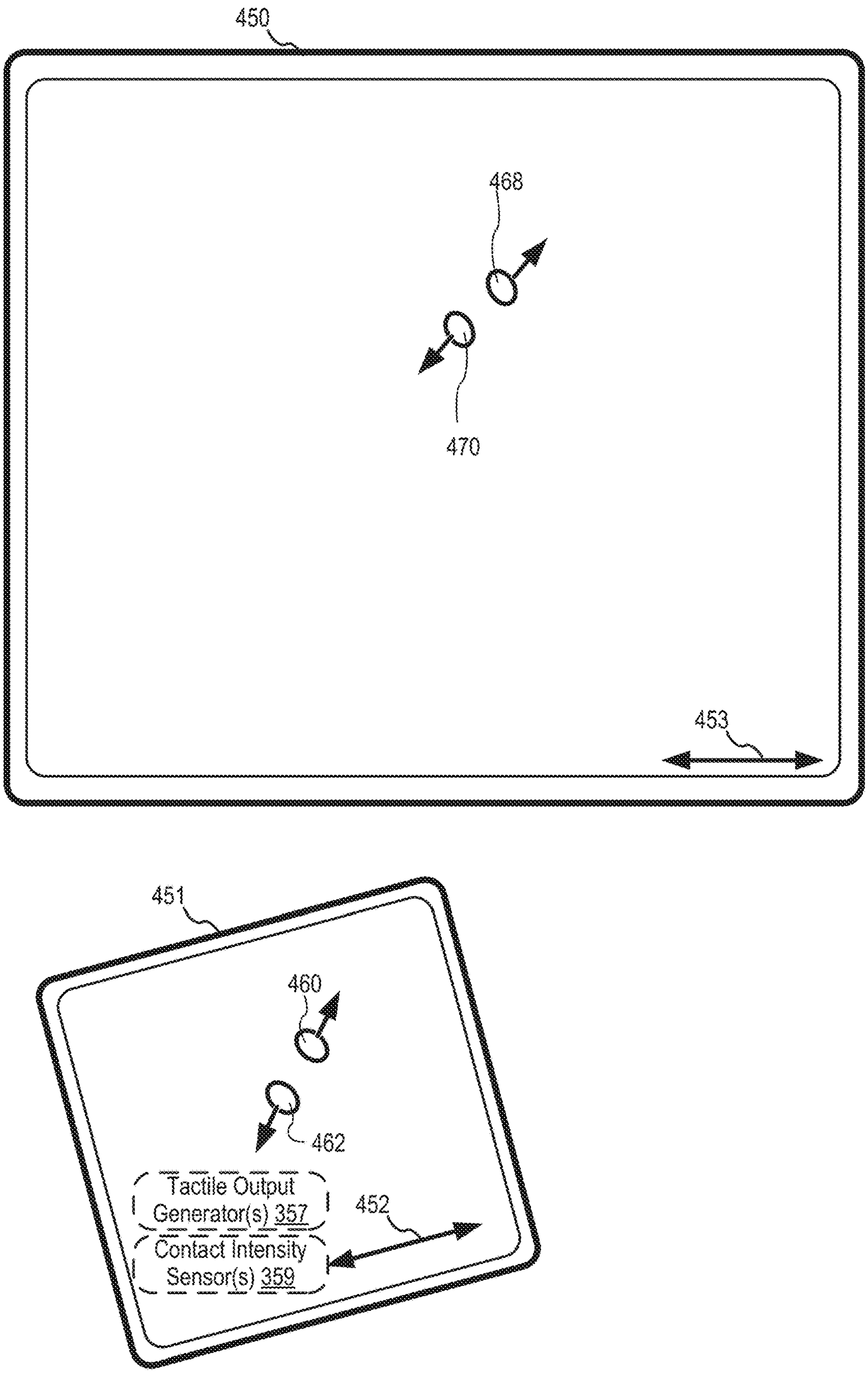
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
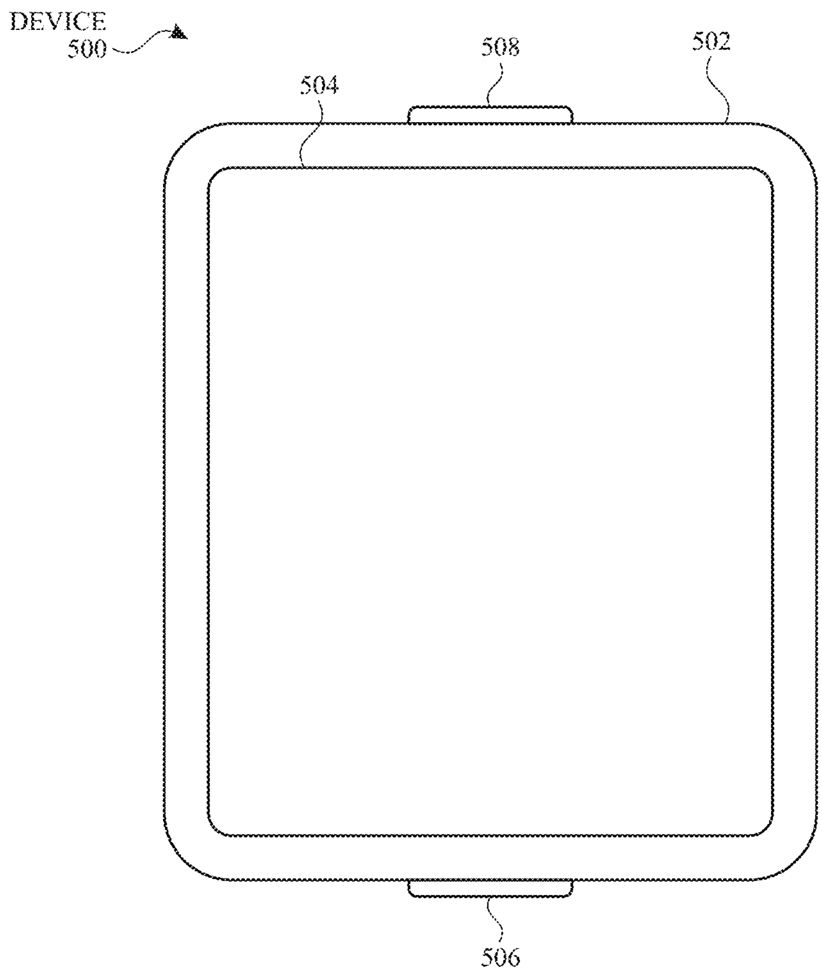
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
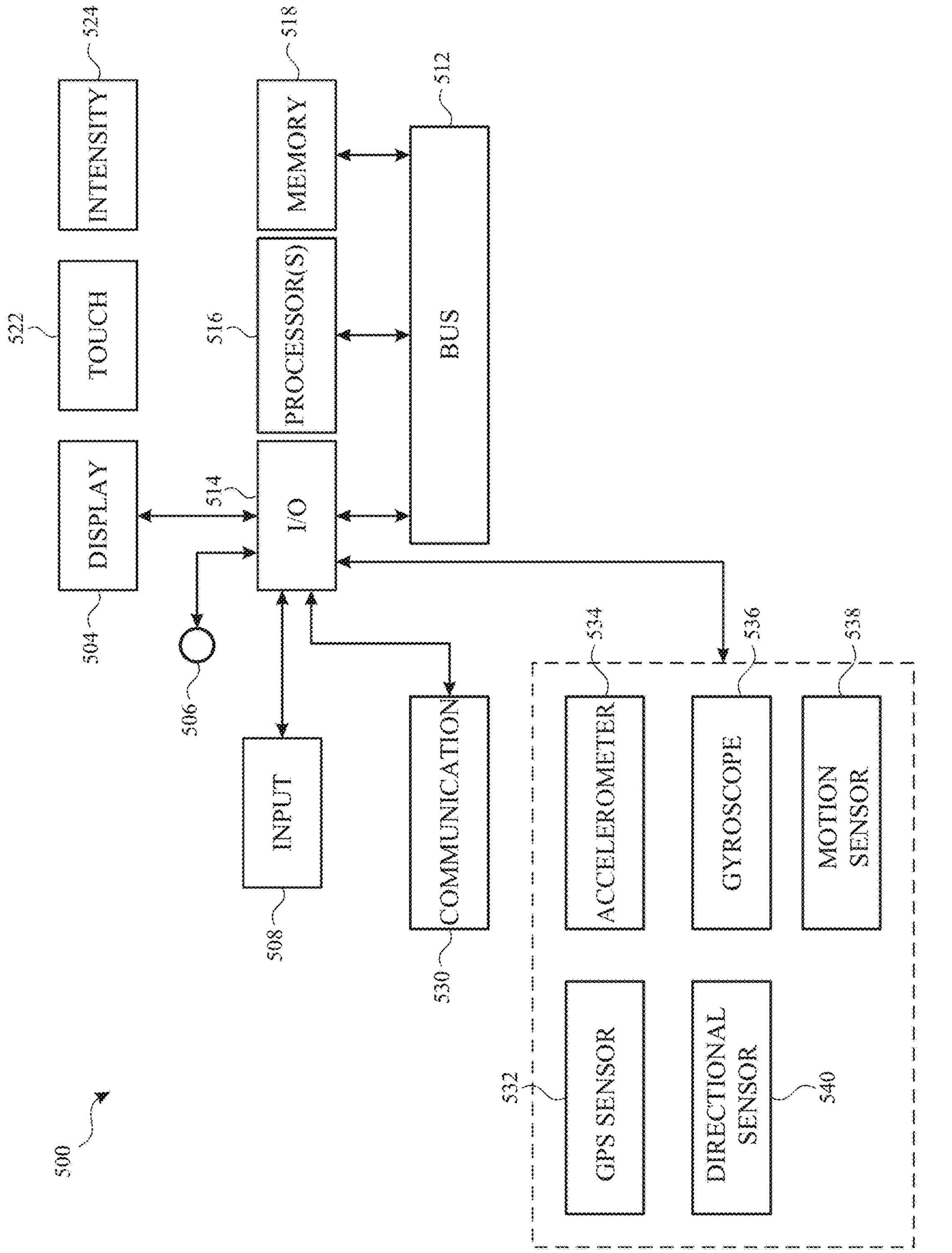
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 900 and 1000 (FIGS. 9 and 10A-10B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6Y illustrate exemplary user interfaces for accessing media-processing styles using a computer system in accordance with some embodiments. The user interfaces in these figures are used to illustrate the processes described below, including the processes in FIGS. 9 and 10A-10B.

FIG. 6A illustrates computer system 600 displaying a camera user interface, which includes live preview 630 that extends from the top of the display to the bottom of the display. In some embodiments, live preview 630 extends into only a portion of the display, such as the portion of the display with camera display region 604. In some embodiments, computer system 600 includes one or more features of device 100, device 300, and/or device 500.

Live preview 630 shows a particular scene (e.g., person standing in front of a mountain and next to a flower in FIG. 6A) that is in the field-of-view of one or more cameras of computer system 600. Live preview 630 is a representation of a (e.g., partial) field-of-view of at least a first camera of one or more cameras of computer system 600 ("the FOV"). Live preview 630 is based on images detected in the FOV. In some embodiments, computer system 600 captures images using a plurality of camera sensors and combines them to display live preview 630. In some embodiments, computer system 600 captures images using a single camera sensor to display live preview 630.

The camera user interface of FIG. 6A includes indicator region 602 and control region 606. Indicator region 602 and control region 606 are overlaid on live preview 630 such that indicators and controls can be displayed concurrently with live preview 630. Camera display region 604 is positioned between indicator region 602 and control region 606 and is substantially not overlaid with indicators or controls (e.g., affordances).

As illustrated in FIG. 6A, indicator region 602 includes indicators, such as flash indicator 602*a*, media-processing styles indicator 602*b*, animated image indicator 602*c*, and raw indicator 602*e*. Flash indicator 602*a* indicates whether the flash is on, off, or in another mode (e.g., automatic mode). In FIG. 6A, flash indicator 602*a* indicates that the flash is off. Media-processing styles indicator 602*b* indicates whether computer system 600 is displaying a media-processing styles user interface and/or selectable user interface objects for controlling media-processing styles that are applied to visual content (e.g., data) captured by one or more cameras of computer system 600. At FIG. 6A, media-processing styles indicator 602*b* is being displayed in an inactive state, which indicates that the plurality of selectable user interface objects for controlling media-processing styles is not being displayed. In some embodiments, a media-processing style has (e.g., defines and/or is defined by) a set of media processing parameters. In some embodiments, one or more of the parameters represent visual characteristics (e.g., color characteristics (e.g., warmth, tone, hue, brightness, saturation, shade, tint, colorfulness, coldness, and/or harmony) and/or depth parameters) that computer system 600 can use to alter the visual content captured by one or more cameras of computer system 600. In some embodiments, each parameter is associated with (or has) a value that impacts how computer system 600 alters the visual content when a particular media-processing style with the respective parameter is applied to the visual content of the media. In some embodiments, one or more of the media-processing styles are predefined and are not created by the user of computer system 600 (e.g., are pre-installed on the computer system without a user of computer system 600 defining the media-processing style). In some embodiments, one or more of the media-processing styles are customized, modified, and/or created by the user of computer system 600. In some embodiments, each media-processing style has the same type of parameters (e.g., parameters corresponding to the same type of visual characteristic). In some embodiments, one or more of the media-processing styles have the same type of parameters but have different values of one or more of the type of parameters corresponding to the one or more media-processing styles.

Animated image indicator 602*c* indicates whether the camera is configured to capture a single image or a plurality of images (e.g., in response to detecting a request to capture media). In some embodiments, indicator region 602 is overlaid onto live preview 630 and optionally includes a colored (e.g., gray and/or translucent) overlay. Raw capture indicator 602*e* indicates whether computer system 600 is configured to store and/or capture media in a raw media format. At FIG. 6A, raw capture indicator 602*e* is displayed in an inactive state, which indicates that computer system 600 is configured to store and capture media in a non-raw format (e.g., joint photographic experts group (JPEG) format and/or high efficiency image coding (HEIC) format). In some embodiments, the file size for media stored in the raw format is bigger than the file size for the same media that is stored in the non-raw format. In some embodiments, media stored in the raw format includes more information than the same media that is stored in the non-raw format. In some embodiments, this more information enables media stored in the raw format to be edited after capture in more ways than media stored in non-raw format. In some embodiments (as discussed further discussed below in relation to FIGS. 6V-6Y), computer system 600 ceases to display media-processing styles indicator 602*b* when raw capture indicator 602*e* is displayed in an active state (e.g., as shown in FIG. 6X) and/or when computer system 600 is configured to store and capture media in the raw format. In some embodiments, computer system 600 displays media-processing styles indicator 602*b* in an inactive state when raw capture indicator 602*e* is displayed in an active state.

As illustrated in FIG. 6A, camera display region 604 includes live preview 630 and zoom controls 622. Zoom controls 622 include 0.5× zoom control 622*a*, lx zoom control 622*b*, and 2× zoom control 622*c*. In FIG. 6A, 1× zoom control 622*b* is selected, which indicates that live preview 630 is being displayed at a 1× zoom level.

As illustrated in FIG. 6A, control region 606 includes shutter control 610, camera switcher control 614, a representation of media collection 612, and camera mode controls 620. Shutter control 610, when activated, causes computer system 600 to capture media (e.g., a photo), using the one or more camera sensors, based on the current state of live preview 630 and the current state of the camera application. The captured media is stored locally at computer system 600 and/or transmitted to a remote server for storage. Camera switcher control 614, when activated, causes computer system 600 to switch to showing the field-of-view of a different camera in live preview 630, such as by switching between a rear-facing camera sensor and a front-facing camera sensor. The representation of media collection 612 illustrated in FIG. 6A is a representation of media (an image, a video) that was most recently captured by computer system 600. In some embodiments, in response to detecting an input on the media collection 612, computer system 600 displays a similar user interface to the user interface illustrated in FIGS. 6S-6U (discussed below).

As illustrated in FIG. 6A, camera mode controls 620 includes slow-motion mode control 620*a*, video mode control 620*b*, photo mode control 620*c*, portrait mode control 620*d*, and panoramic mode control 620*e*. As illustrated in FIG. 6A, photo mode control 620*c* is selected, which is indicated by photo mode control 620*c* being bolded. When photo mode control 620*c* is selected, computer system 600 is operating in a photo capture mode and initiates capture of (e.g., and/or captures) photo media (e.g., a still photo) in response to computer system 600 detecting an input directed to shutter control 610. The photo media that is captured by computer system 600 is representative of live preview 630 that is displayed when (or after) the input is directed to shutter control 610 is detected. In some embodiments, in response to detecting an input directed to slow-motion mode control 620*a*, computer system 600 operates in a slow-motion media capture mode and initiates capture of media (e.g., a video with a slow-motion effect applied, a slow-motion video) that is played back at a slower speed than the speed at which the media was captured. In some embodiments, in response to detecting an input directed to video mode control 620*b*, computer system 600 operates in a video capture mode and initiates capture of video media (e.g., a video). In some embodiments, in response to detecting an input directed to portrait mode control 620*d*, computer system 600 operates in a portrait mode and initiates capture of portrait media (e.g., a still photo, a still photo having a simulated bokeh or simulated depth of field effect applied). In some embodiments, in response to detecting an input directed to panoramic mode control 620*e*, computer system 600 operates in a panoramic mode and initiates capture of panoramic media (e.g., a panoramic photo). In some embodiments, the indicators and/or controls displayed on the camera user interface are based on the mode that is selected (e.g., and/or the mode that computer system 600 is configured to operate in based on the selected camera mode).

At FIG. 6A, computer system 600 is displaying live preview 630 using standard style 634*a*, which is indicated by live preview 630 being overlaid with a pattern of horizontal lines. It should be understood that computer system 600 does not necessarily display the patterns (e.g., a set of lines in a particular direction (e.g., horizontal, vertical, oblique)) illustrated in the figures across the respective portions of a representation of media (e.g., live preview 630 and/or previously captured representations of media, such as in FIGS. 6S-6U). For example, at FIG. 6A, computer system 600 does not necessarily display the set of horizontal lines when displaying live preview 630. However, the patterns illustrated in the figures are symbolic of a particular portion of a representation of media being displayed using a particular media-processing style (e.g., standard style 634*a* in FIG. 6A). As discussed above, when a particular media-processing style is applied to visual content of media, visual characteristics (e.g., color characteristics (e.g., warmth, tone, hue, brightness, saturation, shade, tint, colorfulness, coldness, and/or harmony) and/or depth parameters) of the representation of media that is displayed using the media-processing style appear different from the visual characteristics of a representation of media that is not displayed using the media-processing style.

At FIG. 6A, computer system 600 displays live preview 630 using standard style 634*a* because standard style 634*a* is the currently selected media-processing style (e.g., as discussed further in relation to FIGS. 6B and 6I-6J), and computer system 600 is configured to operate in a media-processing style application mode (e.g., as discussed further in relation to FIGS. 8A-8C). In some embodiments, when another media-processing style is the currently selected media-processing style, computer system 600 displays live preview 630 using the other media-processing style at FIG. 6A. In some embodiments, when computer system 600 is not configured to operate in the media-processing style application mode, computer system 600 does not display media-processing styles indicator 602*b* and/or does not apply a media-processing style to a representation of media (e.g., live preview 630 and/or previously captured media) (e.g., as described further in relation to FIGS. 8A-8C). At FIG. 6A, computer system 600 detects tap input 650*a* on (e.g., directed to and/or at a location that corresponds to) shutter control 610.

At FIG. 6B, in response to detecting tap input 650*a*, computer system 600 initiates capture of media represented of the FOV and updates media collection 612 to include a representation of the captured media (e.g., live preview 630 of FIG. 6A). Notably, the representation in media collection 612 of FIG. 6B ("representation of FIG. 6B") looks different than the representation in media collection 612 of FIG. 6A (e.g., "representation of FIG. 6A"). The representation of FIG. 6B has standard style 634*a* (e.g., horizontal lines) applied and the representation of FIG. 6A does not have the standard style 634*a* applied. The representation in media collection 612 of FIG. 6B has standard style 634*a* applied because computer system 600 was displaying live preview 630 using standard style 634*a* and/or standard style 634*a* was the currently selected media-processing style to be applied to captured media when tap input 650*a* was detected. On the other hand, the representation in media collection 612 of FIG. 6A does not have the standard style 634*a* applied. In some embodiments, this is because the media represented by the representation in media collection 612 of FIG. 6A was not captured while live preview 630 was displayed using standard style 634*a* and/or while standard style 634*a* was the currently selected media-processing style when a request to capture the media that corresponds to the representation of FIG. 6A was captured. In some embodiments, to display the representation of FIG. 6B, computer system 600 alters visual characteristics (e.g., besides for the normal and/or a default (e.g., non-user modified) altering of the visual characteristics of capture media that may occur when computer system 600 is not operating in the media-processing style application mode) of the media that corresponds to the representation of FIG. 6B. In some embodiments, the representation of FIG. 6A is not displayed by altering visual characteristics (e.g., besides for the normal and/or default altering of the visual characteristics of captured media that can occur when computer system 600 is not operating in the media-processing style application mode and/or that can occur based on one or more elements (e.g., lighting, shadows) in the FOV) of the media represented by the representation of FIG. 6A. At FIG. 6B, computer system 600 detects tap input 650*b* on media-processing styles indicator 602*b*.

As illustrated FIG. 6C, in response to detecting tap input 650*b*, computer system 600 displays the media-processing styles user interface and/or selectable user interface objects for controlling media-processing styles. In particular, computer system 600 displays different portions of live preview 630 using different media-processing styles. As illustrated in FIG. 6C, in response to detecting tap input 650*b*, computer system 600 continues to display a portion in the center of live preview 630 ("middle section") using standard style 634*a* and ceases to display a portion of live preview 630 that is to the left of the middle section ("left section") and a portion of live preview 630 that is to the right of the middle section ("right section") using standard style 634*a*. For illustrative purpose only, FIG. 6C shows left boundary 642*a* and right boundary 642*b* (e.g., which are optionally displayed by computer system 600 at FIG. 6C). As used herein and for ease of explanation, the left section can be the portion of live preview 630 to the left of left boundary 642*a*, the middle section can be the portion of live preview 630 between left boundary 642*a* and right boundary 642*b*, and the right section can be the portion of live preview 630 to the right of right boundary 642*b*. However, these respective sections are referred to for ease of discussion, and computer system 600 can apply one or more media-processing styles to any number of portions/sections of the representation of media and to many different sized, shaped, and/or configured portions/sections of the representation of the media.

As illustrated in FIG. 6C, in response to detecting tap input 650*b*, the left section and right section is displayed without using any media-processing style (e.g., without any pattern) and/or without using any different media-processing style that was not displayed before tap input 650*b* was detected (e.g., left section of FIG. 6C is illustrated the same as left section of FIG. 6B). In response to detecting tap input 650*b*, computer system reduced the visual prominence of the right section and left section by displaying a gray overlay over these sections. Thus, as illustrated in FIG. 6C, the right section and left section have visually merged into indicator region 602 and control region 606, which are also displayed with the gray overlay. As illustrated in FIG. 6C, the right section includes visual element 660*b*, which is a portion of a border/frame of an object. Visual element 660*b* indicates that another media-processing style can be applied to live preview 630 that is different from standard style 634*a*. Here, visual element 660*b* is displayed in the right section because computer system 600 has determined that one or more other media-processing styles can be selected in response to detecting an input in a particular direction (e.g., the direction of movement input (e.g., a swipe input, a drag input) 650*d* of FIG. 6D described below) (e.g., indicated by paging dots 638 and described below). Additionally, a visual element is not displayed in the left section because computer system 600 has determined that one or more other media-processing styles cannot be selected in response to detecting an input in another direction (e.g., a direction that is opposite of movement input 650*d* of FIG. 6D described below) (e.g., indicated by paging dots 638 and described below). As illustrated in FIG. 6C, computer system 600 also displayed divider 640 between the middle section and right section. Divider 640 is displayed without a media-processing style applied and/or without a visual element that reduces/increases the visual prominence of divider 640. In some embodiments, divider 640 is displayed between portions that have different media-processing styles applied and/or visual elements included. In some embodiments, divider 640 is used to delineate and/or define a respective portion of live preview 630 with a media-processing style applied with another portion of live preview 630 that does not have the media-processing style applied. In some embodiments, divider 640 is only displayed between applications of two adjacent and/or different media-processing styles to a representation of media, such as live preview 630.

As illustrated in FIG. 6C, in response to detecting tap input 650*b*, computer system 600 also displays standard style identifier 636*a* (e.g., "STANDARD"), which indicates that standard style 634*a* is the currently selected media-processing style. As illustrated in FIG. 6C, the majority of live preview 630 in camera display region 604 is displayed using the currently selected media-processing style (e.g., standard style 634*a*). In some embodiments, the majority of live preview 630 in camera display region 604 is not displayed using the currently selected media-processing style.

As illustrated in FIG. 6C, in response to detecting tap input 650*b*, computer system 600 also displays paging dots 638 that include standard paging dot 638*a*, vibrant paging dot 638*b*, luxe paging dot 638*c*, and vintage paging dot 638*d*. Here, standard paging dot 638*a* is displayed as being selected (e.g., represented by the open paging dot) because the middle section of the representation of media is displayed using the standard media-processing style. In some embodiments, standard paging dot 638*a* is displayed as being selected because a greater portion of the representation of media (e.g., live preview 630) is displayed using standard style 634*a* rather than any other media-processing style.

Moreover, as illustrated in FIG. 6C, each paging dot (e.g., paging dots 638) corresponds to a media-processing style in a set of available media-processing styles. The set of available media-processing styles are media-processing styles that computer system 600 can use to display a portion of a representation of media. Thus, in FIG. 6C, computer system 600 can display a portion of the representation of media using at least four available media-processing styles. In some embodiments, when a paging dot is added to paging dots 638, computer system 600 adds a media-processing style that corresponds to (e.g., that is represented by) the added paging dot to the set of available media-processing styles. In some embodiments, when a paging dot is removed from paging dots 638, computer system 600 removes a media-processing style from the set of available media-processing styles that corresponds to (e.g., that is represented by) the removed media-processing style. In some embodiments, computer system 600 displays one or more other indications (e.g., besides paging dots) to represent a number of media-processing styles that can be used to display a representation of media and/or the current media-processing style that can be used to display the representation of media.

As illustrated in FIG. 6C, in response to detecting tap input 650*b*, computer system 600 ceases to display zoom controls 622 and displays standard style control 626*a* at the location in which zoom controls 622 were previously displayed in FIG. 6B. Standard style control 626*a* includes control 628 (e.g., discussed below in relation to FIG. 7S in response to tap input 750*s* being detected), tone parameter control 626*a*1 and warmth parameter control 626*a*2. In some embodiments, the warmth parameter controls a color temperature bias of the media item (e.g., whether colors in the media item are shifted toward cool colors, such as blues, greens, and/or purples and/or toward warm colors, such as reds, yellows, and/or oranges). In some embodiments, the tone parameter controls saturation of the media item. In some embodiments, the tone parameter controls a difference between light and dark areas of the image (e.g., luminosity, contrast, brightness, and/or shadows) of the media item. In some embodiments, the tone parameter controls saturation of the media item. In some embodiments the tone parameter controls saturation and a difference between light and dark areas of the image (e.g., increasing the saturation and the difference between light and dark areas in one direction and decreasing the saturation and the difference between light and dark areas in the other direction). In some embodiments, computer system 600 is aware of elements in the scene (e.g., people, animals, pets, trees, flowers, birds, buildings, sky, landscape, mountains, clothes, skin, sunsets and/or water) and adjustments to the tone parameter have different effects on different elements of the scene so that an adjustment of the tone parameter caused different degrees of adjustment between the light and dark areas of the image and/or the saturation differently for different elements in the scene (e.g., increasing the saturation of the sky or mountains or landscapes more than increasing the saturation of a person or pet). For example, when the tone parameter is increased, the amount of saturation applied to the skin of a person is less than the amount of saturation applied to the clothes of the person (optionally, the amount of saturation increase applied to the skin of the person is zero or close to zero) and/or the amount of saturation applied to the clothes of a person is less than the amount of saturation applied to a landscape or sunset behind the person.

Tone parameter control **626*a*1 includes tone parameter identifier 626*a*1*a*, current tone value 626*a*1*b*, and tone value range indicator 626*a*1*c*. Tone parameter identifier 626*a*1*a* denotes the type of parameter (e.g., tone parameter) controlled by tone parameter control 626*a*1*a*. Current tone value 626*a*1*b* indicates the current value of the tone parameter for standard style 634*a*. Tone value range indicator 626*a*1*c* is a portion of a range of values that includes the current value of the tone parameter. Similarly, warmth parameter control 626*a*2 includes warmth parameter identifier 626*a*2*a*, current warmth value 626*a*2*b*, and warmth value range indicator 626*a*2*c*. Warmth parameter identifier 626*a*2*a* denotes the type of parameter (e.g., warmth parameter) controlled by warmth parameter control 626*a*2*a*. Warmth tone value 626*a*2*b* is the current value of the warmth parameter for standard style 634*a*. Warmth value range indicator 626*a*2*c* is a portion of a range of values that includes the warmth value of the warmth parameter. Notably, current tone value 626*a*1*b* and current warmth value 626*a*2*b* are the default values (e.g., "0") for, respectively, the tone parameter for standard style 634*a* and the warmth parameter for the standard style 634*a***. In some embodiments, the default value of a respective parameter for a media-processing style is a value that is predefined and is set without user input.

As illustrated in FIG. 6C, in response to detecting tap input **650*b*, computer system 600 updates the visual appearance of media-processing styles indicator 602*b*. In particular, computer system 600 updates the media-processing styles indicator 602*b* to the active state, which indicates that the media-processing styles user interface and/or selectable user interface objects for controlling media-processing styles are displayed. In some embodiments, computer system 600 updates media-processing styles indicator 602*b* in other ways to indicate that media-processing styles application mode is in an active state, such as changing the color, removing a slash from (e.g., slash on flash indicator 602*a*), highlighting, and/or decreasing/increase the size of media-processing styles indicator 602*b*. In some embodiments, computer system 600 updates media-processing styles indicator 602*b* to indicate the currently selected media-processing style. Thus, in some embodiments, computer system 600 updates the appearance of media-processing styles indicator 602*b* when a new media-processing style becomes the currently media-processing style. In some embodiments, in response to detecting a tap input on media-processing styles indicator 602*b* at FIG. 6C, computer system re-displays the user interface of FIG. 6A. In some embodiments, in response to detecting tap input on animated image indicator 602*c*, computer system 600 re-displays the user interface of FIG. 6A. At FIG. 6C, computer system 600 detects tap input 650*c* on shutter control 610**.

As illustrated in FIG. 6D, in response to detecting tap input **650*c*, computer system 600 initiates capture of media represented of the FOV and updates media collection 612 to include a representation of the captured media (e.g., live preview 630 of FIG. 6C) ("representation of FIG. 6D"). The representation of captured media of FIG. 6D has standard style 634*a* applied (e.g., includes set of horizontal lines) and is the same as the representation of FIG. 6B that had standard style 634*a* applied (e.g., no set of horizontal lines). The representation of FIG. 6B and the representation of FIG. 6D are the same, although the representation of FIG. 6B was captured while the entirety of live preview 630 was displayed using standard style 634*a* and representation of FIG. 6D was captured when only the middle section was displayed using has standard style 634*a*. At FIG. 6D, standard style 634*a* has been applied to the right, middle, and left sections of representation of FIG. 6D, although the right and left sections of live preview 630 were not displayed using standard style 634*a* (e.g., in response to tap input 650*c* being detected). At FIG. 6D, standard style 634*a* is applied to a greater portion (and/or all of the) visual content of the captured media than what was applied to the visual content in the FOV that was used to display live preview 630 of FIG. 6C. At FIG. 6D, computer system 600 detects a first portion of movement input 650*d* on live preview 630 in the leftward direction. It should be understood that movement input 650*d* (e.g., any portion of movement input 650*d*) can be detected on any location of live preview 630. In some embodiments, no portion of movement input 650*d* is detected on the left section, visual element 660*b*, and/or a particular media-processing style (e.g., including standard style 634*a*, vibrant style 634*b*, and/or visual element 660*b*, as discussed below in relation to FIG. 6**E).

As illustrated in FIG. 6E, in response to detecting the first portion of movement input **650*d* (e.g., and while continuing to detect movement input 650*d*) in the leftward direction, computer system 600 displays a portion (e.g., that includes a left portion of the middle section and the left section) of live preview 630 using standard style 634*a* and a portion (e.g., that includes a right portion of the middle section and the right section) of live preview 630 using vibrant style 634*b*. At FIG. 6E, vibrant style 634*b* is indicated by the set of upward slanting lines (e.g., lines moving in the northeast direction). Looking back at FIG. 6D, computer system 600 did not display a portion of live preview 630 using vibrant style 634*b* in FIG. 6D. As illustrated in FIG. 6E, standard style 634*a* is indicated by a different set of lines than vibrant style 634*b* to indicate that these media-processing styles impact how live preview 630 is displayed in different ways. The sizes of the portion of live preview 630 that is displayed using standard style 634*a* and the portion of live preview 630 that is displayed using vibrant style 634*b* is based on the magnitude of a movement characteristic (e.g., including speed, direction, acceleration, and/or time) of the first portion of movement input 650*d*. In some embodiments, in response to detecting a portion of movement input 650*d* that has a higher magnitude than the portion of movement input 650*d* of FIG. 6D, computer system 600 displays a portion of live preview 630 using standard style 634*a*, which is less than the portion of live preview 630 of FIG. 6E that is displayed using standard style 634*a* and displays a portion of live preview 630 using vibrant style 634*b* that is greater than the portion of live preview 630 of FIG. 6E that is displayed using vibrant style 634*b*. In some embodiments, in response to detecting a portion of movement input 650*d* that has a lower magnitude than the portion of movement input 650*d* of FIG. 6D, computer system 600 displays a portion of live preview 630 using standard style 634*a*, which is more than the portion of live preview 630 of FIG. 6E that is displayed using standard style 634*a* and displays a portion of live preview 630 using vibrant style 634*b* that is less than the portion of live preview 630 of FIG. 6E that is displayed using vibrant style 634*b*. Thus, in some embodiments, the amount of live preview 630 that is displayed using a respective media-processing style is based on the magnitude of a movement input. In some embodiments, computer system 600 moves the application of standard style 634*a* and vibrant style 634*b* with movement input 650*d*. In some embodiments, as a part of displaying the portion of live preview 630 using vibrant style 634***b* in FIG. 6E, computer system 600 ceases to display visual element 660*b*. In some embodiments, as a part of ceasing to display visual element 660*b*, computer system 600 displays an animation (e.g., a fading animation, a dissolving animation) of visual element 660*b* transitioning into at least a subset of the portion of live preview 630 using vibrant style 634*b* in FIG. 6E. In some embodiments, in response to detecting movement input 650*d* (e.g., before any movement of the input is detected), computer system 600 displays the animation of visual element 660*b* transitioning into at least a subset of the portion of live preview 630 using vibrant style 634*b* in FIG. 6E. In some embodiments, while detecting movement input 650*d*, computer system 600 detects a tap input on shutter control 610 and, in response to detecting the tap input on shutter control 610, capture media that has the standard style 634*a* applied (e.g., because standard style 634*a* is currently selected in FIG. 6E). At FIG. 6E, computer system 600 detects a second portion of movement input 650*d* on live preview 630 in the leftward direction.

As illustrated in FIG. 6F, in response to detecting the second portion of movement input 650*d* in the leftward direction (e.g., and while continuing to detect movement input 650*d*), computer system 600 moves the application of standard style 634*a* and vibrant style 634*b* to the left (e.g., in the direction of the second portion of movement input 650*d*). As illustrated in FIG. 6F, in response to detecting the second portion of input 650*d* in the leftward direction, computer system 600 displays a portion (e.g., that includes a reduced portion of the middle section as compared to FIG. 6E and the left section) of live preview 630 using standard style 634*a* and a portion (e.g., that includes an increased portion of the middle section as compared to FIG. 6E and the right section) of live preview 630 using vibrant style 634*b*. Accordingly, based on the second portion of movement input 650*d*, the size of the portion of live preview 630 that is displayed using standard style 634*a* of FIG. 6F is less than the size of the portion of live preview 630 that is displayed using standard style 634*a* of FIG. 6E. Additionally, based on the second portion of movement input 650*d*, the size of the portion of live preview 630 that is displayed using vibrant style 634*b* of FIG. 6F is more than the size of the portion of live preview 630 that is displayed using vibrant style 634*b* of FIG. 6E. As computer system 600 moves the application of standard style 634*a* and vibrant style 634*b* to the left, computer system 600 moves divider 640 while maintaining divider 640 between the portion of live preview 630 that is displayed using standard style 634*a* and the portion of live preview 630 that is displayed using vibrant style 634*b* (e.g., based on and/or consistent with the movement of input 650*d*).

At FIG. 6F, in response to detecting the second portion of movement input 650*d*, computer system 600 ceases to display standard style identifier 636*a* and displays vibrant style identifier 636*b* (e.g., "Vibrant") (e.g., at the location at which standard style identifier 636*a* was previously displayed). In addition, computer system 600 also updates paging dots 638 to indicate that vibrant paging dot 638*b* (e.g., hallow/open paging dot) is selected and that standard paging dot 638*a* is not selected (e.g., solid/closed paging dot). Here, computer system 600 displays vibrant style identifier 636*b* and displays vibrant paging dot 638*b* as being selected because a determination has been made that a greater portion (or an equal portion) of live preview 630 is displayed using vibrant style 634*b* than the portion of live preview 630 that is displayed using standard style 634*a*. Because of this determination, computer system 600 sets vibrant style 634*b* as the currently selected media-processing style and replaces standard style control 626*a* with vibrant style control 626*b*. As illustrated in FIG. 6F, vibrant style control 626*b* includes control 628, tone parameter control 626*b*1 (e.g., for controlling a tone parameter for vibrant style 634*b*) and warmth parameter control 626*b*2 (e.g., for controlling a warmth parameter for vibrant style 634*b*), which are displayed using similar techniques as those described above (e.g., in relation to control 628, tone parameter control 626*a*1 and warmth parameter control 626*a*2 of FIG. 6C, respectively). Current tone value 626*b*1*b* is the default value (e.g., "80") for the tone parameter for vibrant style 634*b*, and current warmth value 626*b*2*b* is the default value (e.g., "0") for the warmth parameter for vibrant style 634*b*. Notably, the default value for the tone parameter for standard style 634*a* is different from the default value for the tone parameter for vibrant style 634*b*. Likewise, tone value range indicator 626*a*1*c* is different from tone value range indicator 626*b*1*c* because current tone value 626*a*1*b* and current tone value 626*b*1*b* are different (e.g., because each respective current value is positioned in a different range of a scale for the tone parameter). In some embodiments, a difference in default values for a particular type of parameter of respective media-processing styles leads to the defining of different media-processing styles.

Looking back at FIG. 6E, computer system 600 continued to display standard style control 626*a* and standard style identifier 636*a* and to display standard paging dot 638*a* as selected because a determination was not made that a greater portion (or an equal portion) of live preview 630 is displayed using vibrant style 634*b* than the portion of live preview 630 that is displayed using standard style 634*a* (e.g., and/or a determination was made that a greater portion (or an equal portion) of live preview 630 is displayed using standard style 634*a* than the portion of live preview 630 that is displayed using vibrant style 634*b*) in FIG. 6E. Turning back to FIG. 6F, in some embodiments, computer system 600 displays vibrant style control 626*b* and vibrant style identifier 636*b* and displays vibrant paging dot 638*b* as being selected because vibrant style 634*b* is displayed using a particular portion of live preview 630 (e.g., a portion at/near the center of live preview 630 and/or the display of computer system 600) and/or vibrant style 634*b* is currently being displayed at a boundary location of live preview 630 (e.g., in/near the center of live preview 630 and/or the display of computer system 600). At FIG. 6F, computer system 600 detects a third portion of movement input 650*d* on live preview 630 in a rightward direction. The third portion of movement input 650*d* is detected as moving in the opposite direction of the first portion and the second portion of movement input 650*d*.

As illustrated in FIG. 6F, in response to detecting the second portion of movement input 650*d*, computer system 600 changes the appearance of media-processing styles indicator 602*b*. At FIG. 6F, the appearance of media-processing styles indicator 602*b* is changed because the currently selected media-processing style has changed from the standard style 634*a* (e.g., FIG. 6E) to vibrant style 634*b* (e.g., in FIG. 6F) and the vibrant style 634*b* has a value for a parameter that is different (e.g., tone parameter) from a value of the parameter for standard style 634*a*. As illustrated in FIG. 6F, computer system 600 displays a line that travels around the perimeter of media-processing styles indicator 602*b* in a clockwise direction (e.g., with a starting point that is near the middle of the top portion of the perimeter (and/or border) of media-processing styles indicator 602*b*). The line is displayed to represent the current value (e.g., "80" in FIG. 6F) of the tone parameter. As illustrated in FIG. 6F, the line travels around the perimeter of media-processing styles indicator 602*b* based on a relationship between the current value of the tone parameter and a minimum value (e.g., "−100") and/or a maximum value (e.g., 100) to which the tone parameter can be set. Thus, as shown in FIG. 6F, the line travels around roughly eighty percent of the perimeter of media-processing style because the current value (e.g., "80") is eighty percent of the exemplary maximum value (e.g., "100"). Looking back at FIG. 6E, media-processing styles indicator 602*b* does not include a line that travels around the perimeter of media-processing styles indicator 602*b* because the current value (e.g., "0") of the tone parameter in FIG. 6E was zero percent of the minimum/maximum value to which the tone parameter could be set. In some embodiments, when the current value is a different value, the line travels around the perimeter and/or occupies a different amount (e.g., more or less) of the perimeter of media-processing styles indicator 602*b*.

As illustrated in FIG. 6F, the line travels around the perimeter of media-processing styles indicator 602*b* in the clockwise direction because the current value of the tone parameter is positive and/or above a median value (e.g., "0"). In some embodiments, when the current value of the tone parameter is negative or below a media value (e.g., "0"), the live travels around the perimeter of media-processing styles indicator 602*b* in a counter-clockwise direction. Thus, in some embodiments, the direction at which the line travels around the perimeter of media-processing styles indicator 602*b* indicates whether the value of the tone parameter is positive (or above a median value) or negative (or below a median value). In some embodiments, computer system 600 changes one or more other visual aspects (e.g., other than a line around the perimeter) of media-processing styles indicator 602*b* when the current value of the tone parameter (or another parameter) changes, such as changing a color of a portion of media-processing styles indicator 602*b* and/or a size of a portion of media-processing styles indicator 602*b*. In some embodiments, a gradual animation of the visual aspect changing is displayed by computer system 600. In some embodiments, the animation includes the line around the perimeter of media-processing styles indicator 602*b* moving in a clockwise or counter-clockwise direction from a position that corresponds to the previous value of a respective parameter to a position that corresponds to the current value of the respective parameter.

As illustrated in FIG. 6G, in response to detecting the third portion of movement input 650*d* (e.g., and while continuing to detect movement input 650*d*), computer system 600 moves the portions of live preview that are displayed using (e.g., individually using) standard style 634*a* and vibrant style 634*b* to the right based on the magnitude of the third portion of movement input 650*d*. As illustrated in FIG. 6G, in response to detecting the third portion of movement input 650*d*, computer system 600 displays the various portions of live preview 630 using a respective media-processing style and/or one or more user interface objects (e.g., standard style identifier 636*a*, standard paging dot 638*a* as selected, standard style control 626*a*) using one or more techniques as those described above in relation to FIGS. 6C-6E. At FIG. 6G, computer system 600 detects a fourth portion of movement input 650*d* on live preview 630 in a leftward direction. As illustrated in FIG. 6G, in response to detecting the third portion of movement input 650*d*, computer system 600 changes the appearance of media-processing styles indicator 602*b* by removing the line around the perimeter of media-processing styles indicator 602*b*. The line around the perimeter of media-processing styles indicator 602*b* is removed because the current value of the tone perimeter at FIG. 6G is zero and/or the current value of the tone perimeter at FIG. 6G is zero percent of the minimum/maximum value to which the tone parameter can be set. In some embodiments, in response to detecting the third portion of movement input 650*d*, computer system 600 displays an animation of the line around the perimeter of media-processing styles indicator 602*b* (e.g., at displayed in FIG. 6F) shrinking in a counter-clockwise direction (e.g., towards the top and center position of media-processing styles indicator 602*b*) until the line is no longer displayed (e.g., as shown in FIG. 6G) around the perimeter of media-processing styles indicator 602*b*.

As illustrated in FIG. 6H, in response to detecting the fourth portion of movement input 650*d* (e.g., and while continuing to detect movement input 650*d*), computer system 600 moves the portions of live preview 630 that are displayed using standard style 634*a* and vibrant style 634*b* to the left based on the magnitude of the third portion of movement input 650*d*. Because the fourth portion of movement input 650*d* had a greater magnitude than the third portion of movement input 650*d*, computer system 600 translates the portions of live preview 630 that are displayed using standard style 634*a* and vibrant style 634*b* across a greater distance in response to detecting the third portion of movement input 650*d* (e.g., in FIGS. 6G-6H) than the distance that the applications of standard style 634*a* and vibrant style 634*b* were translated in response to detecting the fourth portion of movement input 650*d* (e.g., in FIGS. 6F-6G). As illustrated in FIG. 6H, in response to detecting the fourth portion of movement input 650*d*, computer system 600 displays the majority of live preview 630 using vibrant style 634*b* and displays a lesser portion of live preview 630 using standard style 634*a*. As illustrated in FIG. 6H, in response to detecting the fourth portion of movement input 650*d*, computer system 600 also displays one or more user interface objects (e.g., vibrant style identifier 636*b*, vibrant paging dot 638*b* as selected, vibrant style control 626*b*) using one or more techniques as those described above in relation to FIG. 6F. At FIG. 6H, computer system 600 detects an end (e.g., liftoff) of movement input 650*d* (e.g., at the position that movement input 650*d* is shown in FIG. 6H).

As illustrated in FIG. 6I, in response to detecting the end of movement input 650*d*, computer system 600 displays the middle section using vibrant style 634*b*. Here, computer system 600 displays the middle section using vibrant style 634*b* because a determination was made that a greater portion of live preview 630 was displayed using the vibrant style 634*b* than the portions that were displayed using another media-processing style (e.g., standard style 634*a*) when (and/or before (e.g., immediately before) and/or after (e.g., immediately after)) the end of the movement input 650*d* was detected. Thus, at FIG. 6I, computer system 600 has made vibrant style 634*b* the currently selected media-processing style based on this determination. In some embodiments, computer system 600 displays the middle section using standard style 634*a* when a determination is made that a greater portion of live preview 630 was displayed using the standard style 634*a* than the portions that were displayed using another media-processing style (e.g., vibrant style 634*b*) when the end of the movement input 650*d* was detected. In some embodiments, computer system 600 displays the animation (e.g., a snapping animation) of the applications of standard style 634*a* and vibrant style

634*b* being translated (e.g., rapidly snapping) across the display from the position that each of standard style 634*a* and vibrant style 634*b* are displayed in FIG. 6H to the position that each of standard style 634*a* and vibrant style 634*b* are displayed in FIG. 6I.

As illustrated in FIG. 6I, in response to detecting the end of movement input 650*d* (e.g., and because a determination was made that a greater portion of live preview 630 was displayed using the vibrant style 634*b* than the portions that were displayed using another media-processing style when the end of the movement input 650*d* was detected), computer system 600 moves the application of standard style 634*a* to the left to display the left section using standard style 634*a*. In addition, computer system 600 also displays the right section using luxe style 634*c*. At FIG. 6I, luxe style 634*c* is indicated by the set of downward slanting lines (e.g., lines moving in the southeast direction when scanning from left to right). In some embodiments, computer system 600 displays the right section using luxe style 634*c* because a determination is made that luxe style 634*c* can be selected via a movement input (e.g., a movement input, such as movement input 650*k*1 as described below in relation to FIGS. 6K-6L).

As illustrated in FIG. 6J, some after detecting the end of movement input 650*d*, computer system 600 displays visual element 660*a* over the left section and visual element 660*b* over the right section and reduces the visual prominence of the left and the right section. In some embodiment, as a part of displaying visual element 660*a* over the left section and visual element 660*b* over the right section, computer system 600 displays an animation of standard style 634*a* and luxe style 634*c* fading out (e.g., and/or dissolving into visual element 660*a* and/or visual element 660*b*). At FIG. 6J, computer system 600 detects tap input 650*j* on shutter control 610.

As illustrated in FIG. 6K, in response to detecting tap input 650*j*, computer system 600 initiates capture of media represented by the FOV and updates media collection 612 to include a representation of the captured media (e.g., live preview 630 of FIG. 6J). The representation of captured media of FIG. 6K ("representation of FIG. 6K") has vibrant style 634*b* applied (e.g., includes set of upward slanting lines when scanning from left to right), which is different from the representation of FIG. 6B and the representation of FIG. 6D. Moreover, vibrant style 634*b* has been applied to the right, middle, and left sections of the representation of captured media, although the right and left sections of live preview 630 were not displayed using vibrant style 634*b* (e.g., when/while tap input 650*j* was detected). At FIG. 6K, vibrant style 634*b* is applied to a greater portion (and/or all of the) visual content of the captured media than what was applied to the visual content in the FOV that was used to display live preview 630. In some embodiments, in response to detecting the tap input on shutter control 610 and detecting movement input 650*d*, computer system 600 captures media, where a displayed representation of the captured media has the media-processing style that was applied to the greatest portion of live preview 630 when the tap input on shutter control 610 was detected (e.g., irrespective of whether another media-processing style was applied to a smaller portion of live preview 630 when tap input on shutter control was detected) (e.g., and without having any other media-processing styles being applied to the representation of the media, irrespective other whether another media-processing style was applied to a smaller portion of live preview 630 when tap input on shutter control was detected). At FIG. 6K, computer system 600 detects movement input 650*k*1 in the leftward direction (e.g., the same direction as the first portion of movement input 650*d* in FIG. 6D) or movement input 650*k*2 in a rightward direction (e.g., the opposite direction of movement input 650*d* in FIG. 6D).

As illustrated in FIG. 6L, in response to detecting movement input 650*k*1 (e.g., while continuing to detect movement input 650*k*1), computer system 600 displays a portion (e.g., including a left portion of the middle section) of live preview 630 using vibrant style 634*b* and a portion (e.g., including a right portion of middle section that was displayed using vibrant style 634*b* in FIG. 6K and right section) of live preview 630 using luxe style 634*c* (e.g., using one or more techniques as discussed above in relation to FIGS. 6C-6F). At FIG. 6L, in response to detecting the movement input 650*k*1, computer system 600 ceases to display vibrant style identifier 636*b* (e.g., "VIBRANT") and displays luxe style identifier 636*c* (e.g., "LUXE") (e.g., at the location at which vibrant style identifier 636*b* was previously displayed). In addition, computer system 600 also updates paging dots 638 to indicate that luxe paging dot 638*c* (e.g., hallow/open paging dot) is selected and that vibrant paging dot 638*b* is not selected (e.g., solid/closed paging dot). Here, computer system 600 displays luxe style identifier 636*c* and displays luxe paging dot 638*c* as being selected because a determination has been made that a greater portion (or an equal portion) of live preview 630 is displayed using luxe style 634*c* than the portion of live preview 630 that is displayed using vibrant style 634*b* and/or that luxe style 634*c* should be set as the currently selected media-processing style (e.g., using one or more techniques as described above in relation to detecting the movement input 650*d* in FIGS. 6H-6I). Because of this determination, computer system 600 also replaces vibrant style control 626*b* with luxe style control 626*c*, as illustrated in FIG. 6L. Luxe style control 626*c* includes control 628, tone parameter control 626*c*1 (e.g., for controlling a tone parameter for luxe style 634*c*), and warmth parameter control 626*c*2 (e.g., for controlling a warmth parameter for luxe style 634*c*), which are displayed using similar techniques as those described above (e.g., in relation to control 628, tone parameter control 626*a*1 and warmth parameter control 626*a*2 of FIG. 6C, respectively). Current tone value 626*c*1*b* is the default value (e.g., "50") for the tone parameter for luxe style 634*c*, and current warmth value 626*c*2*b* is the default value (e.g., "70") for the warmth parameter for luxe style 634*c*. Notably, the default values for the tone parameter and warmth parameter for luxe style 634*c* is different from the default values for the tone and warmth for standard style 634*a* (e.g., tone: 0, warmth: 0, as shown in FIG. 6C) and vibrant style 634*b* (e.g., tone: 80, warmth: 0, as shown in FIG. 6F). This denotes that the predefined luxe style 634*c* is different from the predefined standard style 634*a* and vibrant style 634*b*. In some embodiments, in response to movement input 650*k*2 in the rightward direction at FIG. 6K, computer system 600 displays one of the user interfaces in FIGS. 6D-6H (e.g., where the user interface that is displayed depends on the magnitude of movement input 650*k*2). At FIG. 6L, computer system 600 detects an end (e.g., liftoff) of movement input 650*k*1 (e.g., at the position that movement input 650*k*1 is shown in FIG. 6K).

As illustrated in FIG. 6L, in response to detecting movement input 650*k*1, computer system 600 changes the appearance of media-processing styles indicator 602*b*. In particular, computer system 600 changes two visual aspects of media-processing styles indicator 602*b*. At FIG. 6L, computer system 600 changes two visual aspects of media-processing styles indicator 602*b*, such that a change to a respective visual aspect represents a change (or the current value) of a respective parameter. While FIG. 6L illustrates computer system 600 changing the line around the perimeter of media-processing styles indicator 602*b* based on a change to the current value of the tone parameter and changing the color of media-processing styles indicator 602*b* based on a change to the current value of the warmth parameter, the way that media-processing styles indicator 602*b* is changed in FIG. 6L is merely exemplary. In some embodiments, computer system 600 changes a different visual aspect of media-processing styles indicator 602*b* based on the current value of the warmth parameter, the tone parameter, and/or a different parameter. In some embodiments, computer system 600 changes the line around the perimeter of media-processing styles indicator 602*b* based on a change to the current value of the warmth parameter and/or changes the color of media-processing styles indicator 602*b* based on the current value of the tone parameter.

As illustrated in FIG. 6L, because the current value (e.g., "50") of the tone parameter in FIG. 6L is less than the previous value (e.g., "80") of the tone parameter in FIG. 6K, computer system 600 updates the line (e.g., a first visual aspect) around the perimeter of media-processing styles indicator 602*b* (e.g., using one or more techniques as discussed above in relation to FIGS. 6F-6G) to occupy less of the perimeter of media-processing styles indicator 602*b* (e.g., shrinks the line in the counter-clockwise direction). However, because the current value (e.g., 50) of the tone parameter in FIG. 6L is positive like the previous value (e.g., "80") of the tone parameter in FIG. 6K, computer system 600 continues to display line around the media-processing styles indicator 602*b* as traveling (e.g., oriented in such a way that the line appears to travel) in the clockwise direction. As illustrated in FIG. 6L, computer system 600 changes the color (e.g., a second visual aspect) of media-processing styles indicator 602*b*. Here, computer system 600 changes the color of media-processing styles indicator 602*b* to represent the current value (e.g., "70") of the warmth parameter, which is different from the previous value (e.g., "0") of the warmth parameter. As illustrated in FIG. 6L, the color of media-processing styles indicator 602*b* of FIG. 6L is a darker gray than the color of media-processing styles indicator 602*b* of FIG. 6K. As the current value of the warmth parameter increases, computer system 600 adds more dark grey to the color of media-processing styles indicator 602*b*, where the amount of dark gray is roughly equal to percentage of the current value (e.g., "70") of the warmth parameter and the maximum (e.g., "100") and/or minimum value of the warmth parameter. Thus, as illustrated in FIG. 6L, computer system 600 displays media-processing styles indicator 602*b* as having seventy percent of the maximum amount of dark grey. In some embodiments, computer system 600 darkens the color of media-processing styles indicator 602*b* as the value of the warmth parameter increases and/or decreases. In some embodiments, computer system 600 increases the amount of a first color (e.g., red) that makes up the color of media-processing styles indicator 602*b* as the current value increases above a median value (e.g., "0"). In some embodiments, computer system 600 decreases the amount of the first color (e.g., red) that makes up the color of media-processing styles indicator 602*b* as the value decreases towards a median value (e.g., "0") (e.g., between the maximum value and the median value). In some embodiments, computer system 600 increases the amount of a second color (e.g., blue) that makes up the color of media-processing styles indicator 602*b* as the current value decreases below a median value (e.g., "0"). In some embodiments, computer system 600 decreases the amount of the first color (e.g., red) that makes up the color of media-processing styles indicator 602*b* as the value increases towards a median value (e.g., "0") (e.g., between minimum value and the median value). In some embodiments, computer system 600 changes the color of the line around the perimeter of media-processing styles indicator 602*b* based on a change in the current value of the warmth parameter.

As illustrated in FIG. 6M, in response to detecting the end of movement input 650*k*1, computer system 600 displays the middle section using luxe style 634*c*, the left section using vibrant style 634*b*, and the right section using vintage style 634*d*. Computer system 600 displays the middle section using luxe style 634*c*, the left section using vibrant style 634*b*, and the right section using vintage style 634*d* because a determination was made that luxe style 634*c* should be set as the currently selected media-processing style (e.g., using one or more techniques as described above in relation to detecting the end of movement input 650*d* in FIGS. 6H-6I). At FIG. 6M, computer system 600 detects tap input 650*m* on mode-and-settings toggle 616.

As illustrated in FIG. 6N, in response to detecting tap input 650*m*, computer system 600 ceases display of luxe style identifier 636*c* and paging dots 638 and displays zoom controls 622 (e.g., at the location in which one or more of luxe style identifier 636*c* and paging dots 638 were previously displayed). As illustrated in FIG. 6N, in response to detecting tap input 650*m*, computer system ceases display of luxe style control 626*c* and displays camera mode controls 620 (e.g., at the location in which luxe style control 626*c* was previously displayed in FIG. 6M). In response to detecting tap input 650*m*, computer system 600 updates the display of media-processing styles indicator 602*b* to the inactive state. Thus, in response to detecting tap input 650*m*, computer system 600 continues to display a portion of the representation using the luxe style 634*c* (e.g., that was selected in FIG. 6M when the style was displayed in the middle section of computer system 600 while an input was not detected). However, computer system 600 ceases to display the right section and the left section using a different media-processing style than luxe style 634*c* and/or with a visual element in response to detecting tap input 650*m*. In some embodiments, computer system 600 ceases to display the right section and the left section using a different media-processing style than luxe style 634*c* and/or with a visual element because a movement input on live preview 630 would not cause portions of live preview 630 to be displayed using a different media-processing style (e.g., would not cause a change in which media-processing styles are used) in FIG. 6N. At FIG. 6N, computer system detects movement input 650*n*1 on camera mode controls 620 in a leftward direction or movement input 650*n*2 on live preview 630 in a leftward direction.

At FIG. 6O, in response to detecting movement input 650*n*1 or 650*n*2, computer system 600 is transitioned from operating in the photo capture mode to operating in the portrait capture mode. As illustrated in FIG. 6O, in response to detecting movement input 650*n*1 or 650*n*2, computer system 600 moves camera mode controls 620 to the left and displays portrait mode control 620*d* as being selected (e.g., bold portrait mode control 620*d*). While operating in the portrait mode, computer system 600 maintains display of at least a portion of live preview 630 using luxe style 634*c* (e.g., which was selected in 6M). Thus, media-processing styles can be applied to representations of media (e.g., live preview 630) while computer system 600 is configured to captured other types of media (e.g., photo media, video media, and/or portrait media, panoramic media). In some embodiments, in response to detecting movement input **650*n*2 while media-processing styles indicator 602*b* is displayed in an active state (and/or while the styles user interface objects are displayed), computer system 600 is not transitioned to operate in a different capture mode (e.g., computer system 600 continues to operate in the same capture mode in which computer system 600 operated before movement input 650*n*2 was detected). In some embodiments, in response to detecting movement input 650*n*2 while media-processing styles indicator 602*b* is in an inactive state, computer system 600 is transitioned to operate in a different capture mode (e.g., as shown in FIGS. 6N-6O). In some embodiments, computer system 600 would transition to operating in the portrait capture mode in response to input 650*n*1 being detected, irrespective of whether or not media-processing styles indicator 602*b* is in the active state or inactive state. Thus, in some embodiments, computer system 600 can respond to a movement input differently based on the location of the movement input and whether the computer system is currently displaying a set of styles user interface objects. As illustrated in FIG. 6O, in response to detecting movement input 650*n*1 or 650*n*2, computer system 600 also displays indicators for the portrait capture mode (e.g., f-stop indicator 602*d*) in indicator region 602 and controls for the portrait mode in control region 606 (e.g., lighting effect controls 678, zoom control 622*b*) that were not displayed while computer system 600 was operating in photo capture mode in FIG. 6N. Moreover, in response to detecting movement input 650*n*1 and 650*n*2, computer system 600 ceases display of indicators for the photo capture mode (e.g., animated image indicator 602*c*) in indicator region 602 and controls for the photo mode in control region 606 (e.g., zoom control 622*a* and zoom control 622*c*) that were displayed when computer system 600 was operating in portrait mode in FIG. 6N. In some embodiments, in response to detecting a movement input at FIG. 6N on live preview 630, computer system 600 is transitioned from operating in the portrait capture mode to operating in a different capture mode (e.g., using similar techniques as those described above in relation to movement input 650*n*1 or 650*n*2) because computer system is not displaying the styles user interface and/or the plurality of selectable user interface objects for controlling media-processing styles. In some embodiments, in response to detecting a movement input (e.g., at a similar location of movement input 650*n*1 or movement input 650*n*2), computer system 600 is transitioned from operating in the portrait capture mode to operating in a different capture mode and maintains (or while maintaining) display of at least a portion of live preview 630 using the currently selected style (e.g., luxe style 634*c* selected in 6M)). In some embodiments, in response to detecting that movement input 650*n*1 or movement input 650*n*2 had a particular magnitude (e.g., a greater magnitude) and/or a was in a different than movement input 650*n*1 or movement input 650*n*2, computer system 600 is transitioned from operating in the photo mode to operate in a mode that is different from the portrait mode (e.g., panoramic mode and/or video mode) and maintains (or while maintaining) display of at least a portion of live preview 630 using the currently selected style (e.g., luxe style 634*c* selected in 6M)). In some embodiments, in response to detecting a request to capture media, computer system 600 capture portrait media and applies the currently selected media-processing style (e.g., luxe style 634*c*) to the captured portrait media. Thus, in some embodiments, computer system 600 can apply the currently selected media-processing style to different types of media (e.g., portrait media at FIG. 6O and photo media at FIG. 6C). At FIG. 6O, computer system detects tap input 650*o* on media-processing styles indicator 602*b***.

As illustrated in FIG. 6P, in response to detecting tap input **650*o*, computer system 600 re-displays one or more styles user interface objects, including luxe style identifier 636*c*, paging dots 638, luxe style control 626*c*, and visual elements 660*a* and 660*b* (e.g., using one or more techniques as described above in relation to FIG. 6M) while continuing to operate in the portrait mode. In some embodiments, in response to detecting a movement input on live preview 630, computer system 600 displays different portions of live preview 630 using different media-processing styles (e.g., using one or more techniques described above in relation to FIGS. 6C-6P) while continuing to operate in the portrait mode. Thus, in some embodiments, different media-processing styles can be selected while computer system 600 is operating in different capture modes. In some embodiments, in response to detecting a tap input on shutter control 610, computer system 600 captures portrait media, where a representation of the portrait media is displayed as luxe style 634*c* (e.g., because style 634*c* is selected in FIG. 6P). In some embodiments, in response to detecting an input on f-stop indicator 602*d*, computer system 600 re-displays the user interface of FIG. 6O (e.g., ceases to display the styles user interface and/or the plurality of selectable user interface objects for controlling media-processing styles). At FIG. 6P, computer system 600 detects tap input 650*p* on media collection 612**.

As illustrated in FIG. 6Q, in response to detecting tap input **650*p*, computer system 600 displays a media viewer user interface that includes control region 670, media viewer region 672, and control region 674. Control region 670 includes back control 670*a*, current time 670*b*, and media gallery control 670*c*. Control region 674 includes multiple controls and thumbnail representations of media 676, including thumbnail representations 676*a*-676*d*. Thumbnail representations 676*a*-676*d* were previously displayed as a part of media collection 612 in FIGS. 6A-6Q. Media viewer region 672 includes media representation 680*d*. As illustrated in FIG. 6Q, media representation 680*d* is a representation of the media that was captured in response to detecting input 650*j*. As illustrated in FIG. 6Q, media representation 680*d* is displayed using vibrant style 634*b*, which was the currently selected media-processing style when the media that corresponds to media representation 680*d* was captured. At FIG. 6Q, computer system 600 detects tap input 650*q* on back control 670*a***.

As illustrated in FIG. 6R, in response to detecting tap input **650*q*, computer system 600 re-displays the user interface of FIG. 6O, where live preview 630 at FIG. 6R is displayed using luxe style 634*c*. At FIG. 6R, live preview 630 is displayed using luxe style 634*c* because computer system 600 has maintained luxe style 634*c* as the currently selected media-processing style even though computer system 600 has navigated away from the camera application to the media viewer application. Thus, in some embodiments, computer system 600 maintains the currently selected media-processing style between sessions of using the camera application. In some embodiments, computer system 600 maintains luxe style 634*c* as the currently selected media-processing style until a new media-processing style is selected and/or luxe style 634*c* is modified (e.g., as discussed below in FIGS. 7A-7X). In some embodiments, in response to detecting tap input 650*q*, computer system 600 re-displays the user interface of FIG. 6Q instead of FIG. 6O, showing the styles user interface and/or selectable user interface objects for controlling media-processing styles. At FIG. 6R, computer system 600 detects tap input 650***r* on media collection 612.

As illustrated in FIG. 6S, in response to detecting tap input 650*r*, computer system 600 re-displays the user interface of FIG. 6Q, which includes media representation 680*d*. As illustrated in FIG. 6S, computer system 600 detects movement input 650*s* on media representation 680*d*. As illustrated in FIG. 6T, in response to detecting movement input 650*s*, computer system 600 replaces media representation 680*d* with media representation 680*c*. Media representation 680*c* is displayed using standard style 634*a* because it is a representation of the media that was captured in response to detecting input 650*c* when standard style 634*a* was the currently selected media-processing style in FIG. 6C. In some embodiments, the media viewer user interface includes one or more options to change the media-processing style that is applied to media that has already been captured, such as the media represented by media representation 680*c* and media representation 680*d*. Thus, in some embodiments, the computer system applies a different media processing style to previously captured media that was not originally captured when the different media processing style was the currently selected processing style. At FIG. 6T, computer system 600 detects tap input 650*t* on media gallery control 670*c*.

As illustrated in FIG. 6U, in response to detecting tap input 650*t*, computer system 600 displays a media gallery user interface. The gallery user interface includes back control 686 and representations of media that have been captured using a media-processing style (e.g., standard style 634*a* (e.g., represented by the pattern that includes horizontal lines), vibrant style 634*b* (e.g., represented by the pattern that includes upward slanting lines), luxe style 634*c* (e.g., represented by the pattern that includes downward slanting lines), and vintage style 634*d* (e.g., represented by the pattern that includes vertical lines). In some embodiments, media represented by the representations of media included in the media gallery user interface are different types of media (e.g., still photo media, portrait media, video media, panoramic media, slow-motion media, etc.). In some embodiments, the media represented by the representations of media included in the media gallery user interface were captured while the different media-processing style was selected and/or while computer system 600 was configured to operate in different capture modes. At FIG. 6U, computer system 600 detects tap input 650*u* on back control 686.

As illustrated in FIG. 6V, in response to detecting tap input 650*u*, computer system 600 ceases to display the media gallery user interface (e.g., of FIG. 6U) and re-displays the camera user interface of FIG. 6R, where live preview 630 at FIG. 6R is displayed using luxe style 634*c*. At FIG. 6V, computer system 600 detects tap input 650*v* on raw capture indicator 602*e*. As illustrated in FIG. 6W, in response to detecting tap input 650*v*, computer system 600 ceases to display media-processing styles indicator 602*b* and ceases to apply a media-processing style to a portion of live preview 630. As illustrated in FIG. 6W, in response to detecting tap input 650*v*, computer system 600 slides raw capture indicator 602*e* over to the left to the location in which media-processing styles indicator 602*b* was previously displayed. At FIG. 6W, in response to detecting tap input 650*v*, computer system 600 is transitioned from being configured to store and/or capture media in a non-raw media format to a raw format and displays raw capture control 602*e* as being active. In some embodiments (as discussed above), computer system 600 does not apply a selected media-processing style to media that is stored in the raw format. Thus, in some embodiments, computer system 600 is not able to be configured to store and/or capture media in the raw format while also being configured to apply a media-processing style to captured media. At FIG. 6W, computer system 600 detects upward swipe input 650*w* at a location on the camera user interface (e.g., on and/or below one or more camera mode affordances 620).

As illustrated in FIG. 6X, in response to detecting upward swipe input 650*w*, computer system 600 replaces camera mode controls 620 of FIG. 6W with camera setting controls 688. Camera setting controls 688 includes flash setting control 668*a* that, when selected, causes computer system 600 to display one or more options for adjusting a flash mode (e.g., turning flash mode on and/or off), media-processing style control 688*b*, exposure compensation control 688*f* that, when selected, computer system 600 to display one or more options (e.g., a slider) adjusting an exposure compensation value, timer control 688*g* that, when selected, causes computer system 600 to display one or more options for adjusting a duration of a timer, filter control 688*h* that, when selected, causes computer system 600 to display one or more options for adjusting a filter that is applied to media, and f-stop control 688*i* that, when selected, causes computer system 600 to display one or more options for adjusting an f-stop value. In particular, the camera setting controls displayed in FIG. 6X reflect some of the camera settings that are available while computer system 600 is operating in the portrait mode (e.g., as shown in FIG. 6W by "PORTRAIT" being bolded). In some embodiments, one or more other camera setting controls are displayed and/or one or more of the same camera setting controls in response to detecting upward swipe input 650*w* while computer system 600 is operating in a different camera mode. At FIG. 6X, computer system 600 detects tap input 650*x*1 on media-processing style control 688*b*.

As illustrated in FIG. 6Y, in response to detecting tap input 650*x*1, computer system 600 displays raw capture control 602*e* as being inactive (and/or the computer system is configured to capture non-raw media and not configured to capture raw media) and re-applies re-displays the camera user interface of FIG. 6L, where a portion of live preview 630 at FIG. 6R is displayed using luxe style 634*c* (e.g., along with one or more other portions of live preview 630 being displayed with other media-processing style) and luxe style control 626*c* is displayed. In some embodiments, in response to detecting tap input 650*x*1, computer system 600 re-displays the camera user interface of FIG. 6R, where live preview 630 at FIG. 6R is displayed using luxe style 634*c*. In some embodiments in response to detecting tap input 650*x*2 on raw capture control 602*e* in FIG. 6X, computer system 600 re-displays the camera user interface of FIG. 6L or re-displays the camera user interface of FIG. 6R. In some embodiments, in response to detecting tap input 650*x*2 on raw capture control 602*e* in FIG. 6X, computer system 600 displays raw capture control 602*e* as being inactive (and/or the computer system is configured to capture non-raw media and not configured to capture raw media) while not applying a media-processing style to a portion of live preview 630 (e.g., continuing to display of live preview 630 of FIG. 6X without a media-processing style applied).

FIGS. 7A-7X illustrate exemplary user interfaces for editing media-processing styles using a computer system in accordance with some embodiments. The user interfaces in these figures are used to illustrate the processes described below, including the processes in FIGS. 9 and 10A-10B.

FIG. 7A illustrates computer system 600 displaying a camera user interface (e.g., using one or more techniques as described above in relation to FIG. 6C). In particular, computer system 600 is displaying media-processing styles indicator 602*b* in an active state, the middle section using standard style 634*a*, and the right section and the left section without using the media-processing style (e.g., using one or more techniques as described above in relation to FIG. 6C). Moreover, computer system 600 is displaying the right section with visual element 660*b*, paging dots 638 with standard paging dot 638*a* being selected, and standard style control 626*a* that includes control 628, tone parameter control 626*a*1, and warmth parameter control 626*a*2 (e.g., using one or more techniques as described above in relation to FIG. 6C). As illustrated in FIG. 7A, computer system 600 also is displaying tone parameter control 626*a*1 includes tone parameter identifier 626*a*1*a*, current tone value 626*a*1*b*, and tone value range indicator 626*a*1*c*, and warmth parameter control 626*a*2 includes warmth parameter identifier 626*a*2*a*, current warmth value 626*a*2*b*, and warmth value range indicator 626*a*2*c* (e.g., using one or more techniques as described above in relation to FIG. 6C). At FIG. 7A, computer system 600 detects a portion of movement input 750*a* on tone parameter control 626*a*1.

Figure 7B:
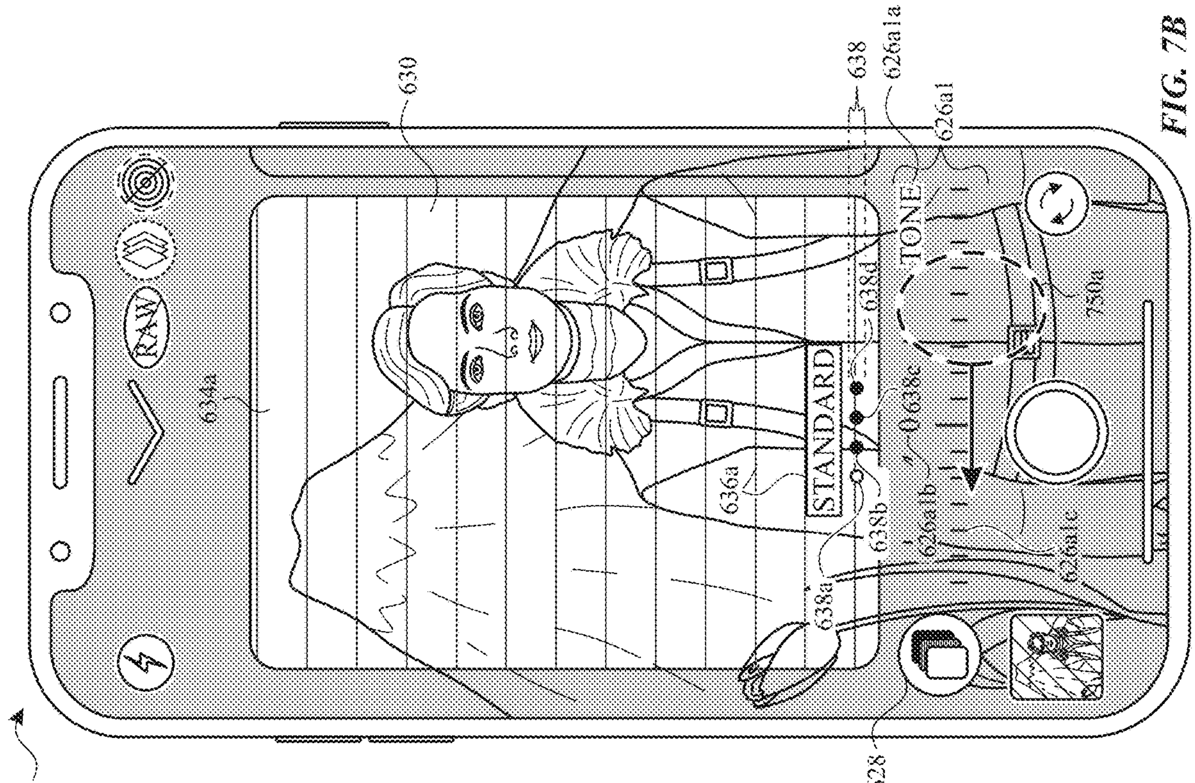
FIGS. 7A-7X illustrate exemplary user interfaces for editing media-processing styles using a computer system in accordance with some embodiments.
Figure 7A:
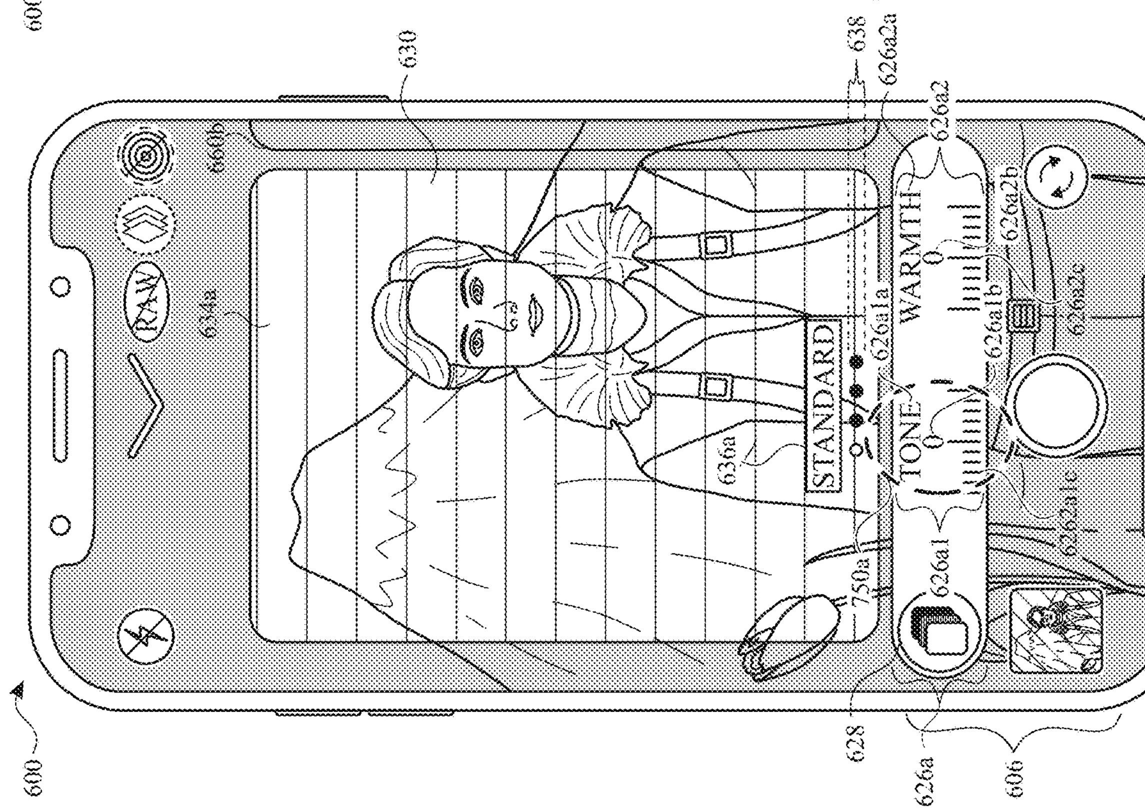
Figure 7D:
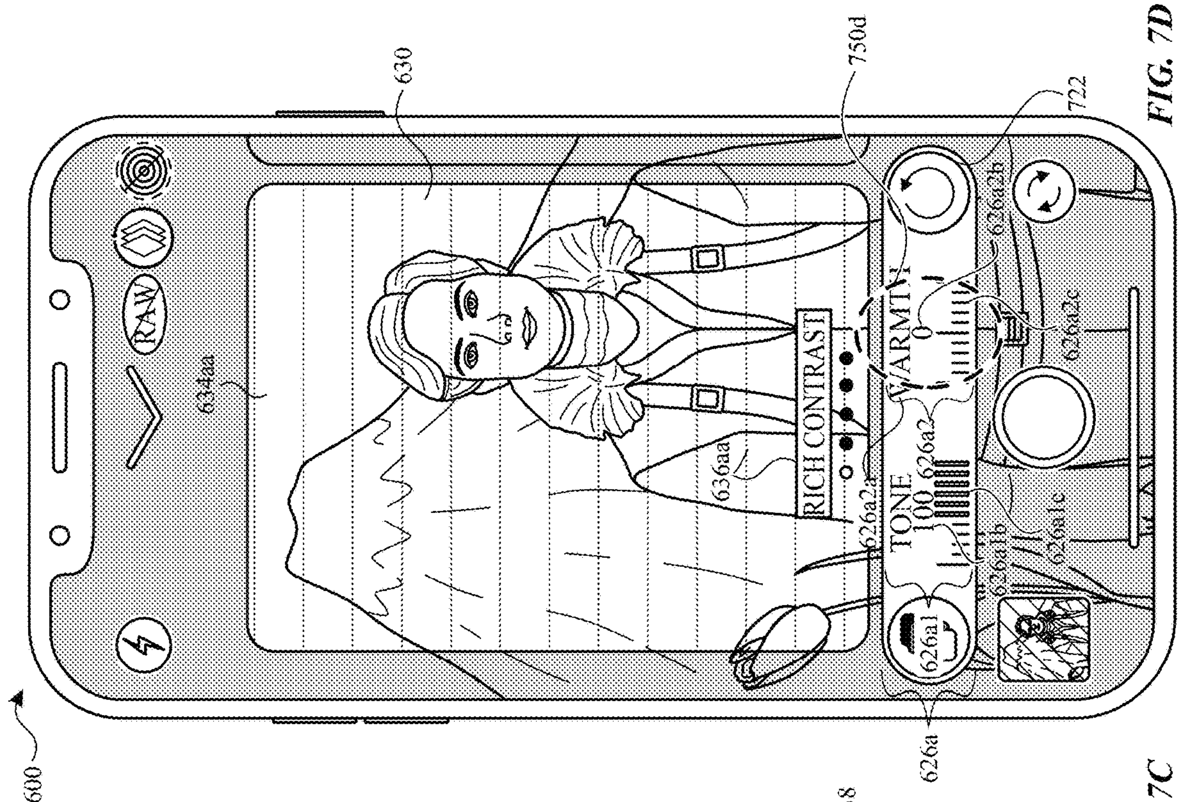
Figure 8B:
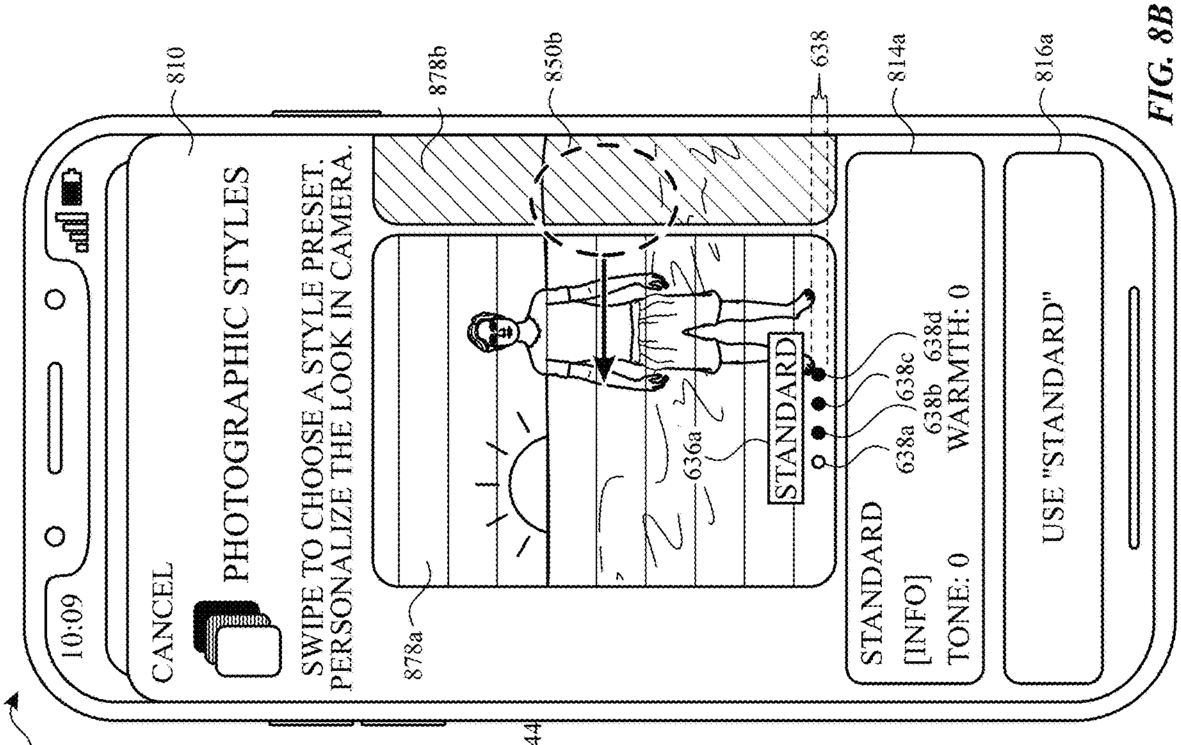
FIGS. 8A-8C illustrate exemplary user interfaces for selecting media-processing styles using a computer system in accordance with some embodiments.
Figure 8A:
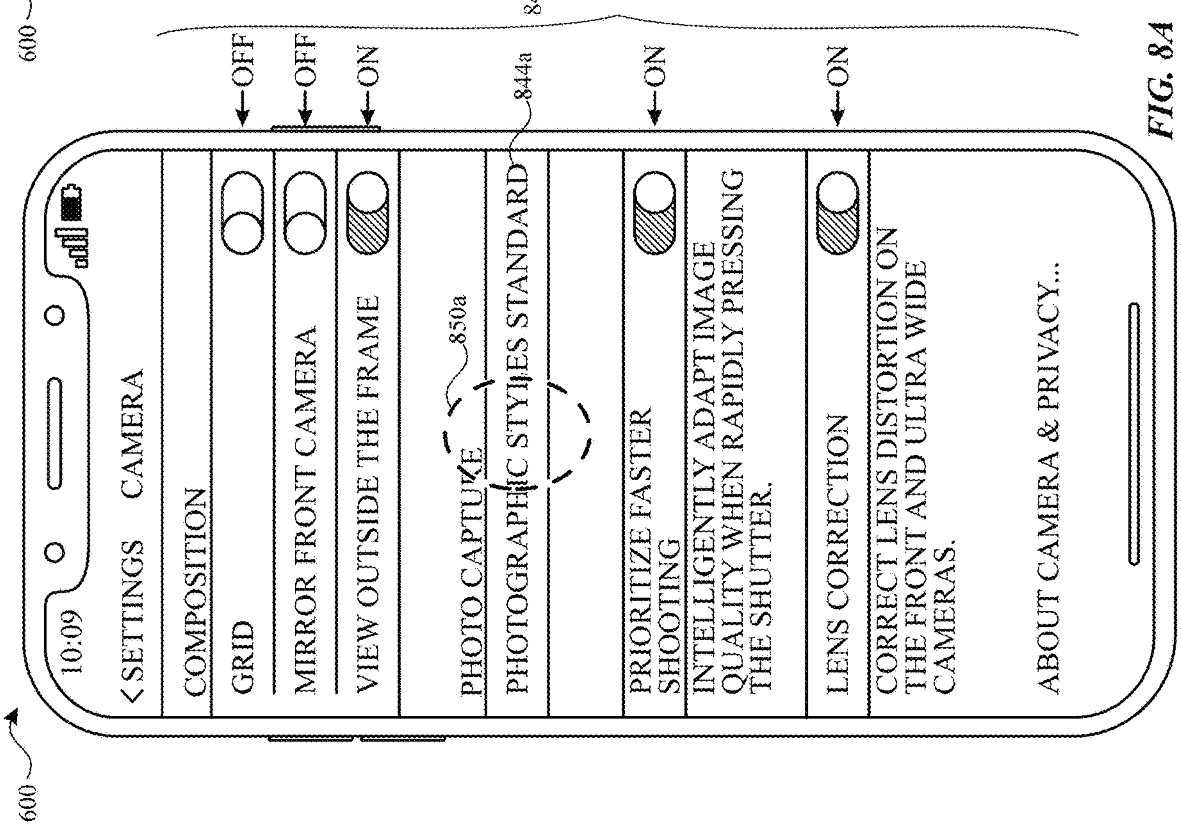
Figure 8C:
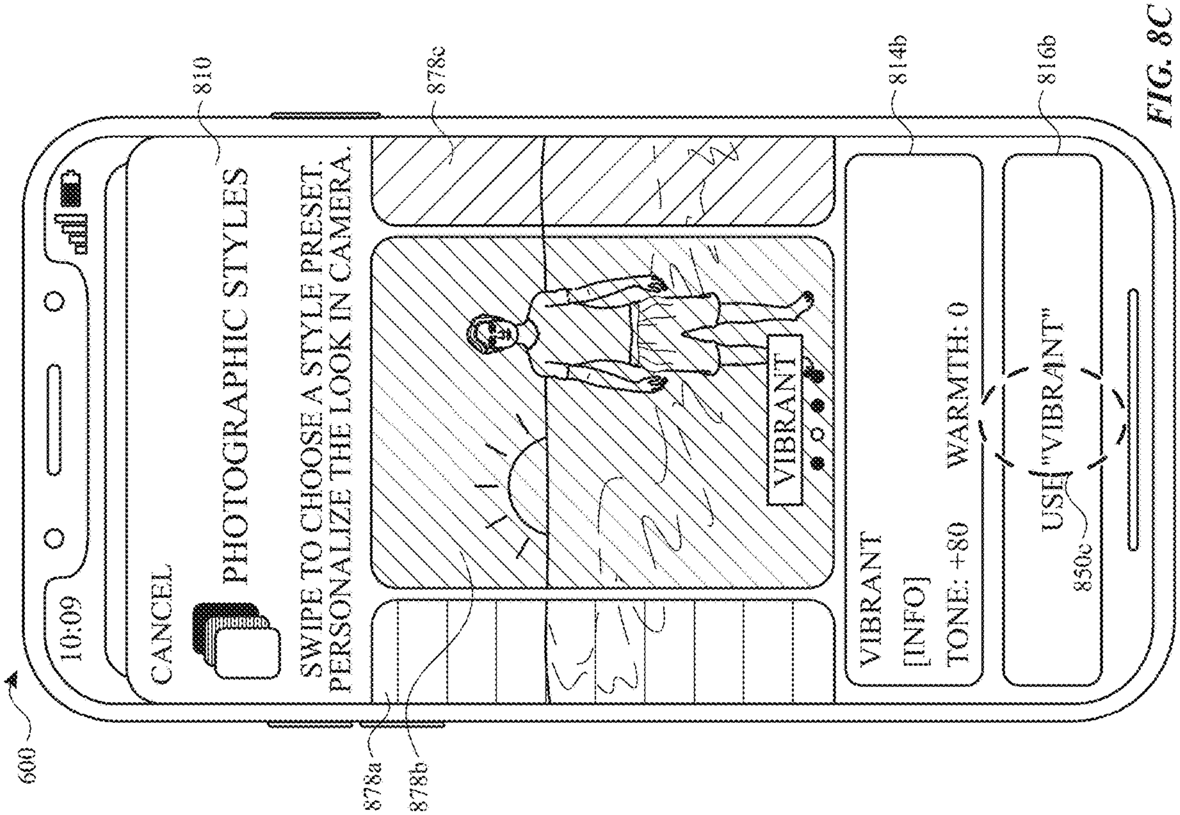

As illustrated in FIG. 7B, in response to detecting the portion of movement input 750*a* at FIG. 7A (e.g., and while continuing to detect movement input 750*a*), computer system 600 expands tone parameter control 626*a*1 and ceases to display warmth parameter control 626*a*2. In particular at FIG. 7B, computer system 600 expands tone parameter control 626*a*1 and/or tone value range indicator 626*a*1*c* in-line (e.g., across a position and/or along a line in which tone parameter control 626*a*1 was displayed in FIG. 7B). When expanding tone parameter control 626*a*1, computer system 600 increases the size of tone value range indicator 626*a*1*c*, such that the tick marks of tone value range indicator 626*a*1*c* of FIG. 7B are larger and further apart than the tick marks of tone value range indicator 626*a*1*c* of FIG. 7A. Moreover, the tick marks of tone value range indicator 626*a*1*c* of FIG. 7B represents more values than the tick marks of tone value range indicator 626*a*1*c* of FIG. 7A (e.g., tone value range indicator 626*a*1*c* of FIG. 7B has more tick marks than tone value range indicator 626*a*1*c* of FIG. 7A). In other words, in response to detecting the portion of movement input 750*a* at FIG. 7A, computer system 600 zooms into tone parameter control 626*a*1 and/or tone value range indicator 626*a*1*c* (which, in some embodiments, makes it easier for a user to change a value of tone parameter control 626*a*1). As illustrated in FIG. 7B, in response to detecting the portion of movement input 750*a* at FIG. 7A, computer system 600 displays current tone value 626*a*1*b* (e.g., "0") of FIG. 7B at a different position on the display than current tone value 626*a*1*b* of FIG. 7A was displayed. Although computer system 600 has moved current tone value 626*a*1*b* of FIG. 7B, computer system 600 continues to display current tone value 626*a*1*b* of FIG. 7B in a central position of tone value range indicator 626*a*1*c* (e.g., as current tone value 626*a*1*b* of FIG. 7A was displayed). Moreover, in response to detecting the portion of movement input 750*a* at FIG. 7A, computer system 600 moves tone parameter identifier 626*a*1*a* to the right side of control region 606. At FIG. 7B, computer system 600 detects another portion of movement input 750*a* on tone value range indicator 626*a*1*c* (e.g., while continuing to detect movement 750*a*). Computer system 600 detects the portion of movement input 750 in a leftward direction. In some embodiments, the portion of movement input 750*a* detected at FIG. 7A is a tap input, and the portion of movement input 750*a* detected at FIG. 7B is a movement input (e.g., in some embodiments, a user can tap to expand the control and, then, provide an input to adjust the current value for the parameter of the control). In some embodiments, the portion of movement input 750*a* detected at FIG. 7A and the portion of movement input 750*a* detected at FIG. 7B are separate inputs that are independently detected. In some embodiments, in response to the portion of movement input 750*a* (e.g., tap input) detected at FIG. 7A being received, computer system 600 expands tone parameter control 626*a*1, irrespective of whether the portion of movement input 750*a* detected at FIG. 7A continues to be detected. In some embodiments, in response to detecting the portion of movement input 750*a* that is a tap input, computer system 600 expands tone parameter control 626*a*1, and if no additional inputs are detected on the expanded tone parameter control 626*a*1 and/or on the camera user interface within a threshold period of time (e.g., 5, 20, 30, 40, 75 seconds) re-displays warmth parameter control 626*b*1.

Figure 7C:
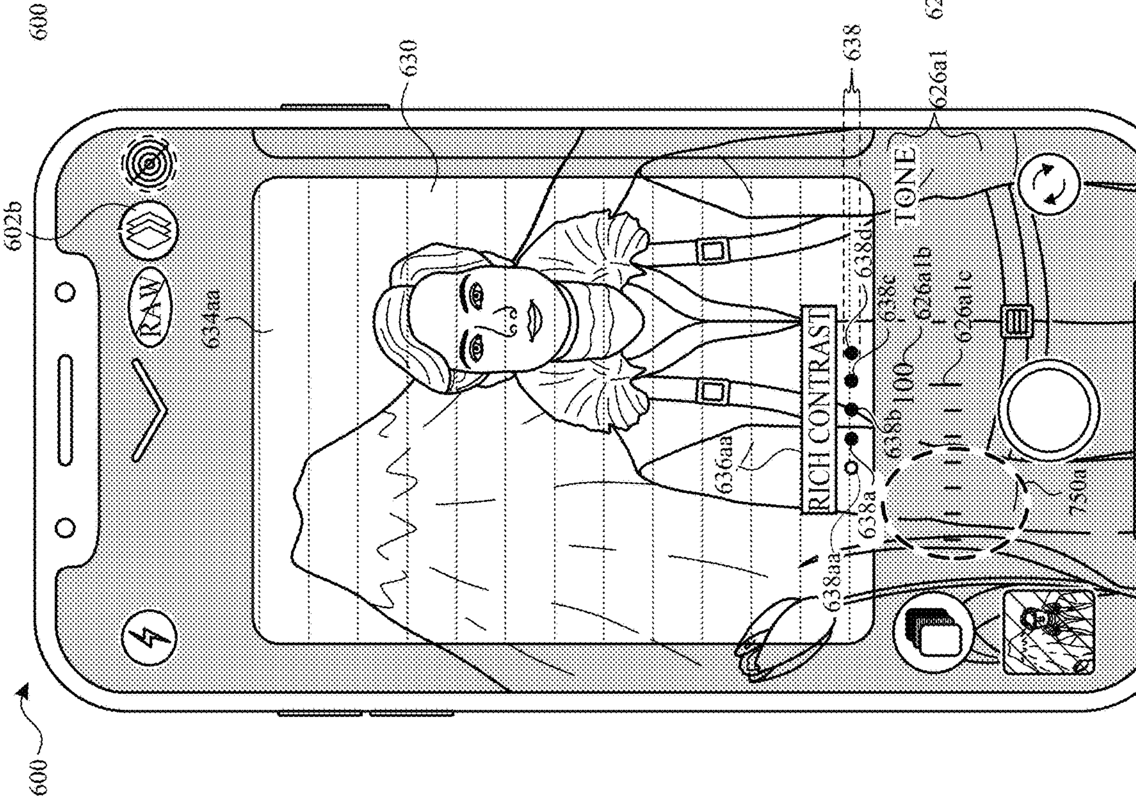
Figure 7F:
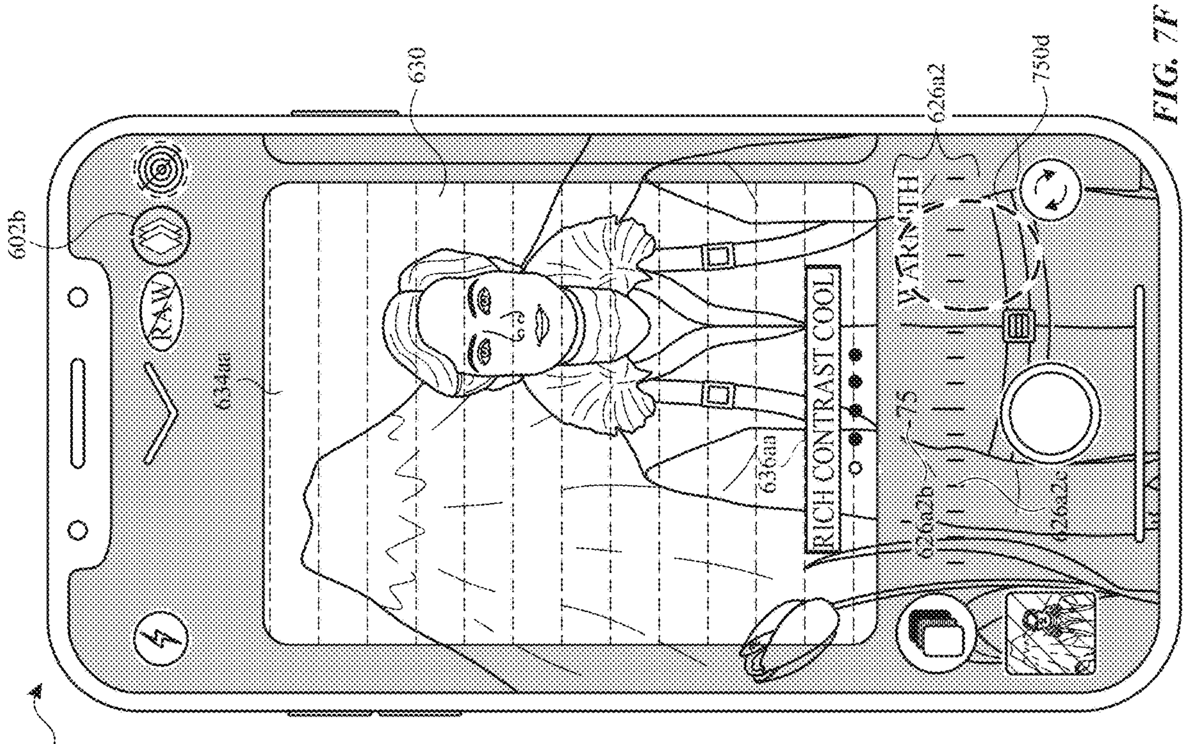

As illustrated in FIG. 7C, in response to detecting the portion of movement input 750*a* at FIG. 7B (e.g., that is moving in the leftward direction), computer system 600 moves the tick marks of tone value range indicator 626*a*1*c* to the left (e.g., based on the magnitude of movement input 750*a* detected at FIG. 7B) and updates current tone value 626*a*1*b* from "0" (e.g., in FIG. 7B) to "100" (e.g., in FIG. 7C). While updating current tone value 626*a*1*b* from "0" (e.g., in FIG. 7B) to "100" (e.g., in FIG. 7C) based on a movement characteristic (e.g., speed, acceleration, and/or velocity) of the portion of movement input 750*a* detected at FIG. 7B (e.g., that is moving in the leftward direction), computer system 600 updates the appearance of media-processing styles indicator 602*b*. At FIG. 7C, computer system 600 updates the appearance of media-processing styles indicator 602*b* by increasing the size of a line in a clockwise direction around the perimeter of media-processing styles indicator 602*b* based on a movement characteristic of the portion of movement input 750*a* detected at FIG. 7B. Notably, although the current value (e.g., "100") is the maximum value at which the tone parameter can be set, computer system 600 the line does not completely surround the perimeter of media-processing styles indicator 602*b*. The line does not completely surround the perimeter of media-processing styles indicator 602*b* (e.g., is displayed with a gap near the top portion of the perimeter of media processing styles indicator 602*b*) to show that the line has traveled around media-processing styles indicator 602*b* in the clockwise direction (e.g., to denote a positive value) while the tone parameter is set to the maximum value. In some embodiments, when the current value of the tone parameter is set to the minimum value of the tone parameter (e.g., "−100"), computer system 600 displays a gap on the other side of the top portion of media processing styles indicator 602*b* (e.g., vertical line showing start of line would be connected to the left portion of the line in FIG. 7C and a gap would be between the vertical line and the right portion of the line in FIG. 7C) to show that the line has traveled around media-processing styles indicator 602*b* in the counter-clockwise direction (e.g., to denote a negative value value) while the current value of the tone parameter is set to the minimum value of the tone parameter.

In addition to updating current tone value 626*a*1*b* and media processing styles indicator 602*b*, computer system 600 replaces standard style identifier 636*a* with custom standard style identifier 636*aa* and adds custom standard paging dot 638*aa* to the left of standard paging dot 638*a* in paging dots 638. In other words, at FIG. 7C, computer system 600 adds a custom version of standard style 634*a* to the set of available styles in response to updating current tone value 626*a*1*b* from the default value ("0") to the modified value ("100"). As illustrated in FIG. 7C, standard style identifier 636*aa* includes the words "RICH CONTRAST" because current tone value 626*a*1*b* at FIG. 7C is greater than the default tone value ("0" in FIG. 7B) of standard style 634*a*. Thus, computer system 600 can determine a name of a custom media-processing style based on how a parameter for a custom media-processing style differs from a default parameter of a media-processing style. Accordingly, at FIG. 7C, computer system 600 does not update the default value of the tone parameter of standard style 634*a* (e.g., as shown in FIG. 7C) but, instead, creates a modified version of standard style 634*a* with the updated value. Thus, in some embodiments, a user can access the modified version of standard style 634*a* (e.g., custom standard style 634*aa*) at a later time.

As illustrated in FIG. 7C, in response to detecting the portion of movement input 750*a* at FIG. 7B, computer system 600 updates the middle section of live preview 630, such that the middle section is displayed using custom standard style 634*aa* in FIG. 7C instead of using standard style 634*a* in FIG. 7B. It should be understood that computer system 600 displays custom standard style 634*aa* in FIG. 7C with an increased amount of tone (e.g., "100") than the tone of standard style 634*a* (e.g., "0") to reflect the change in the value of the tone parameter for the standard media-processing style. For illustrative purposes only, custom standard style 634*aa* (e.g., in FIG. 7C) is shown with the same pattern (e.g., horizontal lines) as standard style 634*a* (e.g., in FIG. 7B) to indicate that custom standard style 634*aa* is a modified version of standard style 634*a*. However, the lines of custom standard style 634*aa* are dotted instead of solid like the lines of standard style 634*a* of FIG. 7B to illustrate that custom standard style 634*aa* is different from standard style 634*a*. At FIG. 7C, computer system 600 continues to display the expanded version of tone parameter control 626*a*1 because computer system 600 is still detecting movement input 750*a* at FIG. 7C. In some embodiments, computer system 600 continues to display the expanded version of tone parameter control 626*a*1, irrespective of whether computer system 600 continues to detect movement input 750*a* at FIG. 7B. At FIG. 7C, computer system 600 detects an end (e.g., liftoff) of movement input 750*a*.

As illustrated in FIG. 7D, in response to detecting the end of movement input 750*a*, computer system 600 shrinks (e.g., reduces the size of) tone parameter control 626*a*1 and re-displays warmth parameter control 626*a*2. As illustrated in FIG. 7D, tone parameter control 626*a*1 and warmth parameter control 626*a*2 are displayed at the same position and at the same size as they were displayed in FIG. 7B. At FIG. 7D, computer system 600 displays the same version of warmth parameter control 626*a*2 that was displayed before movement input 750*a* was detected (e.g., warmth parameter control 626*a*2 of FIG. 7B). Thus, the display of warmth parameter identifier 626*a*2*a*, current warmth value 626*a*2*b*, and warmth value range indicator 626*a*2*c* has not changed (e.g., when comparing FIG. 7B and FIG. 7D). However, because tone parameter control 626*a*1 was updated in response to detecting movement input 750*a*, computer system 600 displays an updated version of tone parameter control 626*a*1, where current tone value 626*a*1*b* of FIG. 7D is different from current tone value 626*a*1*b* of FIG. 7B and tone value range indicator 626*a*1*c* of FIG. 7D is different from tone value range indicator 626*a*1*c* of FIG. 7B. Notably, at FIG. 7D, tone value range indicator 626*a*1*c* includes a set of enlarge tick marks (e.g., 5) that are representative of the current tone value 626*a*1*b* (e.g., "100") as it relates to the scale of tone value range indicator 626*a*1*c* (e.g., all tick marks to the right of the center tick marks are enlarged and completely filled in to denote that "100" is a value that occupies 100% of a range (e.g., 0-100) above zero on the scale of tone value range indication 626*a*1*c*). Looking back at FIG. 7B, tone value range indicator 626*a*1*c* did not include any enlarged and/or filled-in tick marks because current tone value 626*a*1*b* of FIG. 7B was "0" and was not a value that occupied any range below or above zero on the scale of tone value range indication 626*a*1*c*. Turning back to FIG. 7D, it should be understood that tone parameter control 626*a*1 and warmth parameter control 626*a*2 are representative of the current values (e.g., 626*a*1*b*, 626*a*2*b*) for each respective parameter for custom standard style 634*aa* (e.g., as indicated by custom standard style identifier 636*aa* remaining displayed). Thus, one or more controls for a media-processing style can also be used to adjust one or more parameters for modified versions of the media-processing style.

As illustrated in FIG. 7D, in response to detecting the end of movement input 750*a*, computer system 600 displays reset control 722. Here, computer system displays reset control 722 because a value of a parameter of a media-processing style is not the default value of the media-processing style (e.g., because current tone value 626*a*1*b* has been changed from the default value of "0" for standard style 634*a* to "100"). At FIG. 7D, computer system 600 detects a portion of movement input 750*d* on warmth parameter control 626*a*2.

Figure 7E:
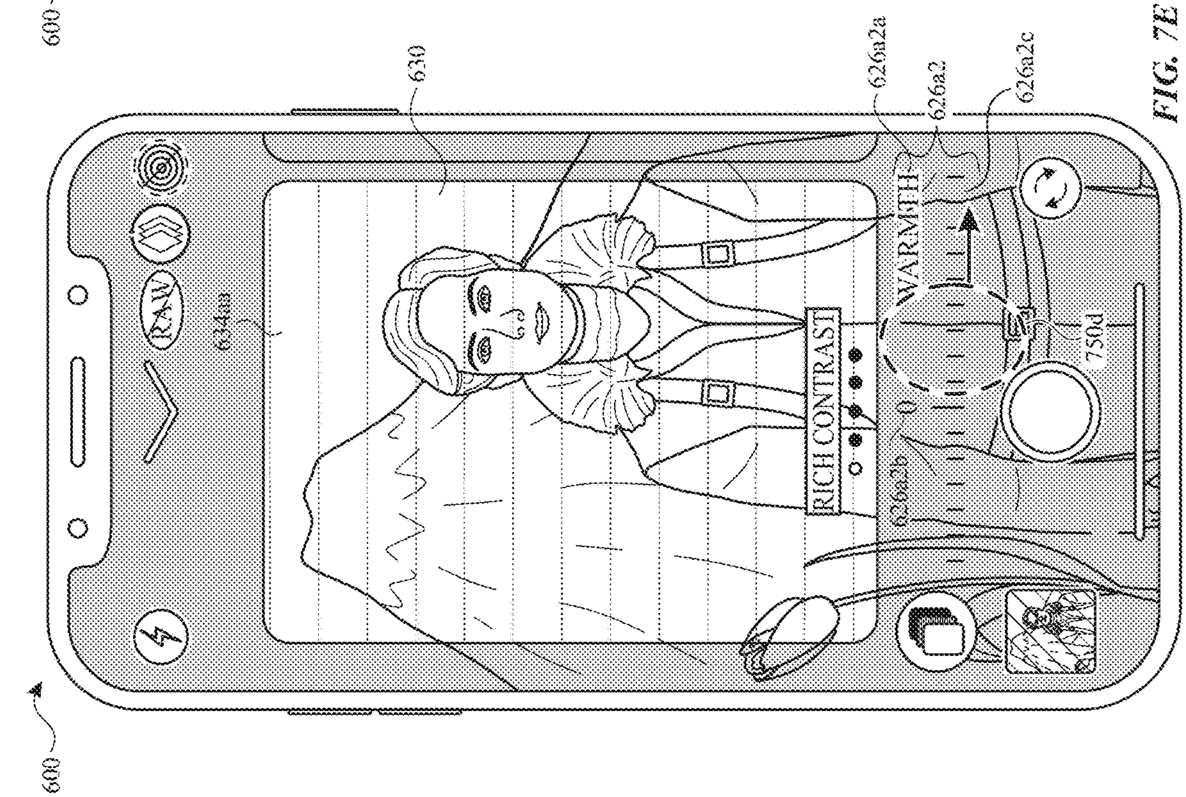
Figure 7H:
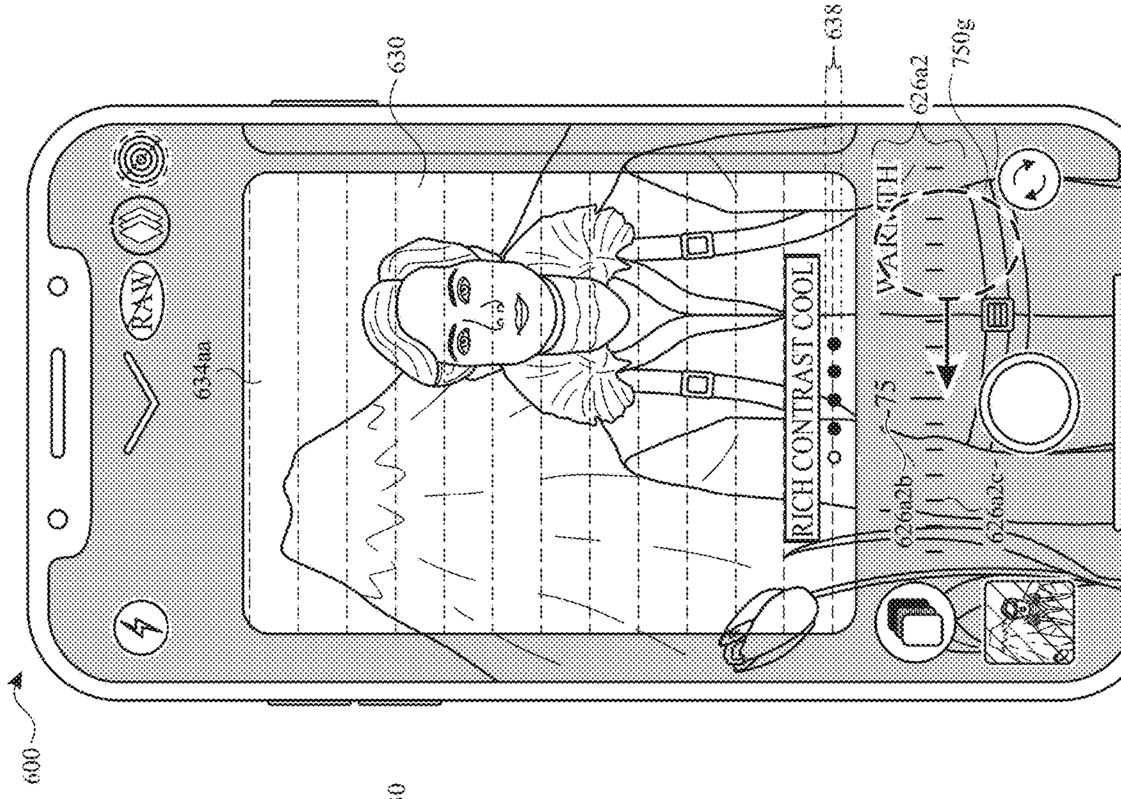

As illustrated in FIG. 7E, in response to detecting the portion of movement input 750*d* at FIG. 7D, computer system 600 ceases to display tone parameter control 626*a*1 and expands warmth parameter control 626*a*2 (e.g., using one or more techniques as described above in relation to expanding tone parameter control 626*a*1 in FIGS. 7B-7C). In particular at FIG. 7E, computer system 600 expands warmth parameter control 626*a*2 and/or warmth value range indicator 626*a*2*c* in-line. When expanding warmth parameter control 626*a*2, computer system 600 increases the size of warmth value range indicator 626*a*2*c*, such that the tick marks of warmth value range indicator 626*a*2*c* of FIG. 7E are larger and further apart than the tick marks of warmth value range indicator 626*a*2*c* of FIG. 7A. Moreover, the tick marks of warmth value range indicator 626*a*2*c* of FIG. 7E represents more values than the tick marks of warmth value range indicator 626*a*2*c* of FIG. 7A (e.g., warmth value range indicator 626*a*2*c* of FIG. 7E has more tick marks than warmth value range indicator 626*a*2*c* of FIG. 7A). In other words, in response to detecting the portion of movement input 750*d* at FIG. 7D, computer system 600 zooms into warmth parameter control 626*a*2 and/or warmth value range indicator 626*a*2*c* (which, in some embodiments, makes it easier for a user to change a value of warmth parameter control 626*a*2). As illustrated in FIG. 7E, in response to detecting movement input 750*d* at FIG. 7D, computer system 600 displays current warmth value 626*a*2*b* (e.g., "0") of FIG. 7E at a different position on the display than current warmth value 626*a*2*b* of FIG. 7A was displayed. Although computer system 600 has moved current warmth value 626*a*2*b* of FIG. 7E, computer system 600 continues to display current warmth value 626*a*2*b* of FIG. 7E in a central position of warmth value range indicator 626*a*2*c* (e.g., as current warmth value 626*a*2*b* of FIG. 7A was displayed). Moreover, in response to detecting movement input 750*d*, computer system 600 moves warmth parameter identifier **626*a*2*a* to the right side of computer system 600. At FIG. 7E, computer system 600 detects another portion of movement input 750*d* on warmth value range indicator 626*a*2*c* in a rightward direction (e.g., while continuing to detect movement 750*d***).

As illustrated in FIG. 7F, in response to detecting the portion of movement input **750*d* at FIG. 7E (e.g., that is moving in the rightward direction), computer system 600 moves the tick marks of warmth value range indicator 626*a*2*c* to the right (e.g., based on the magnitude of movement input 750*d* detected at FIG. 7E) and updates current warmth value 626*a*2*b* from "0" (e.g., in FIG. 7E) to "−75" (e.g., in FIG. 7F). As illustrated in FIG. 7F, in response to detecting the portion of movement input 750*d* at FIG. 7E, computer system 600 updates the appearance of media-processing styles indicator 602*b* by changing the color of media-processing styles indicator 602*b* (e.g., using one or more techniques as discussed above in relation to FIG. 6L). At FIG. 7F, computer system 600 increases the amount of light grey in the color of media-processing styles indicator 602*b* based on the movement of the portion of movement input 750*d* at FIG. 7E. Here, computer system 600 increases the amount of light grey (e.g., as opposed to increasing the amount of dark gray as discussed above in relation to FIG. 6L) because the current value of the warmth control has been decreased. As illustrated in FIG. 7F, computer system 600 continues to display custom standard style identifier 636*aa* and the middle section that is displayed using custom standard style 634*aa*. At FIG. 7F, computer system 600 continues to display custom standard style identifier 636*aa*. However, at FIG. 7F, computer system 600 updates custom standard style identifier 636*aa* to include the words, "RICH CONTRAST COOL" instead of "RICH CONTRAST. Here, "COOL" is added to custom standard style identifier 636*aa* because the current value of the warmth parameter was decreased in response detecting the portion of movement input 750*d* at FIG. 7E and/or the current value of the warmth parameter (e.g., "−75") is less than the default value of the warmth parameter for standard style 634*a* (e.g., from which custom standard style 634*aa* was created). At FIG. 7F, computer system 600 continues to display custom standard style identifier 636*aa* because computer system 600 has edited the parameter of custom standard style identifier 636*aa* instead of adding a new custom standard media-processing style (e.g., a custom standard media-processing style that is different from custom standard style 634*aa* shown in FIG. 7E) to the set of available styles. Thus, at FIG. 7F, the number of the set of available styles (e.g., as indicated by paging dots 638) have remained the same, although current warmth value 626*a*2*b* has been changed from the default value for standard style 634*a* (e.g., shown in FIG. 6B). When displaying the middle section using custom standard style 634*aa*, computer system 600 updates the middle section to reflect the change in warmth and/or the change in the value of the warmth parameter for the custom-standard-media-processing style. For illustrative purposes only, custom standard style 634*aa* (e.g., in FIG. 7F) is shown with the same pattern (e.g., horizontal lines) as standard style 634*a* (e.g., in FIG. 7B) to indicate that custom standard style 634*aa* is a modified version of standard style 634*a*. However, the lines (e.g., dashed) of custom standard style 634*aa* of FIG. 7F are different from the lines (e.g., solid) of standard style 634*a* of FIG. 7B and the lines (e.g., dotted) of custom standard style 634*aa* of FIG. 7E to illustrate that custom standard style 634*aa* of FIG. 7F is different from standard style 634*a* of FIG. 7B and custom standard style 634*aa* of FIG. 7E. In some embodiments, in response to detecting the portion of movement input 750*d* at FIG. 7E, computer system 600 does not update custom standard style 634*aa* of FIG. 7E and adds an additional custom standard media-processing style. In some embodiment, when displaying the additional custom standard media-processing style, computer system 600 displays a paging dot for the additional custom standard media-processing style to the left and/or right of custom standard paging dot 638*aa* and replaces custom standard style identifier 636*aa* with a style identifier for the additional custom standard media-processing style. In some embodiments, computer system 600 adds the additional custom standard media-processing style in the set of available styles at a position that is adjacent to one or more of the standard media-processing styles and/or groups the additional custom standard media-processing style together with the other standard media-processing styles. At FIG. 7F, computer system 600 detects an end of movement input 750*d* on warmth value range indicator 626*a*2*c***.

Figure 7G:
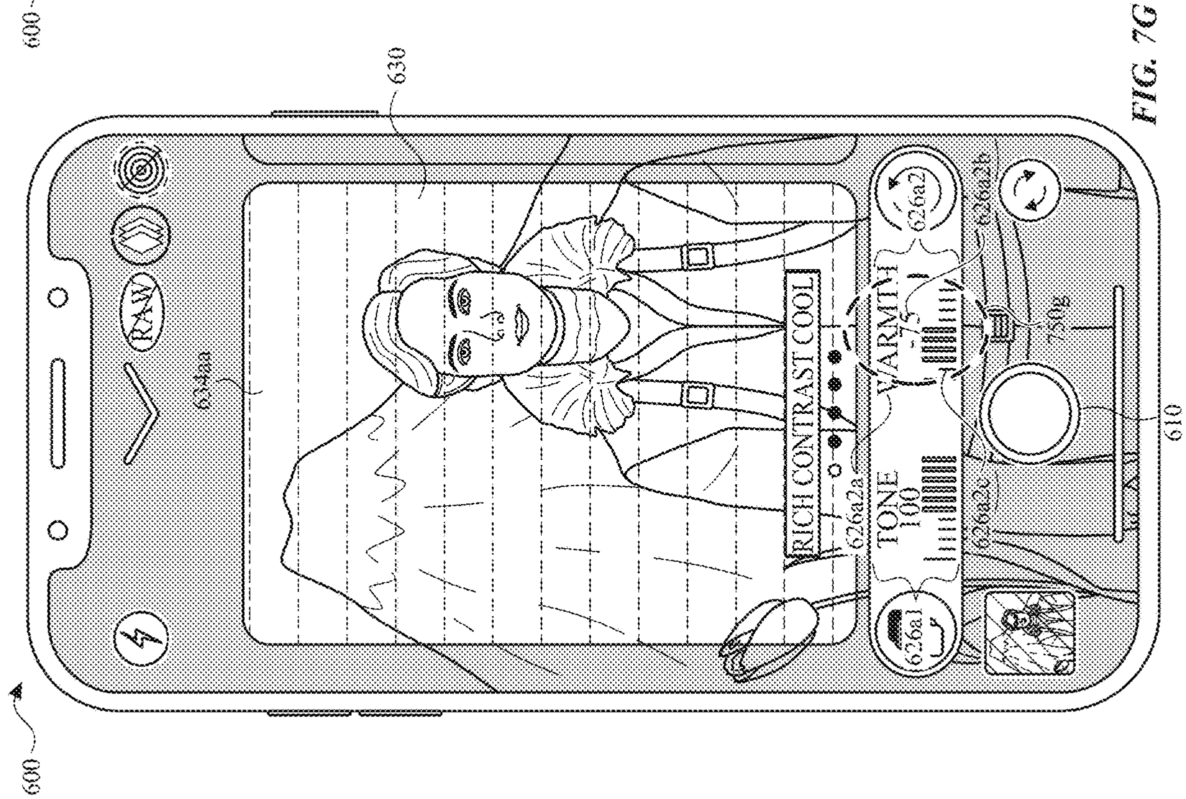

As illustrated in FIG. 7G, in response to detecting the end of movement input **750*d*, computer system 600 re-displays tone parameter control 626*a*1 and shrinks warmth parameter control 626*a*2 (e.g., using one or more techniques discussed above in relation to FIG. 7D). Because warmth parameter control 626*a*2 was updated in response to detecting movement input 750*d*, computer system 600 displays an updated version of warmth parameter control 626*a*2, where current warmth value 626*a*2*b* of FIG. 7G is different from current warmth value 626*a*2*b* of FIG. 7D and warmth value range indicator 626*a*2*c* of FIG. 7G is different from warmth value range indicator 626*a*2*c* of FIG. 7D. Notably, at FIG. 7G, warmth value range indicator 626*a*2*c* includes a set of enlarge tick marks (e.g., 4) that are representative of the current warmth value 626*a*2*b* (e.g., "−75") as it relates to the scale of warmth value range indicator 626*a*2*c* (e.g., 75% of the tick marks to the left (e.g., because current warmth value 626*a*2*b* is a negative value) to the of the center tick marks are enlarged and filled in to denote that "−75" is a value that occupies 75% of a range (e.g., −100-0) below zero on the scale of warmth value range indication 626*a*2*c*). In some embodiments, in response to detecting an input (e.g., a tap gesture) on shutter control 610 at FIG. 7G, computer system 600 captures media and applies custom standard style 634*aa* of FIG. 7G (and not standard style 634*a*) to the media (e.g., when displaying a representation of media). At FIG. 7G, computer system 600 detects a portion of movement input 750*g* on warmth parameter control 626*a*2**.

As illustrated in FIG. 7H, in response to detecting the portion of movement input **750*g* at FIG. 7G, computer system 600 ceases to display tone parameter control 626*a*1 and expands warmth parameter control 626*a*2 (e.g., using one or more techniques as described above in relation to expanding tone parameter control 626*a*1 in FIG. 7D). At FIG. 7H, computer system 600 detects another portion of movement input 750*g* on warmth parameter control 626*a*2** in the leftward direction.

Figure 7J:
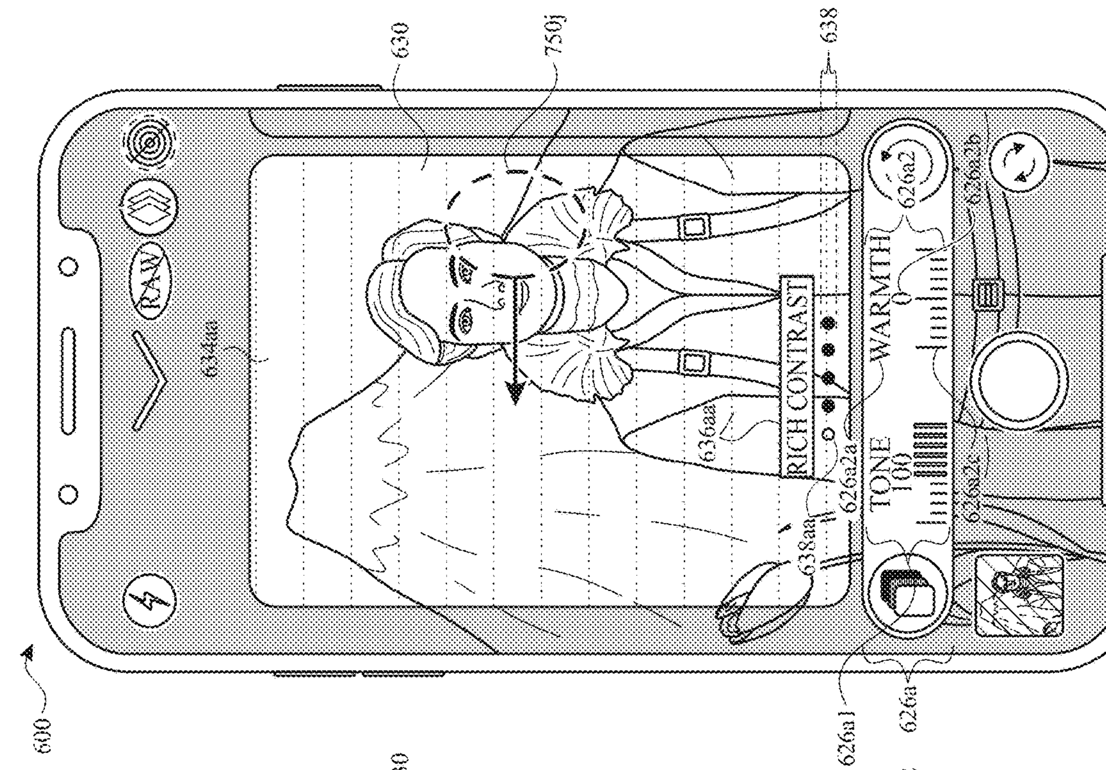
Figure 7I:
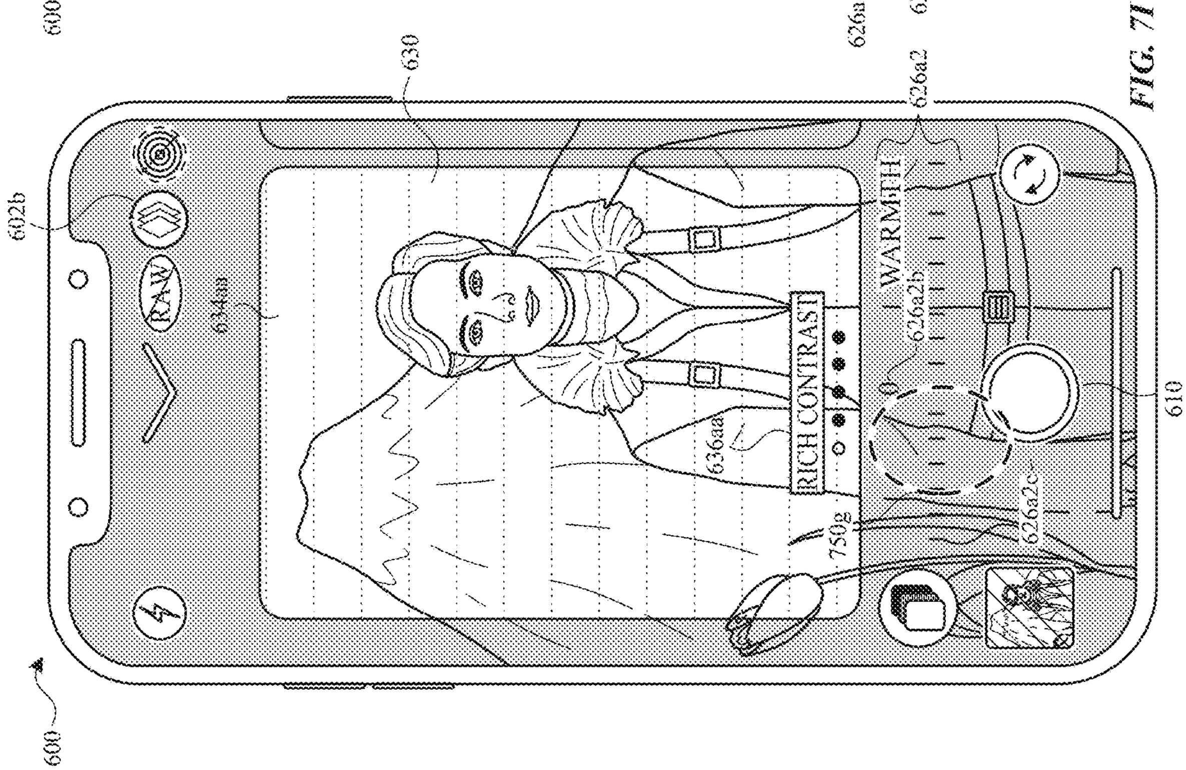
Figure 7L:
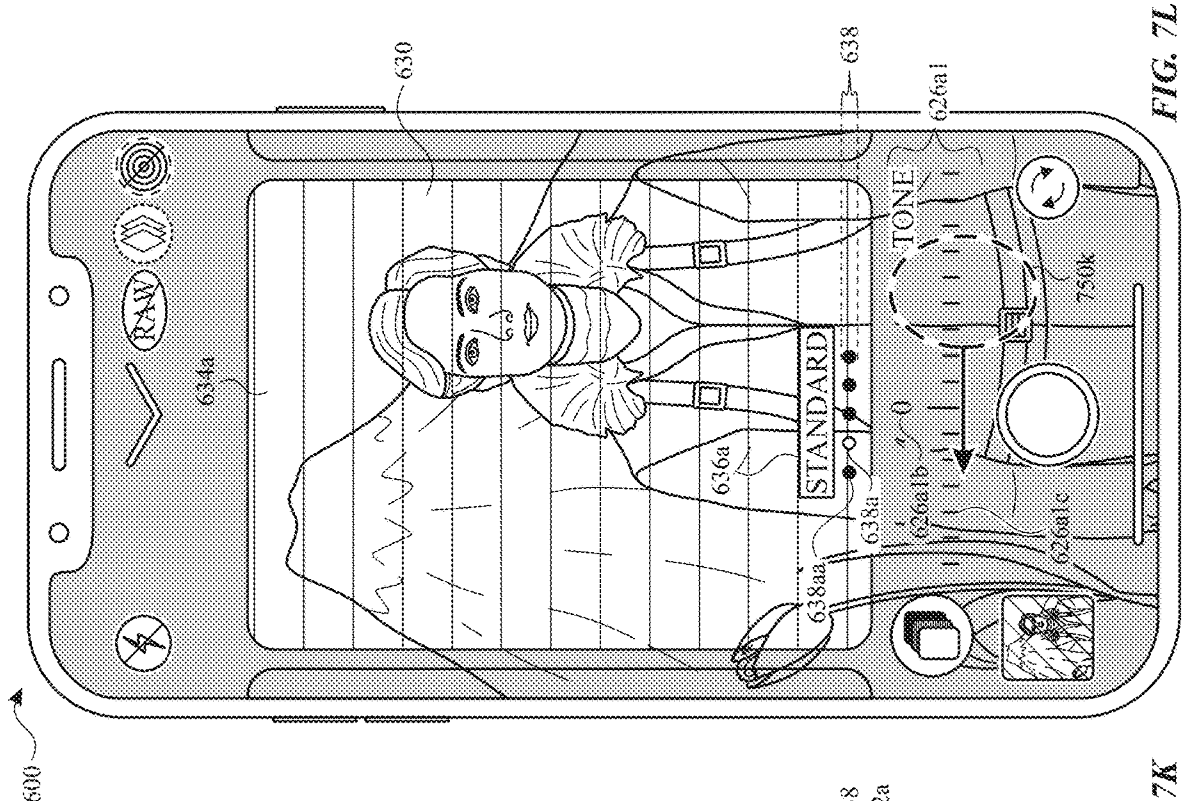

As illustrated in FIG. 7I, in response to detecting the portion of movement input **750*g* at FIG. 7H (e.g., that is moving in the leftward direction), computer system 600 moves the tick marks of warmth value range indicator 626*a*2*c* to the left (e.g., based on the magnitude of the portion of movement input 750*g* detected at FIG. 7H) and updates current warmth value 626*a*2*b* from "−75" (e.g., in FIG. 7H) to "0" (e.g., in FIG. 7I). As illustrated in FIG. 7I, computer system 600 displays the middle section using custom standard style 634*aa*, custom standard style identifier 636*aa*, and media-processing styles indicator 602*b* of FIG. 7I (e.g., "dotted lines of FIG. 7I") in the same way that computer system 600 displays the middle using custom standard style 634***aa*"), custom standard style identifier 636*aa*, and media-processing styles indicator 602*b* of FIG. 7D (e.g., "dotted lines of FIG. 7D"). At FIGS. 7D and 7I, computer system 600 displays the middle section, custom standard style identifier 636*aa*, and media-processing styles indicator 602*b* the same way because current warmth value 626*a*2*b* of FIG. 7I is the same value of current warmth value 626*a*2*b* of FIG. 7D and current tone value 626*a*2*b* at FIG. 7I (e.g., as shown in FIG. 7J) is the same as current tone value 626*a*2*b* of FIG. 7D. At FIG. 7I, computer system 600 detects an end of movement input 750*g* on warmth value range indicator 626*a*2*c*.

As illustrated in FIG. 7I, in response to detecting the end of movement input 750*g*, computer system 600 re-displays tone parameter control 626*a*1 and shrinks warmth parameter control 626*a*2 (e.g., using one or more techniques discussed above in relation to FIGS. 7D and 7I). In some embodiments, in response to detecting an input (e.g., a tap gesture) on shutter control 610 at FIG. 7I, computer system 600 captures media and applies custom standard style 634*aa* of FIG. 7I (and not standard style 634*a* and/or custom standard style 634*aa* of FIG. 7H) to the media (e.g., when displaying a representation of media). At FIG. 7J, computer system 600 detects movement input 750*j* on live preview 630 in a leftward direction.

Figure 7K:
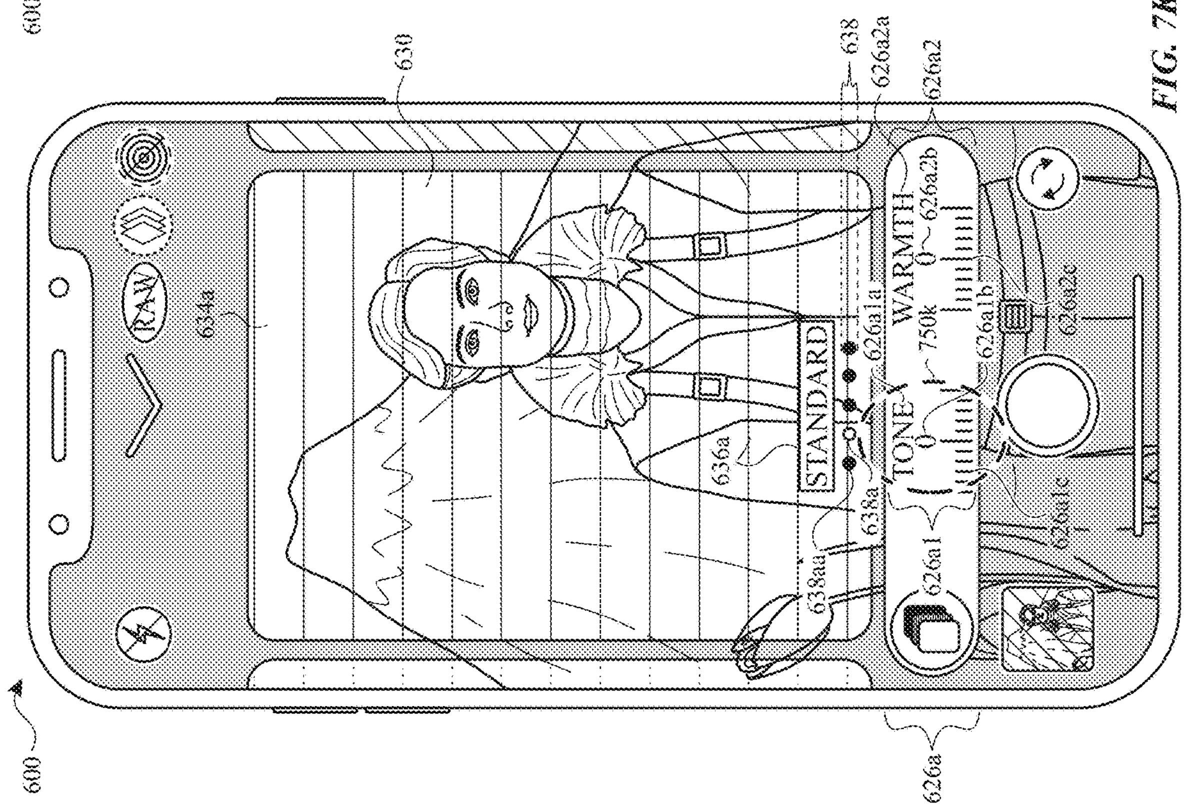
Figure 7N:
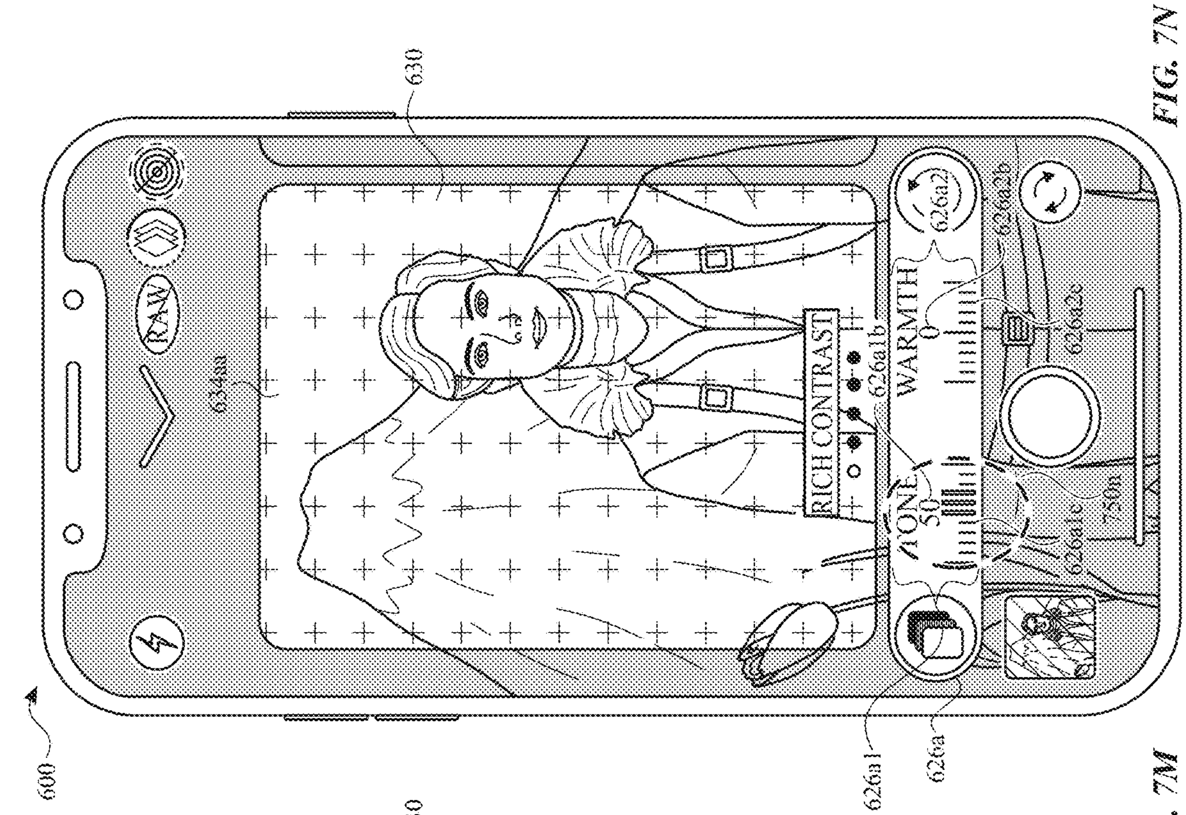

As illustrated in FIG. 7K, in response to detecting movement input 750*j*, computer system 600 translates the available sets of media-processing styles to the left and displays the middle section using standard style 634*a*, the right section using custom standard style 634*aa*, and the left section using vibrant style 634*b* (e.g., using one or more techniques as described above in relation to detecting movement input 650*d* in FIGS. 6E-6I). Notably, at FIG. 7K, computer system 600 displays the middle section using standard style 634*a* because standard style 634*a* is positioned after custom standard style 634*aa* in the set of available media-processing styles (e.g., which computer system 600 previously displayed the middle section using in FIG. 7I). Likewise, computer system 600 displays the right section using vibrant style 634*b* because vibrant style 634*b* is positioned after standard style 634*a* in the set of available media-processing styles. Thus, at FIGS. 7I and 7K, an input can be detected on a custom media-processing style to display a portion of live preview 630 using other media-processing styles in the set of available media-processing styles. As illustrated in FIG. 7K, in response to detecting movement input 750*j*, computer system 600 replaces custom standard style identifier 636*aa* of FIG. 7J with standard style identifier 636*aa*. Moreover, in response to detecting movement input 750*j*, computer system 600 updates standard style control 626*a*, such that current tone value 626*b*1*b* is set to the default value (e.g., "0") for standard style 634*a* and current tone warmth 626*b*2*b* is set to the default value (e.g., "0") for standard style 634*a* (e.g., as ceases to display the respective current values for custom standard style 634*aa*). At FIG. 7K, computer system 600 also ceases to display reset control 722 because the current values (e.g., current tone value 626*b*1*b* and current warmth value 626*b*2*b* are "0") for standard style 634*a* are displayed (e.g., the default values for standard style 634*a* are displayed). In some embodiments, in response to detecting a movement input in the rightward direction, computer system 600 re-displays the middle section using custom standard style 634*aa*. At FIG. 7K, computer system 600 detects a portion of movement input 750*k* on tone value range indicator 626*a*1*c*.

As illustrated in FIG. 7L, in response to detecting the portion of movement input 750*k* at FIG. 7K (e.g., while standard style 634*a* is selected and/or the middle section is displayed using standard style 634*a*), computer system 600 expands tone parameter control 626*a*1 and ceases to display warmth parameter control 626*a*2 (e.g., using one or more techniques as described above in relation to FIG. 7B). At FIG. 7L, computer system 600 detects another portion of movement input 750*k* on tone value range indicator 626*a*1*c* in a leftward direction.

Figure 7M:
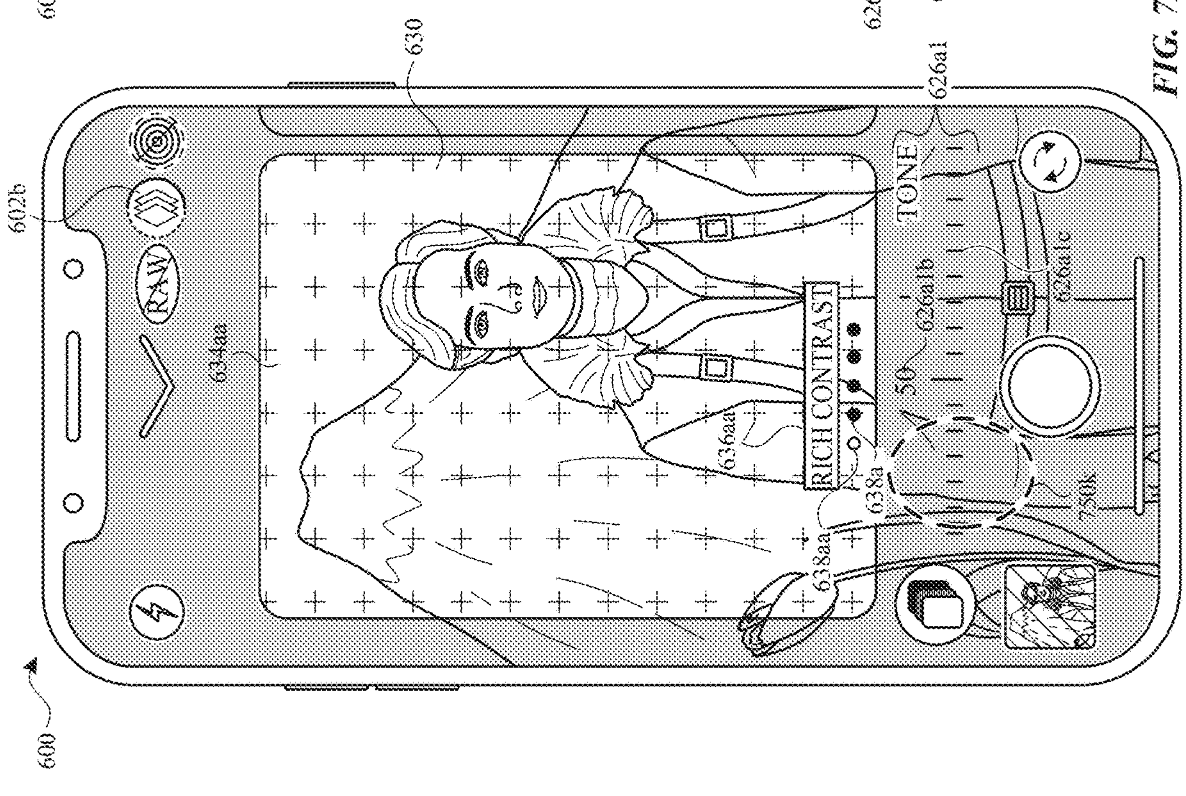

As illustrated in FIG. 7M, in response to detecting the portion of movement input 750*k* at FIG. 7L, computer system 600 moves the tick marks of tone value range indicator 626*a*1*c* to the left (e.g., based on the magnitude of movement input 750*k* detected at FIG. 7L) and updates current tone value 626*a*1*b* from "0" (e.g., in FIG. 7L) to "50" (e.g., in FIG. 7M) (e.g., using one or more techniques as described above in relation to FIG. 7C). In addition to updating current tone value 626*a*1*b*, computer system 600 replaces standard style identifier 636*a* with custom standard style identifier 636*aa*, displays custom standard paging dot 638*aa* as being selected, and displays standard paging dot 638*a* as being unselected. Notably, at FIG. 7M, computer system 600 updates the current value for the tone parameter for custom standard style 634*aa* and does not update the current value for the tone parameter for standard style 634*a*. Thus, at FIG. 7M, computer system 600 does not change how standard style 634*a* is defined (and/or changes the current values for standard style 634*a*). At FIG. 7M, in response to detecting the portion of movement input 750*k* at FIG. 7L, computer system 600 displays the middle section using custom standard style 634*aa*. Custom standard style 634*aa* of FIG. 7C has a decreased amount of tone (e.g., because current tone value 626*a*1*b* of FIG. 7M is lower than the previous value of current tone value 626*a*1*b* shown in FIG. 7J). For illustrative purposes only, the lines (e.g., crossed) of custom standard style 634*aa* of FIG. 7M is different from the lines (e.g., dotted) of custom standard style 634*aa* of FIG. 7J to show that one or more parameters for custom standard style 634*aa* have changed.

As illustrated in FIG. 7M, in response to detecting the portion of movement input 750*k* at FIG. 7L, computer system 600 updates the appearance of media-processing styles indicator 602*b* based on the current value (e.g., "50") of the tone parameter in FIG. 7M. Thus, using one more techniques as discussed above in relation to FIG. 6L, the line around the perimeter of media-processing styles indicator 602*b* is updated to be around roughly half of the perimeter of media-processing styles indicator 602*b*. As illustrated in FIG. 7M, custom standard style identifier 636*aa* includes the words "RICH CONTRAST" for similar reasons as described above in relation to custom standard style identifier 636*aa* of FIG. 7D. When comparing FIGS. 7D and 7M, computer system 600 displays custom standard style identifier 636*aa* with the same words ("RICH CONTRAST') although the current value of tone parameter of FIG. 7D was higher than the current value of the tone parameter of FIG. 7M. In some embodiments, computer system 600 displays custom standard style identifier 636*aa* of FIG. 7M that includes the words "RICHER" instead of "RICH" (e.g., because the current value of the current value of tone parameter of FIG. 7D is higher than the current value of the tone parameter of FIG. 7M and/or the current value of the current value of tone parameter of FIG. 7D is higher than a default value of the tone parameter over a certain amount (e.g., "75")). In some embodiments, computer system 600 displays custom standard style identifier 636*aa* with the word "SOFT" and/or "SOFTER" when a current value of the tone parameter is less than the default value. At FIG. 7M, computer system 600 detects an end of movement input 750*k* on tone value range indicator 626*a*1*c*.

As illustrated in FIG. 7N, in response to detecting the end of movement input 750*k*, computer system 600, shrinks tone parameter control 626*a*1 and re-displays warmth parameter control 626*a*2. Here, tone parameter control 626*a*1 and warmth parameter control 626*a*2 indicate that the current values of the tone parameter and the warmth parameter for custom standard style 634*aa* (e.g., current tone value 626*a*1*b* being "50" and current warmth value 626*a*2*b* being "0") (e.g., because the custom standard style 634*aa* was selected and/or the middle section was displayed using custom standard style 634*aa* in response to detecting movement input 750*k*). At FIG. 7N, computer system 600 detects movement input 750*n* on tone value range indicator 626*a*1*c*.

Figure 7O:
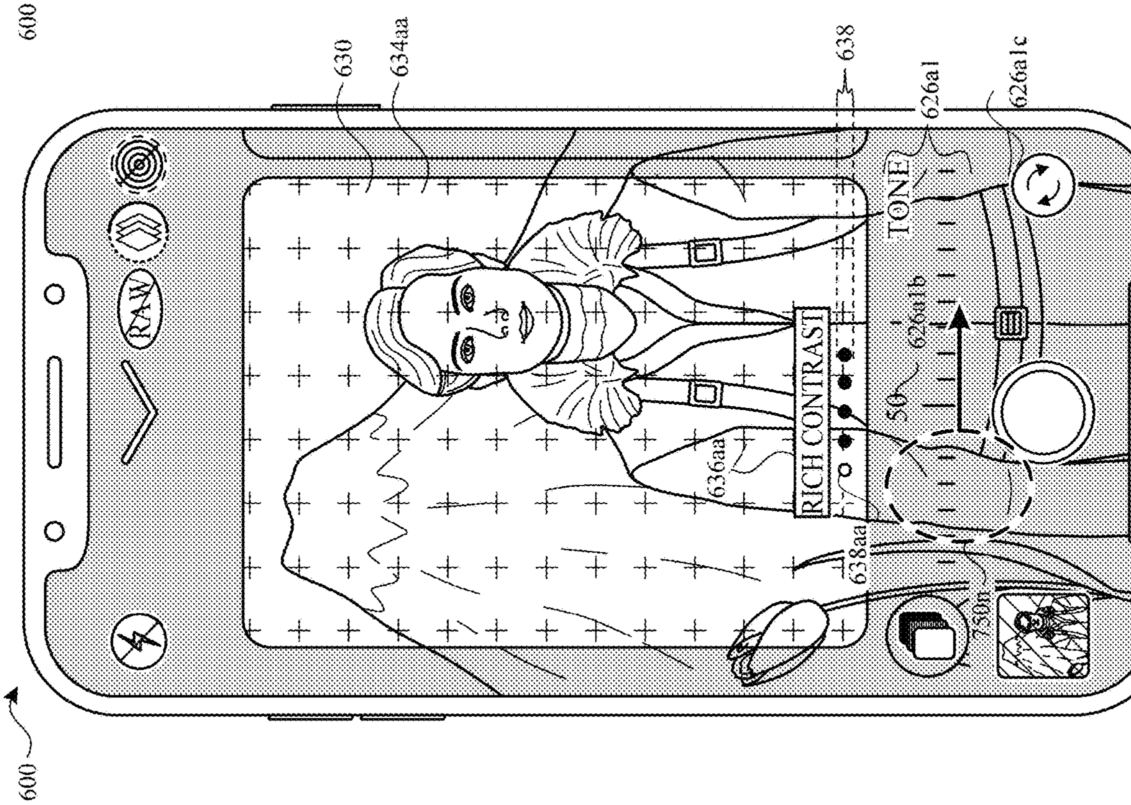

As illustrated in FIG. 7O, in response to detecting movement input 750*n* at FIG. 7N (e.g., while custom standard style 634*aa* is selected and/or the middle section is displayed using custom standard style 634*aa*), computer system 600 expands tone parameter control 626*a*1 and ceases to display warmth parameter control 626*a*2 (e.g., using one or more techniques as described above in relation to FIG. 7B). At FIG. 7O, computer system 600 detects another portion of movement input 750*n* on tone value range indicator 626*a*1*c* in a rightward direction.

Figure 7P:
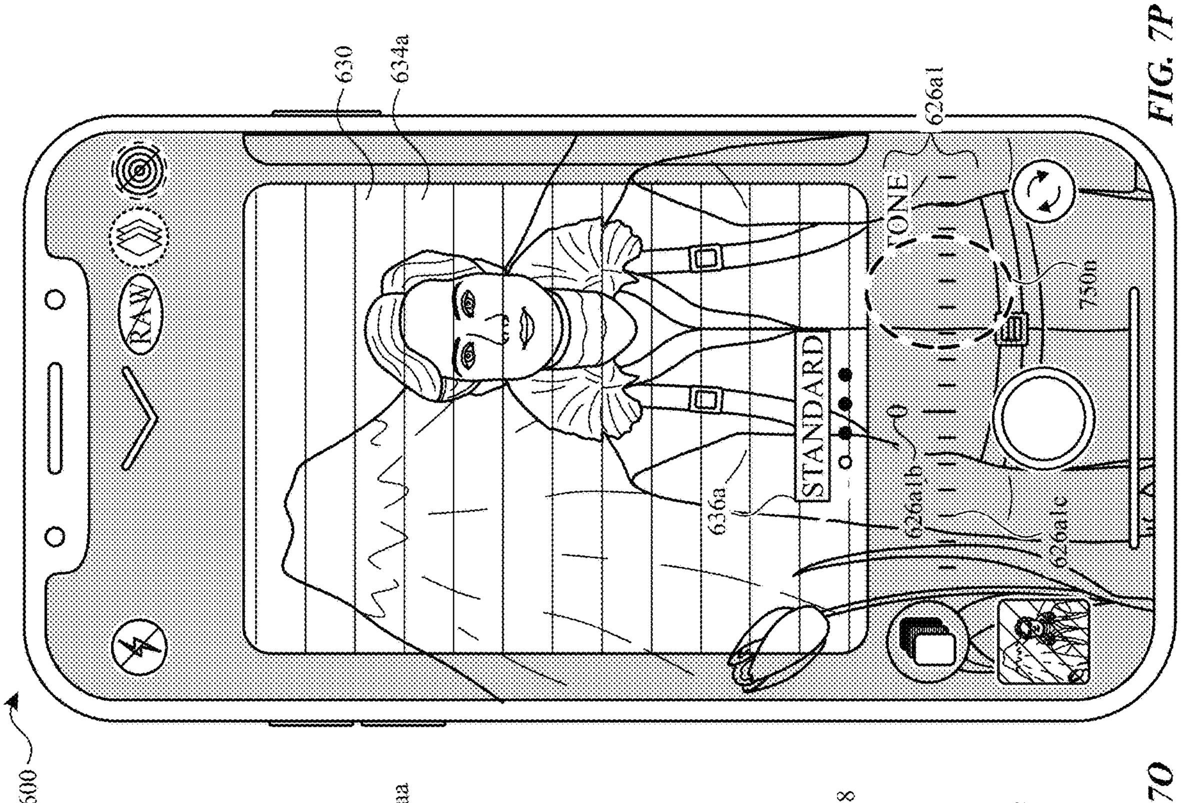
Figure 7R:
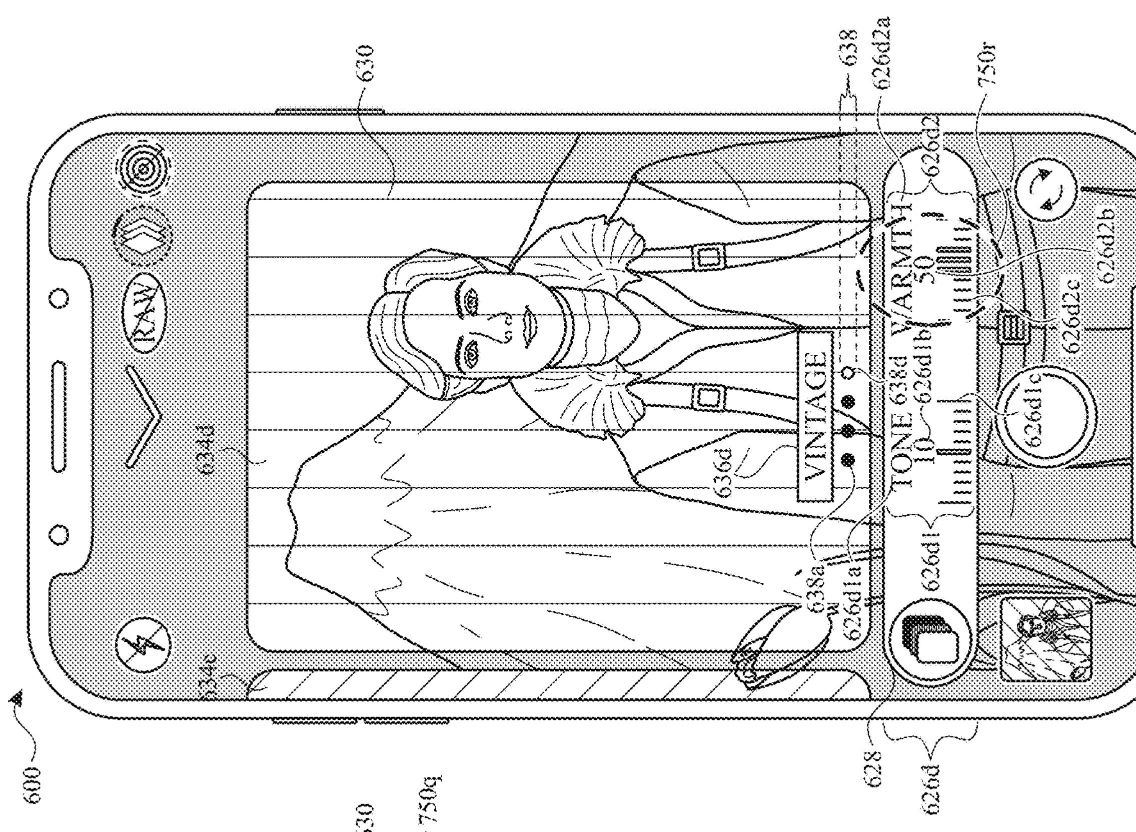

As illustrated in FIG. 7P, in response to detecting the portion of movement input 750*n* at FIG. 7O, computer system 600 moves the tick marks of tone value range indicator 626*a*1*c* to the right (e.g., based on the magnitude of movement input 750*n* detected at FIG. 7O) and updates current tone value 626*a*1*b* from "50" (e.g., in FIG. 7O) to "0" (e.g., in FIG. 7P) (e.g., using one or more techniques as described above in relation to FIG. 7C). In addition to updating tone value 626*a*1*b*, computer system 600 removes custom standard style 634*aa* from the set of available media-processing styles. Computer system 600 removes custom standard style 634*aa* from the set of available media-processing styles because current tone value 626*a*1*b* and current warmth value 626*a*2*b* were both set to their respective default values for the standard media-processing style. Moreover, computer system 600 replaces custom standard style identifier 636*aa* with standard style identifier 636*a* and removes custom standard paging dot 638*aa* from paging dots 638 because custom standard style 634*aa* has been removed from the set of available media-processing styles. Accordingly, while displaying standard style identifier 636*a*, computer system 600 displays the middle section using standard style 634*a*. Thus, computer system 600 can remove a custom media-processing style when a custom media-processing for a respective media-processing style is reset to the default values for (e.g., and/or no longer different from) one or more of the media-processing style in the available sets of media-processing styles. In some embodiments, in response to detecting the portion of movement input 750*n* at FIG. 7O, computer system 600 updates the tone parameter for custom standard style 634*aa* and does not remove custom standard style 634*aa* from the set of available media-processing styles. At FIG. 7P, computer system 600 detects an end of movement input 750*n* on tone value range indicator 626*a*1*c*.

Figure 7Q:
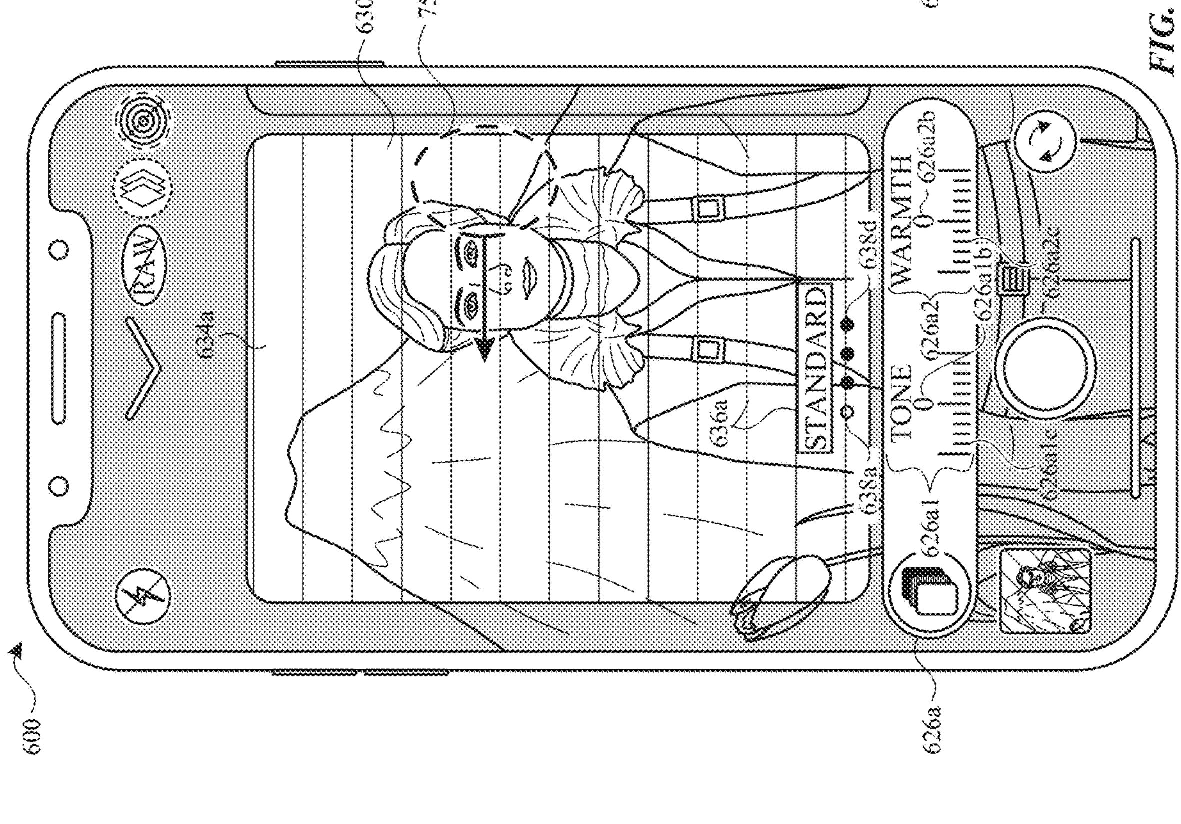

As illustrated in FIG. 7Q, in response to detecting the end of movement input 750*n*, computer system 600 shrinks tone parameter control 626*a*1 and re-displays warmth parameter control 626*a*2 (e.g., using one or more techniques as discussed above in relation to FIGS. 7A and 7C). At FIG. 7Q, computer system 600 detects movement input 750*q* on live preview 630.

As illustrated in FIG. 7R, in response to detecting movement input 750*q*, computer system 600 translates the available sets of media-processing styles to the left and displays the middle section using vintage style 634*d* and the left section using luxe style 634*c* (e.g., using one or more techniques as described above in relation to detecting movement input 650*d* in FIGS. 6E-6I). Computer system 600 displays the right section without using a media-processing style because vintage style 634*d* is the last media-processing style (e.g., last to the right) in the set of available media-processing styles. As illustrated in FIG. 7R, in response to detecting movement input 750*a*, computer system 600 replaces standard style identifier 636*a* of FIG. 7Q with vintage style identifier 636*d*. Moreover, in response to detecting movement input 750Q, computer system 600 replaces standard style control 626*a* with vintage style control 626*d*. Vintage style control 626*d* includes tone parameter control 626*d*1 and warmth parameter control 626*d*2, where current tone value 626*d*1*b* (e.g., "10") and current warmth value 626*d*2*b* (e.g., "50") are default values for each respective parameter for vintage style 634*d* (e.g., which are different from the default values for other media-processing styles in the set of available media-processing styles). At FIG. 7R, computer system 600 detects tap input 750*r* on warmth parameter control 626*d*2.

Figure 7T:
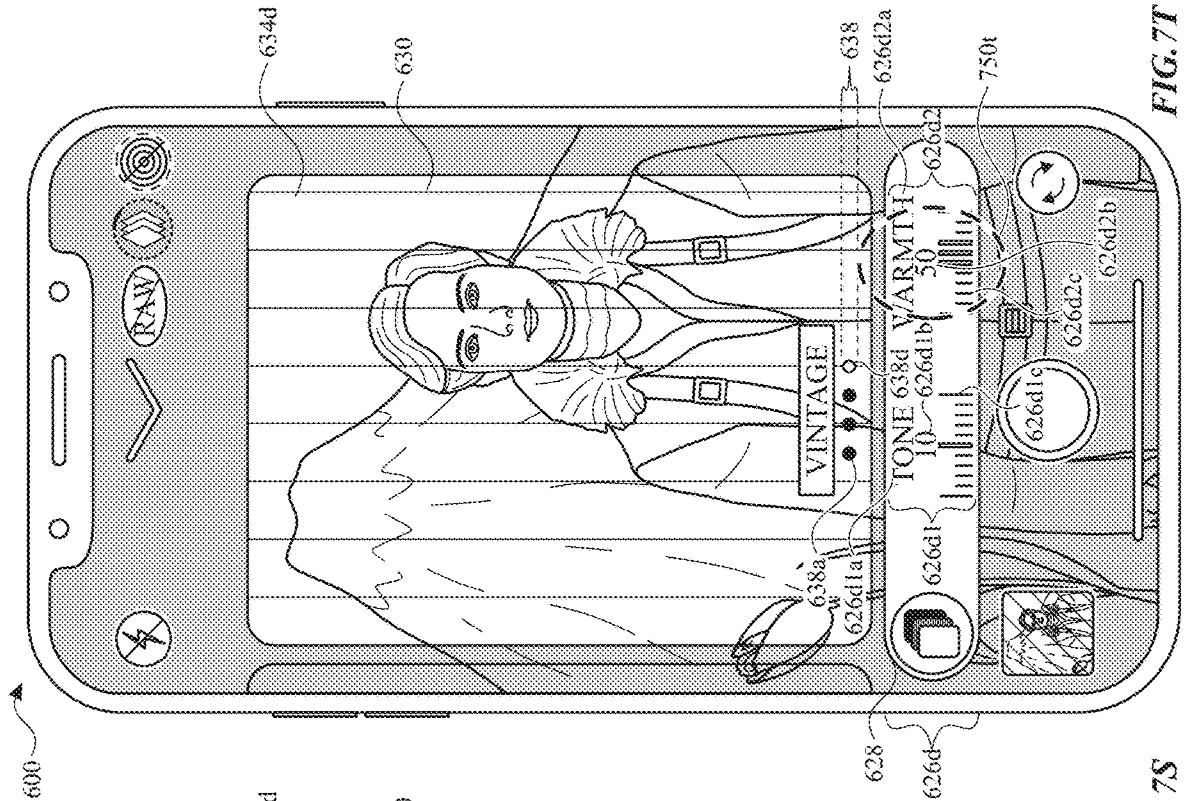
Figure 7S:
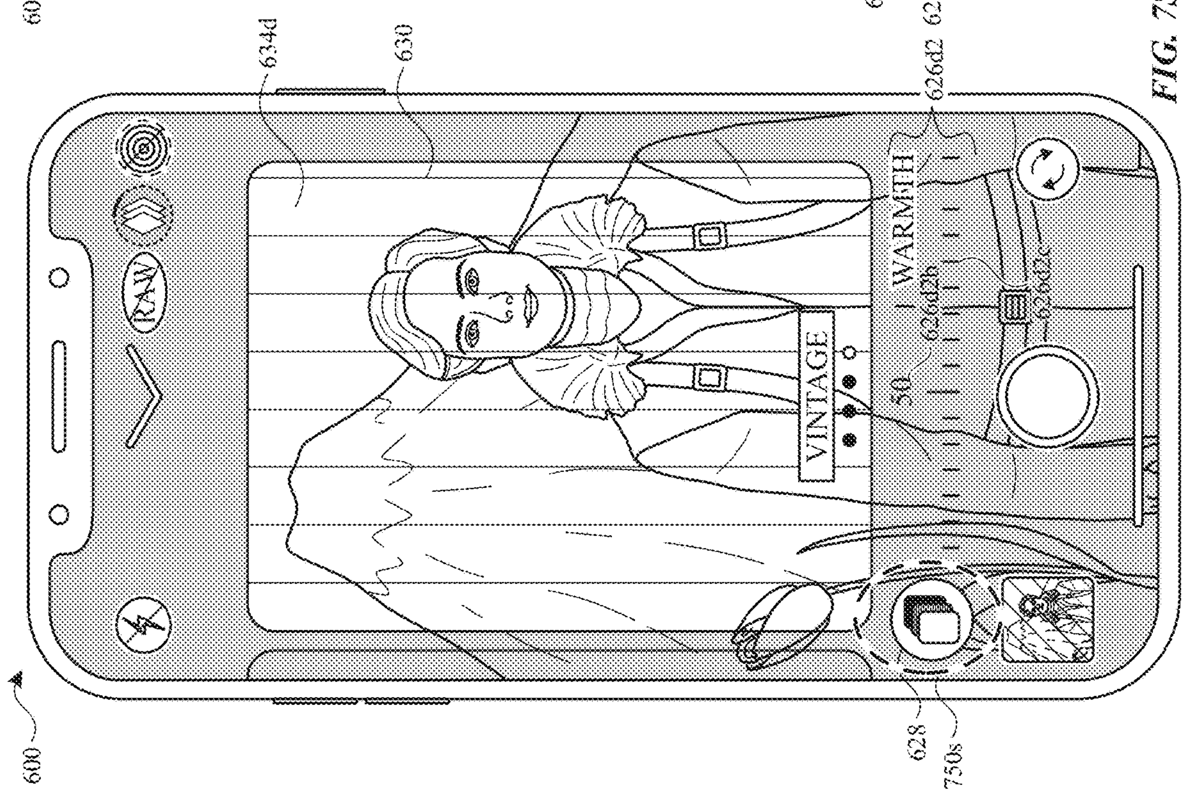
Figure 7V:
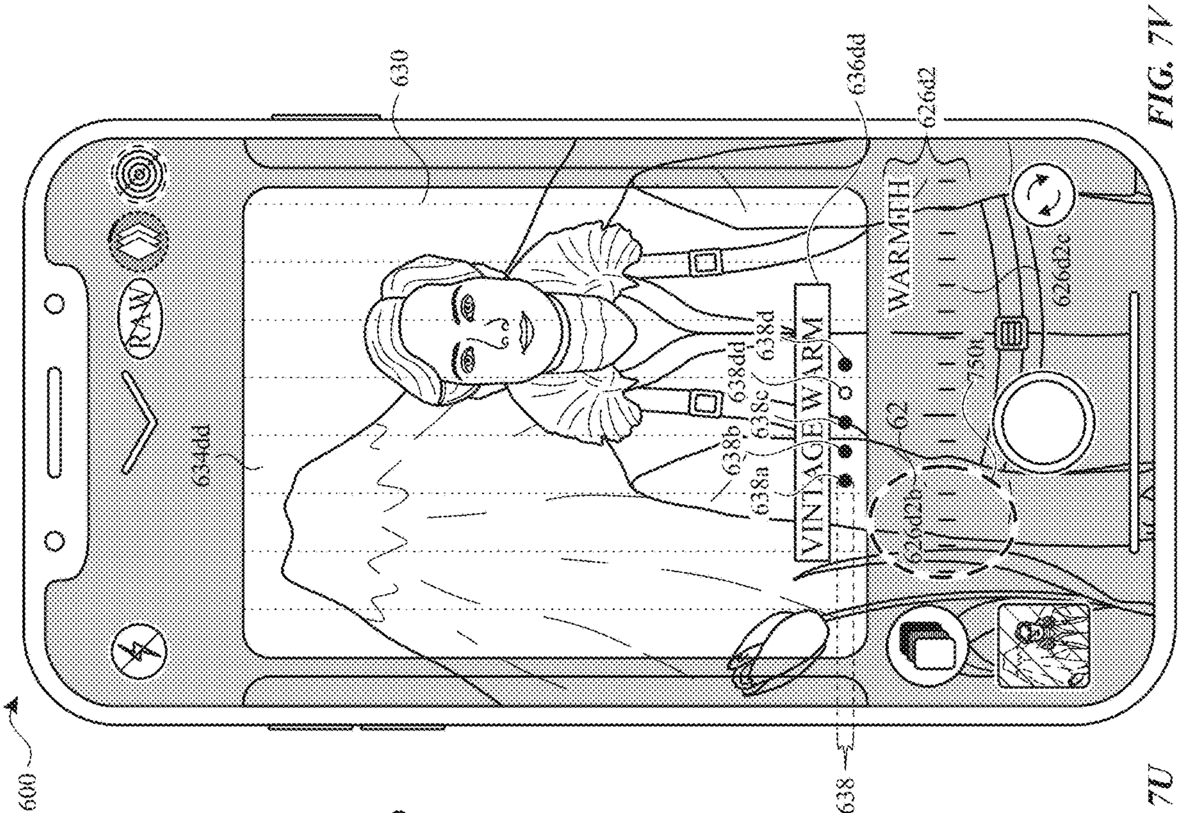

As illustrated in FIG. 7S, in response to detecting tap input 750*r*, computer system 600 expands warmth parameter control 626*d*2 and ceases to display tone parameter control 626*d*1 (e.g., using one or more similar techniques as discussed above in relation to FIG. 7B). While displaying control 628 in FIG. 7S, computer system 600 detects tap input 750*s* on control 628. As illustrated in FIG. 7T, in response to detecting tap input 750*s*, computer system shrinks warmth parameter control 626*d*2 and re-displays tone parameter control 626*d*1 (e.g., using one or more techniques as described above in relation to FIG. 7D). At FIG. 7T, computer system 600 detects a portion of movement input 750*t* on warmth parameter control 626*d*2.

Figure 7U:
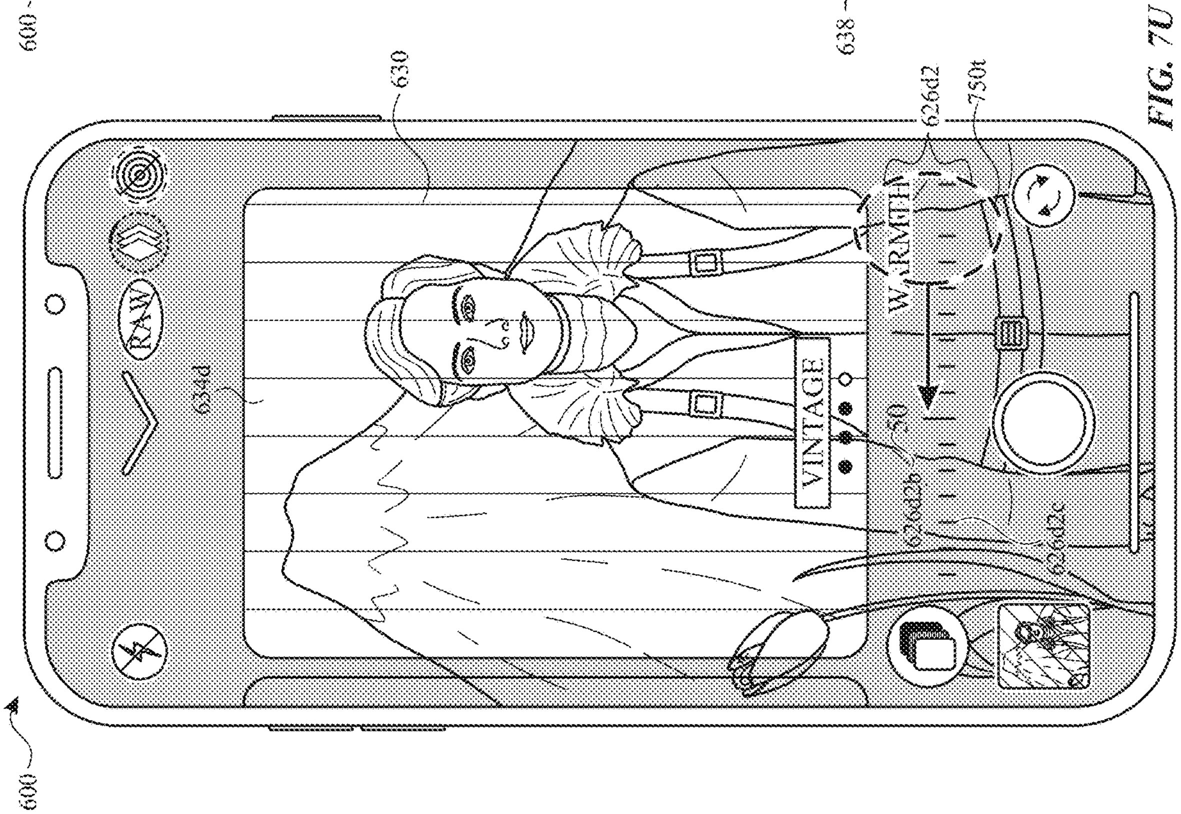
Figure 7X:
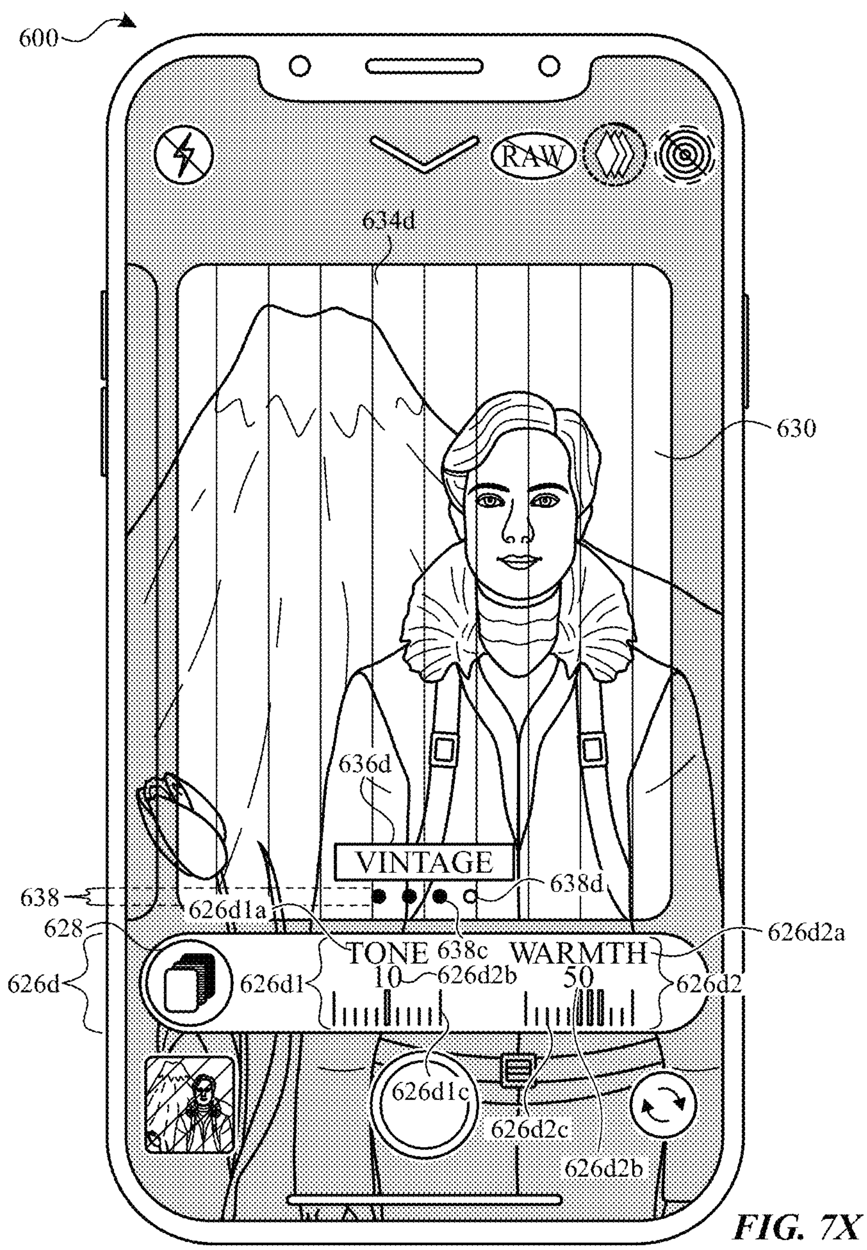

As illustrated in FIG. 7U, in response to detecting a portion of movement input 750*t* at FIG. 7T, computer system 600 expands warmth parameter control 626*d*2 and ceases to display tone parameter control 626*d*1 (e.g., using one or more similar techniques as discussed above in relation to FIG. 7B). At FIG. 7U, computer system 600 detects another portion of movement input 750*t* on warmth value range indicator 626*d*2*c* in a leftward direction.

As illustrated in FIG. 7V, in response to detecting the portion of movement input 750*t* at FIG. 7U, computer system 600 moves the tick marks of warmth value range indicator 626*d*2*c* to the left and updates current warmth value 626*d*2*b* from "50" (e.g., in FIG. 7U) to "62" (e.g., in FIG. 7V). In addition to updating current tone value 626*d*1*b*, computer system 600 replaces vintage style identifier 636*d* with custom vintage style identifier 636*dd* and adds custom vintage paging dot 638*dd* to the left of vintage paging dot 638*d* in paging dots 638. In other words, at FIG. 7V, computer system 600 adds a custom version of vintage style 634*d* to the set of available styles in response to updating current tone value 626*d*1*b* from the default value ("50") to the modified value (e.g., "62"). Accordingly, at FIG. 7V, computer system 600 does not update the default value of the tone parameter of vintage style 634*d* (e.g., as shown in FIG. 7X) but, instead, creates a modified version of vintage style 634*d* with the updated value. Thus, in some embodiments, a user can access the modified version of vintage style 634*d* (e.g., custom vintage style 634*dd*) at a later time.

As illustrated in FIG. 7V, in response to detecting the portion of movement input 750*t* at FIG. 7U, computer system 600 updates the middle section of live preview 630, such that the middle section is displayed using custom vintage style 634*dd* in FIG. 7V instead of using vintage style 634*d* in FIG. 7U. It should be understood that computer system 600 displays custom vintage style 634*dd* in FIG. 7V with an increased amount of warmth (e.g., 62) than the warmth of vintage style 634*d* (e.g., "50") to reflect the change in value of the warmth parameter for the vintage media-processing style. For illustrative purposes only, custom vintage style 634*dd* (e.g., in FIG. 7V) is shown with the same pattern (e.g., vertical lines) as vintage style 634*d* (e.g., in FIG. 7U) to indicate that custom vintage style 634*dd* is a modified version of vintage style 634*d*. However, the lines of custom vintage style 634*dd* are dotted instead of solid like the lines of vintage style 634*d* of FIG. 7U to illustrate that custom vintage style 634*dd* is different from vintage style 634*d*. Notably, at FIG. 7V, custom vintage style identifier 636*dd* (e.g., and 634*dd* when an input is detected) is displayed to the left of vintage style identifier 636*d* (e.g., and 634*d*) and not to the left of standard style identifier 636*a* (or 634*a* when an input is detected) (e.g., as indicated by paging dots 638). This is because custom vintage style 634*dd* is a modified version of vintage style 634*d* and not standard style 634*a*. Thus, in some embodiments, computer system 600 groups a custom respective media-processing style together with the non-custom (and/or non-modified) version of the respective media-processing style.

Moreover, custom vintage style identifier 636*dd* includes the word "WARM" because computer system 600 displays custom vintage style 634*dd* in FIG. 7V with an increased amount of warmth (e.g., 62) than the warmth of vintage style 634*d* (e.g., "50") and/or the current value of the warmth parameter in FIG. 7V is greater than the default value of the warmth parameter for vintage style 634*d*. In addition, computer system 600 updates the appearance of media-processing styles indicator 602*b* by increasing the amount of dark gray in the color of media-processing styles indicator 602*b* based on movement characteristics of the portion of movement input 750*t* (e.g., using one or more similar techniques as described above in relation to FIGS. 6L and 7C). At FIG. 7V, computer system 600 detects an end of movement input 750*t* on warmth value range indicator 626*d*2*c*.

As illustrated in FIG. 7W, in response to detecting the end of movement input 750*t*, computer system 600 re-displays tone parameter control 626*d*1 and shrinks warmth parameter control 626*d*2 (e.g., using one or more techniques as discussed above in relation to FIG. 7G). In response to detecting the end of movement input 750*t*, computer system 600 also displays reset control 722. At FIG. 7W, computer system 600 detects tap input 750*w* on reset control 722.

As illustrated in FIG. 7W1, in response to detecting tap input 750*w*, computer system 600 displays prompt 768, which includes the words "reset to vintage." Here, prompt 768 includes the words "reset to vintage" to indicate that a confirmation needs to be provided before the currently displayed style can be reset (e.g., via an input). Here, the word "vintage" indicates the media-processing style that will be applied to live preview 630 and/or the media-processing style to which the currently applied media processing style will be set in response to computer system 600 detecting confirmation input. At FIG. 7W1, computer system 600 detects tap input 750*w*1 on reset control 722. In some embodiments, computer system 600 detects tap input 750*w*1 on prompt 768 instead of reset control 722 and, in response to detecting tap input 750*w*1 on prompt 768 performs the functions described below with respect to detecting tap input 750*w*1 on reset control 722.

As illustrated in FIG. 7X, in response to detecting tap input 750*w* at FIG. 7W or tap input 750*w*1 at FIG. 7W1, computer system 600 removes custom vintage style 634*dd* from the set of available media-processing styles. Moreover, computer system 600 replaces custom vintage style identifier 636*dd* with vintage style identifier 636*d* and removes custom vintage paging dot 638*dd* from paging dots 638 because custom vintage style 634*dd* has been removed from the set of available media-processing styles. Accordingly, while displaying vintage style identifier 636*d*, computer system 600 displays the middle section using vintage style 634*d*. Thus, computer system 600 can remove a custom media-processing style when a custom media-processing for a respective media-processing style is reset to the default values for (e.g., and/or no longer different from) one or more of the media-processing style in the available sets of media-processing styles. In some embodiments, in response to detecting tap input 750*w* at FIG. 7W or tap input 750*w*1 at FIG. 7W1, computer system 600 resets the parameters for the custom vintage media-processing style and does not remove the custom vintage media-processing style from the set of available media-processing styles.

As shown above in FIGS. 7A-7X, computer system 600 displays a custom style identifier (e.g., custom standard style identifier 634*aa* and/or custom vintage style identifier 636*dd*) using words (and/or symbols and/or numbers) that are based on one or more current values of one or more parameters. In some embodiments, when the current value of the tone parameter is above a median value and/or a default value (e.g., "0") (e.g., and/or a range of values that includes the median value and/or default value), the custom style identifier can include a first word, such as "rich." In some embodiments, when the current value of the tone parameter is below the median value, the custom the custom style identifier can include a second word, such as "soft" that is different from (e.g., opposite from and/or an antonym of) the first word. In some embodiments, when the current value of the warmth parameter is above the median value (e.g., "0"), the custom style identifier can include a third word (e.g., that is different from the first word and the second word), such as the word "warm." In some embodiments, when the current value of the warmth parameter is below the median value (e.g., "0"), the custom style identifier can include a fourth word (e.g., that is different from the first word, second word, and third word), such as the word "cool." In some embodiments, the third word is opposite from and/or an antonym of the fourth word. Thus, in some embodiments, the custom style identifier can be combination of words that are indicative of the current value for multiple parameters, such as "rich-warm," "rich-cool," "soft-warm," or "soft cool." In some embodiments, when the current values of both parameters are set to the median value, the custom style identifier can include a word, such as "standard." In some embodiments, when the current value for one of the parameters is set to the median value and the current value for another parameter is not set to the median value, the custom style identifier includes a word that is indicative of the parameter that is not currently set to the median value but does not include a word that is indicative of the parameter that is currently set to the median value, such as "rich" or "soft" if the tone parameter is not currently set to the median value and the warmth parameter is set to the median value; or "warmth" or "cool" if the warmth parameter is not currently set to the median value and the tone parameter is set to the median value. In some embodiments, a customer style identifier can include one or more words for one or more other parameters (e.g., a third parameter, a fourth parameter, a fifth parameter, etc.). Thus, when there is a third parameter (or a fourth parameter or a fifth parameter) for a media-processing style, the custom style identifier can include a different word based on the current value of the third parameter (along with the words for the first parameter and/or the second parameters (and the third parameter and/or the fourth parameter)) based on whether the third parameter is above/below a median value, such as "bright" (e.g., above the median value) or "dull" (e.g., below the median value) for a brightness parameter. In some embodiments, the custom style identifier can include a word to identify a media-processing style with a particular value for the tone parameter and a particular value for the warmth parameter, such as "vibrant" having a default tone value of "80" and a default warm value of "0" (e.g., as discussed above in relation vibrant style 634*b* of FIG. 6H) (e.g., same for the particular default values for the parameters for "luxe" and/or "vintage" discussed above). In some embodiments, the custom style identifier can include one or more additional words based on whether the current value for a parameter is above/below the default value for a particular media-processing style, such as "vibrant-cool" when the current value for the parameter value is below "0", "vibrant-warm" when the current value for the warm parameter is above "0", "vibrant-soft" when the current value for the tone parameter is below "80", "vibrant-rich" when the current value for the tone parameter is above "80," or a combination thereof (e.g., "vibrant-soft-rich", "vibrant-soft-warm", "vibrant-rich-warm", or "vibrant-rich-cool"). In some embodiments, custom identifiers for other media-processing styles (e.g., luxe 634*c* of FIG. 6M and/or vintage 634*d* of FIG. 7U) can use the same paradigm discussed above in relation to vibrant style 634*b*. Moreover, the words used to describe the current values for the particular parameters above are merely exemplary, and one or more other words can be used in place of the words (e.g., "warm," "cool", "soft", "rich", "dull", "bright", "standard", "luxe", "vibrant," and/or "vintage") discussed above.

FIGS. 8A-8C illustrate exemplary user interfaces for selecting media-processing styles using a computer system in accordance with some embodiments. The user interfaces in these figures are used to illustrate the processes described below, including the processes in FIGS. 9 and 10A-10B.

FIG. 8A illustrates computer system 600 displaying a settings user interface that includes settings 844. Settings 844 include media-processing styles setting 844*a*. At FIG. 8A, computer system 600 detects tap input 850*a* on media-processing styles setting 844*a*. As illustrated in FIG. 8B, in response to detecting tap input 850*a*, computer system 600 displays media-processing styles user interface 810 that includes representation of standard style 878*a* and representation of vibrant style 878*b*. Representation of standard style 878*a* is a sample image (e.g., a stock image) and representation of vibrant style 878*b* is a sample image. Each respective sample image for the respective styles have the respective individual media-processing style applied. As illustrated in FIG. 8B, paging dots 638 indicate that there are four available styles in the set of available styles, which are standard style 634*a* (e.g., corresponding to standard paging dot 638*a*), vibrant style 634*b* (e.g., corresponding to vibrant paging dot 638*b*), luxe style 634*c* (e.g., corresponds to luxe paging dot 638*c*), and vintage style 634*d* (e.g., corresponding to vintage paging dot 638*d*) that have been previously discussed above. In some embodiments, when user interface 810 is displayed while a custom media-processing style is added to the available sets of media-processing styles, computer system 600 displays paging dots and/or a representation for the custom media-processing style.

As illustrated in FIG. 8B, user interface 810 includes area 814*a* that includes the default values for the parameters for the media-processing style (e.g., standard style 634*a*, as discussed above) that corresponds to representation of standard style 878*a* and selection control 816*a*. In some embodiments, in response to detecting an input on selection control 816*a*, computer system 600 sets standard style 634*a* (e.g., using one or more techniques discuss below in relation to FIG. 8C) as the currently selected media-processing style. At FIG. 8B, computer system 600 detects movement input 850*b*.

As illustrated in FIG. 8C, in response to detecting movement input 850*b*, computer system 600 moves the representations of media-processing styles to the left and displays the representation of vibrant style 878*b* in between a portion of the representation of standard style 878*a* and a portion of representation of luxe style 878*c*. Because the representation of vibrant style 878*b* is in a predetermined position on the display, computer system 600 replaces area 814*a* with 814*b*, which includes the default values for the parameters for vibrant style 634*b* (e.g., as described above). At FIG. 8C, computer system detects tap input 850*c* on selection control 816*b*, In some embodiments, in response to detecting tap input 850*c*, computer system sets vibrant style 634*b* as the currently selected media-processing style. In some embodiments, while vibrant style 634*b* is the currently selected media-processing style, computer system 600 will use vibrant style 634*b* as the default media-processing style to display representations of previously captured media, display representations (e.g., live preview 630) of the FOV, and/or to capture media in the future. In some embodiments, while vibrant style 634*b* is the currently selected media-processing style, computer system 600 detects a request to re-display the camera user interface and, in response to detecting the request, computer system 600 displays live preview 630 in the camera user interface using the currently selected media-processing style (e.g., vibrant style 634*b*). In some embodiments, while displaying live preview 630 using the currently selected media-processing style, computer system 600 captures media and displays media using the currently selected media-processing style that was selected (e.g., with an input, such as tap input 850*c*) via user interface 810.

FIG. 9 is a flow diagram illustrating methods for selecting media-processing styles using a computer system in accordance with some embodiments. Method 900 is performed at a computer system (e.g., 100, 300, 500, 600) (e.g., a smartphone, a desktop computer, a laptop, and/or a tablet) that is in communication with a display generation component (e.g., a display controller, and/or a touch-sensitive display system) and one or more input devices (e.g., a touch-sensitive surface and/or a first camera of one or more cameras (e.g., one or more cameras (e.g., dual cameras, triple camera, quad cameras, etc.) on the same side or different sides of the computer system (e.g., a front camera and/or a back camera))). Some operations in method 900 are, optionally, combined, the orders of some operations are, optionally, changed, and some operations are, optionally, omitted.

As described below, method 900 provides an intuitive way for selecting media-processing styles using a computer system. The method reduces the cognitive burden on a user for selecting media-processing styles using a computer system, thereby creating a more efficient human-machine interface. For battery-operated computing devices, enabling a user to select media-processing styles using a computer system faster and more efficiently conserves power and increases the time between battery charges.

The computer system displays (902), via the display generation component, a style-selection user interface (e.g., a media capture user interface, a media viewing user interface, and/or a media editing user interface) that includes a representation (e.g., 630, 676*a*, 676*b*, 676*c*, 680*c*, and/or 680*d*) (e.g., an image) (e.g., photo media and/or video media) (e.g., live media, a live preview (e.g., media corresponding a representation of a field-of-view (e.g., a current field-of-view) of the one or more cameras that has not been stored/captured (e.g., in response to detecting a request to capture media (e.g., detecting selection of a shutter affordance (e.g., user interface object))), and/or previously captured media (e.g., media corresponding a representation of a field-of-view (e.g., a previous field-of-view) of the one or more cameras that has been captured, a media item that has been saved and is able to be accessed by a user at a later time, a representation of media that was displayed in response to receiving a gesture on a thumbnail representation of media (e.g., in a media gallery)) of media (e.g., information, data that is being captured (e.g., the media is a representation of a field of view of one or more cameras of the computer system) or that has been captured by one or more cameras of the computer system), where a first portion (e.g., a portion of middle section, the left section, and/or the right section of 630, 676*a*, 676*b*, 676*c*, 680*c*, and/or 680*d*) of the representation (e.g., 630, 676*a*, 676*b*, 676*c*, 680*c*, and/or 680*d*) and a second portion (e.g., a portion of middle section, the left section, and/or the right section of 630, 676*a*, 676*b*, 676*c*, 680*c*, and/or 680*d*) of the representation (e.g., 630, 676*a*, 676*b*, 676*c*, 680*c*, and/or 680*d*) are displayed using (e.g., according to, with) a first media-processing style (e.g., 634*a*-634*d*, 634*aa*, and/or 634*dd*) (e.g., while operating in a camera mode). In some embodiments, the first media-processing style is one of a plurality of media-processing styles (e.g., that include the second media-processing style and the third media-processing style). In some embodiments, each plurality of styles have the same set of parameters (e.g., the same type of parameters), but with different values for one or more parameters. In some embodiments, the set of parameters is a set of media processing parameters used to determine an appearance of media (e.g., color characteristics (e.g., warmth, tone, hue, brightness, saturation, shade, tint, colorfulness, coldness, and/or harmony) and/or depth parameters) that is applied to visual content of the media (e.g., that affects (e.g., portions of) the display of the representation of the media) (e.g., that changes one or more characteristics (e.g., color characteristics, depth characteristics) of a displayed representation of the media) (e.g., and displaying without using a second style that is applied to the visual content of the media). In some embodiments, the first portion and the second portion do not overlap and/or the first portion does not surround a subset of the second portion and/or the second portion does not surround a subset of the first portion. In some embodiments, the first portion and the second portion are different. In some embodiments, the media-processing style also affects the capture of media that was captured while in a media capture (e.g., camera) application.

While the first portion of the representation (e.g., a portion of middle section, and/or the left section, the right section of 630, 676*a*, 676*b*, 676*c*, 680*c*, and/or 680*d*) and the second portion (e.g., a portion of middle section, and/or the left section, the right section of 630, 676*a*, 676*b*, 676*c*, 680*c*, and/or 680*d*) of the representation are displayed using the first media-processing style (e.g., 634*a*-634*d*, 634*aa*, and/or 634*dd*), the computer system detects (904), via the one or more input devices, an input (e.g., 650*d*, 650*k*1, 650*k*2, 750*j*, and/or 750*q*) (e.g., a movement input/gesture (e.g., a swipe input/gesture that includes velocity at the end of the input/gesture or a drag input/gesture that causes changes based on movement during the input/gesture)) (and/or, in some embodiments, detecting a non-movement input/gesture, a tap input/gesture (e.g., single tap input/gesture, a double tap input/gesture) and/or a press-and-hold input/gesture) directed to the representation (e.g., 630, 676*a*, 676*b*, 676*c*, 680*c*, and/or 680*d*).

In response to detecting the input directed to the representation (e.g., 630, 676*a*, 676*b*, 676*c*, 680*c*, and/or 680*d*) and (and, in some embodiments, while continuing to detect the input (and while continuing to display the representation of the media)) in accordance with a determination that the input (e.g., 650*d*, 650*k*1, 650*k*2, 750*j*, and/or 750*q*) is in a first direction (e.g., right, left, up, down, and/or diagonal) (and in accordance with a determination that the computer system is operating in a media-processing style selection mode (e.g., a mode that enables a user to instruct the computer system to apply one or more media-processing styles to media captured by the computer system after the one or more media-processing styles are selected by the user), the computer system displays (906), via the display generation component, the first portion (e.g., a portion of middle section, the left section, and/or the right section of 630, 676*a*, 676*b*, 676*c*, 680*c*, and/or 680*d*) of the representation using a second media-processing style (e.g., 634*a*-634*d*, 634*aa*, and/or 634*dd*) (e.g., that is applied to visual content of the media, that affects the display of the representation of the media) (e.g., without displaying the first portion of the representation using the first media-processing style and/or the third media-processing style) (e.g., that is different from the first media-processing style) while continuing to display the second portion (e.g., a portion of middle section, the left section, and/or the right section of 630, 676*a*, 676*b*, 676*c*, 680*c*, and/or 680*d*) of the representation using the first media-processing style (e.g., 634*a*-634*d*, 634*aa*, and/or 634*dd*) (e.g., without displaying the second portion of the representation using the second media-processing style and/or the third media-processing style) (e.g., without displaying a visual element corresponding to the third media-processing style). In some embodiments, the input includes a component of motion in the first direction. In some embodiments, the input is not detected at a location on the style-selection user interface that corresponds to and/or of the second media-processing style and/or the input is not detected at a location on the style-selection user interface that corresponds to and/or of the first media-processing style. In some embodiments, the input is not detected at a location on the style-selection user interface that corresponds to the edge and/or border of the second media-processing style and/or the first media-processing style. In some embodiments, the input is detected at a location on the style-selection user interface that corresponds to a central location (e.g., non-border/edge) of the first media-processing style and/or the second media-processing style.

As a part of displaying, via the display generation component, the first portion of the representation using a second media-processing while continuing to display the second portion of the representation using the first media-processing style, the computer system, in response to detecting a first portion of the input (e.g., 650*d*, 650*k*1, 650*k*2, 750*j*, and/or 750*q*) directed to the representation, where the first portion of the input (e.g., 650*d*, 650*k*1, 650*k*2, 750*j*, and/or 750*q*) has a first input magnitude (e.g., a first amount of movement in a first direction from a beginning of the input), displays (908) the first portion of the representation using the second media-processing style (e.g., 634*a*-634*d*, 634*aa*, and/or 634*dd*) (e.g., without using the first media-processing style) while the second portion (e.g., a portion of middle section, the left section, and/or the right section of 630, 676*a*, 676*b*, 676*c*, 680*c*, and/or 680*d*) of the representation and a third portion (e.g., a portion of middle section, the left section, and/or the right section of 630, 676*a*, 676*b*, 676*c*, 680*c*, and/or 680*d*) of the representation that is between the first portion of the representation and the second portion of the representation are displayed using the first media-processing style (e.g., 634*a*-634*d*, 634*aa*, and/or 634*dd*) (e.g., without using the second media-processing style).

As a part of displaying, via the display generation component, the first portion of the representation using a second media-processing while continuing to display the second portion of the representation using the first media-processing style, the computer system, after displaying the first portion of the representation using the second media-processing style (e.g., 634*a*-634*d*, 634*aa*, and/or 634*dd*) while the second portion (e.g., a portion of middle section, the left section, and/or the right section of 630, 676*a*, 676*b*, 676*c*, 680*c*, and/or 680*d*) of the representation and the third portion (e.g., a portion of middle section, the left section, and/or the right section of 630, 676*a*, 676*b*, 676*c*, 680*c*, and/or 680*d*) of the representation are displayed using the first media-processing style (e.g., 634*a*-634*d*, 634*aa*, and/or 634*dd*) and in response to detecting a second portion of the input (e.g., 650*d*, 650*k*1, 650*k*2, 750*j*, and/or 750*q*) directed to the representation, where the second portion of the input has a second input magnitude that is greater than the first input magnitude (e.g., a second amount of movement in the first direction from a beginning of the input), displays (910) the first portion (e.g., a portion of middle section, the left section, and/or the right section of 630, 676*a*, 676*b*, 676*c*, 680*c*, and/or 680*d*) of the representation and the third portion (e.g., a portion of middle section, the left section, and/or the right section of 630, 676*a*, 676*b*, 676*c*, 680*c*, and/or 680*d*) of the representation using the second media-processing style (e.g., 634*a*-634*d*, 634*aa*, and/or 634*dd*) while the second portion (e.g., a portion of middle section, the left section, and/or the right section of 630, 676*a*, 676*b*, 676*c*, 680*c*, and/or 680*d*) of the representation is displayed using the first media-processing style (e.g., 634*a*-634*d*, 634*aa*, and/or 634*dd*). In some embodiments, the first portion of the representation, the second portion of the representation, and the third portion of the representation do not overlap. Displaying different portions of the representation using a respective media-processing style based on the magnitude of a portion of the input directed to the representation allows the user to control which portions of the representation that are displayed using the respective media-processing style and provides visual feedback concerning how the respective media-processing style would affect media representative of the portion of the representation that could be captured, which improves visual feedback.

In some embodiments, before detecting the input (e.g., 650*d*, 650*k*1, 650*k*2, 750*j*, 750*q*) (including the first portion and the second portion) directed to the representation (e.g., 630, 676*a*, 676*b*, 676*c*, 680*c*, and/or 680*d*), the first portion (e.g., a portion of middle section, the left section, and/or the right section of 630, 676*a*, 676*b*, 676*c*, 680*c*, and/or 680*d*) of the representation and the second portion (e.g., a portion of middle section, the left section, and/or the right section of 630, 676*a*, 676*b*, 676*c*, 680*c*, and/or 680*d*) of the representation are not displayed using the second media-processing style.

In some embodiments, the first media-processing style (e.g., 634*a*-634*d*, 634*aa*, and/or 634*dd*) is different from the second media-processing style (e.g., 634*a*-634*d*, 634*aa*, and/or 634*dd*). Displaying different portions of the representation using different respective media-processing styles based on the magnitude of a portion of the input directed to the representation allows the user to control which portions of the representation that are displayed using the different respective media-processing styles and provides visual feedback concerning how the different respective media-processing style would affect media representative of the portion of the representation that could be captured differently, which improves visual feedback.

In some embodiments, in response to detecting the first portion of the input (e.g., 650*d*, 650*k*1, 650*k*2, 750*j*, and/or 750*q*) directed to the representation (e.g., 630, 676*a*, 676*b*, 676*c*, 680*c*, and/or 680*d*), the second portion (e.g., a portion of middle section, the left section, and/or the right section of 630, 676*a*, 676*b*, 676*c*, 680*c*, and/or 680*d*) of the representation and the third portion (e.g., a portion of middle section, the left section, and/or the right section of 630, 676*a*, 676*b*, 676*c*, 680*c*, and/or 680*d*) of the representation are not displayed using the second media-processing style (e.g., 634*a*-634*d*, 634*aa*, and/or 634*dd*). In some embodiments, in response to detecting the second portion of the input, the first portion of the representation and the third portion of the representation are not displayed using the first media-processing style.

In some embodiments, an amount of the representation (e.g., 630, 676*a*, 676*b*, 676*c*, 680*c*, and/or 680*d*) to which the second media-processing style (e.g., 634*a*-634*d*, 634*aa*, and/or 634*dd*) (and/or the first media-processing style) is applied is based on an amount of (e.g., proportional to) movement (e.g., velocity, acceleration, and/or displacement (e.g., distance between two points (e.g., starting point of input, ending point of input)) (and, in some embodiments, direction) of the input (e.g., 650*d*, 650*k*1, 650*k*2, 750*j*, and/or 750*q*) directed to the representation. Displaying an amount of the representation to which the second media-processing style applied is based on an amount of movement of the input directed to the representation allows the user to control the amount of the representation to which a respective media-processing style is applied by the amount of movement of an input, which provides additional control options without cluttering the user interface.

In some embodiments, in response to detecting an end of the input (e.g., 650*d*, 650*k*1, 650*k*2, 750*j*, and/or 750*q*) (e.g., 650*d* at FIG. 6H) directed to the representation: (e.g., and while the representation is displayed using the first media-processing style and the second media-processing style) (and in accordance with a determination that the input is in the first direction), the computer system, in accordance with a determination that more than a predetermined portion of the representation (e.g., 630, 676*a*, 676*b*, 676*c*, 680*c*, and/or 680*d*) (e.g., 25%, 30%, 40% 50%, 60%, 75%) was displayed using the first media-processing style (e.g., 634*a*-634*d*, 634*aa*, and/or 634*dd*) (e.g., 634*b* in FIG. 6H) when (e.g., at the same time as, immediately before, and/or immediately after) the end of the input (e.g., 650*d*) directed to the representation was detected (e.g., and/or in accordance with a determination that the second media-processing style was (and/or the first media-processing style was not) being applied to a particular portion of the representation before the end of the input directed to the representation was detected), displays (e.g., snapping to the display of, abruptly and/or immediately displaying after detecting the end of the input) the first portion (e.g., the middle section) of the representation (and, optionally, the second portion of the representation) using the first media-processing style (e.g., 634*a*-634*d*, 634*aa*, and/or 634*dd*) (e.g., 634*b*) (e.g., without displaying the first portion, the second portion, and/or another portion of representation using the second media-processing style). In some embodiments, the predetermined portion of the representation is a greater portion of the representation that is displayed (e.g., currently displayed) using one respective media-processing style than any other portion of the representation that is displayed using another media-processing style. In some embodiments, in response to detecting an end of the input (e.g., 650*d*, 650*k*1, 650*k*2, 750*j*, and/or 750*q*) (e.g., 650*d* at FIG. 6H) directed to the representation: (e.g., and while the representation is displayed using the first media-processing style and the second media-processing style) (and in accordance with a determination that the input is in the first direction), the computer system, in accordance with a determination that less than the predetermined portion of the representation (e.g., 630) was displayed using the first media-processing style (e.g., 634*a*-634*d*, 634*aa*, and/or 634*dd*) when (e.g., at the same time as, immediately before or immediately after) the end of the input (e.g., 650*d*) directed to the representation was detected (e.g., and/or in accordance with a determination that the second media-processing style was not (and/or the first media-processing style was) being applied to the particular portion of the representation before the end of the input directed to the representation was detected), displays (e.g., snapping to the display of, abruptly and/or immediately displaying after detecting the end of the input) the first portion (e.g., the middle section) of the representation (e.g., 630) (and, optionally, the second portion of the representation) using the second media-processing style (e.g., 634*a*-634*d*, 634*aa*, and/or 634*dd*) (e.g., as discussed above in relation to 634*a* at FIG. 6I) (e.g., without displaying the first portion, the second portion, and/or another portion of representation using the first media-processing style). Automatically displaying the first portion of the representation and the second portion of the representation using a particular media-processing style when prescribed conditions are met allows the computer system to automatically select one or more media-processing styles that will be applied to the representations of media and provides visual feedback to the user regarding which media-processing style was selected to be applied to the representation of the media in response to detecting an end of the input directed to the representation, which performs an operation when a set of conditions has been met without requiring further user input and provides improved visual feedback.

In some embodiments, in response to detecting the input (e.g., 650*d*, 650*k*1, 650*k*2, 750*j*, and/or 750*q*) (e.g., 650*k*2) directed to the representation and in accordance with a determination that the input is in a second direction (e.g., right, left, up, down, and/or diagonal) (e.g., an opposite direction of the first direction) that is different from (e.g., the opposite of) the first direction, the computer system displays the second portion of the representation using a third media-processing style (e.g., 634*a*-634*d*, 634*aa*, and/or 634*dd*) (e.g., 634*a*) (e.g., that is applied to visual content of the media, that affects the display of the representation of the media) (e.g., without displaying the third portion of the representation using the first media-processing style and/or the second media-processing style) while continuing to display the first portion of the representation using the first media-processing style (e.g., 634*a*-634*d*, 634*aa*, and/or 634*dd*) (e.g., 634*b*) (e.g., without displaying the first portion of the representation using the second media-processing style and/or the third media-processing style) (e.g., without displaying a visual element (e.g., a visual element that represents and/or looks like an edge of a style, an edge of a frame) corresponding to the second media-processing style) (e.g., without displaying a visual element corresponding to the second media-processing style), where the third media-processing style is different from the first media-processing style and the second media-processing style (e.g., 634*a*-634*d*, 634*aa*, and/or 634*dd*) (e.g., 634*c*). In some embodiments, the input includes a component of motion in the second direction. In some embodiments, the first portion and second portion of the media do not move positions on the representation of the media (e.g., continued to be displayed in the same location). In some embodiments, the first media-processing style, the second media-processing style, and the third media-processing style have the same set of parameters (e.g., the same type of parameters (e.g., as described below in relation to method 1000 and FIGS. 7A-7X)). In some embodiments, the first media-processing style, the second media-processing style, and the third media-processing style are different because one or more values for the set of parameters for each respective media-processing style is different. In some embodiments, before detecting the input directed to the representation, the first portion includes a first object that is displayed using the first media-processing style and/or the second portion includes a second object that is displayed using the first media-processing style. In some embodiments, in response to detecting the input directed to the representation and while continuing to detect the input, in accordance with a determination that the input is in a first direction, the first object is displayed using the second media-processing style; and in accordance with a determination that the input is in a second direction, the second object is displayed using the third media-processing style and/or the first media-processing style. In some embodiments, a visual element corresponding to the second media-processing style and visual element corresponding to the third media-processing style is displayed before the input is detected. Displaying the second portion of the representation using a third media-processing style that is different from the first media-processing style and the second media-processing style in accordance with a determination that the input is in a second direction (e.g., a different that is different from the first direction) allows the user to control which portions of the representation that are displayed using a media-processing style that is different from the first media-processing style and the second media-processing style, which provides additional control options without cluttering the user interface.

In some embodiments, in response to detecting the input (e.g., 650*d*, 650*k*1, 650*k*2, 750*j*, and/or 750*q*) directed to the representation (e.g., 630, 676*a*, 676*b*, 676*c*, 680*c*, and/or 680*d*) and in accordance with a determination that the input (e.g., 650*d*, 650*k*1, 650*k*2, 750*j*, and/or 750*q*) is in the first direction (e.g., and in accordance with a determination that an end (e.g., lift off) of the input directed to the representation is detected (or in response to detecting an end of the input directed to the representation) and/or while the representation is displayed using the first media-processing style and the second media-processing style), the computer system displays a visual element (e.g., 660*a*, 660*b*) (e.g., that was not previously displayed before the input directed to the representation was detected) corresponding to a fourth media-processing style (e.g., 634*a*-634*d*, 634*aa*, and/or 634*dd*) (e.g., an indication, such as text and/or symbols) (e.g., a visual element, such as a user interface object (e.g., a border, outline of a shape, and/or a visual element that indicates that that the representation can be displayed using the fourth media-processing style) (e.g., without displaying the visual element corresponding to the fifth media-processing style) (e.g., while displaying the first portion of the representation and the second portion of the representation using the second media-processing style) (e.g., a visual element that represents and/or looks like an edge of a style, and/or an edge of a frame). In some embodiments, the visual element corresponding to the fourth media-processing style is displayed at a location/area (e.g., right and/or left edge, in a direction that is opposite of the first direction) of the style-selection user interface. In some embodiments, in response to detecting the input (e.g., 650*d*, 650*k*1, 650*k*2, 750*j*, and/or 750*q*) directed to the representation (e.g., 630, 676*a*, 676*b*, 676*c*, 680*c*, and/or 680*d*) and in accordance with a determination that the input (e.g., 650*d*, 650*k*1, 650*k*2, 750*j*, and/or 750*q*) is in a third direction (e.g., right, left, up, down, and/or diagonal) (e.g., an opposite direction of the first direction) that is different from the first direction (e.g., and in accordance with a determination that the end (e.g., lift off) of the input directed to the representation is detected (e.g., and/or while the representation is displayed using the first media-processing style and the third media-processing style (e.g., as discussed above)), the computer system displays a visual element (e.g., 660*a*, 660*b*) (e.g., that was not previously displayed before the input directed to the representation was detected) corresponding to a fifth media-processing style (e.g., 634*a*-634*d*, 634*aa*, and/or 634*dd*) (e.g., an indication, such as text and/or symbols) (e.g., a visual element, such as a user interface object (e.g., a boarder, outline of a shape, and/or a visual element that the representation can be displayed using the fourth media-processing style) (e.g., a visual element that represents and/or looks like an edge of a style, and/or an edge of a frame) that is different from the fourth media-processing style (e.g., without displaying the visual element corresponding to the fourth media-processing style) (e.g., while displaying the first portion of the representation and the second portion of the representation using the third media-processing style (e.g., as discussed above)). In some embodiments, the visual element corresponding to the fourth media-processing style is displayed at a first location (e.g., an edge of the representation of the media) on the style-selection user interface and the visual element corresponding to the fifth media-processing style is displayed at a second location (e.g., an edge of the representation of the media, an opposite of the first location) on the style-selection user interface that is different from the first location on the style-selection user interface. In some embodiments, the visual element corresponding to the fourth media-processing style and/or the visual element corresponding to the fifth media-processing style is displayed concurrently with a visual element corresponding to the first media-processing style. In some embodiments, the visual element corresponding to the fifth media-processing style is displayed at a location/area (e.g., right and/or left edge, in a direction that is opposite of the third direction) of the style-selection user interface that is different from the area/location of the style-selection user interface at which the visual element corresponding to the fifth media-processing style would be displayed. Displaying a visual element that corresponds to a respective style based on the direction of the input that is directed to the representation provides the user with visual feedback concerning a style that can be selected via an additional input directed to the representation, which provides improved visual feedback.

In some embodiments, before detecting the input (e.g., 650*d*, 650*k*1, 650*k*2, 750*j*, and/or 750*q*) directed to the representation (e.g., 630, 676*a*, 676*b*, 676*c*, 680*c*, and/or 680*d*) (and, in some embodiments, while the first portion of the representation and the second portion of the representation are displayed using the first media-processing style), the style-selection user interface includes a visual element (e.g., 660*a*, 660*b*) (e.g., a visual element that represents and/or looks like an edge of a style, and/or an edge of a frame) corresponding to the second media-processing style (e.g., 634*a*-634*d*, 634*aa*, and/or 634*dd*) and a visual element (e.g., 660*a*, 660*b*) corresponding to a sixth media-processing style (e.g., 634*a*-634*d*, 634*aa*, and/or 634*dd*) (e.g., third media-processing style (e.g., as described above in relation to method 900) (e.g., a visual element that represents and/or looks like an edge of a style, and/or an edge of a frame). In some embodiments, in response to detecting the input (e.g., 650*d*, 650*k*1, 650*k*2, 750*j*, and/or 750*q*) directed to the representation (e.g., in accordance with a determination that the end of the input is detected or before and after the input directed to the representation is detected) and in accordance with a determination that the input (e.g., 650*d*, 650*k*1, 650*k*2, 750*j*, and/or 750*q*) is in the first direction, the computer system ceases to display the visual element (e.g., 660*a*, 660*b*) corresponding to the second media-processing style without displaying the representation (e.g., any portion of the representation) using the second media-processing style (e.g., 634*a*-634*d*, 634*aa*, and/or 634*dd*) (e.g., without applying the second media-processing style to the representation of the media). In some embodiments, in response to detecting the input (e.g., 650*d*, 650*k*1, 650*k*2, 750*j*, and/or 750*q*) directed to the representation (e.g., in accordance with a determination that the end of the input is detected or before and after the input directed to the representation is detected) and in accordance with a determination that the input (e.g., 650*d*, 650*k*1, 650*k*2, 750*j*, and/or 750*q*) is in a fourth direction that is different from the first direction, the computer system ceases to display the visual element (e.g., 660*a*, 660*b*) corresponding to the sixth media-processing style without displaying the representation (e.g., 630, 676*a*, 676*b*, 676*c*, 680*c*, and/or 680*d*) (e.g., any portion of the representation) using the sixth media-processing style (e.g., 634*a*-634*d*, 634*aa*, and/or 634*dd*) (e.g., without applying the sixth media-processing style to the representation of the media). Ceasing to display the visual element corresponding to the second media-processing style without displaying the representation using the second media-processing style in accordance with a determination that the input is in the first direction or ceasing to display the visual element corresponding to the sixth media-processing style without displaying the representation using the sixth media-processing style in accordance with a determination that the input is in a fourth direction that is different from the first direction provides the user with visual feedback that informs the user that the respective media-processing style corresponding to the visual element that has ceased to be displayed cannot be selected by the input being provided in a particular direction and/or that the user will need to change the direction of the input in order for the respective media-processing style to be selected, which provides improved visual feedback.

In some embodiments, the input (e.g., 650*d*, 650*k*1, 650*k*2, 750*j*, and/or 750*q*) directed to the representation (e.g., 630, 676*a*, 676*b*, 676*c*, 680*c*, and/or 680*d*) is not detected at an indication (e.g., a portion of) of the second media-processing style (e.g., 634a-634d, 634aa, and/or 634dd) (e.g., a portion of the representation of the media that is displayed using the second media-processing style (and/or the third media-processing style (e.g., as discussed above in relation to method 900), an indication (e.g., one or more text/symbols), a portion of the second media-processing style, and/or visual element (e.g., border of an object) that represents the second media-processing style). Displaying different portions of the representation using a respective media-processing style in response to an input that is not detected at an indication of the second media-processing style allows the user to select a respective media-processing style via the input without the need for the user to select an object that represents the respective media-processing style and/or for the object that represents the respective media-processing style to be displayed, which can clutter the UI, which provides additional control options without cluttering the user interface.

In some embodiments, the representation of the media is a representation (e.g., 676a, 676b, 676c, 680c, and/or 680d) of previously captured media (e.g., is not a preview/view of a live camera field-of-view). In some embodiments, after detecting the input (e.g., 650d, 650k1, 650k2, 750j, and/or 750q) directed to the representation, the computer system displays an option (e.g., 816a, 816b) to use a seventh media-processing style (e.g., 634a-634d, 634aa, and/or 634dd) for media captured in response to future media capture requests (e.g., a user interface object labeled "use"). In some embodiments, while displaying the option (e.g., 816a, 816b) to use the seventh media-processing style (e.g., 634a-634d, 634aa, and/or 634dd), the computer system detects an input (e.g., 850c) (e.g., a tap input (e.g., a tap gesture) (e.g., a single tap input, a double tap input)) (and/or, in some embodiments, in response to detecting a non-tap input/gesture (e.g., a movement input/gesture, a press-and-hold input/gesture, a voice input)) directed to the option to use the seventh media-processing style (e.g., and/or to apply the seventh media-processing style to visual content of media). In some embodiments, in response to detecting the input (e.g., 850c) directed to the option to use the seventh media-processing style, the computer system configures the computer system to use the seventh media-processing style (e.g., for media captured in response to future media capture requests). In some embodiments, while the computer system (e.g., 600) is configured to use the seventh media-processing style (e.g., for media captured in response to future media capture requests), the computer system detects a request (e.g., 650a, as discussed in relation to FIGS. 8A-8C) to capture media. In some embodiments, in response to detecting the request (e.g., 650a, as discussed in relation to FIGS. 8A-8C) to capture media while the computer system is configured to use the seventh media-processing style, the computer system captures respective media. In some embodiments, after capturing the respective media (e.g., and in response to a request to display the respective media), the computer system displays a first user interface (e.g., 668) (e.g., as discussed in relation to FIGS. 8A-8C) that includes a representation (e.g., 680c, 680d) (e.g., as discussed in relation to FIGS. 8A-8C) of the respective media (e.g., previously captured media). In some embodiments, the representation of the respective media is displayed in the first user interface (e.g., that includes the representation of the respective media) using the seventh media-processing style. In some embodiments, the first user interface is displayed in response to detecting an input (e.g., a tap input (e.g., a tap gesture) (e.g., a single tap input, a double tap input)) (and/or, in some embodiments, in response to detecting a non-tap input/gesture (e.g., a movement input/gesture, a press-and-hold input/gesture, and/or a voice input)) on a media gallery user interface object and/or a thumbnail that is representative of the representation of the media using the seventh media-processing style. In some embodiments, while displaying the representation of the media using the seventh media-processing style, the computer system detects a request to display a representation of second (e.g., previously captured) media and, in response to detecting the request to display the representation of other media, the computer system displays the representation of other media using the seventh media-processing style. In some embodiments, the computer system displays the representation of other media using the seventh media-processing style, irrespective of whether the other media was captured using the seventh media-processing style. In some embodiments, the computer system displays the representation of other media using the seventh media-processing style only when the representation of the media was not captured using another media-processing style. In some embodiments, the other media was captured before the input directed to the option to use the seventh media-processing style to display one or more representations of the media was detected. Configuring the computer system to use the seventh media-processing style in response to detecting the input directed to the option to use the seventh media-processing style for media captured in response to future media capture requests allows a user to control which media-processing style(s) will be applied to one or more representations of media that will be captured in the future (and, in some embodiments, representations of previously captured media), which provides additional control options without cluttering the user interface. Displaying different portions of a representation of previously captured using respective media-processing style(s) allows the user to select a media-processing style for previously captured media by providing an input and provides visual feedback to the user concerning how the respective media-processing style(s) would affect one or more portions of the previously captured media, which provides additional control options without cluttering the user interface and provides improved visual feedback.

In some embodiments, the computer system is in communication with one or more cameras that includes the first camera. In some embodiments, the representation of the media includes a representation (e.g., 630) (e.g., a live representation, a live preview) of at least a portion of a current field-of-view of at least the first camera. In some embodiments, the representation is updated when the portion of the current field-of-view of at least the first camera changes. In some embodiments, the portion of the current field-of-view of at least the first camera changes when the computer system is moved around, one or more objects are moved into and/or out of the field-of-view of at least the first camera, and/or when other changes occur (e.g., lighting changes) in the field-of-view of at least the first camera. In some embodiments, after detecting the input (e.g., 650d, 650k1, 650k2, 750j, and/or 750q) directed to the representation, the computer system displays an option (e.g., 816a, 816b) to use an eighth media-processing style for media captured in response to future media capture requests (e.g., a user interface object labeled "use"). In some embodiments, while displaying the option to use the eighth media-processing style (e.g., 634a-634d, 634aa, and/or 634dd), the computer system detects an input (e.g., 850c) (e.g., a tap input (e.g., a tap gesture) (e.g., a single tap input, a double tap input)) (and/or, in some embodiments, in response to detecting a non-tap input/gesture (e.g., a movement input/gesture, a press-and-hold input/gesture, and/or a voice input)) directed to the option to use the eighth media-processing style (e.g., and/or to apply the eighth media-processing style to visual content of media). In some embodiments, in response to detecting the input (e.g., 850*c*) directed to the option to use the eighth media-processing style, the computer system configures the computer system (e.g., 600) to use the eighth media-processing style (e.g., for media captured in response to future media capture requests). In some embodiments, while the computer system (e.g., 600) is configured to use the eighth media-processing style, the computer system detects a second request (e.g., 650*a*, as described in relation to FIGS. 8A-8C) to capture media. In some embodiments, in response to detecting the second request (e.g., 650*a*, as described in relation to FIGS. 8A-8C) to capture media while the computer system is configured to use the eighth media-processing style, the computer system captures second respective media. In some embodiments, after capturing the second respective media, the computer system displays a second user interface (e.g., 668) (e.g., as discussed in relation to FIGS. 8A-8C) that includes a representation (e.g., 680*c*, 680*d*) (e.g., as described in relation to FIGS. 8A-8C) of the second respective media. In some embodiments, the representation of the second respective media (e.g., previously captured media) is displayed in the second user interface (e.g., that includes a representation of the second respective media) using the eighth media-processing style. In some embodiments, as a part of detecting the second request, the computer system detects an input (e.g., a tap input (e.g., a tap gesture) (e.g., a single tap input, a double tap input)) (and/or, in some embodiments, in response to detecting a non-tap input/gesture (e.g., a movement input/gesture, a press-and-hold input/gesture, and/or a voice input)) on a camera application icon (e.g., to open a camera application). In some embodiments, while displaying the representation of the media using the eighth media-processing style, the computer system detects a requests to close and re-open an application, and in response to detecting the requests to close and re-open the application, the computer system displays a different representation of media using the eighth media-processing style. In some embodiments, before capturing the respective media and while the computer system is configured to use the eighth media-processing style, the computer system displays a third user interface that includes a representation of media (e.g., a live preview and/or a portion of a current field-of-view of at least one camera) using the eighth media-processing style. In some embodiments, in response to detecting the second request to capture media while the computer system is configured to use the eighth media-processing style, the computer system captures third respective media. In some embodiments, after capturing the third respective media, the computer system does not display a user interface that includes a representation of the third respective media using the eighth media-processing style. Configuring the computer system to use the eighth media-processing style in response to detecting the input directed to the option to use the eighth media-processing style for media captured in response to future media capture requests allows a user to control which media-processing style(s) will be applied to one or more representations of media that will be captured in the future (and, in some embodiments, representations of previously captured media), which provides additional control options without cluttering the user interface. Displaying different portions of a representation of at least a portion of a current field-of-view of at least the first camera using respective media-processing style(s) allows the user to select a media-processing style for media that will be captured in response to receiving a request to capture the media (e.g., activation of a shutter button) by providing an input and provides visual feedback to the user concerning how the respective media-processing style(s) will be applied to one or more portions of the current field-of-view after the media corresponding to the current field-of-view is captured, which provides additional control options without cluttering the user interface and provides improved visual feedback.

In some embodiments, as a part of applying a respective media-processing style (e.g., 634*a*-634*d*, 634*aa*, and/or 634*dd*) to captured media (e.g., displaying a respective representation using a respective media-processing style), the computer system applies a first set of operations (e.g., media processing operations) to the captured media (e.g., 680*b*, 680*c*). In some embodiments, as a part of applying the respective media-processing style (e.g., 634*a*-634*d*, 634*aa*, and/or 634*dd*) to a live preview (e.g., 630) (e.g., a current field-of-view) of a portion of a field-of-view of one or more cameras (e.g., displaying a respective portion of a field-of-view of one or more cameras), the computer system applies a second set of operations (e.g., media processing operations) to the live preview (e.g., 630). In some embodiments, parameters for the media processing operations in the first set of operations and the second set of operations are selected based on the respective media-processing style. In some embodiments, the first set of operations take a longer time or greater amount of processing power to apply and the second set of operations can be applied more quickly or with a smaller amount of processing power, and using the first set of operations provides a higher quality result than using the second set of operations. In some embodiments, applying the second set of operations is a less intense (e.g., includes less operations, requires less processing resources (e.g., random access memory and/or instruction sets) process than applying the first set of operations. In some embodiments, applying the second set of operations to the live preview allows the computer system to display the live preview using the respective media-processing style with reduced latency and/or visual distortion than when the first set of operations is applied to the live preview. Applying the first set of operations to the capture media and the second set of operations to the live preview enhances the computer system's ability to provide visual feedback concerning how the respective media-processing style would affect media representative of the portion of the representation that could be captured with a less computationally intense set of operations for applying a respective media-processing style to the visual content of media, which provides improved visual feedback.

In some embodiments, while the first portion (e.g., a portion of middle section, the left section, and/or the right section of 630, 676*a*, 676*b*, 676*c*, 680*c*, and/or 680*d*) of the representation and the second portion (e.g., a portion of middle section, the left section, and/or the right section of 630, 676*a*, 676*b*, 676*c*, 680*c*, and/or 680*d*) of the representation are displayed using the first media-processing style (e.g., 634*a*-634*d*, 634*aa*, and/or 634*dd*), an identifier (e.g., 636*a*-636*d*, 636*aa*, and/or 636*dd*) (e.g., one or more symbols and/or text (e.g., "Standard", "Vibrant")) that corresponds to the first media-processing style is displayed. In some embodiments, the identifier is overlaid on the representation of the media. In some embodiments, the identifier is positioned above, below, to the left, to the right of, and/or overlaid on a portion of the representation of the media. Displaying an identifier that corresponds to the first media-processing style while the first portion of the representation and the second portion of the representation are displayed using the first media-processing style provides visual feedback to the user so that the user can quickly identify which media-processing style is being applied without having to determine the type of media-processing style being applied by how the media-processing style is being applied to the representation of the media, which provides improved visual feedback.

In some embodiments, as a part of displaying the first portion (e.g., a portion of middle section, the left section, and/or the right section of 630, 676*a*, 676*b*, 676*c*, 680*c*, and/or 680*d*) of the representation using the second media-processing style (e.g., 634*a*-634*d*, 634*aa*, and/or 634*dd*) while continuing to display the second portion (e.g., a portion of middle section, the left section, and/or the right section of 630) of the representation using the first media-processing style (e.g., 634*a*-634*d*, 634*aa*, and/or 634*dd*), the computer system displays a divider (e.g., 640) (e.g., an area and/or a portion of the representation; a visually distinct user interface object that delineates the intersection between the first and second portions) between the first portion of the representation and the second portion of the representation. In some embodiments, the divider is an area and/or a portion of the representation that does not have the first media-processing style, the second media-processing style, and/or any other media-processing style applied. In some embodiments, the divider is translucent. In some embodiments, the divider is not translucent. In some embodiments, the computer system moves the divider across the display based on the magnitude of the input directed to the representation. In some embodiments, when the divider is moved across the display (e.g., in response to detecting an input), the computer system, optionally, changes the sizes of the first portion of the representation and the second portion of the representation. In some embodiments, the first portion of the representation and the second portion of the representation are changed relatively and/or in an indirectly proportional manner (e.g., as the first portion of the representation increases in size, the second portion of the representation decreases in size (e.g., by the same amount that the first portion increased in size) (or vice-versa). Displaying a divider between the first portion of the representation and the second portion of the representation as a part of displaying the first portion of the representation using the second media-processing style while continuing to display the second portion of the representation using the first media-processing style provides visual feedback to the user so that the user can quickly identify which portion of the representation that is being displayed using the second media-processing style and/or which portion of the representation that is being displayed using the first media-processing style, which provides improved visual feedback.

In some embodiments, the input (e.g., 650*d*, 650*k*1, 650*k*2, 750*j*, and/or 750*q*) directed to the representation is a movement input (e.g., a swipe input/gesture that includes velocity at the end of the input/gesture or a drag input/gesture that causes changes based on movement during the input/gesture) (or, in some embodiments, is not a movement input (e.g., is a tap input, a press-and-hold input)).

In some embodiments, the computer system is in a first capture mode. In some embodiments, while displaying the style-selection user interface and while the computer system (e.g., 600) is in the first capture mode (e.g., indicative of photo mode control 620*c* in FIG. 6N), the computer system detects an input (e.g., 650*n*) (e.g., a movement input) (and/or, in some embodiments, detecting a non-movement input/gesture (e.g., a press-and-hold input/gesture, voice input, and/or a tap input)) directed to the style-selection user interface (e.g., not directed to the representation, directed to one or more camera capture mode user interface objects, at the bottom of user interface, at a different location than the location at which the input directed to the representation of the media is detected). In some embodiments, that is different from the input directed to the representation). In some embodiments, the computer system displays a camera control region that includes a plurality of selectable user interface objects for camera capture modes. In some embodiments, each camera mode (e.g., video, photo/still, portrait, slow-motion, panoramic modes) has a plurality of settings (e.g., for a portrait capture mode: a studio lighting setting, a contour lighting setting, a stage lighting setting) with multiple values (e.g., levels of light for each setting) of the mode (e.g., portrait capture mode) that a camera (e.g., a camera sensor) is operating in to capture media (including post-processing performed automatically after capture). In this way, for example, capture modes are different from modes which do not affect how the camera operates when capturing media or do not include a plurality of settings (e.g., a flash mode having one setting with multiple values (e.g., inactive, active, auto). In some embodiments, capture modes allow user to capture different types of media (e.g., photos or video) and the settings for each mode can be optimized to capture a particular type of media corresponding to a particular mode (e.g., via post processing) that has specified properties (e.g., shape (e.g., square, rectangle), speed (e.g., slow motion, time elapse), audio, video). For example, when the computer system is configured to operate in a still photo capture mode, the one or more cameras of the computer system, when activated, captures media of a first type (e.g., rectangular photos) with particular settings (e.g., flash setting, one or more filter settings); when the computer system is configured to operate in a square capture mode, the one or more cameras of the computer system, when activated, captures media of a second type (e.g., square photos) with particular settings (e.g., flash setting and one or more filters); when the computer system is configured to operate in a slow motion capture mode, the one or more cameras of the computer system, when activated, captures media that media of a third type (e.g., slow motion videos) with particular settings (e.g., flash setting, frames per second capture speed); when the computer system is configured to operate in a portrait capture mode, the one or more cameras of the computer system captures media of a fifth type (e.g., portrait photos (e.g., photos with blurred portions (e.g., background and/or foreground) and, in some embodiments, the computer system generates the photos with blurred portions by applying a synthetic depth-of-field effect to at least a portion of a field-of-view of one or more cameras of the computer system). with particular settings (e.g., amount of a particular type of light (e.g., stage light, studio light, and/or contour light), f-stop, and/or blur) (and, in some embodiments, the particular type of light is synthetic (e.g., computer generated) (e.g., generated by the computer system using depth information of the photo and/or at least a portion of the field-of-view (e.g., current field-of-view) of one or more cameras of the computer system); and/or when the computer system is configured to operate in a panoramic capture mode, the one or more cameras of the computer system captures media of a fourth type (e.g., panoramic photos (e.g., wide photos) with particular settings (e.g., zoom and/or amount of field to view to capture with movement). In some embodiments, when switching between capture modes, the display of the representation of the field-of-view changes to correspond to the type of media that will be captured by the capture mode (e.g., the representation is rectangular while the computer system is operating in a still photo capture mode and the representation is square while the computer system is operating in a square capture mode). In some embodiments, the synthetic (e.g., computer-generated), depth-of-field effect adjusts the photo such that it appears that the photo has been captured with a camera that has a different aperture (e.g., physical aperture, effective aperture) and/or focal length (e.g., physical focal length, effective focal length) than the aperture and/or focal length of the one or more cameras that actually captured the photo. In some embodiments, in response to detecting the input directed to the style-selection user interface, the computer system transitions the computer system from being in the first capture mode to being in a different capture mode (e.g., indicative of portrait mode control 620*d* in FIG. 6O) (e.g., while continuing to display a representation of media using at least one media-processing style, and/or while continuing to apply the media-processing style to the visual content of the media). Transitioning the computer system from being in the first capture mode to being in a second capture mode that is different from the first capture mode in response to detecting the input directed to the style-selection user interface allows a user to control the capture mode in which the computer system operates, which provides additional control options without cluttering the user interface.

In some embodiments, after transitioning the computer system (e.g., 620) from being in the first capture mode (e.g., indicative of photo mode control 620*c* in FIG. 6N) to being in the different capture mode (e.g., indicative of portrait mode control 620*d* in FIG. 6O), the computer system detects a request to capture media. In some embodiments, in response to detecting the request to capture media, the computer system captures media with the different capture mode based on a currently selected media-processing style (e.g., 634*a*-634*d*, 634*aa*, and/or 634*dd*) (e.g., as discussed in relation to FIG. 6O), including: in accordance with a determination that the currently selected media-processing style is the first media-processing style (e.g., 634*a*-634*d*, 634*aa*, and/or 634*dd*), capturing the media in the different capture mode with the first media-processing style (e.g., as discussed in relation to FIG. 6O); and in accordance with a determination that the currently selected media-processing style is the second media-processing style (e.g., 634*a*-634*d*, 634*aa*, and/or 634*dd*), capturing the media in the different capture mode with the second media-processing style (e.g., 634*a*-634*d*, 634*aa*, and/or 634*dd*). In some embodiments, the currently selected media-processing style is applied to different media (e.g., media captured in different camera mode). In some embodiments, a representation of the currently selected media-processing style continues to be displayed when switching from a respective capture mode to a different respective capture mode.

In some embodiments, the computer system (e.g., 600) is in a third capture mode (e.g., indicated by 602*c*) (e.g., before and after detecting the input directed to the representation) (e.g., still camera, video, slow motion, and/or portrait) (e.g., as discussed in relation to FIGS. 8A-8C). In some embodiments, after detecting the input directed to the representation (e.g., 630), the computer system detects a request to display a second user interface that includes a second representation of media (e.g., as discussed in relation to FIGS. 6N-6O). In some embodiments, in response to detecting the request to the display the second user interface that includes the second representation of media, the computer system displays the second user interface that includes the second representation (e.g., 630) of media. In some embodiments, while displaying the second user interface, the computer system detects an input (e.g., a movement input) (and/or, in some embodiments, detecting a non-movement input/gesture (e.g., a press-and-hold input/gesture, voice input, and/or a tap input)) (e.g., 650*d*, 650*k*1, 650*k*2, 750*j*, and/or 750*q*) (e.g., as discussed in relation to FIGS. 6N-6O) directed to the second representation. In some embodiments, in response to detecting the input (e.g., 650*n*1, 650*n*2) (e.g., as discussed in relation to FIGS. 8A-8C) directed to the second representation (e.g., 630) and in accordance with a determination that the computer system is not in a first media-processing style selection mode (e.g., a mode that causes the computer system to apply one or more media-processing styles to the second representation), the computer system transitions the computer system from being in the third capture mode (e.g., indicated by 620*c*) to being in a fourth capture mode (e.g., indicated by 620*d*) (e.g., still camera, video, slow motion, and/or portrait) (e.g., without displaying a media-processing style being applied to the second representation that was not previously applied) (e.g., as discussed in relation to FIGS. 8A-8C). In some embodiments, in response to detecting the input (e.g., 650*d*, 650*k*1, 650*k*2, 750*j*, and/or 750*q*) (e.g., as discussed in relation to FIGS. 8A-8C) directed to the second representation (e.g., 630) and in accordance with a determination that the computer system is in the first media-processing style selection mode (e.g., as indicated by 602*b*), the computer system maintains the computer system in the third capture mode (e.g., indicated by 620*c*) (e.g., media-processing and displaying an indication that the media-processing style for capturing media has changed) (e.g., still camera, video, slow motion, and/or portrait) (e.g., forgoing transitioning the computer system from being in the fifth capture mode to being in a sixth capture mode) (e.g., as discussed in relation to FIGS. 6N-6O). Choosing whether to transition the computer system from being in the third capture mode to being in a fourth capture mode or maintain the computer system in the third capture mode based on whether the computer system is in the media-processing style selection mode when prescribed are met allows the computer system to intelligently perform different operations based whether computer system is in the media-processing style selection mode, which performs an operation when a set of conditions has been met without requiring further user input.

In some embodiments, before detecting the input directed to the representation, the style-selection user interface includes a plurality of selectable user interface objects (e.g., 626*a*1, 626*a*2, 626*b*1, 626*b*2, 626*c*1, 626*c*2, 626*d*1, 626*d*2) for (e.g., editing/modifying parameters (e.g., visual characteristics (e.g., a color characteristic (e.g., warmth, tone, hue, brightness, saturation, shade, tint, colorfulness, coldness, and/or harmony)) and/or a depth parameter) of the) the first media-processing style (e.g., as described in relation to FIGS. 7A-7X and method 1000). Displaying a plurality of selectable user interface objects for the first media-processing style before detecting the input directed to the representation provides the user with visual feedback concerning the parameters that can be adjusted for how the first media-processing style is applied to visual content of media, which provides improved visual feedback.

In some embodiments, in response to detecting the input (e.g., 650*d*, 650*k*1, 650*k*2, 750*j*, and/or 750*q*) directed to the representation and in accordance with the determination that the input directed to the representation is in the first direction and in accordance with a determination that the second media-processing style is being applied to a fourth portion (e.g., a middle portion) (e.g., the middle section and/or a portion of middle section, the left section, and/or the right section of 630, 676*a*, 676*b*, 676*c*, 680*c*, and/or 680*d*) of the representation (e.g., 630) of the media (and/or in accordance with a determination that more than a predetermined portion of the representation (e.g., 25%, 30%, 40% 50%, 60%, 75%) was displayed using the second media-processing style when (e.g., at the same time as, immediately before, and/or immediately after) the end of the input directed to the representation was detected) (e.g., in response to detecting the input directed to the representation), the computer system displays a plurality of selectable user interface objects (e.g., 626*a*1, 626*a*2, 626*b*1, 626*b*2, 626*c*1, 626*c*2, 626*d*1, 626*d*2) for the second media-processing style (e.g., 634*a*-634*d*, 634*aa*, and/or 634*dd*) (e.g., user interface objects that are displayed with representations of current values for the second media-processing style that are different from the representations of current values for the first media-processing style) and ceasing to display the plurality of selectable user interface objects for the first media-processing style (e.g., 634*a*-634*d*, 634*aa*, and/or 634*dd*) (e.g., replacing display of the plurality of selectable user interface objects for the first media-processing style with display of the plurality of selectable user interface objects for the second media-processing style) (e.g., as described in relation to FIGS. 6A-6D and method 900). In some embodiments, in response to detecting the input (e.g., 650*d*, 650*k*1, 650*k*2, 750*j*, and/or 750*q*) directed to the representation and in accordance with the determination that the input directed to the representation is in the first direction and in accordance with a determination that the second media-processing style is not being applied to the fourth portion (e.g., a middle portion) (e.g., the middle section and/or a portion of middle section, the left section, and/or the right section of 630, 676*a*, 676*b*, 676*c*, 680*c*, and/or 680*d*) of the representation (e.g., 630) of the media (and/or in accordance with a determination that less than a predetermined portion of the representation (e.g., 25%, 30%, 40% 50%, 60%, 75%) was displayed using the second media-processing style when (e.g., at the same time as, immediately before, and/or immediately after) the end of the input directed to the representation was detected) (e.g., in response to detecting the input directed to the representation), the computer system continues to display the plurality of selectable user interface objects (e.g., 626*a*1, 626*a*2, 626*b*1, 626*b*2, 626*c*1, 626*c*2, 626*d*1, 626*d*2) for the first media-processing style without displaying the plurality of selectable user interface objects for the second media-processing style (e.g., forgoing replacing display of the plurality of selectable user interface objects for the first media-processing style with display of the plurality of selectable user interface objects for the second media-processing style)) (e.g., as described in relation to FIGS. 6A-6D and method 900). Choosing whether to display the plurality of selectable user interface objects for the second media-processing style or continue to display the plurality of selectable user interface objects for the first media-processing style when prescribed conditions are met allows the computer system to provide relevant selectable options to the user for a media-processing style in situations that are determined to may be relevant to the user, which performs an operation when a set of conditions has been met without requiring further user input.

In some embodiments, the plurality of selectable user interface objects (e.g., 626*a*1, 626*a*2, 626*b*1, 626*b*2, 626*c*1, 626*c*2, 626*d*1, 626*d*2) for the first media-processing style) (e.g., as described in relation to FIGS. 6A-6D and method 900) is displayed at one or more locations on (e.g., and/or at) (is overlaid on) the representation (e.g., 630, 676*a*, 676*b*, 676*c*, 680*c*, and/or 680*d*) (e.g., a live preview and/or previously captured media) of the media. In some embodiments, the one or more locations in a bottom portions of the representations of media, in a bottom portion of the representation of media that is displayed in a camera display region (e.g., 604), in one or more locations adjacent to (e.g., above) a user interface object for capturing media (e.g., 610) and/or camera capture mode user interface objects, between an indicator region (e.g., 602) and a control region (e.g., 606). In some embodiments, as a part of displaying the plurality of selectable user interface objects for the first media-processing style, the computer system ceases to display one or more other selectable user interface objects (e.g., one or more selectable objects for controlling a zoom level of the representation of media, one or more selectable objects for control a synthetic lighting effect that can be applied to the representation of the media). Displaying the plurality of the selectable objects for the first media-processing style at one or more locations on the representations of the media provides the user with feedback concerning selectable user interface objects that are available for (e.g., for editing, corresponding to) the first media-processing style while concurrently providing feedback concerning the representation of media to the user while efficiently using limited space for displaying user interface elements (e.g., on a display or in a predetermined display region that is available for displaying user interface elements), which provides additional control options without cluttering the user interface.

In some embodiments, while the first media-processing style is selected for use (e.g., while displaying the first portion of the representation and the second portion of the representation are displayed using the first media-processing style), the computer system (e.g., 600) a first request (e.g., 650*a*, 650*c*, 650*j*) to capture media (e.g., detecting an input (e.g., a tap input (e.g., a tap gesture) (e.g., a single tap input, a double tap input)) (and/or, in some embodiments, in response to detecting a non-tap input/gesture (e.g., a movement input/gesture, a press-and-hold input/gesture, and/or a voice input)) on a user interface object for captured media). In some embodiments, in response to detecting the first request to capture media, the computer system captures media (e.g., one or more photo(s) and/or video(s) corresponding to different activations and/or a single activation of a user interface object for capturing media) with the first media-processing style (e.g., 634*a*-634*d*, 634*aa*, and/or 634*dd*) applied (e.g., without having the second media-processing style applied). In some embodiments, in response to detecting the first request to capture media, the computer system captures and applies the first media-processing style to multiple photo and/or videos. In some embodiments, the first request to capture media includes multiple requests (e.g., includes detecting multiple inputs/gestures) to capture media. In some embodiments, the first request to capture media includes a single request (e.g., includes detecting a single input/gesture). In some embodiments, after capturing media with the first media-processing style applied, and while the second media-processing style (e.g., 634*a*-634*d*, 634*aa*, and/or 634*dd*) is selected for use (e.g., while the first portion of the representation and the second of the representation are displayed using the second media-processing style) (e.g., as discussed in relation to FIGS. 6O-6U), the computer system detects a second request (e.g., 650*a*, 650*c*, 650*j*) to capture media (e.g., detecting an input (e.g., a tap input (e.g., a tap gesture) (e.g., a single tap input, a double tap input)) (and/or, in some embodiments, in response to detecting a non-tap input/gesture (e.g., a movement input/gesture, a press-and-hold input/gesture, and/or a voice input)) on a user interface object for captured media). In some embodiments, in response to detecting the second request to capture media, the computer system captures media (e.g., one or more photo(s) and/or video(s) corresponding to different activations and/or a single activation of a user interface object for capturing media) with the second media-processing style applied (e.g., as discussed in relation to FIGS. 6O-6U) (e.g., without having the first media-processing style applied). In some embodiments, a representation of the media that includes the first portion of the representation and the second of the representation with the second media-processing style applied is different from a representation of media that includes the first portion of the representation and the second of the representation with the first media-processing style applied. In some embodiments, in response to detecting the second request to capture media, the computer system captures and applies the second media-processing style to multiple photo and/or videos. In some embodiments, the second request to capture media includes multiple requests (e.g., includes detecting multiple inputs/gestures) to capture media. In some embodiments, the first request to capture media includes a single request (e.g., includes detecting a single input/gesture). Capturing media that includes one or more portions of the representation that have a respective media-processing style applied in response to detecting a request to capture media when one or more portions of the representations was displayed with the respective media-processing style applied allows the computer system to intelligently capture media that is representative of the media that was displayed when the request to capture the media was detected, which performs an operation when a set of conditions has been met without requiring further user input.

In some embodiments, in response to detecting the input (e.g., 650*d*, 650*k*1, 650*k*2, 750*j*, and/or 750*q*) directed to the representation (e.g., 630, 676*a*, 676*b*, 676*c*, 680*c*, and/or 680*d*) and in accordance with a determination that an end (e.g., liftoff) of the input has been detected and in accordance with a determination that the input directed to the representation satisfies one or more movement criteria (e.g., input has been detected longer than a certain duration, has been detected to have a velocity (e.g., average velocity, highest velocity) above a threshold (e.g., a non-zero threshold), has been detected to end at a certain position on the style-selection user interface, and/or to has been detected over (e.g., from start position to end position) a threshold (e.g., a non-zero threshold) distance), the computer system displays (e.g., snapping to the display of, abruptly and/or immediately displaying after detecting the end of the input) the first portion of the representation and the second portion of the representation using the second media-processing style (e.g., 650*d*, 650*k*1, 650*k*2, 750*j*, and/or 750*q*) (e.g., without using the first media-processing style) (e.g., to indicate that the second media-processing style has been selected for use when capturing media in response to future media capture inputs). In some embodiments, in response to detecting the input (e.g., 650*d*, 650*k*1, 650*k*2, 750*j*, and/or 750*q*) directed to the representation (e.g., 630, 676*a*, 676*b*, 676*c*, 680*c*, and/or 680*d*) and in accordance with a determination that an end (e.g., liftoff) of the input has been detected and in accordance with a determination that the input directed to the representation does not satisfy one or more movement criteria, the computer system displays (e.g., snapping to the display of, abruptly and/or immediately displaying after detecting the end of the input) the first portion of the representation and the second portion of the representation using the first media-processing style (e.g., 650*d*, 650*k*1, 650*k*2, 750*j*, and/or 750*q*) (e.g., without using the second media-processing style) (e.g., to indicate that the first media-processing style has been selected for use when capturing media in response to future media capture inputs). Choosing whether to display the first portion of the representation and the second portion of the representation using the second media-processing style or display the first portion of the representation and the second portion of the representation using the first media-processing style based on the movement of the input allows the computer system to intelligently provide feedback to the user concerning which media-processing style is selected and will impact the display and/or capture of the media going forward, which performs an operation when a set of conditions has been met without requiring further user input and provides improved visual feedback.

In some embodiments, after detecting the input (e.g., 650*d*, 650*k*1, 650*k*2, 750*j*, and/or 750*q*) directed to the representation, the computer system displays the first portion of the representation and the second portion of the representation using the second media-processing style (e.g., 634*a*-634*d*, 634*aa*, and/or 634*dd*). In some embodiments, while displaying the representation and the second portion of the representation are displayed using the second media-processing style, the computer system detects a second input (e.g., 650*d*, 650*k*1, 650*k*2, 750*j*, and/or 750*q*) directed to the representation (and, in some embodiments includes movement in the same direction as a movement direction of the input directed to the representation). In some embodiments, in response to detecting the second input directed to the representation, in accordance with a determination that the second input directed to the representation is in the first direction, the computer system displays the first portion of the representation using a ninth media-processing style (e.g., 634*a*-634*d*, 634*aa*, and/or 634*dd*) (e.g., that is different from the first media-processing style, the second media-processing style, and the third media-processing style (e.g., as described above in relation to method 900)) while continuing to display the second portion of the representation using the second media-processing style. In some embodiments, as a part of displaying the first portion of the representation using the ninth media-processing style while continuing to display the second portion of the representation using the second media-processing style (e.g., 634*a*-634*d*, 634*aa*, and/or 634*dd*), the computer system, in response to detecting a first portion of the second input directed to the representation (and, in some embodiments, the first portion of the second input has a third input magnitude), displays (e.g., concurrently displaying) the first portion of the representation using the ninth media-processing style while the second portion of the representation and the third portion of the representation are displayed using the second media-processing style. In some embodiments, after displaying the first portion of the representation using the seventh media-processing style while the second portion of the representation and the third portion of the representation are displayed using the second media-processing style and in response to detecting a second portion of the second input directed to the representation. In some embodiments, the second portion of the second input has a fourth input magnitude that is greater than the second input magnitude, the computer system displays the first portion of the representation and the third portion of the representation using the seventh media-processing style while the second portion of the representation is displayed using the second media-processing style.

In some embodiments, in response to detecting the second input (e.g., 650*d*, 650*k*1, 650*k*2, 750*j*, and/or 750*q*) directed to the representation and in accordance with a determination that an end of the second input has been detected, the computer system: in accordance with a determination that the second input directed to the representation satisfies one or more movement criteria (e.g., input has been detected longer than a certain duration, has been detected to have a velocity (e.g., average velocity, highest velocity) above a threshold (e.g., a non-zero threshold), has been detected to end at a certain position on the style-selection user interface, and/or to has been detected over (e.g., from start position to end position) a threshold (e.g., a non-zero threshold) distance), displays (e.g., snapping to the display of, abruptly and/or immediately displaying after detecting the end of the input) the first portion of the representation and the second portion of the representation using the seventh media-processing style (e.g., 634*a*-634*d*, 634*aa*, and/or 634*dd*) (e.g., without using the first media-processing style and second media-processing style); and in accordance with a determination that the input directed to the representation does not satisfy one or more movement criteria, displays (e.g., snapping to the display of, abruptly and/or immediately displaying after detecting the end of the input) the first portion of the representation and the second portion of the representation using the second media-processing style (e.g., without using the seventh media-processing style and first media-processing style). Choosing whether to display the first portion of the representation and the second portion of the representation using the seventh media-processing style or display the first portion of the representation and the second portion of the representation using the second media-processing style based on the movement of the input allows the computer system to intelligently provide feedback to the user concerning which media-processing style is selected and will impact the display and/or capture of the media going forward, which provides additional control options without cluttering the user interface and provides improved visual feedback. Displaying the first portion of the representation using the seventh media-processing style while the second portion of the representation and the third portion of the representation are displayed using the second media-processing style in response to detecting a first portion of the second input directed to the representation provides the user with visual feedback concerning how different media-processing style(s) impact the visual content represented by the representation of the media differently and concerning at least some media-processing style(s) that can be selected based on the second input directed to the representation, which provides improved visual feedback. Displaying the first portion of the representation using a ninth media-processing style while continuing to display the second portion of the representation using the second media-processing style in response to detecting the second input directed to the representation after detecting the input directed to the representation and in accordance with a determination that the second input directed to the representation is in the first direction, allows the user to control which portions of the representation that are displayed using a media-processing style that is different from the first media-processing style and the second media-processing style, which provides additional control options without cluttering the user interface.

In some embodiments, before displaying the style-selection user interface that includes the representation of the media that is displayed using the first media-processing style, (e.g., 634*a*-634*d*, 634*aa*, and/or 634*dd*) displaying a user interface that includes (e.g., a fourth representation of the media (e.g., that is not displayed using the first media-processing style) (or any other media-processing style (e.g., any other user-selected/predefined media-processing style (e.g., that is applied to the representation in response to detecting an input, such as the input directed to the representation) like the first media-processing style, second media-processing style, third media-processing style discussed above)) and) a user interface object (e.g., 602*b*) for displaying the style-selection user interface that is displayed at a first respective location in the user interface that includes a fourth representation of the media (e.g., a mode that causes the computer system to apply one or more media-processing styles to the second representation) (e.g., as described in relation to method 1000). In some embodiments, while displaying the user interface object (e.g., 602*b*) for displaying the style-selection user interface, the computer system detects an input (e.g., 650*b*) (e.g., a tap input (e.g., a tap gesture) (e.g., a single tap input, a double tap input)) (and/or, in some embodiments, detecting a non-tap input/gesture (e.g., a movement input/gesture, a press-and-hold input/gesture, and/or a voice input)) directed to the user interface object for displaying the style-selection user interface (e.g., and/or directed to the first respective location). In some embodiments, in response to detecting the input directed to the user interface object for displaying the style-selection user interface, the computer system displays the style-selection user interface (e.g., an interface that includes one or more of (e.g., 634*a*-634*d*, 634*aa*, and/or 634*dd*)) (e.g., and/or ceasing to display the representation of the media that is not displayed using the first media-processing style or any other media-processing style (e.g., any other user-selected/predefined media-processing style)). In some embodiments, in response to detecting the first input directed to the user interface object for displaying the style-select user interface, the computer system is configured to operation in the styles-mode. In some embodiments, as a part of displaying style-selection user interface, the computer system displays (and/or continues to display) a representation of media using the currently selected media-processing style. Displaying the representation of the media that is displayed using the first media-processing style in response to detecting the input directed to user interface object for displaying the style-selection user interface provides the user with control over the computer system regarding whether a style-selection user interface will be displayed, where a user can set a new media-processing style to apply to a representation of media, which provides additional control options without cluttering the user interface.

In some embodiments, the style-selection user interface includes a user interface object (e.g., 602*b*) for controlling a setting (e.g., an f-stop setting (e.g., to control a depth parameter), a setting to turn off a photo capture setting, where a plurality of photos are captured in response to a single request to capture media)) (as described above in relation to 602*c* and 602*d*) at a second respective location in the style-selection user interface (e.g., an interface that includes one or more of (e.g., 634*a*-634*d*, 634*aa*, and/or 634*dd*)). In some embodiments, while displaying the style-selection user interface and the user interface object (e.g., 602*b*) for controlling the setting at the second respective location, detecting an input (e.g., a tap input (e.g., a tap gesture) (e.g., a single tap input, a double tap input)) (and/or, in some embodiments, detecting a non-tap input/gesture (e.g., a movement input/gesture, a press-and-hold input/ gesture, a voice input)) directed to the second respective location in the style-selection user interface (e.g., directed to a location at which the user interface object for displaying the style-selection user interface was previously displayed). In some embodiments, in response to detecting the input directed to the second respective location in the style-selection user interface, the computer system ceases to display the style-selection user interface (e.g., as discussed above in relation inputs detected on 602*c* and 602*d*) (or any other media-processing style ((e.g., any other user-selected/ predefined media-processing style (e.g., that is applied to the representation in response to detecting an input, such as the input directed to the representation) like the first media-processing style, second media-processing style, third media-processing style discussed above)) (e.g., and/or ceasing to display the representation of the media that is displayed and/or where portions of the representation are displayed using the media-processing styles (e.g., the first media-processing style and/or the second media-processing style)). In some embodiments, in response to detecting the input directed to the second respective location in the user interface, the computer system displays one or more user interface objects (e.g., a slider) for controlling to the setting. In some embodiments, in response to detecting the input directed to the second respective location in the style-selection user interface, the computer system is not configured to operate in the media-processing style selection mode. In some embodiments, as a part of ceasing style-selection user interface, the computer system maintains display of a representation using the currently selected media-processing style. Ceasing to display the style-selection user interface in response to detecting the input directed to the user interface object for controlling a setting (e.g., that was detected while displaying the user interface that includes the representation of the media that is displayed using the first media-processing style) provides the user with control over the computer system regarding whether a style-selection user interface will be displayed, where a user can select a new media-processing style to apply to a representation of media, which provides additional control options without cluttering the user interface.

In some embodiments, after displaying the style-selection user interface, the computer system receives a request to displaying a camera user interface. In some embodiments, in response to receiving the request to display the camera user interface, the computer system displays a camera user interface (e.g., user interface that includes 602, 604, and/or 606) that includes concurrently displaying, in the camera user interface: a representation (e.g., 630) of a field of view of one or more cameras; and a respective user interface object (e.g., 602*b*) that, when selected, causes the style-selection user interface to be displayed (e.g., a user interface object for displaying the style-selection user interface), including: in accordance with a determination that the first media-processing style is currently selected as a media-processing style, displaying the respective user interface object (e.g., 602*b*) with a first appearance (e.g., without displaying the affordance with the second appearance). In some embodiments, in accordance with a determination that the second media-processing style is currently selected as a media-processing style, the computer system displays the respective user interface object (e.g., 602*b*) with a second appearance that is different from the first appearance (e.g., described above in relation to 602*b* at FIGS. 6A-6D) (e.g., without displaying the affordance with the first appearance). In some embodiments, the camera user interface also includes a user interface object for capturing media (e.g., 610) that is concurrently displayed with the representation of the field of view of the one or more cameras and the affordance that, when selected, causes the device to capture media with one or more cameras of the device. In some embodiments, the computer system displays the respective user interface object with the first appearance when a default style is the currently selected media-processing style and displays the respective user interface object with the second appearance when one or more (and/or a predetermined number) of different non-default styles are selected. Displaying the user interface object, that when selected, causes the style-selection user interface to be displayed with a different visual appearance based on whether a respective media-processing style being a first media-processing style or the second media-processing style provides the user with visual feedback concerning the media-processing style that is currently being and/or currently configured to be applied to the visual content of the media, which provides improved visual feedback.

In some embodiments, the user interface includes a first user interface object (e.g., as discussed in relation to FIGS. 8A-8C) that is concurrently displayed with the first portion of the representation and the second portion of the representation that is displayed using the first media-processing style. In some embodiments, while displaying the first user interface object that is concurrently displayed with the first portion of the representation and the second portion of the representation that is displayed using the first media-processing style, the computer system displays, via the one or more input devices, an input (e.g., a tap input (e.g., a tap gesture) (e.g., a single tap input, a double tap input)) (and/or, in some embodiments, detecting a non-tap input/gesture (e.g., a movement input/gesture, a press-and-hold input/ gesture, a voice input)) directed to the first user interface object (e.g., as discussed in relation to FIGS. 8A-8C). In some embodiments, in response to detecting the input directed to the first user interface object, the computer system displays the first portion of the representation and the second portion of the representation without using the first media-processing style (e.g., as discussed in relation to FIGS. 8A-8C) (e.g., a style that is displayed when the computer system is not operating in a media-processing style selection mode, and/or a style that cannot be detected by an input like the input directed to the representation) for displaying content). In some embodiments, in response to detecting the input directed to the first user interface object, the first portion of the representation and the second portion of the representation is displayed using a media-processing style that is different from the first media-processing style. In some embodiments, in response to detecting the input directed to the first user interface object, the first portion of the representation and the second portion of the representation is displayed using a neutral style (and/or default style). Displaying the first portion of the representation and the second portion of the representation without using the first media-processing style in response to detecting the input directed to the first user interface object (e.g., that was detected while displaying the first user interface object that is concurrently displayed with the first portion of the representation and the second portion of the representation that is displayed using the first media-processing style) allows the user to control whether or not the representation of the first media-processing style will be displayed using the first media-processing style, which provides additional control options without cluttering the user interface.

In some embodiments, the style-selection user interface includes a selectable user interface object (e.g., 610) for capturing media (e.g., a shutter button). In some embodiments, while displaying the representation (e.g., 630) of the media using the first media-processing style (e.g., 634*a*-634*d*, 634*aa*, and/or 634*dd*), and the selectable user interface object for capturing media (e.g., and the style-selection user interface), the computer system detects an input (e.g., 650*a*, 650*c*, 650*j*) (e.g., a tap input (e.g., a tap gesture) (e.g., a single tap input, a double tap input)) (and/or, in some embodiments, detecting a non-tap input/gesture (e.g., a movement input/gesture, a press-and-hold input/gesture, and/or a voice input)) directed to the selectable user interface object for capturing media (e.g., a location in the style selection user interface). In some embodiments, in response to detecting the input (e.g., 650*a*, 650*c*, 650*j*) directed to the selectable user interface object for capturing media, the computer system captures media that has the first media-processing style applied (e.g., based on the current value of the parameters of the first media-processing style). In some embodiments, in response to detecting the input directed to the selectable user interface object for capturing media and while detecting an input directed to the plurality of selectable user interface objects for the first media-processing style and/or detecting an input to directed to the representation (e.g., as request to switch media-processing styles (e.g., in response to detecting the input directed to the representation), the computer initiates the capture of media that has a media-processing style applied that is applied to a predetermined portion of the representation (e.g., 25%, 30%, 40% 50%, 60%, 75%) was displayed using the first media-processing style and/or a greater (or equal to) portion of the representation of the media than other portions of the representation of the media that was displayed (and/or when (e.g., immediately before/after) the input detecting to the selectable user interface object for capturing media was detected. In some embodiments, in response to detecting the input directed to the selectable user interface object for capturing media, the computer system display a representation (e.g., a thumbnail representation) of the capture media that has the first media-processing style applied in the style-selection user interface). Capturing media that has the first media-processing style applied in response to detecting the input directed to the selectable user interface object for capturing media (e.g., that was detected while displaying the representation of the media using the first media-processing style and the selectable user interface object for capturing media) allows the user to capture media that will have the currently selected media-processing style applied, which provides additional control options without cluttering the user interface.

In some embodiments, as a part of displaying the first portion of the representation using the first media-processing style, the computer system applies the first media-processing style (e.g., 650*d*, 650*k*1, 650*k*2, 750*j*, and/or 750*q*) differently (e.g., using a different set of visual parameters (e.g., color characteristics (e.g., warmth, tone, hue, brightness, saturation, shade, tint, colorfulness, coldness, and/or harmony) and/or depth parameters) for one type of identified object as compared to a different type of identified object (e.g., subjects (e.g., a person) as compared to non-subjects) to one or more objects (e.g., the person in live preview 630) (e.g., people and/or faces of people) (e.g., identifiable object) in (e.g., detected in) the first portion of the representation (e.g., 630) than to a subset of the first portion that does not include the one or more objects (e.g., displaying a first subset of the first portion (e.g., a subset that includes an object) with a different visual appearance than a second subset of the first portion (e.g., a subset that does not include an object)). In some embodiments, the first media-processing style is applied differently different portions of the representation to attempt to preserve the appearance of some of the particular portions of a scene (e.g., portion(s) of the scene that include the sky, a skin tone, a face of a user, etc.) included in the representation of the media.

In some embodiments, the first media-processing style (e.g., 650*d*, 650*k*1, 650*k*2, 750*j*, and/or 750*q*) is applied to the representation of the media based one or more parameters selected from the group consisting of contrast, vibrancy, warmth, and a combination thereof (e.g., as described in relation to FIGS. 6A-6C and method 70).

In some embodiments, while the first portion (e.g., a portion of middle section, the left section, and/or the right section of 630, 676*a*, 676*b*, 676*c*, 680*c*, and/or 680*d*) of the representation and the third portion (e.g., a portion of middle section, the left section, and/or the right section of 630, 676*a*, 676*b*, 676*c*, 680*c*, and/or 680*d*) of the representation is displayed using the second media-processing style (e.g., 634*a*-634*d*, 634*aa*, and/or 634*dd*) while the second portion of the representation is displayed using the first media-processing style, the computer system detects an end of the input (e.g., 650*d*, 650*k*1, 650*k*2, 750*j*, and/or 750*q*) directed to the representation. In some embodiments, in response to detecting the end of the input (e.g., 650*d*, 650*k*1, 650*k*2, 750*j*, and/or 750*q*) directed to the representation, the computer system ceases to display the second portion (e.g., at least a portion of the second portion, an edge of the representation) of the representation using the first media-processing style (e.g., fading out the second portion of the representation that is displayed using the first media-processing style) and decreasing a visual prominence of (e.g., dimming out, darkening, fading out, greying out, not highlighting, and/or increasing opacity of) a subset (e.g., 660*a*, 660*b*, and/or a portion of middle section, the left section, and/or the right section of 630, 676*a*, 676*b*, 676*c*, 680*c*, and/or 680*d*) (e.g., a portion of the representation that is included in and smaller than the second portion the representation) of the second portion of the representation (and displaying the first portion of the representation, the second portion of the representation, and/or the third portion of the representation using the second media-processing style). In some embodiments, the first portion of the representation is displayed using the second media-processing style and while the second portion of the representation and the third portion of the representation are displayed using the first media-processing style, the computer system detects an end of the input directed to the representation. In some embodiments, in response to detecting the end of the input directed to the representation while the first portion of the representation is displayed using the second media-processing style and while the second portion of the representation and the third portion of the representation are displayed using the first media-processing style, the computer system ceases to display the first portion (e.g., at least a portion of the second portion, an edge of the representation) of the representation using the second media-processing style and decreases a visual prominence of a subset (e.g., a portion of the representation that is included in and smaller than the second portion the representation) of the first portion of the representation. In some embodiments, while the subset of the second portion (e.g., a portion of middle section, the left section, and/or the right section of 630, 676*a*, 676*b*, 676*c*, 680*c*, and/or 680*d*) of the representation is displayed with the decreased visual prominence, the computer system detects a third input (e.g.,

650*d*, 650*k*1, 650*k*2, 750*j*, and/or 750*q*) directed to the representation (e.g., 630, 676*a*, 676*b*, 676*c*, 680*c*, and/or 680*d*). In some embodiments, in response to detecting the third input directed to the representation, the computer system increases the visual prominence of (e.g., undimming, brightening, fading in, highlighting, and/or decreasing opacity of) the subset of the second portion of the representation. Increasing the visual prominence the subset of the second portion of the representation in response to detecting the fourth input directed to the representation provides the user with visual feedback that the end of the input directed to the representation has not been detected and, in some embodiments, provides the user with visual feedback concerning how a media-processing style can affect the subset of the second portion of the representation, which provides improved visual feedback. Decreasing the visual prominence the subset of the second portion of the representation in response to detecting the end of the input directed to the representation provides the user with visual feedback that the a media-processing style has been selected via the input and/or that the input is not currently being detected, which gives the user confidence that an unintended change regarding changing of the selected media-processing style will not occur without further user input, which provides improved visual feedback.

In some embodiments, displaying the representation of the media includes: in accordance with a determination that the representation of the media (e.g., and/or a portion of the presentation of media) would be displayed using a tenth media-processing style (e.g., 634*a*-634*d*, 634*aa*, and/or 634*dd*) (and/or any media-processing style) in response to detecting a fourth input (e.g., 650*d*, 650*k*1, 650*k*2, 750*j*, and/or 750*q*) directed to the representation, a fifth portion (e.g., 660*a*, 660*b*, the right section, and/or the left section) (e.g., an edge (e.g., left edge and/or right edge), a visual element) of the representation is displayed with a first visual appearance (e.g., a first color and/or not grayed-out); and in accordance with a determination that the representation of the media (e.g., and/or a portion of the presentation of media) would not be displayed using the tenth media-processing style (and/or any media-processing style) in response to detecting the fourth input directed to the representation, the fifth portion (e.g., 660*a*, 660*b*, the right section, and/or the left section) of the representation is displayed with a second visual appearance that is different from the first visual appearance. Displaying the fourth portion of the representation differently based on a determination of whether or not the representation of the media would be displayed using a tenth media-processing style provides the user with visual feedback concerning whether the user can select a respective media-processing style via an input and/or whether the respective media-processing style can be accessed via an input in a particular direction, which provides improved visual feedback.

In some embodiments, before detecting the input (e.g., 650*d*, 650*k*1, 650*k*2, 750*j*, and/or 750*q*) directed to the representation and while displaying the first portion of the representation and the second portion of the representation using the first media-processing style, a sixth portion (e.g., 660*a*, 660*b*, the right section, and/or the left section) (e.g., an edge (e.g., left edge and/or right edge), a portion) of the representation of the media is displayed using the first media-processing style (e.g., with a media-processing style being applied to the area/edge of the representation of the media). Displaying a sixth portion of the representation of the media is displayed using the first media-processing style provides the user with feedback concerning how the first media-processing style could impact the second area of the representation, which provides improved visual feedback.

In some embodiments, before detecting the input (e.g., 650*d*, 650*k*1, 650*k*2, 750*j*, and/or 750*q*) directed to the representation and while displaying the first portion of the representation and the second portion of the representation using the first media-processing style (e.g., 634*a*-634*d*, 634*aa*, and/or 634*dd*), a seventh portion (e.g., 660*a*, 660*b*, the right section, and/or the left section) (e.g., an edge (e.g., left edge and/or right edge), a portion) of the representation of the media is not displayed using the first media-processing style (e.g., 634*a*-634*d*, 634*aa*, and/or 634*dd*) (without any media-processing style (e.g., first media-processing style, second media-processing style, third media-processing style, etc.) being applied to the area/edge of the representation of the media). In some embodiments, in response to detecting the input (e.g., 650*d*, 650*k*1, 650*k*2, 750*j*, and/or 750*q*) directed to the representation, the computer system displays an animation of the seventh portion (e.g., 660*a*, 660*b*, the right section, and/or the left section) of the representation of the media transitioning from not being displayed using the first media-processing style to being displayed using the first media-processing style (e.g., fading in the first media-processing style being applied to the representation of the media). Displaying an animation of the second area of the representation of the media transitioning from not being displayed using the first media-processing style to being displayed using the first media-processing style in response to detecting the input directed to the representation provides a user with feedback concerning how the first media-processing style could impact the second area of the representation (e.g., when the user would more than likely want to see how the first media-processing style could impact the second area of the representation), which provides improved visual feedback.

In some embodiments, before displaying the style-selection user interface, where the first portion of the representation and the second portion of the representation are displayed using the first media-processing style that is applied to visual content of the media, the computer system displays a user interface object (e.g., 844*a*) for enabling a second media-processing style selection mode. In some embodiments, while displaying the user interface object (e.g., 844*a*) for enabling the second media-processing style selection mode, the computer system detects an input (e.g., 850*a*) (e.g., a tap input (e.g., a tap gesture) (e.g., a single tap input, a double tap input)) (and/or, in some embodiments, detecting a non-tap input/gesture (e.g., a movement input/gesture, a press-and-hold input/gesture, and/or a voice input)) directed to the user interface object for enabling the second media-processing style selection mode. In some embodiments, in response to detecting the input directed to the user interface object for enabling the second media-processing style selection mode, the computer system displays a respective user interface that includes concurrently displaying a representation (e.g., 878*a*) of previously captured media (e.g., sample media, media that has not been captured by the computer system and/or a template) that has the first media-processing style applied (e.g., 634*a*) and a representation (e.g., 878*b*) of previously captured media (e.g., sample media, media that has not been captured by the computer system and/or a template) that has the second media-processing style (e.g., 634*b*) applied. In some embodiments, while displaying the respective, the computer system detects an input (e.g., a tap input (e.g., a tap gesture) (e.g., a single tap input, a double tap input)) (and/or, in some embodiments, detecting a non-tap input/gesture (e.g., a movement input/gesture, a press-and-hold input/gesture, and/or a voice input)) directed to the respective user interface. In some embodiments, in response to detecting the input directed to the respective user interface and in accordance with a determination that the input directed to the respective user interface corresponds to selection of an option to use the first media-processing style, the computer system displays the user interface that includes the representation of the media in response to detecting a request to display a media user interface (e.g., without using the second media-processing style). In some embodiments, in response to detecting the input directed to the respective user interface and in accordance with a determination that the input directed to the respective user interface corresponds to selection of an option to use the second media-processing style, the computer system displays a user interface that includes a representation of media using the second media-processing style in response to detecting the request to display the media user interface (e.g., without using the first media-processing style).

In some embodiments, the style-selection user interface includes a first styles-mode user interface object (e.g., 602*b* and/or 688*b*) that, when selected, causes (e.g., causes the computer system to toggles between) the style-selection user interface to be displayed (e.g., a user interface object for displaying the style-selection user interface, and/or a user interface object that, when selected, causes the style-section user interface to be displayed) (e.g., or cease to be displayed). In some embodiments, the first styles-mode user interface object is concurrently displayed with one or more camera setting user interface objects (e.g., 688) (e.g., one or more camera setting user interface objects (e.g., a user interface of object for controlling a camera setting) are displayed based on the camera capture mode in which the one or more cameras are configured to capture media (e.g., settings for each camera capture mode)). In some embodiments, before displaying the user interface object for displaying the style-selection user interface is displayed, the computer system detects an input (e.g., 650*w*) (e.g., swipe input, tap input, and/or drag input) directed to a respective user interface and, in response to detecting the input directed to the respective user interface, the computer system displays the user interface object for displaying the style-selection user interface (e.g., that was not previously displayed) and one or more camera setting affordances (e.g., that was not previously displayed). In some embodiments, in response to detecting selection of a respective camera setting user interface object of the one or more camera setting user interface object, the computer system displays one or more controls for adjusting a camera setting (e.g., a control, that when selected, causes the computer system to turn a mode on (e.g., a flash mode, a night mode, an animated image capture mode, and/or a timer mode), a control that, when selected, causes the computer system to turn the mode off), a control that, when selected, causes a value for a capture setting (e.g., an exposure value, a time value for a timer mode) to be adjusted, and/or a control for changing one or more filters and/or zoom levels used to capture and/or display media). Displaying the style-selection user interface includes a first styles-mode user interface object concurrently with one or more user camera setting user interface objects allows user to access a control that can cause the style-selection user interface to be displayed and cease to be displayed while allowing a user to access controls for controlling one or more user camera settings, which reduces the number inputs that it takes to access the respective controls if they were not concurrently displayed.

In some embodiments, the style-selection user interface includes a second styles-mode user interface object (e.g., 602*b* and/or 688*b*) that, when selected, causes (e.g., causes the computer system to toggle between) the style-selection user interface to be displayed (e.g., a user interface object for displaying the style-selection user interface, and/or a user interface object that, when selected, causes the style-section user interface to be displayed) (e.g., or cease to be displayed). In some embodiments, the computer system, while displaying the first portion of the representation (e.g., 630) using the second media-processing style while the second portion of the representation and the third portion of the representation are displayed using the first media-processing style, displays the second styles-mode user interface object (e.g., 602*b* and/or 688*b*) with a third appearance (e.g., a color, a size, with a first border (e.g., line (e.g., that is shown in a clockwise and/or counter-clockwise direction) surrounding the second styles-modes user interface object, where in the line surrounds and/or is around a portion (e.g., 0%-100%) of the second styles-mode user interface object)) (e.g., as discussed above in relation to FIG. 6L). In some embodiments, after displaying the first portion of the representation using the second media-processing style while the second portion of the representation and the third portion of the representation are displayed using the first media-processing style and in response to detecting the second portion of the input (e.g., 650*d*, 650*k*1, 650*k*2, 750*j*, and/or 750*q*) directed to the representation, the computer system changes (e.g., displays and/or displays an animation of the second styles-mode user interface changing) the second styles-mode user interface object from being displayed with the third appearance to being displayed with a fourth appearance (e.g., a color, a size, with a first border (e.g., line (e.g., that is shown in a clockwise and/or counter-clockwise direction) surrounding the second styles-modes user interface object, where in the line surrounds and/or is around a portion (e.g., 0%-100%) of the second styles-mode user interface object)) that is different from the third appearance (e.g., while displaying the first portion of the representation and the third portion of the representation using the second media-processing style while the second portion of the representation is displayed using the first media-processing style) (e.g., as discussed above in relation to FIG. 6L). Changing the second styles-mode user interface object from being displayed with the third appearance to being displayed with the fourth appearance provides visual feedback to the user regarding how a switch to a media-processing style that is being applied to a representation effects display of the representation differently, which provides improved visual feedback.

In some embodiments, as a part of changing the second styles-mode user interface object (e.g., 602*b*) from being displayed with the third appearance to being displayed with the fourth appearance, in accordance with a determination that a value (e.g., 626*a* and/or 626*b*) of a first parameter of the first media-processing style (e.g., 634*a*-634*d*, 634*aa*, and/or 634*dd*) is different from a value of the first parameter (e.g., 626*a* and/or 626*b*) of the second media-processing style (e.g., 634*a*-634*d*, 634*aa*, and/or 634*dd*), the computer system changes display of a first visual aspect (e.g., color of 602*b* and/or line around 602*b* (e.g., as discussed above in relation to FIG. 6L)) (e.g., a color, a shading, and/or a tint of at least a portion (and, in some embodiments, the portion includes the border (e.g., a line surrounding) of the second media-processing style)) of the second styles-mode user interface object (e.g., 602*b*) (e.g., without changing the second visual aspect of the second styles-mode user interface object based on the determination that the value of the first parameter of the first media-processing style is different from the value of the first parameter of the second media-processing style). In some embodiments, in accordance with a determination that the value of the first parameter of the first media-processing style is not different from the value of the first parameter of the second media-processing style, the computer system does not change the first visual aspect of the second styles-mode user interface object. In some embodiments, while displaying the first portion of the representation using the second media-processing style while the second portion of the representation and the third portion of the representation are displayed using the first media-processing style, the first visual aspect corresponds to (is and/or is represented by) a first color and, after displaying the first portion of the representation using the second media-processing style while the second portion of the representation and the third portion of the representation are displayed using the first media-processing style and in response to detecting the second portion of the input directed to the representation, the second visual aspect corresponds to (is and/or is represented by) a second color that is different from the first color length (e.g., as described above in relation to method 1000). In some embodiments, as a part of changing the second styles-mode user interface object (e.g., 602*b*) from being displayed with the third appearance to being displayed with the fourth appearance, in accordance with a determination that a value of a second parameter (e.g., 626*a* and/or 626*b*) of the first media-processing style is different from a value of the second parameter (e.g., 626*a* and/or 626*b*) of the second media-processing style, where the first parameter is different from the second parameter, the computer system changes display of a second visual aspect (e.g., color of 602*b* and/or line around 602*b* (e.g., as discussed above in relation to FIG. 6L)) (e.g., a size, a length, and/or a fill of at least a portion (e.g., a borderline and/or line that is around, adjacent to, and/or surrounds the second styles-mode user interface object) of the second media-processing style) of the second styles-mode user interface object. In some embodiments, the second visual aspect is different from the first visual aspect (e.g., without changing the first visual aspect of the second styles-mode user interface object based on the determination that the value of the second parameter of the first media-processing style is different from the value of the second parameter of the second media-processing style). In some embodiments, in accordance with a determination that the value of the second parameter of the first media-processing style is not different from the value of the second parameter of the second media-processing style, the computer system does not change the second visual aspect of the second styles-mode user interface object. In some embodiments, while displaying the first portion of the representation using the second media-processing style while the second portion of the representation and the third portion of the representation are displayed using the first media-processing style, the second visual aspect corresponds to (is and/or is represented by) a first length and, after displaying the first portion of the representation using the second media-processing style while the second portion of the representation and the third portion of the representation are displayed using the first media-processing style and in response to detecting the second portion of the input directed to the representation, the second visual aspect corresponds to (is and/or is represented by) a second length that is different from the first length (e.g., as described in relation to method 1000). Changing display of a particular visual aspect of the second styles-mode user interface object based on whether a value of a particular parameter has been changed, provides visual feedback to the user regarding which parameters have been changed for a media-processing style, which provides improved visual feedback.

In some embodiment, the computer is configured to store media (e.g., and/or capture media) in a first file format (e.g., compressed format, such as JPEG and/or HEIC) (e.g., when raw capture indicator 602*b* is displayed in an inactive state). In some embodiments, while the computer system is configured to capture and sore media in the first file format and while the second styles-mode user interface object (e.g., 602*b*) is displayed in an active state (e.g., enabled state (e.g., a state where the computer system performs an action in response to detecting one or more inputs directed to the user interface object)), the computer system detects a request (e.g., 650*v*) to configure the computer system to capture and store media in a second file format (e.g., raw format) that is different from the first file format. In some embodiments, in response to detecting the request to configure the computer system to capture and store media in the second file format, the computer system ceases to display the second styles-mode user interface object in the active state (e.g., as discussed above in relation to FIGS. 6V-6Y) (e.g., ceasing to display the second styles-mode user interface object and/or displaying the second styles-mode user interface object in an inactive (e.g., disabled state (e.g., a state where the computer system does not perform an action in response to detecting one or more inputs directed to the user interface object)). In some embodiments, in response to detecting the request to configure the computer system to capture and store media in the second file format, the computer system configures the computer system to capture and store media in the second file format. In some embodiments, as a part of detecting the request to configure the computer system to capture and store media in the second file format, the computer system detects an input (e.g., a tap input, a press-and-hold input, and/or a swipe input) directed to the first selectable user interface object for controlling a file format for capturing media with the one or more cameras. In some embodiments, in response to detecting the request to configure the computer system to capture and store media in the second file format, the computer system changes the first selectable user interface object for controlling a file format for capturing media with the one or more cameras from being displayed in an inactive state to being displayed in an active state. Ceasing to display the second styles-mode user interface object in the active state in response to detecting the request to configure the computer system to capture and store media in the second file format provides visual feedback to the user that a media-processing style is not being applied and applying a media-processing style is not available when the computer is configured to capture and store media in the second file format, which improves visual feedback.

Note that details of the processes described above with respect to method 900 (e.g., FIG. 9) are also applicable in an analogous manner to the methods described herein. For example, method 900 optionally includes one or more of the characteristics of the various methods described above with reference to method 1000. For example, method 900 can be used to select one or more media-processing styles and method 1000 can be used to edit the media that was selected using method 900. For brevity, these details are not repeated below.

FIGS. 10A-10B are a flow diagram illustrating methods for editing media-processing styles using a computer system in accordance with some embodiments. Method 1000 is performed at a computer system (e.g., 100, 300, 500, 600) (e.g., a smartphone, a desktop computer, a laptop, and/or a tablet) that is in communication with a display generation component (e.g., a display controller and/or a touch-sensitive display system) and one or more input devices (e.g., a touch-sensitive surface and/or a first camera of one or more cameras (e.g., one or more cameras (e.g., dual cameras, triple camera, quad cameras, etc.) on the same side or different sides of the computer system (e.g., a front camera and/or a back camera))). Some operations in method 1000 are, optionally, combined, the orders of some operations are, optionally, changed, and some operations are, optionally, omitted.

As described below, method 1000 provides an intuitive way for editing media-processing styles using a computer system. The method reduces the cognitive burden on a user for editing media-processing styles using a computer system, thereby creating a more efficient human-machine interface. For battery-operated computing devices, enabling a user to edit media-processing styles using a computer system faster and more efficiently conserves power and increases the time between battery charges.

The computer system displays (1002), via the display generation component, a user interface (e.g., a style-selection user interface, a media capture user interface, a media viewing user interface a media editing user interface) that includes a representation (e.g., 630, 676*a*, 676*b*, 676*c*, 680*c*, and/or 680*d*) (e.g., photo media, video media) (e.g., live media, a live preview (e.g., media corresponding a representation of a field-of-view (e.g., a current field-of-view) of the one or more cameras that has not been stored/captured (e.g., in response to detecting a request to capture media (e.g., detecting selection of a shutter affordance (e.g., user interface object))), previously captured media (e.g., media corresponding a representation of a field-of-view (e.g., a previous field-of-view) of the one or more cameras that has been captured, a media item that has been saved and is able to be accessed by a user at a later time, and/or a representation of media that was displayed in response to receiving a gesture on a thumbnail representation of media (e.g., in a media gallery)) of media (e.g., information, data that is being captured or that has been captured by one or more cameras of the computer system) (e.g., while operating in a camera mode) (e.g., and while operating in a particular style-mode (e.g., a media-processing styles mode)), where the representation of the media is displayed using a first media-processing style (e.g., 634*a*-634*d*, 634*aa*, and/or 634*dd*) (e.g., according to, with) that is applied to visual content of the media. In some embodiments, the first media-processing style is one of a plurality of media-processing style. In some embodiments, each plurality of styles have the same set of parameters. In some embodiments, the set of parameters is a set of visual characteristics (e.g., color characteristics (e.g., warmth, tone, hue, brightness, saturation, shade, tint, colorfulness, coldness, and/or harmony) and/or depth parameters) (e.g., without a second style being applied to the media).

While displaying the representation of the media using the first media-processing style (e.g., 634*a*-634*d*, 634*aa*, and/or 634*dd*), the computer system concurrently displays (1004), via the display generation component, a plurality of selectable user interface objects for (e.g., editing parameters (e.g., visual characteristics (e.g., a color characteristic (e.g., warmth, tone, hue, brightness, saturation, shade, tint, colorfulness, coldness and/or harmony)) and/or a depth parameter) of) the first media-processing style, including: a first selectable user interface object (e.g., 626*a*1, 626*a*2, 626*b*1, 626*b*2, 626*c*1, 626*c*2, 626*d*1, and/or 626*d*2) for editing a first parameter (e.g., as indicated by 626*a*1*a*, 626*a*2*a*, 626*b*1*a*, 626*b*2*a*, 626*c*1*a*, 626*c*2*a*, 626*d*1*a*, and/or 626*d*2*a*) (e.g., visual characteristics (e.g., a color characteristic (e.g., warmth, tone, hue, brightness, saturation, shade, tint, colorfulness, coldness, and/or harmony)) and/or a depth parameter) of the first media-processing style (1006) that is displayed with (e.g., concurrently displayed with, includes) a representation (e.g., 626*a*1*b*, 626*a*2*b*, 626*b*1*b*, 626*b*2*b*, 626*c*1*b*, 626*c*2*b*, 626*d*1*b*, and/or 626*d*2*b*) of a current value for the first parameter of the first media-processing style (e.g., a number (e.g., 0-100), a percentage (e.g., 0-100%), an indication of the number on a control (e.g., a slider, a rotatable knob) (e.g., a slider bar that is displayed at a particular position on a slider), one or more characters that is indicated for the first value), a compressed control and/or a portion of a control) and a second electable user interface object (e.g., 626*a*1, 626*a*2, 626*b*1, 626*b*2, 626*c*1, 626*c*2, 626*d*1, and/or 626*d*2) for editing a second parameter (e.g., as indicated by 626*a*1*a*, 626*a*2*a*, 626*b*1*a*, 626*b*2*a*, 626*c*1*a*, 626*c*2*a*, 626*d*1*a*, and/or 626*d*2*a*) (e.g., visual characteristics (e.g., a color characteristic (e.g., warmth, tone, hue, brightness, saturation, shade, tint, colorfulness, coldness, and/or harmony)) and/or a depth parameter) of the first media-processing style (1008) that is displayed with (e.g., concurrently displayed with, includes) a representation (e.g., 626*a*1*b*, 626*a*2*b*, 626*b*1*b*, 626*b*2*b*, 626*c*1*b*, 626*c*2*b*, 626*d*1*b*, and/or 626*d*2*b*) of a current value for the second parameter of the first media-processing style (e.g., a number (e.g., 0-100), a percentage (e.g., 0-100%), an indication of the number on a control (e.g., a slider and/or a rotatable knob) (e.g., a slider bar that is displayed at a particular position on a slider), one or more characters that is indicated for the first value), a compressed control, and/or a portion of a control), where the first parameter is different from the second parameter. In some embodiments, in accordance with a determination that the first value corresponds to a first amount of the parameter, the first value is displayed to indicate the first amount of the first parameter. In some embodiments, in accordance with a determination that the first value corresponds to a second amount of the parameter, the first value is displayed to indicate the second amount of the first parameter, where the first amount is different from the second amount. In some embodiments, the first value for the second parameter is different from the first value for the first parameter. In some embodiments, first selectable user interface object is different from the second selectable user interface object. In some embodiments, the plurality of selectable user interface objects was not displayed before the request to edit how the first media-processing style is applied to the visual content was applied. In some embodiments, the plurality of selectable user interface objects for editing parameters of the first media-processing style are displayed next to each other (e.g., next to each other in a line) (e.g., aligned with each other, in-lined).

While displaying the plurality of selectable user interface objects (e.g., 626*a*1, 626*a*2, 626*b*1, 626*b*2, 626*c*1, 626*c*2, 626*d*1, and/or 626*d*2) for the first media-processing style (e.g., and while displaying the representation of the media that is displayed using the first media-processing style) (e.g., and while operating in a particular style-mode (e.g., a media-processing styles mode)), the computer system detects (1010), via the one or more input devices, an input (e.g., 750*a*, 750*d*, 750*g*, 750*k*, 750*n*, 750*r*, and/or 750*t*) (e.g., a tap input (e.g., a tap gesture) (e.g., a single tap input, a double tap input)) (and/or, in some embodiments, detecting a non-tap input/gesture (e.g., a movement input/gesture (e.g., a swipe input/gesture that includes velocity at the end of the input/gesture or a drag input/gesture that causes changes based on movement during the input/gesture), and/or a press-and-hold input/gesture)) directed to the plurality of selectable user interface objects for the first media-processing style.

In response to (1012) detecting the input (e.g., 750*a*, 750*d*, 750*g*, 750*k*, 750*n*, 750*r*, and/or 750*t*) (e.g., a tap input (e.g., a tap gesture) (e.g., a single tap input, a double tap input)) (and/or, in some embodiments, detecting a non-tap input/gesture (e.g., a movement input/gesture (e.g., a movement input/gesture that includes velocity at the end of the input/gesture or a drag input/gesture that causes changes based on movement during the input/gesture), and/or a press-and-hold input/gesture)) directed to the plurality of selectable user interface objects for the first media-processing style (e.g., and while displaying the representation of the media using the first media-processing style and/or while continuing to operate in a particular camera mode and/or while operating in a particular style-mode (e.g., a media-processing styles mode)) (and/or, in some embodiments, in response to detecting a non-tap input/gesture (e.g., a movement input/gesture and/or a press-and-hold input/gesture) directed to the plurality of selectable user interface objects for editing parameters that correspond to the first media-processing style), the computer system, in accordance with a determination that the input is directed to the first selectable user interface object for editing the first parameter of the first media-processing style, displays (1014), via the display generation component, a first control (e.g., 626*a*1, 626*a*2, 626*b*1, 626*b*2, 626*c*1, 626*c*2, 626*d*1, and/or 626*d*2) (e.g., a slider and/or a rotatable knob) (e.g., an expanded control (e.g., an expanded control of a compress control that was previously displayed)) for adjusting (e.g., changing) the current value for the first parameter (e.g., as indicated by 626*a*1*a*, 626*a*2*a*, 626*b*1*a*, 626*b*2*a*, 626*c*1*a*, 626*c*2*a*, 626*d*1*a*, and/or 626*d*2*a*) (e.g., without displaying the control for adjusting the first value for the second parameter) (e.g., without adjusting the second value for the first parameter) (e.g., concurrently with the representation of the first media-processing style being applied to the visual content) (e.g., while continuing to detect the input directed to the plurality of selectable user interface objects for the first media-processing style). In some embodiments, in response to detecting an input (e.g., a movement input) (and/or, in some embodiments, in response to detecting a non-movement input (e.g., tap input, a rotation dragging gesture, a press-and-hold gesture, and/or a voice input) directed to the first control for adjusting the current value for the first parameter, the computer system updates the representation of the media and/or a portion of the representation of the media (e.g., to reflect that that the current value for the first parameter) and/or updates the current value for the first parameter. In some embodiments, in response to detecting the input directed to the first control for adjusting the current value for the first parameter, the computer system does not update the representation of the media and/or a portion of the representation of the media to reflect the current value of the second parameter and/or does not update the current value for the second parameter.

In response to (1012) detecting the input (e.g., 750*a*, 750*d*, 750*g*, 750*k*, 750*n*, 750*r*, and/or 750*t*) (e.g., a tap input (e.g., a tap gesture) (e.g., a single tap input, a double tap input)) (and/or, in some embodiments, detecting a non-tap input/gesture (e.g., a movement input/gesture (e.g., a movement input/gesture that includes velocity at the end of the input/gesture or a drag input/gesture that causes changes based on movement during the input/gesture), and/or a press-and-hold input/gesture)) directed to the plurality of selectable user interface objects for the first media-processing style (e.g., and while displaying the representation of the media using the first media-processing style and/or while continuing to operate in a particular camera mode and/or while operating in a particular style-mode (e.g., a media-processing styles mode)) (and/or, in some embodiments, in response to detecting a non-tap input/gesture (e.g., a movement input/gesture and/or a press-and-hold input/gesture) directed to the plurality of selectable user interface objects for editing parameters that correspond to the first media-processing style), the computer system, in accordance with a determination that the input is directed to the second user interface object for editing the second parameter of the first media-processing style, displays (1016), via the display generation component, a second control (e.g., 626*a*1, 626*a*2, 626*b*1, 626*b*2, 626*c*1, 626*c*2, 626*d*1, and/or 626*d*2) (e.g., a slider and/or a rotatable knob) (e.g., an expanded control (e.g., an expanded control of a compress control that was previously displayed)) for adjusting (e.g., changing) the current value for the second parameter (e.g., as indicated by 626*a*1*a*, 626*a*2*a*, 626*b*1*a*, 626*b*2*a*, 626*c*1*a*, 626*c*2*a*, 626*d*1*a*, and/or 626*d*2*a*) (e.g., without displaying the control for adjusting the first value for the first parameter) (e.g., concurrently with the representation of the first media-processing style being applied to the visual content) (e.g., while continuing to detect the input directed to the plurality of selectable user interface objects for the first media-processing style). In some embodiments, in response to detecting an input (e.g., a movement input) (and/or, in some embodiments, in response to detecting a non-movement input (e.g., tap input, a rotation dragging gesture, and/or a press-and-hold gesture) directed to the second control for adjusting the current value for the second parameter, the computer system updates the representation of the media and/or a portion of the representation of the media (e.g., to reflect that that the current value for the second parameter) and/or updates the current value for the second parameter. In some embodiments, in response to detecting the input directed to the second control for adjusting the current value for the second parameter, the computer system does not update the representation of the media and/or a portion of the representation of the media to reflect the current value of the first parameter and/or does not update the current value for the first parameter. Displaying a respective control for adjusting the current value for a respective parameter in accordance with a determination that the input is directed to a respective user interface object for editing the respective parameter of the first media-processing style allows a user to access a control for adjusting the current value for a respective parameter based on the respective user interface object at which the input was directed, which provides additional control options without cluttering the user interface. While displaying the representation of the media using the first media-processing style, concurrently displaying, via the display generation component, the plurality of selectable user interface objects for the first media-processing style provides the user with visual feedback concerning a plurality of selectable user interface objects that can be used to edit how the first media-processing style is applied to visual content, which provides improved visual feedback.

In some embodiments, as a part of displaying the first control (e.g., 626*a*1, 626*a*2, 626*b*1, 626*b*2, 626*c*1, 626*c*2, 626*d*1, and/or 626*d*2), the computer system displays (e.g., concurrently with the first control; as part of the first control) a second representation (e.g., 626*a*1*b*, 626*a*2*b*, 626*b*1*b*,

626*b*2*b*, 626*c*1*b*, 626*c*2*b*, 626*d*1*b*, and/or 626*d*2*b*) of the current value for the first parameter of the first media-processing style (e.g., 634*a*-634*d*, 634*aa*, and/or 634*dd*). In some embodiments, as a part of displaying the second control (e.g., 626*a*1, 626*a*2, 626*b*1, 626*b*2, 626*c*1, 626*c*2, 626*d*1, and/or 626*d*2), the computer system displays (e.g., concurrently with the second control; as part of the second control) a second representation (e.g., 626*a*1*b*, 626*a*2*b*, 626*b*1*b*, 626*b*2*b*, 626*c*1*b*, 626*c*2*b*, 626*d*1*b*, and/or 626*d*2*b*) of the current value for the second parameter of the first media-processing style. Displaying a respective control with a representation of a current respective value for the respective control in accordance with a determination that the input is directed to a respective user interface object for editing the respective parameter provides the user with visual feedback concerning the current value for the respective parameter and how the user can adjust the current value for the respective parameter to change how a media-processing style is applied to visual content, which provides improved visual feedback.

In some embodiments, while displaying the representation (e.g., 630, 676*a*, 676*b*, 676*c*, 680*c*, and/or 680*d*) of the media using the first media-processing style (e.g., 634*a*-634*d*, 634*aa*, and/or 634*dd*) and the plurality of selectable user interface objects for the first media-processing style (e.g., 626*a*1, 626*a*2, 626*b*1, 626*b*2, 626*c*1, 626*c*2, 626*d*1, and/or 626*d*2) (e.g., and while operating in a particular style-mode (e.g., a media-processing style selection mode)), the computer system detects a request (e.g., 650*d*, 650*k*1, 650*k*2, 750*j*, and/or 750*q*) to display the representation of the media using a second media-processing style (e.g., 634*a*-634*d*, 634*aa*, and/or 634*dd*) (e.g., a style that differs from the first style in one or more visual characteristics) that is applied to visual content of the media. In some embodiments, in response to detecting the request (e.g., 650*d*, 650*k*1, 650*k*2, 750*j*, and/or 750*q*) to display the representation of the media using the second media-processing style that is applied to visual content of the media (e.g., and while operating in a particular style-mode (e.g., a media-processing styles mode)), the computer system ceases to display the plurality of selectable user interface objects for the first media-processing style. In some embodiments, in response to detecting the request to display the representation of the media using the second media-processing style that is applied to visual content of the media, the computer system displays the representation of the media using the second media-processing style that is applied to visual content of the media. In some embodiments, in response to detecting the request to display the representation of the media using the second media-processing style that is applied to visual content of the media, the computer system displays the representation of the media using the second media-processing style that is applied to visual content of the media concurrently with a plurality of selectable user interface objects for the second media-processing style. In some embodiments, the plurality of selectable user interface objects for the second media-processing style includes a first selectable user interface object for editing a third parameter of the second media-processing style that is displayed with a representation of a current value for the third parameter of the second media-processing style; and a second electable user interface object for editing a fourth parameter of the second media-processing style that is displayed with a representation of a current value for the fourth parameter of the second media-processing style. In some embodiments, the third parameter is different (e.g., a different type of parameter) from the fourth parameter. In some embodiments, the first parameter is the same (e.g., the same type of parameter) as the third parameter. In some embodiments, the second parameter is the same (e.g., the same type of parameter) as the fourth parameter. In some embodiments, in response to detecting input directed to the plurality of selectable user interface objects for the second media-processing style, the computer system, in accordance with a determination that the input is directed to the first selectable user interface object for editing the third parameter of the second media-processing style, displays, via the display generation component, a control for adjusting the current value for the third parameter. In some embodiments, in response to detecting input directed to the plurality of selectable user interface objects for the second media-processing style, the computer system, in accordance with a determination that the input is directed to the second selectable user interface object for editing the fourth parameter of the second media-processing style, the computer system displays, via the display generation component, a control for adjusting the current value for the fourth parameter. Ceasing to display the plurality of selectable user interface objects for the first media-processing style in response to detecting the request to display the representation of the media using the second media-processing style that is applied to visual content of the media allows the computer system to source relevant user interface objects that pertain to the media-processing style that is being applied to representation of media without sourcing user interface objects that do not pertain to the media-processing style that is being applied to representation of media, which performs an operation when a set of conditions has been met without requiring further user input and provides improved visual feedback.

In some embodiments, as a part of displaying, via the display generation component, the first control (e.g., 626*a*1, 626*a*2, 626*b*1, 626*b*2, 626*c*1, 626*c*2, 626*d*1, and/or 626*d*2) for adjusting the current value for the first parameter (e.g., in response to detecting the input directed to the plurality of selectable user interface objects for the first media-processing style and in accordance with a determination that the input is directed to the first selectable user interface object for editing the first parameter of the first media-processing style), the computer system expands (and/or enlarging) the first selectable user interface object (e.g., 626*a*1, 626*a*2, 626*b*1, 626*b*2, 626*c*1, 626*c*2, 626*d*1, and/or 626*d*2) for editing the first parameter of the first media-processing style (e.g., to display the first control for adjusting the current value for the first parameter) (e.g., expanding in-line, expanding the first selectable user interface object for editing the first parameter of the first media-processing style such that the first control for adjusting the current value for the first parameter occupies the same area (and/or a portion of the same area) that the first user interface object for editing the first parameter of the first media-processing style occupied before the input directed to the plurality of selectable user interface objects for the first media-processing style was detected) (e.g., displaying an animation of expanding). In some embodiments, as a part of displaying, via the display generation component, the second control for adjusting the current value for the second parameter (e.g., in response to detecting the input directed to the plurality of selectable user interface objects for the first media-processing style and in accordance with a determination that the input is directed to the second user interface object for editing the second parameter of the first media-processing style), the computer system expands the second selectable user interface object for editing the second parameter of the first media-processing style (e.g., to display the second control for adjusting the current value for the second parameter) (e.g., expanding in-line, expanding the second user interface object for editing the second parameter of the first media-processing style such that the second control for adjusting the current value for the second parameter occupies the same area (and/or a portion of the same area) that the second user interface object for editing the second parameter of the first media-processing style occupied before the input directed to the plurality of selectable user interface objects for the first media-processing style was detected). In some embodiments, the first control for adjusting the current value for the first parameter is related to (e.g., is a larger version of, is larger than, includes a portion of, and/or includes one or more characteristics of) the first selectable user interface object for editing the first parameter of the first media-processing style. In some embodiments, the second control for adjusting the current value for the second parameter is related to (e.g., is a larger version of, is larger than, includes a portion of, and/or includes one or more characteristics of) the second selectable user interface object for editing the second parameter of the first media-processing style. Expanding the first selectable user interface object for editing the first parameter of the first media-processing style as a part of displaying, via the display generation component, the first control for adjusting the current value for the first parameter in response to the input provides visual feedback to the user that the first selectable user interface object for editing the first parameter of the first media-processing style corresponds to the first control for adjusting the current value for the first parameter, which reduces the confusion for the user while also providing a de-cluttered user interface and provides improved visual feedback.

In some embodiments, while displaying, via the display generation component, the first control (e.g., **626*a*1, 626*a*2, 626*b*1, 626*b*2, 626*c*1, 626*c*2, 626*d*1, and/or 626*d*2) for adjusting the current value for the first parameter (e.g., and continuing to detect the input directed to the plurality of selectable user interface objects for the first media-processing style), the computer system detects an end of the input directed to the plurality of selectable user interface objects for the first media-processing style. In some embodiments, in response to detecting the end (e.g., liftoff) of the input (e.g., 750*a*, 750*d*, 750*g*, 750*k*, 750*n*, and/or 750*t***) directed to the plurality of selectable user interface objects for the first media-processing style, the computer system reduces a size of (e.g., shrinking) the first control for adjusting the current value for the first parameter (e.g., to display the first selectable user interface object for editing a first parameter of the first media-processing style that is displayed with the representation of the current value for the first parameter of the first media-processing style) (e.g., displaying an animation of shrinking). In some embodiments, after shrinking the first control for adjusting the current value for the first parameter and/or in response to detecting the end of the input directed to the plurality of selectable user interface objects for the first media-processing style, the computer system re-displays the first selectable user interface object for editing the first parameter and the second selectable user interface object for editing the second parameter). In some embodiments, after shrinking the first control for adjusting the current value for the first parameter and/or in response to detecting the end of the input directed to the plurality of selectable user interface objects for the first media-processing style, the computer system re-displays the first selectable user interface object for editing the first parameter and displays the representation of the current value of the first parameter at a different position on the first selectable user interface object for editing the second parameter from the position that the representation of the current value of the first parameter was previously displayed before the input was detected. In some embodiments, while displaying, via the display generation component, the second control for adjusting the current value for the second parameter (e.g., and continuing to detect the input directed to the plurality of selectable user interface objects for the first media-processing style), the computer system detects an end of the input directed to the plurality of selectable user interface objects for the first media-processing style; and in response to detecting the end of the input directed to the plurality of selectable user interface objects for the first media-processing style, the computer system reduces the size of the second control for adjusting the current value for the second parameter (e.g., to display the second selectable user interface object for editing the second parameter of the first media-processing style that is displayed with the representation of the current value for the second parameter of the first media-processing style). In some embodiments, after reducing the size of the second control for adjusting the current value for the second parameter and/or in response to detecting the end of the input directed to the plurality of selectable user interface objects for the first media-processing style, the computer system re-displays the first selectable user interface object for editing the first parameter and the second selectable user interface object for editing the second parameter. In some embodiments, after reducing the size of the second control for adjusting the current value for the second parameter and/or in response to detecting the end of the input directed to the plurality of selectable user interface objects for the first media-processing style, the computer system re-displays the second selectable user interface object for editing the second parameter and displays the representation of the current value of the second parameter at a different position on the second selectable user interface object for editing the second parameter from the position that the representation of the current value of the second parameter was previously displayed before the input was detected. Reducing the size of the first control for adjusting the current value for the first parameter in response to detecting the end of the input directed to the plurality of selectable user interface objects for the first media-processing style provides visual feedback to the user that the first selectable user interface object for editing the first parameter of the first media-processing style corresponds to the first control for adjusting the current value for the first parameter, which reduces the confusion for the user while also providing a de-cluttered user interface and provides improved visual feedback.

In some embodiments, before detecting the input (e.g., **750*a*, 750*d*, 750*g*, 750*k*, 750*n*, and/or 750*t*) directed to the plurality of selectable user interface objects for the first media-processing style, the current value for the first parameter is a first value (e.g., represented by 626*a*1*b*, 626*a*2*b*, 626*b*1*b*, 626*b*2*b*, 626*c*1*b*, 626*c*2*b*, 626*d*1*b*, and/or 626*d*2*b*). In some embodiments, while displaying, via the display generation component, the first control (e.g., 626*a*1, 626*a*2, 626*b*1, 626*b*2, 626*c*1, 626*c*2, 626*d*1, and/or 626*d*2**) for adjusting the current value for the first parameter (e.g., and continuing to detect the input directed to the plurality of selectable user interface objects for the first media-processing style), the computer system detects an end (e.g., liftoff) of the input directed to the plurality of selectable user interface objects for the first media-processing style. In some embodiments, in response to detecting the end (e.g., liftoff)

of the input directed to the plurality of selectable user interface objects for the first media-processing style, the computer system displays the representation (e.g., **626*a*1*b*, 626*a*2*b*, 626*b*1*b*, 626*b*2*b*, 626*c*1*b*, 626*c*2*b*, 626*d*1*b*, and/or 626*d*2*b***) of the current value of the first parameter. In some embodiments, the current value is a second value that is different from the first value. In some embodiments, the second value is the same as the first value. In some embodiments, while displaying, via the display generation component, the first control for adjusting the current value for the first parameter and in response to detecting the end (e.g., liftoff) of the input directed to the plurality of selectable user interface objects for the first media-processing style, the computer system displays the representation of the current value of the second parameter, where the current value of the representation of the second parameter is a value after the input directed to the plurality of selectable user interface objects for the first media-processing style was detected that is the same as the value that the current value was before the input directed to the plurality of selectable user interface objects for the first media-processing style was detected (e.g., the current value for the second parameter does not change). In some embodiments, before detecting the input directed to the plurality of selectable user interface objects for the first media-processing style, the current value for the first parameter is a third value, while displaying, via the display generation component, the second control for adjusting the current value for the second parameter (e.g., and continuing to detect the input directed to the plurality of selectable user interface objects for the first media-processing style), the computer system: detects an end (e.g., liftoff) of the input directed to the plurality of selectable user interface objects for the first media-processing style; and in response to detecting the end (e.g., liftoff) of the input directed to the plurality of selectable user interface objects for the first media-processing style, displays the representation of the current value of the second parameter. In some embodiments, the current value is a third value that is different from the fourth value (and/or displaying the representation of the current value of the first parameter as the same value that the current value of the first parameter was displayed before the input directed to the plurality of selectable user interface objects for the first media-processing style was detected). Displaying the representation of the current value of the first parameter, where the current value is a second value that is different from the first value, in response to detecting the end of the input directed to the plurality of selectable user interface objects for the first media-processing style provides the user with visual feedback to understand that the current value of the first parameter has been adjusted by the input, which provides improved visual feedback.

In some embodiments, the first selectable user interface object (e.g., **626*a*1, 626*a*2, 626*b*1, 626*b*2, 626*c*1, 626*c*2, 626*d*1, and/or 626*d*2) for editing the first parameter is displayed with a first representation (e.g., 626*a*1*c*, 626*a*2*c*, 626*b*1*c*, 626*b*2*c*, 626*c*1*c*, 626*c*2*c*, 626*d*1*c*, and/or 626*d*2*c*) of a first range of values (e.g., −100 to 100) (e.g., and, in some embodiments, the representation of the current value for the first parameter of the first media-processing style is displayed on, adjacent to, and/or included in the representation of the first range of values) for the first parameter, the first range of values having a first distance between a first point in the first representation of the first range of values representing a first value and a second point in the first representation of the first range of values representing a second value (e.g., as discussed above in relation to FIGS. 7A-7B). In some embodiments, as a part of displaying the first control (e.g., 626*a*1, 626*a*2, 626*b*1, 626*b*2, 626*c*1, 626*c*2, 626*d*1, and/or 626*d*2), the computer system displays a second representation (e.g., 626*a*1*c*, 626*a*2*c*, 626*b*1*c*, 626*b*2*c*, 626*c*1*c*, 626*c*2*c*, 626*d*1*c*, and/or 626*d*2*c*) of a range of values which has a second distance (e.g., on the display generation component), greater than the first distance (e.g., on the display generation component), between a first point in the second representation of the range of values representing the first value and a second point in the second representation of the range of values representing the second value (e.g., as discussed above in relation to FIGS. 7A-7**B). In some embodiments, the second selectable user interface object for editing the first parameter is displayed with a third representation of a first range of values (e.g., −100 to 100) (e.g., and, in some embodiments, the representation of the current value for the first parameter of the first media-processing style is displayed on, adjacent to, and/or included in the representation of the first range of values) for the second parameter, the first range of values for the second parameter having a third distance between a first point in the third representation of the first range of values for the second parameter representing a third value and a second point in the third representation of the first range of values for the second parameter representing a fourth value. In some embodiments, as a part of displaying the second control, the computer system displays a fourth representation of a second range of values for the second parameter which has a fourth distance, greater than the third distance, between a first point in the fourth representation of the second range of values for the second parameter representing the third value and a second point in the fourth representation of the second range of values for the second parameter representing the fourth value. In some embodiments, the second selectable user interface object for editing the first parameter includes a representation of a second range of values (e.g., −100 to 100) for the first parameter (e.g., and, in some embodiments, the representation of the current value for the second parameter of the first media-processing style is displayed on, adjacent to, and/or included in the representation of the second range of values). In some embodiments, as a part of displaying the second control, the computer displays a representation of a range of values (e.g., 30 to 60) that is a subset of the first range of values for the second parameter (e.g., and ceasing to displaying the representation of a first range of values for the second parameter). In some embodiments, while displaying, via the display generation component, the first control for adjusting the current value for the first parameter and continuing to detect the input directed to the plurality of selectable user interface objects for the first media-processing style (and/or while continuing to detect movement of the input directed to the plurality of selectable user interface objects for the first media-processing style), the computer system increases a first size of the first control for adjusting the current value for the first parameter (e.g., zooming into the first control, displaying one or more portions of a respective control for adjusting the current value for a respective parameter at an increased, bigger, greater size than the control was previously displayed) (e.g., on the user interface). In some embodiments, while displaying, via the display generation component, the second control for adjusting the current value for the second parameter and continuing to detect the input directed to the plurality of selectable user interface objects for the first media-processing style (and/or while continuing to detect movement of the input directed to the plurality of selectable user interface objects for the first media-processing style), increasing a size of the second control for adjusting the current value for the second parameter (e.g., zooming into the second control) (e.g., on the user interface). Displaying a representation of a range of values which has a second distance, greater than the first distance, between a second point representing the first value and a second point representing the second value as a part of displaying the first control provides the user with visual feedback that the first control for adjusting the current value for the first parameter can be manipulated to change the current value for the first parameter via the input and gives the user the ability to focus on and/or select (e.g., more easily select) values between a point representing the first value and a point representing the second value, which provides additional control options without cluttering the user interface and provides improved visual feedback.

In some embodiments, the first control (e.g., **626*a*1, 626*a*2, 626*b*1, 626*b*2, 626*c*1, 626*c*2, 626*d*1, and/or 626*d*2) is displayed with a third representation (e.g., 626*a*1*c*, 626*a*2*c*, 626*b*1*c*, 626*b*2*c*, 626*c*1*c*, 626*c*2*c*, 626*d*1*c*, and/or 626*d*2*c*) of a third range of values for the first parameter, the third range of values having a third distance between a first point in the third representation of the third range of values representing a third value and a second point in the third representation of the third range of values representing a fourth value. In some embodiments, while displaying, via the display generation component, the first control with the third representation of the third range of values for the first parameter, the computer system detects an end (e.g., liftoff) of the input (e.g., 750*a*, 750*d*, 750*g*, 750*k*, 750*n*, and/or 750*t*) directed to the plurality of selectable user interface objects for the first media-processing style. In some embodiments, in response to detecting the end of the input directed to the plurality of selectable user interface objects for the first media-processing style, the computer system displays the first selectable user interface object (e.g., 626*a*1, 626*a*2, 626*b*1, 626*b*2, 626*c*1, 626*c*2, 626*d*1, and/or 626*d*2) for editing the first parameter with a fifth representation (e.g., 626*a*1*c*, 626*a*2*c*, 626*b*1*c*, 626*b*2*c*, 626*c*1*c*, 626*c*2*c*, 626*d*1*c*, and/or 626*d*2*c***) of a range of values which has a fourth distance (e.g., on the display generation component), lesser than the third distance (e.g., on the display generation component), between a first point in the fifth representation of the range of values representing the third value and a second point in the fifth representation of the range of values representing the fourth value. In some embodiments, the second control is displayed with a fifth representation of a fifth range of values for the second parameter, the fifth range of values having a fifth distance between a first point in the fifth representation of the range of values for the second parameter representing a fifth value and a second point in the fifth representation of the fifth range of values representing a sixth value. In some embodiments, while displaying, via the display generation component, the second control with the fifth representation of the fifth range of values for the second parameter, the computer system detects an end (e.g., liftoff) of the input directed to the plurality of selectable user interface objects for the first media-processing style. In some embodiments, in response to detecting the end of the input directed to the plurality of selectable user interface objects for the first media-processing style, the computer system displays the second selectable user interface object for editing the second parameter with a sixth representation of a range of values which has a sixth distance, lesser than the fifth distance, between a first point in the sixth representation of the range of values for the second parameter representing the fifth value and a second point in the sixth representation of the range of values for the second parameter representing the sixth value. In some embodiments, the first control is displayed with a representation of a range of values that is a subset (e.g., 30 to 60) (e.g., having a min and max value that is between the second range of values) of a second range of values (e.g., −100 to 100) for the first parameter. In some embodiments, while displaying, via the display generation component, the first control with the representation of the subset of the second range of values for the first parameter, the computer system detects an end (e.g., liftoff) of the input directed to the plurality of selectable user interface objects for the first media-processing style. In some embodiments, in response to detecting the end of the input directed to the plurality of selectable user interface objects for the first media-processing style, the computer system displays a representation of a second range of values for the first parameter. In some embodiments, in response to detecting the end of the input directed to the plurality of selectable user interface objects for the first media-processing style, the computer system ceases displaying the representation of the subset of the second range of values for the first parameter. In some embodiments, in response to detecting the end of the input directed to the plurality of selectable user interface objects for the first media-processing style, the computer system displays a representation of a second range of values for the second parameter (e.g., that was not previously displayed while the representation of the subset of the second range of values for the first parameter was displayed) concurrently with the representation of the second range of values for the first parameter. In some embodiments, the second control is displayed with a representation of a range of values that is a subset (e.g., 30 to 60) of a second range of values for the second parameter. In some embodiments, while displaying, via the display generation component, the second control with the representation of the subset of the second range of values for the second parameter, the computer system detects an end (e.g., liftoff) of the input directed to the plurality of selectable user interface objects for the first media-processing style and, in response to detecting the end of the input directed to the plurality of selectable user interface objects for the first media-processing style, displays a representation of a second range of values for the second parameter. In some embodiments, in response to detecting the end of the input directed to the plurality of selectable user interface objects for the first media-processing style, the computer system ceases displaying the representation of the subset of the second range of values for the second parameter. In some embodiments, in response to detecting the end of the input directed to the plurality of selectable user interface objects for the first media-processing style, the computer system decreases a second size (e.g., same as the first size in the paragraph above) of the first control for adjusting the currently value for the first parameter (e.g., zooming out the first control, displaying one or more portions of a respective control for adjusting the current value for a respective parameter at a decreased, smaller, lesser size than the control was previously displayed) (e.g., on the user interface). In some embodiments, while displaying, via the display generation component, the second control for adjusting the current value for the second parameter, the computer system detects an end (e.g., liftoff) of the input directed to the plurality of selectable user interface objects for the first media-processing style. In some embodiments, in response to detecting the end of the input directed to the plurality of selectable user interface objects for the first media-processing style, the computer system decreases a size of the first control for adjusting the currently value for the first parameter. Displaying the first selectable user interface object for editing the first parameter with a representation of a range of values which has a fourth distance, lesser than the third distance, between a second point representing the third value and a second point representing the fourth value provides the user with visual feedback that the first control for adjusting the current value for the first parameter can be no longer manipulated to change the current value for the first parameter via the input, which provides improved visual feedback.

In some embodiments, in response to detecting the input (e.g., 750*a*, 750*d*, 750*g*, 750*k*, 750*n*, and/or 750*t*) directed to the plurality of selectable user interface objects (e.g., 626*a*1, 626*a*2, 626*b*1, 626*b*2, 626*c*1, 626*c*2, 626*d*1, and/or 626*d*2) for the first media-processing style and in accordance with a determination that the input is directed to the first selectable user interface object for editing the first parameter of the first media-processing style, the computer system moves the second control (e.g., 626*a*1, 626*a*2, 626*b*1, 626*b*2, 626*c*1, 626*c*2, 626*d*1, and/or 626*d*2) for adjusting the current value for the second parameter (e.g., represented by 626*a*1*b*, 626*a*2*b*, 626*b*1*b*, 626*b*2*b*, 626*c*1*b*, 626*c*2*b*, 626*d*1*b*, and/or 626*d*2*b*) from a first location on user interface to a second location (e.g., that is different from the first location) on the user interface (e.g., and/or one or more of the other plurality of selectable user interface objects for the first media-processing style). In some embodiments, in response to detecting the input directed to the plurality of selectable user interface objects for the first media-processing style and in accordance with a determination that the input is directed to the second selectable user interface object for editing the second parameter of the first media-processing style, the computer system moves the first control for adjusting the currently value for the first parameter from a third location on user interface to a fourth location (e.g., that is different from the third location) on the user interface (e.g., and/or one or more of the other plurality of selectable user interface objects for the first media-processing style). Moving the second control for adjusting the currently value for the second parameter from a first location on user interface to a second location in response to detecting the input directed to the plurality of selectable user interface objects for the first media-processing style and in accordance with a determination that the input is directed to the first selectable user interface object for editing the first parameter of the first media-processing style provides the user with visual feedback that the input was not directed to the second selectable user interface object for editing the first parameter of the first media-processing style, allowing a user to correct a potential error if needed, which provides improved visual feedback.

In some embodiments, in response to detecting the input (e.g., 750*a*, 750*d*, 750*g*, 750*k*, 750*n*, and/or 750*t*) directed to the plurality of selectable user interface objects (e.g., 626*a*1, 626*a*2, 626*b*1, 626*b*2, 626*c*1, 626*c*2, 626*d*1, and/or 626*d*2) for the first media-processing style and in accordance with a determination that the input is directed to the first selectable user interface object (e.g., 626*a*1, 626*a*2, 626*b*1, 626*b*2, 626*c*1, 626*c*2, 626*d*1, and/or 626*d*2) for editing the first parameter of the first media-processing style, the computer system ceases to display the second control (e.g., 626*a*1, 626*a*2, 626*b*1, 626*b*2, 626*c*1, 626*c*2, 626*d*1, and/or 626*d*2) for adjusting the current value for the second parameter (e.g., and/or one or more of the other plurality of selectable user interface objects for the first media-processing style). In some embodiments, in response to detecting the input directed to the plurality of selectable user interface objects for the first media-processing style and in accordance with a determination that the input is directed to the second selectable user interface object for editing the second parameter of the first media-processing style, the computer system ceases to display the first control for adjusting the currently value for the first parameter (e.g., and/or one or more of the other plurality of selectable user interface objects for the first media-processing style). Ceasing to display the second control for adjusting the currently value for the second parameter in response to detecting the input directed to the plurality of selectable user interface objects for the first media-processing style and in accordance with a determination that the input is directed to the first selectable user interface object for editing the first parameter of the first media-processing style provides the user with visual feedback that the input was not directed to the second selectable user interface object for editing the first parameter of the first media-processing style, allowing a user to correct a potential error if needed, which provides improved visual feedback.

In some embodiments, while displaying the representation of the media using the first media-processing style and before detecting the input directed to the plurality of selectable user interface objects for the first media-processing style, a first identifier (e.g., 636*a*-636*d*) (e.g., one or more symbols and/or text (e.g., "Standard", "Vibrant")) that corresponds to the first media-processing style (e.g., 634*a*-634*d*) is displayed. In some embodiments, in response to detecting the input (e.g., 750*a*, 750*g*) directed to the plurality of selectable user interface objects for the first media-processing style and in accordance with a determination that the current value for the first parameter has changed (e.g., after the input directed to the plurality of selectable user interface objects for the first media-processing style, in response to detecting movement of the input directed to the plurality of selectable user interface objects for the first media-processing style) to (or is) a value (e.g., a numerical value (e.g., −100-100), and/or a percentage) that is different from a default value (e.g., a predefined value) (e.g., 0) of the first parameter of the first media-processing style (and/or in accordance with a determination that the current value for the second parameter has change (e.g., after the input directed to the plurality of selectable user interface objects for the first media-processing style, in response to detecting movement of the input directed to the plurality of selectable user interface objects for the first media-processing style) to (or is) a value that is different from a default value of the second parameter of the first media-processing style), the computer system displays a second identifier (e.g., 636*aa* and/or 636*dd*) (e.g., one or more symbols and/or text (e.g., "Custom", "Custom-Standard", "Custom-Vibrant")) that corresponds to a third media-processing style (e.g., 634*aa*, and/or 634*dd*) (e.g., a media-processing style that is different from the first media-processing style and the second media-processing style, a media-processing style that was not predefined before the input directed to the plurality of selectable user interface objects for the first media-processing style was detected). In some embodiments, the second identifier is different from the first identifier (and ceasing to display the first identifier). In some embodiments, the second incitation includes a portion (e.g., one or more words) of the first identifier. In some embodiments, while displaying the second identifier, the computer system detects other input directed to the plurality of selectable user interface objects for the first media-processing style. In some embodiments, in response to detecting the other input directed to the plurality of selectable user interface objects for the first media-processing style and in accordance with a determination that the current value for the first parameter is a default value for the first parameter of the first media-processing style and the current value for the second parameter is a default value for the second parameter of the first media-processing style, the computer system displays (e.g., re-displays) the first identifier and ceases to display the second identifier. In some embodiments, the first media-processing style is different from the third media-processing style. In some embodiments, the first media-processing style is a predefined media-processing style (e.g., a style that is not created in response to detecting an input directed to the computer system) and the third media-processing style is not a predefined media-processing style. Displaying a second identifier that corresponds to a third media-processing style in accordance with a determination that the current value for the first parameter has changed to a value that is different from a default value for the first parameter provides the user with visual feedback that the first media-processing style has been edited such that at least one parameter for the first media-processing style is not the default value for the at least one parameter of the media-processing style and/or that a custom media-processing style that has been customized by the user has been created, which provides improved visual feedback.

In some embodiments, the user interface includes a selectable user interface object (e.g., 722) for resetting one or more parameters of the first media-processing style. In some embodiments, while displaying the selectable user interface object (e.g., 722) for resetting one or more parameters of the first media-processing style, the computer system detects an input (e.g., 750*w*) (e.g., a tap input (e.g., a tap gesture) (e.g., a single tap input, a double tap input)) (and/or, in some embodiments, detecting a non-tap input/gesture (e.g., a movement input, a press-and-hold input/gesture, and/or a voice input)) directed to the selectable user interface object for resetting the one or more parameters of the first media-processing style. In some embodiments, in response to detecting the input (e.g., 750*w*) directed to the selectable user interface object for resetting the one or more parameters of the first media-processing style, the computer system displays the representation of the current value (e.g., represented by 626*a*1*b*, 626*a*2*b*, 626*b*1*b*, 626*b*2*b*, 626*c*1*b*, 626*c*2*b*, 626*d*1*b*, 626*d*2*b*) for the first parameter of the first media-processing style as a second default value (e.g., represented by 626*a*1*b*, 626*a*2*b*, 626*b*1*b*, 626*b*2*b*, 626*c*1*b*, 626*c*2*b*, 626*d*1*b*, and/or 626*d*2*b*) e.g., a numerical value (e.g., −100-100), a percentage) for the first parameter of the first media-processing style (e.g., and/or setting the current value for the first parameter of the first media-processing style to the default value of the first parameter of the first media-processing style); and displays the representation of the current value for the second parameter of the first media-processing style as a second default value (e.g., represented by 626*a*1*b*, 626*a*2*b*, 626*b*1*b*, 626*b*2*b*, 626*c*1*b*, 626*c*2*b*, 626*d*1*b*, and/or 626*d*2*b*) (e.g., a numerical value (e.g., −100-100), a percentage) for the second parameter of the first media-processing style (e.g., and/or setting the current value for the first parameter of the first media-processing style to the default value of the second parameter of the first media-processing style). In some embodiments, in response to detecting the input directed to the selectable user interface object for resetting the one or more parameters of the first media-processing style, the computer system sets the current value for the first parameter of the first media-processing style as the second default value for the first parameter of the first media processing style and sets the current value for the first parameter of the first media-processing style as the second default value for the first parameter of the first media processing style (e.g., without displaying the representation of the current value for the first parameter and/or the second parameter in response to detecting the input directed to the selectable user interface object for resetting the one or more parameters of the first media-processing style). In some embodiments, a default value for the first parameter is different from a default value of the second parameter. In some embodiments, the selectable user interface object for resetting one or more parameters of first media-processing style is only displayed in accordance with a determination that the current value for the first parameter of the first media-processing style is a value that is not the default value for the first parameter and/or the current value for the second parameter of the second media-processing style is a value that is not the default value for the second parameter of the first media-processing style. In some embodiments, in response to detecting the input directed to the plurality of selectable user interface objects for the first media-processing style (and while displaying, via the display generation component, the first control for adjusting the current value for the first parameter and/or displaying, via the display generation component, the second control for adjusting the current value for the second parameter), the computer system displays the selectable user interface object for resetting the one or more parameters first media-processing style. In some embodiments, the first control for adjusting the current value for the first parameter is displayed concurrently with the selectable user interface object for resetting one or more parameters of the first media-processing style is displayed concurrently with the first control for adjusting the current value for the first parameter (or the second control for adjusting the current value for the second parameter). In some embodiments, plurality of selectable user interface objects for the first media-processing style is displayed concurrently with the selectable user interface object for resetting one or more parameters of the first media-processing style. In some embodiments, in response to detecting the input (e.g., 750*w*) directed to the selectable user interface object for resetting the one or more parameters of the first media-processing style, the computer system displays an animation of the current value for the first parameter of the first media-processing style changing (e.g., gradually changing over time) to the second default value for the first parameter of the first media-processing style (e.g., as discussed above in relation to FIGS. 7W-7X). In some embodiments, in response to detecting the input directed to the selectable user interface object for resetting the one or more parameters of the first media-processing style, the computer system displays an animation of the current value for the second parameter of the first media-processing style changing to the second default value for the second parameter of the first media-processing style. In some embodiments, the animation of the current value for the first parameter of the first media-processing style changing is displayed concurrently the animation of the current value for the second parameter of the first media-processing style changing. In some embodiments, in response to detecting the input directed to the selectable user interface object for resetting the one or more parameters of the first media-processing style, computer system displays an animation of the first control changing into the first user interface object for the first parameter. Displaying an animation of the current value for the first parameter of the first media-processing style changing to the second default value for the first parameter of the first media-processing style provides the user with feedback that the input directed to the selectable user interface object for resetting the one or more parameters of the first media-processing style has caused the current value for the first parameter of the first media-processing style to change, which provides improved visual feedback. Displaying (and/or setting) the representation of the current value for the first parameter of the first media-processing style and the current value for the first parameter of the first media-processing style as default values in response to detecting the input directed to the selectable user interface object for resetting the one or more parameters of the first media-processing style provides the user with the ability to reset a media-processing style via one input instead of multiple inputs, which reduces the number of inputs needed to perform an operation.

In some embodiments, the prompt (e.g., 768) is displayed with an indication (e.g., "reset to warm", "reset to cool", "reset to neutral", reset to "rich" and/or "reset to soft") of how at least one of the one or more parameters of the first media-processing style will be reset (e.g., an indication includes a characteristic (e.g., a word that indicates a characteristic) of a parameter, such as "warm and/or cold" being a characteristic of a "warmth" parameter and/or "soft" being a characteristic of a "tone" parameter). Displaying a prompt that includes an indication of how at least one of the one or more parameters of the first media-processing style will be reset provides visual feedback to the user that one or more parameters of the first media-processing style will be reset in a particular way and/or to a particular style if one or more additional inputs are received from the user, which improves visual feedback and reduces the performance of unintended operations.

In some embodiments, before detecting the input (e.g., 750*w* and/or 750*w*1) directed to the selectable user interface object (e.g., 722) for resetting the one or more parameters of the first media-processing style, the computer system displays a first styles-mode user interface object (e.g., 602*b*) that, when selected, causes (e.g., causes the computer system to toggles between) the representation to be displayed (e.g., a user interface object for displaying the style-selection user interface, and/or a user interface object that, when selected, causes the style-section user interface to be displayed) with a first selected media-processing style (634*a*-634*d*) applied or causes the representation to be displayed without the first selected respective media-processing style applied. In some embodiments, the first styles-mode user interface object is displayed with a first appearance e.g., 602*b*) that is based on the current value for the first parameter of the first media-processing style (e.g., using one or more techniques as described above in relation to the styles-mode user interface object and the second styles-mode user interface object described above in relation to method 900 and/or FIGS. 6L and 7C). In some embodiments, in response to detecting the input directed to the selectable user interface object for resetting the one or more parameters of the first media-processing style, the computer system displays an animation of the first styles-mode user interface object transitioning from being displayed with the first appearance (e.g., a visual appearance that has the first visual aspect and the second visual aspect as described above in relation to method 900 and/or FIGS. 6L and 7C) that is based on the current value for the first parameter of the first media-processing style to being displayed with a second appearance e.g., a visual appearance that has the first visual aspect and the second visual aspect as described above in relation to method 900 and/or FIGS. 6L and 7C) that is based on the second default value for the first parameter of the first media-processing style. In some embodiments, the animation is a gradual transition that occurs over period of time (e.g., 0.01-10 seconds). Displaying an animation of the first styles-mode user interface object transitioning from being displayed with the first appearance that is based on the current value for the first parameter of the first media-processing style to being displayed with the second appearance that is based on the second default value for the first parameter of the first media-processing style provides visual feedback to the user regarding how a resetting a media-processing style will change the media-processing style and that the media-processing style has changed, which provides improved visual feedback.

In some embodiments, while displaying the first control (e.g., 626*a*1, 626*a*2, 626*b*1, 626*b*2, 626*c*1, 626*c*2, 626*d*1, 626*d*2) for adjusting the current value for the first parameter and in response to detecting movement of an input (e.g., 750*a*, 750*d*, 750*g*, 750*k*, 750*n*, and/or 750*t*) (e.g., a tap input (e.g., a tap gesture) (e.g., a single tap input, a double tap input)) (and/or, in some embodiments, detecting a non-tap input/gesture (e.g., a movement input/gesture, a press-and-hold input/gesture, a voice input)) directed to the first control (e.g., and/or in response to detecting movement of the input directed to the plurality of selectable user interface objects for the first media-processing style), the computer system changes the current value (e.g., 626*a*1*b*, 626*a*2*b*, 626*b*1*b*, 626*b*2*b*, 626*c*1*b*, 626*c*2*b*, 626*d*1*b*, and/or 626*d*2*b*) for the first parameter from a third value for the first parameter to a fourth value for the first parameter (e.g., without changing the current value for the second parameter) (e.g., replacing the display of a representation of the third value for the first parameter to the display of the representation of the fourth value for the first parameter). In some embodiments, the input directed to the first control is the same as the input directed to the plurality of selectable user interface objects for the first media-processing style. In some embodiments, the third value is different from the fourth value. In some embodiments, while displaying the first control for adjusting the current value for the first parameter, the computer system detects movement of the input directed to the first control. In some embodiments, while displaying the second control for adjusting the current value for the second parameter and in response to detecting that movement of the input directed to the second control (e.g., and/or in response to detecting movement of the input directed to the plurality of selectable user interface objects for the first media-processing style), the computer system changes the current value for the second parameter from a third value for the second parameter to a fourth value for the second parameter (e.g., without changing the current value for the first parameter) (e.g., replacing the display of a representation of the third value for the first parameter to the display of the representation of the fourth value for the first parameter). In some embodiments, the input directed to the first control is the same as the input directed to the plurality of selectable user interface objects for the first media-processing style. In some embodiments, while displaying the second control for adjusting the current value for the second parameter, the computer system detects movement of the input directed to the second control. In some embodiments, the third value is different from the fourth value. Changing the current value for the first parameter from a third value for the first parameter to a fourth value for the first parameter in response to detecting that movement of an input directed to the first control provides the user with control over to what the current value for the first parameter is set based on movement of the input, which provides additional control options without cluttering the user interface.

In some embodiments, while displaying the first control for adjusting the current value for the first parameter and in response to detecting the movement of the input (e.g., 750*a*, 750*d*, 750*g*, 750*k*, 750*n*, and/or 750*t*) directed to the first control, the computer system displays (e.g., before and/or after detecting an end of the input directed to the first control) a second representation (e.g., 630) of media using a modified first media-processing style (e.g., 634*a*-634*d*). In some embodiments, the second representation of the media using the modified first media-processing style (e.g., 634*aa*, and/or 634*dd*) is different from the representation of the media using the first media-processing style. In some embodiments, the second representation of the media using the first media-processing style is displayed based on the changed value (e.g., fourth value) for the first parameter and the representation of the media using the first media-processing style is displayed based on the value before the input directed to the first control was detected (e.g., third value). In some embodiments, while displaying the second control for adjusting the current value for the second parameter and in response to detecting that movement of the input directed to the second control, the computer system displays (e.g., before and/or after detecting an end of the input directed to the second control) a third representation of media using the first media-processing style, where the third representation of the media using the first media-processing style is different form the representation of the media using the first media-processing style and the second representation of the media using the first media-processing style. Displaying a second representation of media using the first media-processing style, where the second representation of the media using the first media-processing style is different from the representation of the media using the first media-processing style in response to detecting that movement of the input directed to the first control provides the user with feedback concerning how the input impacted how the first media-processing style is applied to the representation of the media, which provides improved visual feedback.

In some embodiments, while displaying the representation (e.g., 630) of the media using the first media-processing style, the computer system detects a first request (e.g., 650*a*, 650*c*, 650*j*) to capture media. In some embodiments, in response to detecting the first request to capture media, the computer system captures first media. In some embodiments, while displaying the second representation (e.g., 630) of media using the modified first media-processing style, the computer system detects a second request to capture media. In some embodiments, in response to detecting the first request to capture media, the computer system captures second media. In some embodiments, after capturing the first media and the second media, the computer system: displays a representation (e.g., 680*c*) of the first media having the first media-processing style (e.g., as discussed above in relation to FIGS. 7A-7X); and displays a representation (e.g., 680*d*) of the second media having the modified first media-processing style (e.g., as discussed above in relation to FIGS. 7A-7X). In some embodiments, the computer system transitions from displaying the representation of the first media to displaying the representation of the second media (or vice-versa) in response to detecting an input (e.g., a movement input) (and/or, in some embodiments, in response to detecting a non-movement input (e.g., tap input, a rotation dragging gesture, and/or a press-and-hold gesture) directed to the representation of the first media (or an input (e.g., a movement input) (and/or, in some embodiments, in response to detecting a non-movement input (e.g., tap input, a rotation dragging gesture, and/or a press-and-hold gesture) directed to the representation of the second media). In some embodiments, the representation of the first media and the representation of the current media are displayed sequentially in a media viewer interface (e.g., FIGS. 6A-6U). In some embodiments, the representation of the first media and the representation of the second media are displayed concurrently in a media viewer interface and/or a media grid (e.g., amongst a plurality of other representations of media).

In some embodiments, the user interface includes a second selectable user interface object (e.g., 610) for capturing media. In some embodiments, while displaying the representation (e.g., 630) of the media using the first media-processing style (e.g., 634*a*-634*d*, 634*aa*, and/or 634*dd*) and the second selectable user interface object (e.g., 610) for capturing media, the computer system detects an input (e.g., a tap input (e.g., a tap gesture) (e.g., a single tap input, a double tap input)) (and/or, in some embodiments, in response to detecting a non-tap input/gesture (e.g., a movement input/gesture, a press-and-hold input/gesture, and/or a voice input)) directed to the second selectable user interface object for capturing media. In some embodiments, in response to detecting the input (e.g., 650*a*, 650*c*, 650*j*) directed to the second selectable user interface object for capturing media, the computer system captures third media that has the first media-processing style applied (e.g., based on the current value of the parameters of the first media-processing style). In some embodiments, in response to detecting the input directed to the selectable user interface object for capturing media and while detecting an input directed to the plurality of selectable user interface objects for the first media-processing style and/or detecting an input to directed to the representation (e.g., as request to switch media-processing styles, as described above in relation to method 900 and FIGS. 6A-6P), the computer initiates the capture of media that has a media-processing style applied that is applied to a more of a predetermined portion of the representation (e.g., 25%, 30%, 40% 50%, 60%, 75%) of media and/or greater portion of the representation of the media than other portions of the representation of the media that have another media-processing style applied (e.g., portions as described above in relation to method 900 and FIGS. 6A-6P) when (e.g., immediately before/after) the input directed to the selectable user interface object for capturing media was detected. Capturing media that has the first media-processing style applied in response to detecting the input directed to the second selectable user interface object for capturing media allows the user to capture media that will have the currently selected media-processing style applied, which provides additional control options without cluttering the user interface.

In some embodiments, as a part of displaying the representation using the first media-processing style, the computer system applies the first media-processing style differently (e.g., using a different set of visual parameters (e.g., color characteristics (e.g., warmth, tone, hue, brightness, saturation, shade, tint, colorfulness, coldness, and/or harmony) and/or depth parameters) for one type of identified object as compared to a different type of identified object (e.g., subjects (e.g., a person) as compared to non-subjects) to one or more objects (e.g., person shown in 630) (e.g., people and/or faces of people) (e.g., identifiable object) in the representation than to a portion of the first portion that does not include the one or more objects (e.g., displaying a first portion of the representation (e.g., a portion that includes an object) with a different visual appearance than a second portion of the representation (e.g., a subset that does not include an object)).

In some embodiments, while displaying the plurality of selectable user interface objects for the first media-processing style, the computer system detects, via the one or more input devices, a first input (e.g., 650*d*, 650*k*1, 650*k*2, 750*j*, and/or 750*q*) (e.g., a movement input) (and/or, in some embodiments, in response to detecting a non-movement input (e.g., tap input, a rotation dragging gesture, and/or a press-and-hold gesture) directed to the representation (e.g., 630) of the media. In some embodiments, in response to detecting the first input directed to the representation of the media, the computer system displays a representation (e.g., 626*a*1*b*, 626*a*2*b*, 626*b*1*b*, 626*b*2*b*, 626*c*1*b*, 626*c*2*b*, 626*d*1*b*, and/or 626*d*2*b*) of a current value for a first parameter of a fourth media-processing style and ceasing to display the representation (e.g., 626*a*1*b*, 626*a*2*b*, 626*b*1*b*, 626*b*2*b*, 626*c*1*b*, 626*c*2*b*, 626*d*1*b*, and/or 626*d*2*b*) of the current value for the first parameter for the first media-processing style. In some embodiments, in response to detecting the first input directed to the representation of the media, the computer system displays a portion of the representation of the media using the fourth media-processing style (e.g., a portion of the representation of the media that was displayed using the first media-processing style before the input directed to the representation of the media was detected). In some embodiments, in response to detecting the first input directed to the representation of the media, the computer system displays a representation of a current value for a second parameter of the fourth media-processing style and ceases to display the representation of the current value for the second parameter for the first media-processing style. In some embodiments, as a part of displaying the representation of the current value for the first parameter of the fourth media-processing style, the computer system displays an animation (e.g., a sliding animation, a dissolving animation, and/or a fading in/out animation) that changes the representation (e.g., 626*a*1*b*, 626*a*2*b*, 626*b*1*b*, 626*b*2*b*, 626*c*1*b*, 626*c*2*b*, 626*d*1*b*, and/or 626*d*2*b*) of the current value for the first parameter for the first media-processing style into the representation (e.g., 626*a*1*b*, 626*a*2*b*, 626*b*1*b*, 626*b*2*b*, 626*c*1*b*, 626*c*2*b*, 626*d*1*b*, and/or 626*d*2*b*) of the current value for the first parameter for the fourth media-processing style. In some embodiments, as a part of displaying the representation of the current value for the second parameter of the fourth media-processing style, the computer system displays an animation (e.g., a gradual animation over time) that changes the representation of the current value for the second parameter for the first media-processing style into the representation of the current value for the second parameter for the fourth media-processing style. Displaying an animation that changes the representation of the current value for the first parameter for the first media-processing style into the representation of the current value for the first parameter for the fourth media-processing style provides the user with visual feedback that the user interface objects for the first media-processing are changing into the user interface objects for the fourth media-processing style, which can possibly reduce potential mistakes, which provides improved visual feedback. Displaying a representation of a current value for a first parameter of a fourth media-processing style and ceasing to display the representation of the current value for the first parameter for the first media-processing style in response to detecting the first input directed to the representation of the media allows the computer system to source relevant user interface objects that pertain to the media-processing style that is being applied to representation of media without sourcing user interface objects that do not pertain to the media-processing style that is being applied to representation of media, which performs an operation when a set of conditions has been met without requiring further user input and provides improved visual feedback.

In some embodiments, while displaying the plurality of selectable user interface objects (e.g., 626*a*1, 626*a*2, 626*b*1, 626*b*2, 626*c*1, 626*c*2, 626*d*1, 626*d*2) for the first media-processing style, the computer system detects, via the one or more input devices, a second input (e.g., 650*d*, 650*k*1, 650*k*2, 750*j*, and/or 750*q*) directed to the representation of the media. In some embodiments, in response to detecting the second input directed to the representation of the media, the computer system displays a portion of the representation of the media using a fifth media-processing style (e.g., 634*a*-634*d*, 634*aa*, and/or 634*dd*) (e.g., a portion of the representation of the media that was displayed using the first media-processing style before the input directed to the representation of the media was detected). In some embodiments, while displaying the portion of the representation of the media using the fifth media-processing style and in accordance with a determination that the portion of the representation of the media using the fifth media-processing style is greater than a threshold amount (e.g., 25%, 30%, 40%, 50%, 51%, 60%, or 75%) of the representation (e.g., 630) (and/or display generation component) (and/or is located at a particular portion (e.g., middle of) of the representation and/or the display generation component), the computer system displays a representation (e.g., 626*a*1*b*, 626*a*2*b*, 626*b*1*b*, 626*b*2*b*, 626*c*1*b*, 626*c*2*b*, 626*d*1*b*, and/or 626*d*2*b*) of a current value for a first parameter of the fifth media-processing style and ceasing to display the representation (e.g., 626*a*1*b*, 626*a*2*b*, 626*b*1*b*, 626*b*2*b*, 626*c*1*b*, 626*c*2*b*, 626*d*1*b*, and/or 626*d*2*b*) of the current value for the first parameter for the first media-processing style. In some embodiments, while displaying the portion of the representation of the media using the fifth media-processing style and in accordance with a determination that the portion of the representation of the media using the fifth media-processing style is not greater than a threshold amount (e.g., 25%, 30%, 40%, 50%, 51%, 60%, or 75%) of the representation (and/or display generation component) (and/or is located at a particular portion (e.g., middle of) of the representation and/or the display generation component), the computer system continues to display the representation of the currently value for the first parameter for the first media-processing style and forgoes displaying the representation of a current value for a first parameter of a fifth media-processing style. Displaying a representation of a current value for a first parameter of a fifth media-processing style and ceasing to display the representation of the current value for the first parameter for the first media-processing style when prescribed conditions are met allows the computer system to source relevant user interface objects that pertain to the media-processing style that is being applied to representation of media without sourcing user interface objects that do not pertain to the media-processing style that is being applied to representation of media, which performs an operation when a set of conditions has been met without requiring further user input and provides improved visual feedback.

In some embodiments, in response to detecting the input (e.g., 750*a*, 750*d*, 750*g*, 750*k*, and/or 750*t*) directed to the plurality of selectable user interface objects (e.g., 626*a*1, 626*a*2, 626*b*1, 626*b*2, 626*c*1, 626*c*2, 626*d*1, 626*d*2) for the first media-processing style (e.g., and in accordance with a determination that at least one current value (e.g., represented by 626*a*1*b*, 626*a*2*b*, 626*b*1*b*, 626*b*2*b*, 626*c*1*b*, 626*c*2*b*, 626*d*1*b*, and/or 626*d*2*b*) for one or more parameters of the first media-processing style is different from (e.g., and/or substantially different from) one or more default values for the one or more parameters of the first media-processing style (e.g., 634*a* and/or 634*d*)), the computer system adds a first custom media-processing style (e.g., 634*aa* and/or 634*dd*) (e.g., a custom media-processing style that corresponds to (e.g., that is a modified version of the first media-processing style that shares a set of parameters with the first media-processing style, but that is different from the first media-processing style in at least one other parameter) the first media-processing style) that is different from the first media-processing style to a set of available media-processing styles (e.g., 634*a*-634*d*). In some embodiments, the user interface includes one or more indications corresponding to one or more media-processing styles.

In some embodiments, the one or more indications includes a first indication corresponding to the first media-processing style. In some embodiments, the computer system, in response to detecting the input directed to the plurality of selectable user interface objects for the first media-processing style and in accordance with a determination that at least one current value for one or more parameters of the first media-processing style is different from one or more default values for the one or more parameters of the first media-processing style, displays a plurality of selectable user interface objects corresponding to a first custom media-processing style (e.g., a custom media-processing style that corresponds to the first media-processing style) that is different from the first media-processing style; and adds a second indication corresponding to the first custom media-processing style to the one or more indications (e.g., display the second indication, display the second indication as being a part of (e.g., among, in-line with) the one or more indications). In some embodiments, adding the first custom media-processing style includes configuring the first custom media-processing styles to be available for future use (e.g., in other user interfaces, after exiting/closing an application, after a certain time period has passed where the first custom media-processing style would not be available for use if it was not configured to be available for future use. Adding the first custom media-processing style to the set of available media-processing styles when prescribed conditions are met allows a user to reuse a customized style without providing inputs to remake the style and prevents the user from editing a non-customized media-processing style, which reduces the number of inputs needed to perform an operation.

In some embodiments, while the set of available media (e.g., 634*a*-634*d*, 634*aa*, and/or 634*dd*) processing styles includes the first custom media-processing style, the computer system detects a first request (e.g., 750*n* and/or 750*w*) to change one or more parameters of the first custom media-processing style. In some embodiments, the computer system, in response to detecting the first request to change the one or more parameters of the first custom media-processing style (e.g., and in accordance with a determination that the first custom media-processing style would be, after the first request is implemented, the same as (or substantially the same as) one or more other available media-processing styles) (e.g., in the set of available media-processing styles) (e.g., one or more parameters of the first custom media-processing style are the same as one or more parameters of one or more of the other available media-processing styles), removes the first custom media-processing style (e.g., 634*aa* and/or 634*dd*) from the set of available media-processing styles (e.g., cease to display the second indication, and/or cease to display the second indication as being a part of (e.g., among, in-line with) the one or more indications). In some embodiments, while the one or more indications includes the second indication corresponding to the first custom media-processing style that is different from the first media-processing style and while displaying the plurality of selectable user interface objects for the first custom media-processing style, the computer system detects, via the one or more input devices, a first input directed to the plurality of selectable user interface objects for the first custom media-processing style, the computer system detects, via the one or more input devices, a first input directed to the plurality of selectable user interface objects for the first custom media-processing style. In some embodiments, in response to detecting the first input and in accordance with a determination that the first custom media-processing style is the same as (or substantially the same as) one or more other available media-processing styles in the set of available media-processing styles, the computer system removes the second indication corresponding to the first custom media processing style. In some embodiments, removing the first custom media-processing style includes configuring the first custom media-processing styles to not be available for future use (e.g., in other user interfaces, after exiting/closing an application, after a certain time period has passed where the first custom media-processing style would not be available for use if it was not configured to be available for future use). Removing the first custom media-processing style from the set of available media-processing styles when prescribed conditions are met allows the computer system to automatically remove styles that may be duplicative and/or are not needed, which reduces the number of inputs needed to perform an operation.

In some embodiments, after adding the first custom media-processing style (e.g., 634*aa* and/or 634*dd*) to the set of available media-processing styles (e.g., 634*a*-634*d*, 634*aa*, and/or 634*dd*), the computer system displays a respective user interface that includes a respective representation (e.g., 630) of media that is displayed using a respective media-processing style (e.g., 634*a* and/or 634*d*).

In some embodiments, while displaying the respective user interface that includes the respective representation (e.g., 630) of media that is displayed using the respective media-processing style (e.g., 634*a* and/or 634*d*) and while the set of available media-processing styles includes the first custom media-processing style (e.g., 634*aa* and/or 634*dd*), the computer system detects a request to display the respective representation of media using a next (or previous) available media-processing style from the set of available media-processing styles. In some embodiments, as a part of detecting a request to display the representation of media using a next available media-processing style from the set of available media-processing styles includes, the computer system detects an input on the respective user interface (e.g., as described above). In some embodiments, in response to detecting the request (e.g., 750*n*) to display the respective representation of media using the next (e.g., or previous) available media-processing style while the respective representation of media is displayed using the respective media-processing style, the computer system: in accordance with a determination that the respective media-processing style is the first media-processing style, displays at least a portion of the respective representation of the media using the first custom media-processing style (e.g., 634*aa* and/or 634*dd*);

and in accordance with a determination that the respective media-processing style is not the first media-processing style, forgoes displaying at least a portion of the respective representation of the media using the first custom media-processing style (e.g., 634*aa* and/or 634*dd*) (e.g., as discussed above in relation to FIGS. 7O-7P). In some embodiments, after removing the first custom media-processing style, the computer displays the respective user interface that includes the respective representation of media that is displayed using the first media-processing style. In some embodiments, while displaying user interface that includes the respective representation of media that is displayed using the first media-processing style and while the set of available media-processing styles does not the first custom media-processing style, the computer system detects a request to display the representation of media using the next available media-processing style. In some embodiments, in response to detecting the request to display the representation of media using the next available media-processing style, the computer system displays at least a portion of the representation of the media using the first custom media-processing style. In some embodiments, the one or more indications includes a third indication that corresponds to a sixth media-processing style. In some embodiments, the one or more indications are displayed such that the second indication is adjacent (e.g., next to, closer to, to the right of, to the left of, above, and/or below) to the first indication and not adjacent to the third indication. Displaying at least a portion of the representation of the media using the first custom media-processing style (e.g., when prescribed conditions are met) provides the user with feedback that the first custom photographic style is a customized style for the first media-processing style and not the other media-processing style, which provides improved visual feedback.

In some embodiments, while the set of available media processing styles includes the first custom media-processing style (e.g., 634*aa* and/or 634*dd*), the computer system detects a second request (e.g., 750*a*, 750*d*, 750*g*, 750*k*, and/or 750*t*) to change one or more parameters of the first custom media-processing style. In some embodiments, in response to detecting the second request to change the one or more parameters of the first custom media-processing style (e.g., and in accordance with a determination that the first custom media-processing style, after implementing the second request, is not the same as (or substantially the same as) one or more other available media-processing styles), the computer system updates the one or more parameters of first custom media-processing style (e.g., represent by 626*a*1, 626*a*2, 626*b*1, 626*b*2, 626*c*1, 626*c*2, 626*d*1, and/or 626*d*2) (e.g., as discussed above in relation to input 750*a* and/or input 750*t*) (and continues to include the first custom media-processing style in the set of available media-processing styles (e.g., without including the an additional custom media-processing style in the set of available media-processing styles)). In some embodiments, while the one or more indications includes the second indication corresponding to the first custom media-processing style that is different from the first media-processing style and while displaying the plurality of selectable user interface objects for the first custom media-processing style, the computer system detects, via the one or more input devices, a second input directed to the plurality of selectable user interface objects for the first custom media-processing style. In some embodiments, in response to detecting the second input directed to the plurality of selectable user interface objects for the first custom media-processing style and in accordance with a determination that the current value for the first parameter of the first custom media-processing style has changed (e.g., and at least one current value for one or more parameters of the first custom media-processing style is different from one or more default values for the one or more parameters of the first media-processing style) (e.g., has been changed via the second input and/or one or more inputs directed to the first control), the computer system does not add a fourth indication to the one or more indications (e.g., continuing to display the same number of indications that were displayed before the second input directed to the plurality of selectable user interface objects for the first custom media-processing style was detected) and updates the current value for the first parameter of the first custom media-processing style based on the second input directed to the plurality of selectable user interface objects for the first custom media-processing style. In some embodiments, in response to detecting the second input directed to the plurality of selectable user interface objects for the first custom media-processing style and in accordance with a determination that a current value for a first parameter of the first custom media-processing style has changed, the computer system continues to include the second indication as a part of the one or more indications corresponding to the first custom media-processing style (e.g., continuing to display the second indication). Updating the one or more parameters of the first custom media-processing style in response to detecting the second request to change the one or more parameters of the first custom media-processing style reduces the number inputs needed to navigate through the set of available media-processing styles and reduces the number of inputs needed to re-configure the first custom media-processing style after the one or more parameters have been updated, which reduces the number of inputs needed to perform one or more operations.

In some embodiments, while the set of available media processing styles includes the first custom media-processing style, the computer system detects a third request (e.g., 750*a* and/or 750*t*) to change one or more parameters of the first custom media-processing style (e.g., as discussed above in relation to input 750*a* and/or input 750*t*). In some embodiments, in response to detecting the third request to change the one or more parameters of the first custom media-processing style (e.g., and in accordance with a determination that the first custom media-processing style, after implementing the third request, is not the same as (or substantially the same as) one or more other available media-processing styles), the computer system adds a second custom media-processing style (e.g., for/that corresponds to the first media-processing style) to the set of available media-processing styles without updating the one or more parameters of the first custom media-processing style (e.g., as discussed above in relation to input 750*a* and/or input 750*t*) (and/or one or more parameters of the first media processing style). In some embodiments, while the one or more indications includes the second indication corresponding to the first custom media-processing style that is different from the first media-processing style and while displaying the plurality of selectable user interface objects for the first custom media-processing style, the computer system detects, via the one or more input devices, a second input (e.g., a tap input (e.g., a tap gesture) (e.g., a single tap input, a double tap input)) (and/or, in some embodiments, detecting a non-tap input/gesture (e.g., a movement input/gesture, a press-and-hold input/gesture, and/or a voice input)) directed to the plurality of selectable user interface objects for the first custom media-processing style. In some embodiments, in response to detecting the second input directed to the plurality of selectable user interface objects for the first custom media-processing style and in accordance with a determination that the current value for the first parameter of the first custom media-processing style has changed (e.g., and at least one current value for one or more parameters of the first custom media-processing style is different from one or more default values for the one or more parameters of the first media-processing style) (e.g., has been changed via the second input and/or one or more inputs directed to the first control), the computer system: adds a fifth indication to the one or more indications corresponding to a second respective media-processing style that is different from the first custom media-processing style (e.g., continuing to display the second indication); and updates a current value for a first parameter of the second custom media-processing style based on the second input directed to the plurality of selectable user interface objects for the first custom media-processing style (e.g., while forgoing updating the current value for the first parameter of the first custom media-processing style based on the second input directed to the plurality of selectable user interface objects for the first custom media-processing style and without updating the current value for the first parameter of the first custom media-processing style based on the second input directed to the plurality of selectable user interface objects for the first custom media-processing style). In some embodiments, in response to detecting the second input directed to the plurality of selectable user interface objects for the first custom media-processing style and in accordance with a determination that a current value for a first parameter of the first custom media-processing style has not changed, the computer system continues to include the second indication as a part of the one or more indications corresponding to the first custom media-processing style (e.g., continuing to display the second indication). In some embodiments, the first custom media-processing style and the second custom media-processing style are both between the first media-processing style and the second media-processing style in the set of available media-processing styles. Adding a second custom media-processing style to the set of available media-processing styles without updating the one or more parameters of the first custom media-processing style in response to detecting the third request to change the one or more parameters of the first custom media-processing style reduces the number of inputs needed to re-configure the first custom media-processing style, which reduces the number of inputs needed to perform one or more operations and provides the user with additional options to reduce the need to repeatedly reconfigure the photographic styles.

In some embodiments, the first custom media-processing style (e.g., 634*aa* and/or 634*dd*) and the second custom media-processing style (e.g., 634*aa* and/or 634*dd*) have a same respective text identifier (e.g., 636*aa* and/or 636*dd*) (e.g., a description or a name (e.g., vibrant warm, vibrant cool, warm, cool, neutral, soft warm, soft cool, vibrant, and/or soft)). In some embodiments, while displaying the user interface that includes the representation (e.g., 630) of media and in accordance with a determination that the first custom media-processing style (e.g., 634*aa* and/or 634*dd*) is being applied to the representation of the media, the computer displays the same respective text identifier concurrently with an indication (e.g., 626*a* and/or 626*d*) of a parameter for the first custom media-processing style. In some embodiments, while displaying the user interface that includes the representation (e.g., 630) of media and in accordance with a determination that the second custom media-processing style is being applied to the representation of the media, the computer system displays the same respective text identifier (e.g., 636*aa* and/or 636*dd*) concurrently with an indication (e.g., 626*a* and/or 626*b*) of the parameter for the second custom media-processing style (e.g., 634*aa* and/or 634*dd*). In some embodiments, the indication of the parameter for the first custom media-processing style is different from (e.g., a different value from) the indicator of the parameter for the second custom media-processing style (e.g., as discussed above in relation to FIGS. 7C, 7D, and 7M). Displaying the same respective identifier concurrently with an indication of the parameter for a particular media-processing style (e.g., a media-processing style that has the same identifier as another media-processing style) provides visual feedback that lets a user identify which media-processing style is being applied (e.g., and/or the difference with respective to how media-processing styles with the same identifier are being applied), which provides improved visual feedback.

In some embodiments, in response to detecting the input (e.g., 750*a*, 750*d*, 750*g*, 750*k*, and/or 750*t*) (e.g., directed to the plurality of selectable user interface objects for the first media-processing style and in accordance with a determination that at least one current value for one or more parameters of the first media-processing style is different from (e.g., and/or substantially different from) one or more default values for the one or more parameters of the first media-processing style: in accordance with a determination that a first difference between the at least one current value for the one or more parameters of the first media-processing style (e.g., 634*a*-634*d*, 634*aa*, and/or 634*dd*) and the one or more default values for the one or more parameters of the first media-processing style is a first difference (e.g., a positive and/or negative amount (e.g., a value between −100 to 100) of difference) (e.g., as described above in relation to FIGS. 7C and 7F), the computer system displays a first text identifier (e.g., 636*aa* and/or 636*dd*) (e.g., a description or a name such as vibrant warm, vibrant cool, warm, cool, neutral, soft warm, soft cool, vibrant, and/or soft) for the first custom media-processing style (e.g., 634*aa* and/or 634*dd*) (e.g., where the first identifier is based on the one or more parameters and/or the first difference); and in accordance with a determination that a difference between the at least one current value for the one or more parameters of the first media-processing style (e.g., 634*a*-634*d*, 634*aa*, and/or 634*dd*) and the one or more default values for the one or more parameters of the first media-processing style is a second difference (e.g., a positive and/or negative amount (e.g., a value between −100 to 100) of difference) that is different (e.g., is a different value) from the first difference (e.g., as described above in relation to FIGS. 7C and 7F), the computer system displays a second text identifier (e.g., a description or a name such as vibrant warm, vibrant cool, warm, cool, neutral, soft warm, soft cool, vibrant, and/or soft) for the first custom media-processing style (e.g., 634*aa* and/or 634*dd*). In some embodiments, the second text identifier (e.g., 636*aa* and/or 636*dd*) is different from the first text identifier (e.g., 636*aa* and/or 636*dd*)) (e.g., as described above in relation to FIGS. 7C and 7F). Displaying an identifier based on a difference between the at least one current value for the one or more parameters of the first media-processing style and the one or more default values for the one or more parameters of the first media-processing style provides visual feedback that informs the user how the changed version of the media-processing style is different from the default version of the media-processing style, which provides improved visual feedback.

In some embodiments, the first media-processing style (e.g., 634*a*-634*d*, 634*aa*, and/or 634*dd*) has a third text identifier that is different from the first text identifier and the second text identifier (e.g., as described above in relation to FIGS. 7W, 7W1, and/or 7X). In some embodiments, while the set of available media processing styles includes the first custom media-processing style, the computer system detects a third request (e.g., 750*n*, 750*w* and/or 750*w*1) to change one or more parameters of the first custom media-processing style. In some embodiments, in response to detecting the third request to change the one or more parameters of the first custom media-processing style and in accordance with a determination that the first custom media-processing style would be, after the first request is implemented, the same as (or substantially the same as) one or more other available media-processing styles (e.g., the first media-processing style) (e.g., in the set of available media-processing styles) (e.g., one or more parameters of the first custom media-processing style are the same as one or more parameters of one or more of the other available media-processing styles) (e.g., and/or in response to detecting a request to reset the first custom media-processing style (e.g., in response to detecting the input directed to the selectable user interface object for resetting the one or more parameters of the first media-processing style)), the computer system displays the third text identifier (e.g., 636*a*-636*d*, 636*aa*, and/or 636*dd*) (e.g., without displaying the first identifier and the second identifier) (e.g., as described above in relation to FIGS. 7W, 7W1, and/or 7X). In some embodiments, when custom media-processing style is reset, the computer system changes the styles name back to its original name. Displaying the third identifier (e.g., the identifier of a media-processing style from which the media-processing style changed) provides visual feedback that informs the user of the media-processing style that created the media-processing style, which provides improved visual feedback.

In some embodiments, the plurality of selectable user interface objects (e.g., 626*a*1*b*, 626*a*2*b*, 626*b*1*b*, 626*b*2*b*, 626*c*1*b*, 626*c*2*b*, 626*d*1*b*, and/or 626*d*2*b*) for the first media-processing style are displayed in response to detecting the request (e.g., 650*b*) to edit the first media-processing style (e.g., and while displaying the representation of the media that is displayed using the first media-processing style). In some embodiments, before displaying the plurality of selectable user interface objects, the computer system detects, via one or more inputs devices, a request to edit the first media-processing style (e.g., that is being applied to the visual content of the media) (e.g., a request to edit how the first media-processing style is being applied to the visual content). In some embodiments, as a part of detecting the request to edit the first media-processing style, the computer system detects a movement input (e.g., and/or, in some embodiments, a non-movement input, such as a press-and-hold input, a pinching input, etc.) on the representation of the media (e.g., as described above in relation to as described above in relation to method 900 and FIGS. 6A-6C). In some embodiments, as a part of detecting the request to edit the first media-processing style, the computer system detects a tap input (and/or a non-tap input, such as a press-and-hold input, a pinching input, etc.) on a user interface object for displaying a representation of the first media-processing style (e.g., as described above in relation to method 900 and FIGS. 6A-6C). In some embodiments, in response to detecting the request to edit the first media-processing style (e.g., and while displaying the representation of the media that is displayed using the first media-processing style), the computer system concurrently displays the plurality of selectable user interface objects. In some embodiments, a respective customize style for one media-processing style is displayed and/or included in a set of available media-processing style, even if the parameters for the respective customized style match another media-processing style in the available set of media-processing styles.

In some embodiments, the user interface including the representation (e.g., 630)) of the media includes a second styles-mode user interface object (e.g., 602*b*) that, when selected, causes (e.g., causes the computer system to toggles between) the representation to be displayed (e.g., a user interface object for displaying the style-selection user interface, and/or a user interface object that, when selected, causes the style-section user interface to be displayed) with a second selected media-processing style applied (e.g., or causes the representation to be displayed to be displayed without the second selected media-processing style applied). In some embodiments, the computer system detects a respective input (e.g., 750*a*, 750*d*, 750*g*, 750*k*, 750*n*, 750*r*, 750*t*, 750*w*, and/or 750*w*1)(e.g., a movement input (e.g., a swipe gesture and/or a dragging gesture)) (and/or, in some embodiments, in response to detecting a non-movement input (e.g., tap input, a press-and-hold gesture, and/or a voice input) (e.g., while to the first control for adjusting the current value for the first parameter or while the second control for adjusting the current value for the second parameter is displayed). In some embodiments, in response to detecting the respective input and in accordance with a determination that the respective input is directed to the first control for adjusting the current value for the first parameter, the computer system changes a first appearance g, a color, a size, with a first border (e.g., line (e.g., that is shown in a clockwise and/or counter-clockwise direction) surrounding the second styles-modes user interface object, where in the line surrounds and/or is around a portion (e.g., 0%-100%) of the second styles-mode user interface object)) (e.g., as described above in relation to method 900) of the second styles-mode user interface object (e.g., 602*b*) (e.g., displaying the second styles-mode user interface object with an appearance that was not displayed before the respective input was detected) (e.g., as described above in relation to FIGS. 6L, 7C, and/or 7M). Changing the first appearance of the second styles-mode user interface object in response to detecting the respective input and in accordance with a determination that the respective input is directed to the first control for adjusting the current value for the first parameter provides visual feedback that informs the user that the input has caused a change to how a media-processing style is being applied to the representation of the media, which provides improved visual feedback. In some embodiments, the first appearance of the second styles-mode user interface object (e.g., 602*b*) is changed gradually as the current value for the first parameter is modified (e.g., as described above in relation to FIGS. 6L, 7C, and/or 7M) (e.g., changed). In some embodiments, the respective input has a first magnitude (e.g., speed and/or acceleration). In some embodiments, the appearance of the second styles-mode user interface object is changed at a second magnitude that is based on the first magnitude. In some embodiments, as the respective input is moved and/or accelerates faster (e.g., or, alternatively, slower), the appearance of the second styles-mode user interface object is moved and/or accelerated at a faster (e.g., or, alternatively, slower) speed. Changing the first appearance of the second styles-mode user interface object gradually in response to detecting the respective input and in accordance with a determination that the respective input is directed to the first control for adjusting the current value for the first parameter provides visual feedback that informs the user that the input has caused a change to how a media-processing style is being applied to the representation of the media while reducing visual distractions that can be caused when abruptly changing user interface elements, which provides improved visual feedback.

In some embodiments, as a part of changing the first appearance of the second styles-mode user interface object, in accordance with a determination that the respective input is in a first direction (e.g., up/down/right/left direction), the computer system updates a first visual aspect (e.g., a line around the perimeter of 602*b* and/or the color of 602*b*) of the second styles-mode user interface object (e.g., 602*b*) (e.g., a color, a shading, and/or a tint of at least a portion (and, in some embodiments, the portion includes the border (e.g., a line surrounding) of the second media-processing style)) in a first manner (e.g., as discussed in relation to FIGS. 6F and 6L). In some embodiments, as a part of changing the first appearance of the second styles-mode user interface object, in accordance with a determination that the respective input is in a second direction that is different from the first direction (e.g., up/down/right/left direction), the computer system updates the first visual aspect in a second manner that is different from the first manner (e.g., as discussed in relation to FIGS. 6F and 6L). In some embodiments, the first manner is opposite of the second manner. In some embodiments, as a part of updating the first visual aspect in the first manner, the computer system increases (or, alternatively, decreases) the length and/or size of the first visual aspect (e.g., in a clockwise direction), and, as a part of updating the first visual aspect in the second manner, the computer system decreases (or, alternatively, increases) the length and/or size of the first visual aspect (e.g., in a counter-clockwise direction). In some embodiments, as a part of updating the first visual aspect in the first manner, the computer system adds more of a first color (e.g., red and/or black) and/or removes more of a second color (e.g., blue and/or white) from the second styles-mode user interface object, where the second color is different from the first color. In some embodiments, as a part of updating the first visual aspect in the second manner, the computer system adds more of the second color (e.g., red and/or black) and/or removes more of the first color (e.g., blue and/or white) from the second styles-mode user interface object. Updating the first visual aspect in a manner that is based on the direction of the respective input provides visual feedback that informs the user about how the first input is changing a parameter of a media-processing style, which provides improved visual feedback.

In some embodiments, as a part of changing the first appearance of the second styles-mode user interface object (e.g., 602*b*), the computer system displays the second styles-mode user interface object with a visual element that is an open shape (e.g., as shown by 602*b* in FIGS. 7C-7F) that has an opening. In some embodiments, in accordance with a determination that the respective input has set a second current value for the first parameter (e.g., 626*a*1 and/or 626*a*2) to a maximum value (e.g., 100, 150, 200, 256, and/or 300) for the first parameter, the opening (e.g., a gap) is on a first side (e.g., a side with respect to the midpoint, center, and/or origin of the shape) (e.g., a left side) of the open shape (e.g., without having an opening on the second side of the open shape) (e.g., as described above in relation to FIGS. 7C-7F). In some embodiments, in accordance with a determination that the respective input has set the second current value for the first parameter to a minimum value (e.g., 100, 150, 200, 256, and/or 300) for the first parameter that is different from the maximum value for the first parameter, the opening is on a second side (e.g., a side with respect to the midpoint, center, and/or origin of the shape) (e.g., a right side) of the open shape (e.g., without having an opening on the second side of the first open shape) that is different from the first side (e.g., without having an opening on the first side of the open shape) e.g., as shown by 602*b* in FIGS. 7C-7F). Displaying visual element that is an open shape, where the shape has an opening that is displayed on a different side based on whether the second current value is a minimum or a maximum value for the first parameter provides the user with visual feedback regarding the direction (e.g., clockwise direction and/or counter-clockwise direction) that the visual element progressed before reaching a position that indicates the minimum or maximum value for the first parameter, which provides improved visual feedback.

In some embodiments, as a part of changing an appearance of the second styles-mode user interface object (602*b*), the computer system changes display of a third visual aspect (e.g., a color of 602*b* and/or a line of 602*b* (e.g., as discussed above in relation to FIGS. 6F, 6L, 7C, 7D, and/or 7M) (e.g., a color, a shading, and/or a tint of at least a portion (and, in some embodiments, the portion includes the border (e.g., a line surrounding) of the second media-processing style)) of the second styles-mode user interface object (e.g., without changing the second visual aspect of the second styles-mode user interface object based on the determination that the value of the first parameter of the first media-processing style is different from the value of the first parameter of the second media-processing style).

In some embodiments, in response to detecting the respective input and in accordance with a determination that the respective input (e.g., 750*a*, 750*d*, 750*g*, 750*k*, 750*n*, 750*r*, and/or 750*t*) is directed to the first control for adjusting the current value for the first parameter (e.g., 626*a*1*c* and/or 626*a*2*c*), the computer system changes a second appearance (e.g., color and/or line surrounding 602*b*) (e.g., g, a color, a size, with a first border (e.g., line (e.g., that is shown in a clockwise and/or counter-clockwise direction) surrounding the second styles-modes user interface object, where in the line surrounds and/or is around a portion (e.g., 0%-100%) of the second styles-mode user interface object)) (e.g., as described above in relation to method 900 and/or FIGS. 6F and 6L) of the second styles-mode user interface object. In some embodiments, as a part of changing the second appearance of the second styles-mode user interface object, the computer system changes display of a fourth visual aspect (e.g., a size, a length, and/or a fill of at least a portion (e.g., a borderline and/or line that is around, adjacent to, and/or surrounds the second styles-mode user interface object) of the second media-processing style) of the second styles-mode user interface object. In some embodiments, the fourth visual aspect (e.g., a border and/or a line (e.g., or vice-versa)) is different from the third visual aspect (e.g., a color (e.g., or vice-versa)). Changing display of a particular visual element of the second styles-mode user interface object based on whether a value of a particular parameter has been changed, provides visual feedback to the user regarding which parameter has been changed for a media-processing style (and which parameter(s) have not been changed), which provides improved visual feedback.

Note that details of the processes described above with respect to method 1000 (e.g., FIGS. 10A-10B) are also applicable in an analogous manner to the methods described herein. For example, method 1000 optionally includes one or more of the characteristics of the various methods described above with reference to method 900. For example, method 900 can be used to select one or more media-processing styles and method 1000 can be used to edit the media that was selected using method 900. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of media-processing styles or any other media editing tools that may be of useful for them. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to media-processing styles that are useful to a user. Accordingly, use of such personal information data enables users to have calculated control of the delivered media-processing styles and/or the media-processing styles that are initially available to the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of providing media-processing styles to users, the present technology can be configured to allow users to select to "opt in" or "opt out" of participation in the collection of personal information data during registration for services or anytime thereafter. In another example, users can select not to share date regarding their customized media-processing styles, including media that they have captured on their personal devices. In yet another example, users can select to limit the length of captured media that is maintained or entirely prohibit the accessing of captured media. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, media-processing styles can be generated and made available based on non-personal information data or a bare minimum amount of personal information, such as the content being requested by the device associated with a user, other non-personal information available to the media editing and/or capturing, or publicly available information.

What is claimed is:

1. A computer system configured to communicate with a display generation component and one or more input devices, comprising:

one or more processors; and memory storing one or more programs configured to be executed by the one or more processors, the one or more programs including instructions for:

displaying, via the display generation component, a user interface that includes a representation of media, wherein the representation of the media is displayed using a first media-processing style that is applied to visual content of the media, wherein the first media-processing style is defined by a first value of a first parameter of the first media-processing style and a second value of a second parameter of the first media-processing style;

while displaying the representation of the media using the first media-processing style:

concurrently displaying, via the display generation component, a plurality of selectable user interface objects for the first media-processing style, including:

a first selectable user interface object for editing the first parameter of the first media-processing style that is displayed with a representation of a current value for the first parameter of the first media-processing style; and a second selectable user interface object for editing the second parameter of the first media-processing style that is displayed with a representation of a current value for the second parameter of the first media-processing style, wherein the first parameter is different from the second parameter; and displaying a first identifier that corresponds to the first media-processing style before detecting a first input directed to the plurality of selectable user interface objects for the first media-processing style;

while displaying the plurality of selectable user interface objects for the first media-processing style, detecting, via the one or more input devices, the first input directed to the plurality of selectable user interface objects for the first media-processing style; and in response to detecting the first input directed to the plurality of selectable user interface objects for the first media-processing style:

in accordance with a determination that the first input is directed to the first selectable user interface object for editing the first parameter of the first media-processing style, displaying, via the display generation component, a first control for adjusting the current value for the first parameter;

in accordance with a determination that the first input is directed to the second selectable user interface object for editing the second parameter of the first media-processing style, displaying, via the display generation component, a second control for adjusting the current value for the second parameter; and in accordance with a determination that the current value for the first parameter has changed to a value that is different from a default value of the first parameter of the first media-processing style, displaying a second identifier, wherein the second identifier is different from the first identifier.

2. The computer system of claim 1, the one or more programs further including instructions for:

while displaying the representation of the media using the first media-processing style and the plurality of selectable user interface objects for the first media-processing style, detecting a request to display the representation of the media using a third media-processing style that is applied to the visual content of the media; and in response to detecting the request to display the representation of the media using the third media-processing style that is applied to the visual content of the media, ceasing to display the plurality of selectable user interface objects for the first media-processing style.

3. The computer system of claim 1, wherein displaying, via the display generation component, the first control for adjusting the current value for the first parameter includes expanding the first selectable user interface object for editing the first parameter of the first media-processing style.

4. The computer system of claim 1, the one or more programs further including instructions for:

while displaying, via the display generation component, the first control for adjusting the current value for the first parameter, detecting an end of the first input directed to the plurality of selectable user interface objects for the first media-processing style; and in response to detecting the end of the first input directed to the plurality of selectable user interface objects for the first media-processing style, reducing a size of the first control for adjusting the current value for the first parameter.

5. The computer system of claim 1, wherein:

the first selectable user interface object for editing the first parameter is displayed with a first representation of a first range of values for the first parameter, the first range of values having a first distance between a first point in the first representation of the first range of values representing a third value and a second point in the first representation of the first range of values representing a fourth value; and displaying the first control includes displaying a second representation of a range of values which has a second distance, greater than the first distance, between a first point in the second representation of the range of values representing the third value and a second point in the second representation of the range of values representing the fourth value.

6. The computer system of claim 1, wherein the first control is displayed with a third representation of a third range of values for the first parameter, the third range of values having a third distance between a first point in the third representation of the third range of values representing a third value and a second point in the third representation of the third range of values representing a fourth value, the one or more programs further including instructions for:

while displaying, via the display generation component, the first control with the third representation of the third range of values for the first parameter, detecting an end of the first input directed to the plurality of selectable user interface objects for the first media-processing style; and in response to detecting the end of the first input directed to the plurality of selectable user interface objects for the first media-processing style, displaying the first selectable user interface object for editing the first parameter with a fifth representation of a range of values which has a fourth distance, lesser than the third distance, between a first point in the fifth representation of the range of values representing the third value and a second point in the fifth representation of the range of values representing the fourth value.

7. The computer system of claim 1, the one or more programs further including instructions for:

in response to detecting the first input directed to the plurality of selectable user interface objects for the first media-processing style and in accordance with a determination that the first input is directed to the first selectable user interface object for editing the first parameter of the first media-processing style, ceasing to display the second control for adjusting the current value for the second parameter.

8. The computer system of claim 1, wherein the user interface includes a selectable user interface object for resetting one or more parameters of the first media-processing style, the one or more programs further including instructions for:

while displaying the selectable user interface object for resetting one or more parameters of the first media-processing style, detecting an input directed to the selectable user interface object for resetting the one or more parameters of the first media-processing style; and in response to detecting the input directed to the selectable user interface object for resetting the one or more parameters of the first media-processing style:

displaying the representation of the current value for the first parameter of the first media-processing style as a second default value for the first parameter of the first media-processing style; and displaying the representation of the current value for the second parameter of the first media-processing style as a second default value for the second parameter of the first media-processing style.

9. The computer system of claim 8, the one or more programs further including instructions for:

in response to detecting the input directed to the selectable user interface object for resetting the one or more parameters of the first media-processing style, displaying a prompt to confirm resetting the one or more parameters of the first media-processing style.

10. The computer system of claim 1, wherein the user interface includes a second selectable user interface object for capturing media, the one or more programs further including instructions for:

while displaying the representation of the media using the first media-processing style and the second selectable user interface object for capturing media, detecting an input directed to the second selectable user interface object for capturing media; and in response to detecting the input directed to the second selectable user interface object for capturing media, capturing third media that has the first media-processing style applied.

11. The computer system of claim 1, wherein displaying the representation of the media using the first media-processing style includes applying the first media-processing style differently to one or more objects in a first portion of the representation of the media than to a second portion of the representation of the media that does not include the one or more objects.

12. The computer system of claim 1, the one or more programs further including instructions for:

while displaying the plurality of selectable user interface objects for the first media-processing style, detecting, via the one or more input devices, a third input directed to the representation of the media;

in response to detecting the third input directed to the representation of the media, displaying a portion of the representation of the media using a fifth media-processing style; and while displaying the portion of the representation of the media using the fifth media-processing style and in accordance with a determination that the portion of the representation of the media displayed using the fifth media-processing style is greater than a threshold amount of the representation of the media, displaying a representation of a current value for a first parameter of the fifth media-processing style and ceasing to display the representation of the current value for the first parameter of the first media-processing style.

13. The computer system of claim 1, the one or more programs further including instructions for:

in response to detecting the first input directed to the plurality of selectable user interface objects for the first media-processing style and in accordance with a determination that at least one current value for one or more parameters of the first media-processing style is different from one or more default values for the one or more parameters of the first media-processing style, adding a first custom media-processing style that is different from the first media-processing style to a set of available media-processing styles.

14. The computer system of claim 13, the one or more programs further including instructions for:

in response to detecting the first input directed to the plurality of selectable user interface objects for the first media-processing style and in accordance with a determination that at least one current value for one or more parameters of the first media-processing style is different from one or more default values for the one or more parameters of the first media-processing style:

in accordance with a determination that a difference between the at least one current value for the one or more parameters of the first media-processing style and the one or more default values for the one or more parameters of the first media-processing style is a first difference, displaying a first text identifier for the first custom media-processing style; and in accordance with a determination that a difference between the at least one current value for the one or more parameters of the first media-processing style and the one or more default values for the one or more parameters of the first media-processing style is a second difference that is different from the first difference, displaying a second text identifier for the first custom media-processing style, wherein the second text identifier is different from the first text identifier.

15. The computer system of claim 14, wherein the first media-processing style has a third text identifier that is different from the first text identifier and the second text identifier, the one or more programs further including instructions for:

while the set of available media-processing styles includes the first custom media-processing style, detecting a third request to change one or more parameters of the first custom media-processing style; and in response to detecting the third request to change the one or more parameters of the first custom media-processing style and in accordance with a determination that the first custom media-processing style would be, after the third request is implemented, the same as one or more other available media-processing styles, displaying the third text identifier.

16. The computer system of claim 1, wherein the plurality of selectable user interface objects for the first media-processing style are displayed in response to detecting a request to edit the first media-processing style.

17. The computer system of claim 1, wherein the user interface including the representation of the media includes a second styles-mode user interface object that, when selected, causes the representation of the media to be displayed with a third selected media-processing style applied, the one or more programs further including instructions for:

detecting a respective input; and in response to detecting the respective input and in accordance with a determination that the respective input is directed to the first control for adjusting the current value for the first parameter, changing a first appearance of the second styles-mode user interface object.

18. The computer system of claim 17, wherein changing the first appearance of the second styles-mode user interface object includes changing display of a third visual aspect of the second styles-mode user interface object.

19. The computer system of claim 1, wherein the first media-processing style is for newly captured media.

20. The computer system of claim 1, wherein:

a third identifier that corresponds to a second media-processing style is displayed in response to detecting, via the one or more input devices, a second input that corresponds to a request to change the first media-processing style to the second media-processing style different from the first media-processing style; and the second identifier is re-displayed in response to detecting, via the one or more input devices, a third input that corresponds to a request to change the second media-processing style back to the first media-processing style.

21. A non-transitory computer-readable storage medium storing one or more programs configured to be executed by one or more processors of a computer system that is in communication with a display generation component and one or more input devices, the one or more programs including instructions for:

displaying, via the display generation component, a user interface that includes a representation of media, wherein the representation of the media is displayed using a first media-processing style that is applied to visual content of the media, wherein the first media-processing style is defined by a first value of a first parameter of the first media-processing style and a second value of a second parameter of the first media-processing style;

while displaying the representation of the media using the first media-processing style:

concurrently displaying, via the display generation component, a plurality of selectable user interface objects for the first media-processing style, including:

a first selectable user interface object for editing the first parameter of the first media-processing style that is displayed with a representation of a current value for the first parameter of the first media-processing style; and a second selectable user interface object for editing the second parameter of the first media-processing style that is displayed with a representation of a current value for the second parameter of the first media-processing style, wherein the first parameter is different from the second parameter; and displaying a first identifier that corresponds to the first media-processing style before detecting a first input directed to the plurality of selectable user interface objects for the first media-processing style;

while displaying the plurality of selectable user interface objects for the first media-processing style, detecting, via the one or more input devices, the first input directed to the plurality of selectable user interface objects for the first media-processing style; and in response to detecting the first input directed to the plurality of selectable user interface objects for the first media-processing style:

in accordance with a determination that the first input is directed to the first selectable user interface object for editing the first parameter of the first media-processing style, displaying, via the display generation component, a first control for adjusting the current value for the first parameter;

in accordance with a determination that the first input is directed to the second selectable user interface object for editing the second parameter of the first media-processing style, displaying, via the display generation component, a second control for adjusting the current value for the second parameter; and in accordance with a determination that the current value for the first parameter has changed to a value that is different from a default value of the first parameter of the first media-processing style, displaying a second identifier, wherein the second identifier is different from the first identifier.

22. The non-transitory computer-readable storage medium of claim 21, wherein the first media-processing style is for newly captured media.

23. The non-transitory computer-readable storage medium of claim 21, the one or more programs further including instructions for:

while displaying the representation of the media using the first media-processing style and the plurality of selectable user interface objects for the first media-processing style, detecting a request to display the representation of the media using a third media-processing style that is applied to the visual content of the media; and in response to detecting the request to display the representation of the media using the third media-processing style that is applied to the visual content of the media, ceasing to display the plurality of selectable user interface objects for the first media-processing style.

24. The non-transitory computer-readable storage medium of claim 21, wherein displaying, via the display generation component, the first control for adjusting the current value for the first parameter includes expanding the first selectable user interface object for editing the first parameter of the first media-processing style.

25. The non-transitory computer-readable storage medium of claim 21, the one or more programs further including instructions for:

while displaying, via the display generation component, the first control for adjusting the current value for the first parameter, detecting an end of the first input directed to the plurality of selectable user interface objects for the first media-processing style; and in response to detecting the end of the first input directed to the plurality of selectable user interface objects for the first media-processing style, reducing a size of the first control for adjusting the current value for the first parameter.

26. The non-transitory computer-readable storage medium of claim 21, wherein:

the first selectable user interface object for editing the first parameter is displayed with a first representation of a first range of values for the first parameter, the first range of values having a first distance between a first point in the first representation of the first range of values representing a third value and a second point in the first representation of the first range of values representing a fourth value; and displaying the first control includes displaying a second representation of a range of values which has a second distance, greater than the first distance, between a first point in the second representation of the range of values representing the third value and a second point in the second representation of the range of values representing the fourth value.

27. The non-transitory computer-readable storage medium of claim 21, wherein the first control is displayed with a third representation of a third range of values for the first parameter, the third range of values having a third distance between a first point in the third representation of the third range of values representing a third value and a second point in the third representation of the third range of values representing a fourth value, the one or more programs further including instructions for:

while displaying, via the display generation component, the first control with the third representation of the third range of values for the first parameter, detecting an end of the first input directed to the plurality of selectable user interface objects for the first media-processing style; and in response to detecting the end of the first input directed to the plurality of selectable user interface objects for the first media-processing style, displaying the first selectable user interface object for editing the first parameter with a fifth representation of a range of values which has a fourth distance, lesser than the third distance, between a first point in the fifth representation of the range of values representing the third value and a second point in the fifth representation of the range of values representing the fourth value.

28. The non-transitory computer-readable storage medium of claim 21, the one or more programs further including instructions for:

in response to detecting the first input directed to the plurality of selectable user interface objects for the first media-processing style and in accordance with a determination that the first input is directed to the first selectable user interface object for editing the first parameter of the first media-processing style, ceasing to display the second control for adjusting the current value for the second parameter.

29. The non-transitory computer-readable storage medium of claim 21, wherein the user interface includes a selectable user interface object for resetting one or more parameters of the first media-processing style, the one or more programs further including instructions for:

while displaying the selectable user interface object for resetting one or more parameters of the first media-processing style, detecting an input directed to the selectable user interface object for resetting the one or more parameters of the first media-processing style; and in response to detecting the input directed to the selectable user interface object for resetting the one or more parameters of the first media-processing style:

displaying the representation of the current value for the first parameter of the first media-processing style as a second default value for the first parameter of the first media-processing style; and displaying the representation of the current value for the second parameter of the first media-processing style as a second default value for the second parameter of the first media-processing style.

30. The non-transitory computer-readable storage medium of claim 29, the one or more programs further including instructions for:

in response to detecting the input directed to the selectable user interface object for resetting the one or more parameters of the first media-processing style, displaying a prompt to confirm resetting the one or more parameters of the first media-processing style.

31. The non-transitory computer-readable storage medium of claim 21, wherein the user interface includes a second selectable user interface object for capturing media, the one or more programs further including instructions for:

while displaying the representation of the media using the first media-processing style and the second selectable user interface object for capturing media, detecting an input directed to the second selectable user interface object for capturing media; and in response to detecting the input directed to the second selectable user interface object for capturing media, capturing third media that has the first media-processing style applied.

32. The non-transitory computer-readable storage medium of claim 21, wherein displaying the representation of the media using the first media-processing style includes applying the first media-processing style differently to one or more objects in a first portion of the representation of the media than to a second portion of the representation of the media that does not include the one or more objects.

33. The non-transitory computer-readable storage medium of claim 21, the one or more programs further including instructions for:

while displaying the plurality of selectable user interface objects for the first media-processing style, detecting, via the one or more input devices, a third input directed to the representation of the media;

in response to detecting the third input directed to the representation of the media, displaying a portion of the representation of the media using a fifth media-processing style; and while displaying the portion of the representation of the media using the fifth media-processing style and in accordance with a determination that the portion of the representation of the media displayed using the fifth media-processing style is greater than a threshold amount of the representation of the media, displaying a representation of a current value for a first parameter of the fifth media-processing style and ceasing to display the representation of the current value for the first parameter of the first media-processing style.

34. The non-transitory computer-readable storage medium of claim 21, the one or more programs further including instructions for:

in response to detecting the first input directed to the plurality of selectable user interface objects for the first media-processing style and in accordance with a determination that at least one current value for one or more parameters of the first media-processing style is different from one or more default values for the one or more parameters of the first media-processing style, adding a first custom media-processing style that is different from the first media-processing style to a set of available media-processing styles.

35. The non-transitory computer-readable storage medium of claim 34, the one or more programs further including instructions for:

in response to detecting the first input directed to the plurality of selectable user interface objects for the first media-processing style and in accordance with a determination that at least one current value for one or more parameters of the first media-processing style is different from one or more default values for the one or more parameters of the first media-processing style:

in accordance with a determination that a difference between the at least one current value for the one or more parameters of the first media-processing style and the one or more default values for the one or more parameters of the first media-processing style is a first difference, displaying a first text identifier for the first custom media-processing style; and in accordance with a determination that a difference between the at least one current value for the one or more parameters of the first media-processing style and the one or more default values for the one or more parameters of the first media-processing style is a second difference that is different from the first difference, displaying a second text identifier for the first custom media-processing style, wherein the second text identifier is different from the first text identifier.

36. The non-transitory computer-readable storage medium of claim 35, wherein the first media-processing style has a third text identifier that is different from the first text identifier and the second text identifier, the one or more programs further including instructions for:

while the set of available media-processing styles includes the first custom media-processing style, detecting a third request to change one or more parameters of the first custom media-processing style; and in response to detecting the third request to change the one or more parameters of the first custom media-processing style and in accordance with a determination that the first custom media-processing style would be, after the third request is implemented, the same as one or more other available media-processing styles, displaying the third text identifier.

37. The non-transitory computer-readable storage medium of claim 21, wherein the plurality of selectable user interface objects for the first media-processing style are displayed in response to detecting a request to edit the first media-processing style.

38. The non-transitory computer-readable storage medium of claim 21, wherein the user interface including the representation of the media includes a second styles-mode user interface object that, when selected, causes the representation of the media to be displayed with a third selected media-processing style applied, the one or more programs further including instructions for:

detecting a respective input; and in response to detecting the respective input and in accordance with a determination that the respective input is directed to the first control for adjusting the current value for the first parameter, changing a first appearance of the second styles-mode user interface object.

39. The non-transitory computer-readable storage medium of claim 38, wherein changing the first appearance of the second styles-mode user interface object includes changing display of a third visual aspect of the second styles-mode user interface object.

40. The non-transitory computer-readable storage medium of claim 21, wherein:

a third identifier that corresponds to a second media-processing style is displayed in response to detecting, via the one or more input devices, a second input that corresponds to a request to change the first media-processing style to the second media-processing style different from the first media-processing style; and the second identifier is re-displayed in response to detecting, via the one or more input devices, a third input that corresponds to a request to change the second media-processing style back to the first media-processing style.

41. A method, comprising:

at a computer system that is in communication with a display generation component and one or more input devices:

displaying, via the display generation component, a user interface that includes a representation of media, wherein the representation of the media is displayed using a first media-processing style that is applied to visual content of the media, wherein the first media-processing style is defined by a first value of a first parameter of the first media-processing style and a second value of a second parameter of the first media-processing style;

while displaying the representation of the media using the first media-processing style:

concurrently displaying, via the display generation component, a plurality of selectable user interface objects for the first media-processing style, including:

a first selectable user interface object for editing the first parameter of the first media-processing style that is displayed with a representation of a current value for the first parameter of the first media-processing style; and a second selectable user interface object for editing the second parameter of the first media-processing style that is displayed with a representation of a current value for the second parameter of the first media-processing style, wherein the first parameter is different from the second parameter; and displaying a first identifier that corresponds to the first media-processing style before detecting a first input directed to the plurality of selectable user interface objects for the first media-processing style;

while displaying the plurality of selectable user interface objects for the first media-processing style, detecting, via the one or more input devices, the first input directed to the plurality of selectable user interface objects for the first media-processing style; and in response to detecting the first input directed to the plurality of selectable user interface objects for the first media-processing style:

in accordance with a determination that the first input is directed to the first selectable user interface object for editing the first parameter of the first media-processing style, displaying, via the display generation component, a first control for adjusting the current value for the first parameter;

in accordance with a determination that the first input is directed to the second selectable user interface object for editing the second parameter of the first media-processing style, displaying, via the display generation component, a second control for adjusting the current value for the second parameter; and in accordance with a determination that the current value for the first parameter has changed to a value that is different from a default value of the first parameter of the first media-processing style, displaying a second identifier, wherein the second identifier is different from the first identifier.

42. The method of claim 41, wherein the first media-processing style is for newly captured media.

43. The method of claim 41, further comprising:

while displaying the representation of the media using the first media-processing style and the plurality of selectable user interface objects for the first media-processing style, detecting a request to display the representation of the media using a third media-processing style that is applied to the visual content of the media; and in response to detecting the request to display the representation of the media using the third media-processing style that is applied to the visual content of the media, ceasing to display the plurality of selectable user interface objects for the first media-processing style.

44. The method of claim 41, wherein displaying, via the display generation component, the first control for adjusting the current value for the first parameter includes expanding the first selectable user interface object for editing the first parameter of the first media-processing style.

45. The method of claim 41, further comprising:

while displaying, via the display generation component, the first control for adjusting the current value for the first parameter, detecting an end of the first input directed to the plurality of selectable user interface objects for the first media-processing style; and in response to detecting the end of the first input directed to the plurality of selectable user interface objects for the first media-processing style, reducing a size of the first control for adjusting the current value for the first parameter.

46. The method of claim 41, wherein:

the first selectable user interface object for editing the first parameter is displayed with a first representation of a first range of values for the first parameter, the first range of values having a first distance between a first point in the first representation of the first range of values representing a third value and a second point in the first representation of the first range of values representing a fourth value; and displaying the first control includes displaying a second representation of a range of values which has a second distance, greater than the first distance, between a first point in the second representation of the range of values representing the third value and a second point in the second representation of the range of values representing the fourth value.

47. The method of claim 41, wherein the first control is displayed with a third representation of a third range of values for the first parameter, the third range of values having a third distance between a first point in the third representation of the third range of values representing a third value and a second point in the third representation of the third range of values representing a fourth value, further comprising:

while displaying, via the display generation component, the first control with the third representation of the third range of values for the first parameter, detecting an end of the first input directed to the plurality of selectable user interface objects for the first media-processing style; and in response to detecting the end of the first input directed to the plurality of selectable user interface objects for the first media-processing style, displaying the first selectable user interface object for editing the first parameter with a fifth representation of a range of values which has a fourth distance, lesser than the third distance, between a first point in the fifth representation of the range of values representing the third value and a second point in the fifth representation of the range of values representing the fourth value.

48. The method of claim 41, further comprising:

in response to detecting the first input directed to the plurality of selectable user interface objects for the first media-processing style and in accordance with a determination that the first input is directed to the first selectable user interface object for editing the first parameter of the first media-processing style, ceasing to display the second control for adjusting the current value for the second parameter.

49. The method of claim 41, wherein the user interface includes a selectable user interface object for resetting one or more parameters of the first media-processing style, further comprising:

while displaying the selectable user interface object for resetting one or more parameters of the first media-processing style, detecting an input directed to the selectable user interface object for resetting the one or more parameters of the first media-processing style; and in response to detecting the input directed to the selectable user interface object for resetting the one or more parameters of the first media-processing style:

displaying the representation of the current value for the first parameter of the first media-processing style as a second default value for the first parameter of the first media-processing style; and displaying the representation of the current value for the second parameter of the first media-processing style as a second default value for the second parameter of the first media-processing style.

50. The method of claim 49, further comprising:

in response to detecting the input directed to the selectable user interface object for resetting the one or more parameters of the first media-processing style, displaying a prompt to confirm resetting the one or more parameters of the first media-processing style.

51. The method of claim 41, wherein the user interface includes a second selectable user interface object for capturing media, further comprising:

while displaying the representation of the media using the first media-processing style and the second selectable user interface object for capturing media, detecting an input directed to the second selectable user interface object for capturing media; and in response to detecting the input directed to the second selectable user interface object for capturing media, capturing third media that has the first media-processing style applied.

52. The method of claim 41, wherein displaying the representation of the media using the first media-processing style includes applying the first media-processing style differently to one or more objects in a first portion of the representation of the media than to a second portion of the representation of the media that does not include the one or more objects.

53. The method of claim 41, further comprising:

while displaying the plurality of selectable user interface objects for the first media-processing style, detecting, via the one or more input devices, a third input directed to the representation of the media;

in response to detecting the third input directed to the representation of the media, displaying a portion of the representation of the media using a fifth media-processing style; and while displaying the portion of the representation of the media using the fifth media-processing style and in accordance with a determination that the portion of the representation of the media displayed using the fifth media-processing style is greater than a threshold amount of the representation of the media, displaying a representation of a current value for a first parameter of the fifth media-processing style and ceasing to display the representation of the current value for the first parameter of the first media-processing style.

54. The method of claim 41, further comprising:

in response to detecting the first input directed to the plurality of selectable user interface objects for the first media-processing style and in accordance with a determination that at least one current value for one or more parameters of the first media-processing style is different from one or more default values for the one or more parameters of the first media-processing style, adding a first custom media-processing style that is different from the first media-processing style to a set of available media-processing styles.

55. The method of claim 54, further comprising:

in response to detecting the first input directed to the plurality of selectable user interface objects for the first media-processing style and in accordance with a determination that at least one current value for one or more parameters of the first media-processing style is different from one or more default values for the one or more parameters of the first media-processing style:

in accordance with a determination that a difference between the at least one current value for the one or more parameters of the first media-processing style and the one or more default values for the one or more parameters of the first media-processing style is a first difference, displaying a first text identifier for the first custom media-processing style; and in accordance with a determination that a difference between the at least one current value for the one or more parameters of the first media-processing style and the one or more default values for the one or more parameters of the first media-processing style is a second difference that is different from the first difference, displaying a second text identifier for the first custom media-processing style, wherein the second text identifier is different from the first text identifier.

56. The method of claim 55, wherein the first media-processing style has a third text identifier that is different from the first text identifier and the second text identifier, further comprising:

while the set of available media-processing styles includes the first custom media-processing style, detecting a third request to change one or more parameters of the first custom media-processing style; and in response to detecting the third request to change the one or more parameters of the first custom media-processing style and in accordance with a determination that the first custom media-processing style would be, after the third request is implemented, the same as one or more other available media-processing styles, displaying the third text identifier.

57. The method of claim 41, wherein the plurality of selectable user interface objects for the first media-processing style are displayed in response to detecting a request to edit the first media-processing style.

58. The method of claim 41, wherein the user interface including the representation of the media includes a second styles-mode user interface object that, when selected, causes the representation of the media to be displayed with a third selected media-processing style applied, further comprising:

detecting a respective input; and in response to detecting the respective input and in accordance with a determination that the respective input is directed to the first control for adjusting the current value for the first parameter, changing a first appearance of the second styles-mode user interface object.

59. The method of claim 58, wherein changing the first appearance of the second styles-mode user interface object includes changing display of a third visual aspect of the second styles-mode user interface object.

60. The method of claim 41, wherein:

a third identifier that corresponds to a second media-processing style is displayed in response to detecting, via the one or more input devices, a second input that corresponds to a request to change the first media-processing style to the second media-processing style different from the first media-processing style; and the second identifier is re-displayed in response to detecting, via the one or more input devices, a third input that corresponds to a request to change the second media-processing style back to the first media-processing style.

* * * * *